US012743727B2

(12) United States Patent
Gao et al.

(10) Patent No.: US 12,743,727 B2
(45) Date of Patent: Sep. 22, 2026

(54) MACHINE LEARNING PORTFOLIO SIMULATING AND OPTIMIZING APPARATUSES, METHODS AND SYSTEMS

(71) Applicant: FMR LLC, Boston, MA (US)

(72) Inventors: Aaron Gao, Wayland, MA (US); Samarjit Walia, Lexington, MA (US); Deepak Bhaskaran, Cary, NC (US); Jiawen Dai, Somerville, MA (US); Xiao Zhang, Norwood, MA (US); Peng Sun, Morrisville, NC (US); Christine Thompson, Bedford, MA (US); Niyu Jia, Revere, MA (US); Songyang Li, Somerville, MA (US); Yongsheng Gao, Shrewsbury, MA (US)

(73) Assignee: FMR LLC, Boston, MA (US)

( * ) Notice: Subject to any disclaimer, the term of this patent is extended or adjusted under 35 U.S.C. 154(b) by 1275 days.

(21) Appl. No.: 17/383,289

(22) Filed: Jul. 22, 2021

(65) Prior Publication Data

US 2022/0101437 A1 Mar. 31, 2022

Related U.S. Application Data

(60) Provisional application No. 63/055,876, filed on Jul. 23, 2020.

(51) Int. Cl.

*G06Q 40/06* (2012.01)
*G06F 16/23* (2019.01)

(Continued)

(52) U.S. Cl.

CPC ..... *G06Q 40/0631* (2025.08); *G06F 16/2386* (2019.01); *G06F 16/2433* (2019.01);

(Continued)

(58) Field of Classification Search

CPC ............................ G06Q 40/06; G06F 16/2386

See application file for complete search history.

(56) References Cited

U.S. PATENT DOCUMENTS 7,016,870 B1 3/2006 Jones
7,774,257 B2 8/2010 Maggioncalda (Continued)

OTHER PUBLICATIONS

Buehler, Hans, et al. “A data-driven market simulator for small data environments.” arXiv preprint arXiv:2006.14498 (2020). (Year: 2020).*

(Continued)

*Primary Examiner* — Kevin W Figueroa

(74) *Attorney, Agent, or Firm* — Hanchuk Kheit LLP.; Walter G. Hanchuk

(57) ABSTRACT

The Machine Learning Portfolio Simulating and Optimizing Apparatuses, Methods and Systems (“MLPO”) transforms machine learning simulation request, decision tree ensembles training request, expected returns calculation request, portfolio construction request, predefined scenario construction request, portfolio returns visualization request inputs via MLPO components into machine learning simulation response, decision tree ensembles training response, expected returns calculation response, portfolio construction response, predefined scenario construction response, portfolio returns visualization response outputs. Neural networks are used as encoder to generate a set of latent variables. Latent variables are simulated with neural networks as decoder such that the decoded simulated market scenarios follow dynamic dependencies and volatilities of historical market risk factors. A transfer layer is used between the encoder and the decoder to allow latent space variables to take on any distributions and any dependency joint distribution structures.

15 Claims, 108 Drawing Sheets

(51) Int. Cl.

| | |
|---|---|
| ***G06F 16/242*** | (2019.01) |
| ***G06F 16/26*** | (2019.01) |
| ***G06F 30/27*** | (2020.01) |
| ***G06N 3/045*** | (2023.01) |
| ***G06Q 30/0201*** | (2023.01) |
| ***G06Q 30/0202*** | (2023.01) |

(52) U.S. Cl.
CPC .............. *G06F 16/26* (2019.01); *G06F 30/27* (2020.01); *G06N 3/045* (2023.01); *G06Q 30/0201* (2013.01); *G06Q 30/0202* (2013.01); *G06Q 30/0206* (2013.01); *G06Q 40/06* (2013.01)

(56) References Cited

U.S. PATENT DOCUMENTS

| | | | | |
|---|---|---|---|---|
| 7,788,155 | B2 | 8/2010 | Jones | |
| 7,983,975 | B2 | 7/2011 | Jones | |
| 10,290,059 | B2 | 5/2019 | Basu | |
| 11,113,704 | B2 | 9/2021 | Toweiss | |
| 2002/0073180 | A1 | 6/2002 | Dewhurst | |
| 2002/0147671 | A1 | 10/2002 | Sloan | |
| 2003/0074307 | A1 | 4/2003 | Maestle | |
| 2004/0019564 | A1 | 1/2004 | Goldthwaite | |
| 2007/0208645 | A1 | 9/2007 | Hoffman | |
| 2008/0154792 | A1 | 6/2008 | Maggioncalda | |
| 2009/0006270 | A1 | 1/2009 | Penello | |
| 2012/0246094 | A1 * | 9/2012 | Hsu ........................ | G06Q 40/06 705/36 R |
| 2013/0091046 | A1 | 4/2013 | Benbrahim | |
| 2015/0206245 | A1 | 7/2015 | Basu | |
| 2016/0155200 | A1 | 6/2016 | Basu | |
| 2016/0217366 | A1 | 7/2016 | Li | |
| 2016/0275609 | A1 | 9/2016 | Dintenfass | |
| 2017/0103678 | A1 | 4/2017 | Gingher | |
| 2017/0124652 | A1 | 5/2017 | Beaven | |
| 2017/0185922 | A1 | 6/2017 | Lange | |
| 2017/0323385 | A1 | 11/2017 | Sivaramakrishnan | |
| 2021/0027379 | A1 * | 1/2021 | Zhu .......................... | G06N 3/08 |
| 2021/0374761 | A1 | 12/2021 | Ramanathan | |
| 2022/0004428 | A1 | 1/2022 | Sun | |
| 2022/0058738 | A1 | 2/2022 | Rebuth | |
| 2022/0058739 | A1 | 2/2022 | Ding | |

OTHER PUBLICATIONS

Wilhelmsson, Per. "Hierarchical Clustering of Time Series using Gaussian Mixture Models and Variational Autoencoders." Master's Theses in Mathematical Sciences (2019). (Year: 2019).*

Amazon SageMaker Developer Guide (dated Mar. 8, 2021) [https://web.archive.org/web/20210308125800/https://docs.aws.amazon.com/sagemaker/latest/dg/sagemaker-dg.pdf] (Year: 2021).*

Buehler, Hans, et al. "A data-driven market simulator for small data environments." arXiv preprint arXiv:2006.14498 (2020).

Wilhelmsson, Per. "Hierarchical Clustering of Time Series using Gaussian Mixture Models and Variational Autoencoders." Master's Theses in Mathematical Sciences (2019).

* cited by examiner

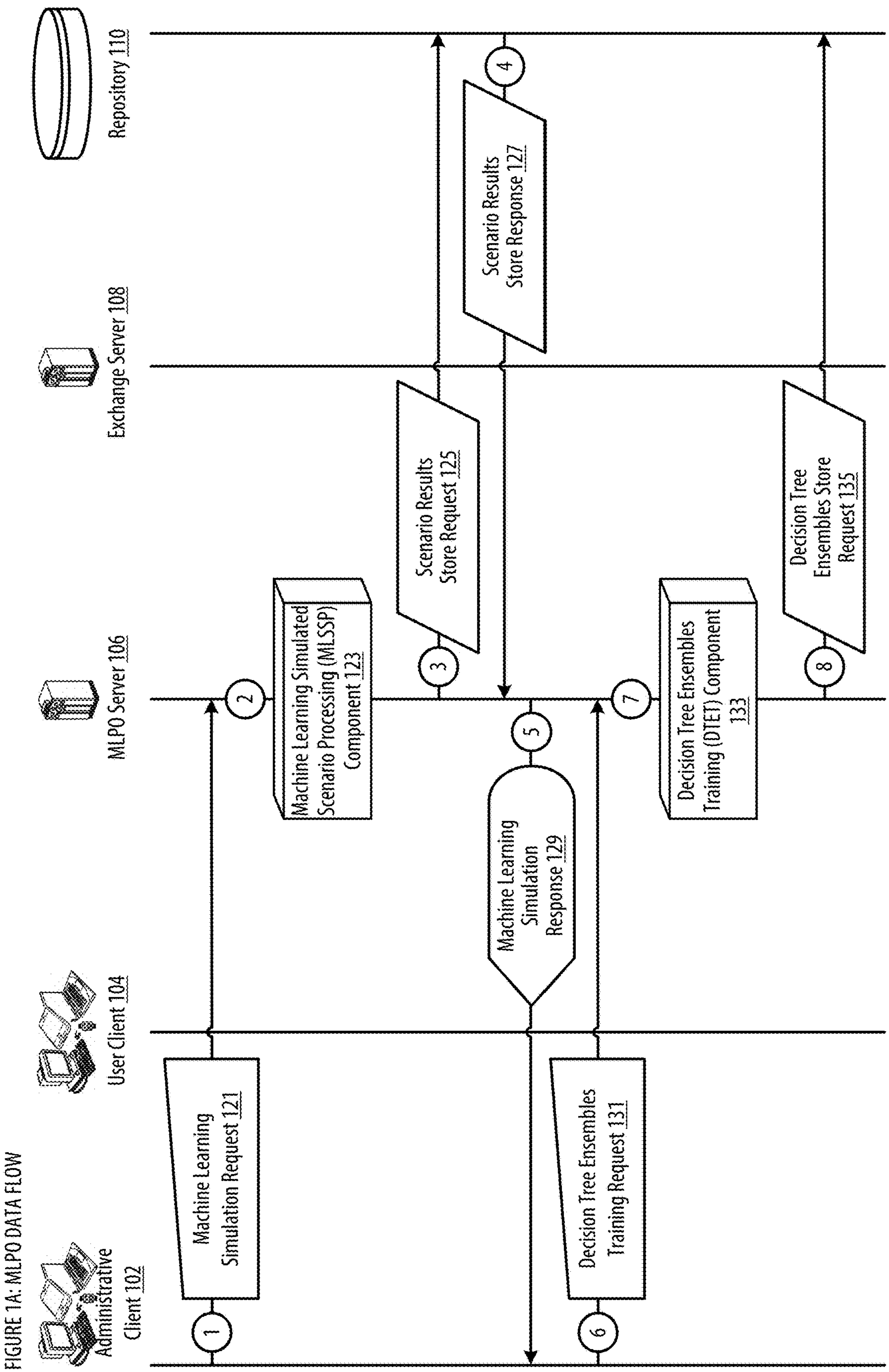
FIGURE 1A: MLPO DATA FLOW
Administrative Client 102
User Client 104
MLPO Server 106
Exchange Server 108
Repository 110
1
Machine Learning Simulation Request 121
2
Machine Learning Simulated Scenario Processing (MLSSP) Component 123
3
Scenario Results Store Request 125
4
Scenario Results Store Response 127
5
Machine Learning Simulation Response 129
6
Decision Tree Ensembles Training Request 131
7
Decision Tree Ensembles Training (DTET) Component 133
8
Decision Tree Ensembles Store Request 135

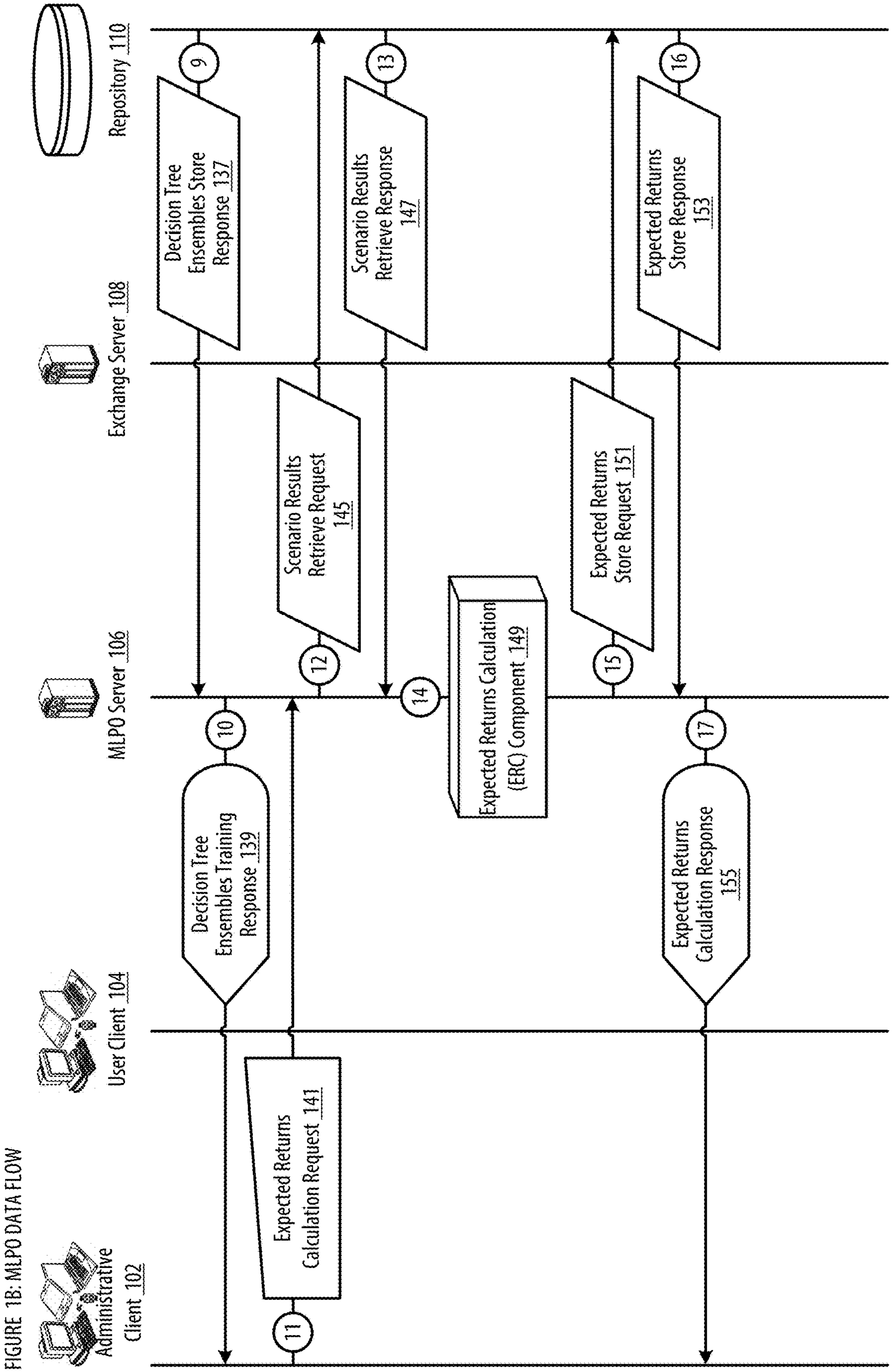
FIGURE 1B: MLPO DATA FLOW
Administrative Client 102
User Client 104
MLPO Server 106
Exchange Server 108
Repository 110
Decision Tree Ensembles Store Response 137
Decision Tree Ensembles Training Response 139
Expected Returns Calculation Request 141
Scenario Results Retrieve Request 145
Scenario Results Retrieve Response 147
Expected Returns Calculation (ERC) Component 149
Expected Returns Store Request 151
Expected Returns Store Response 153
Expected Returns Calculation Response 155
9
10
11
12
13
14
15
16
17

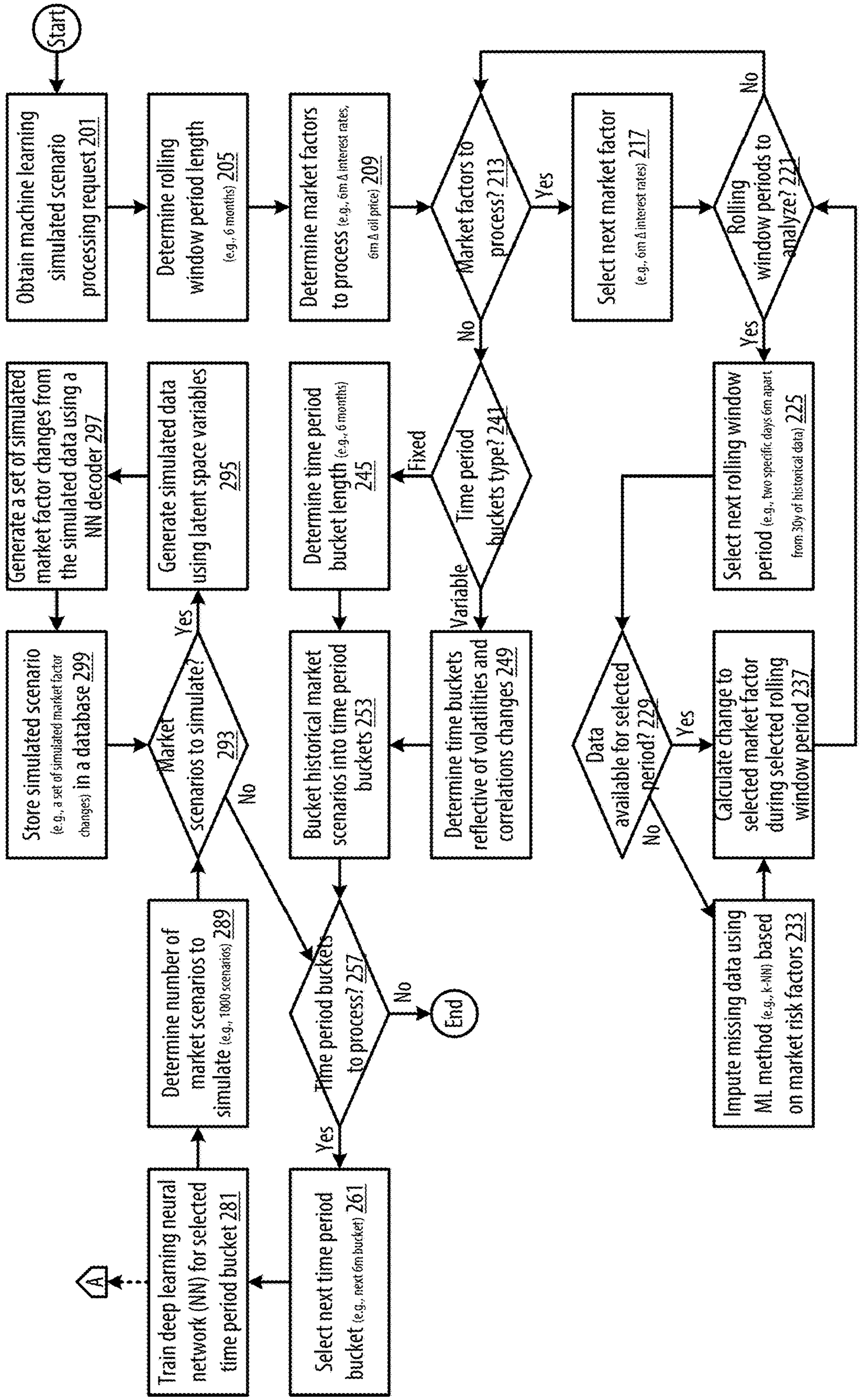
FIGURE 2A: MLPO MLSSP COMPONENT

FIGURE 2B: MLPO MLSSP COMPONENT
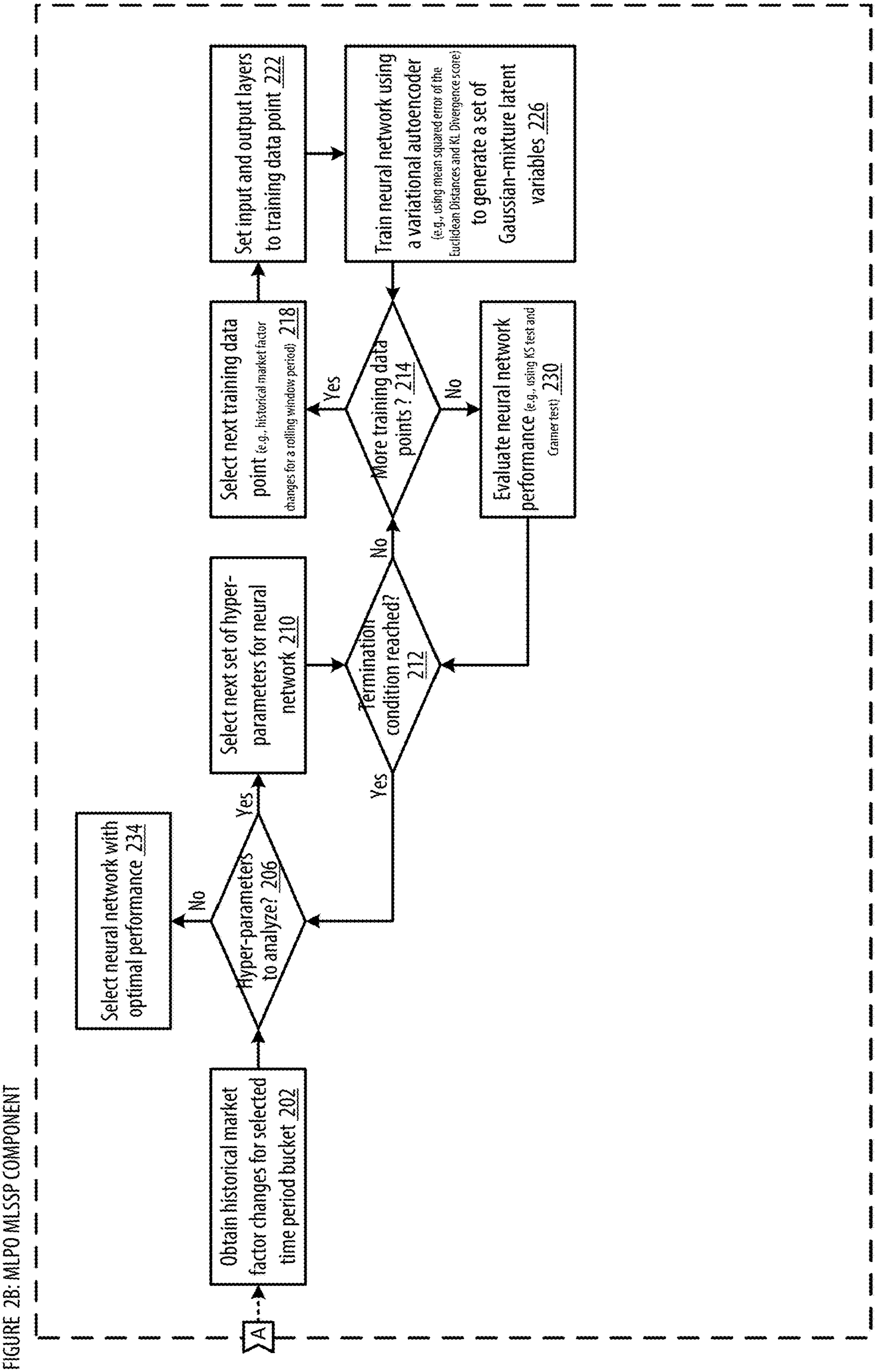

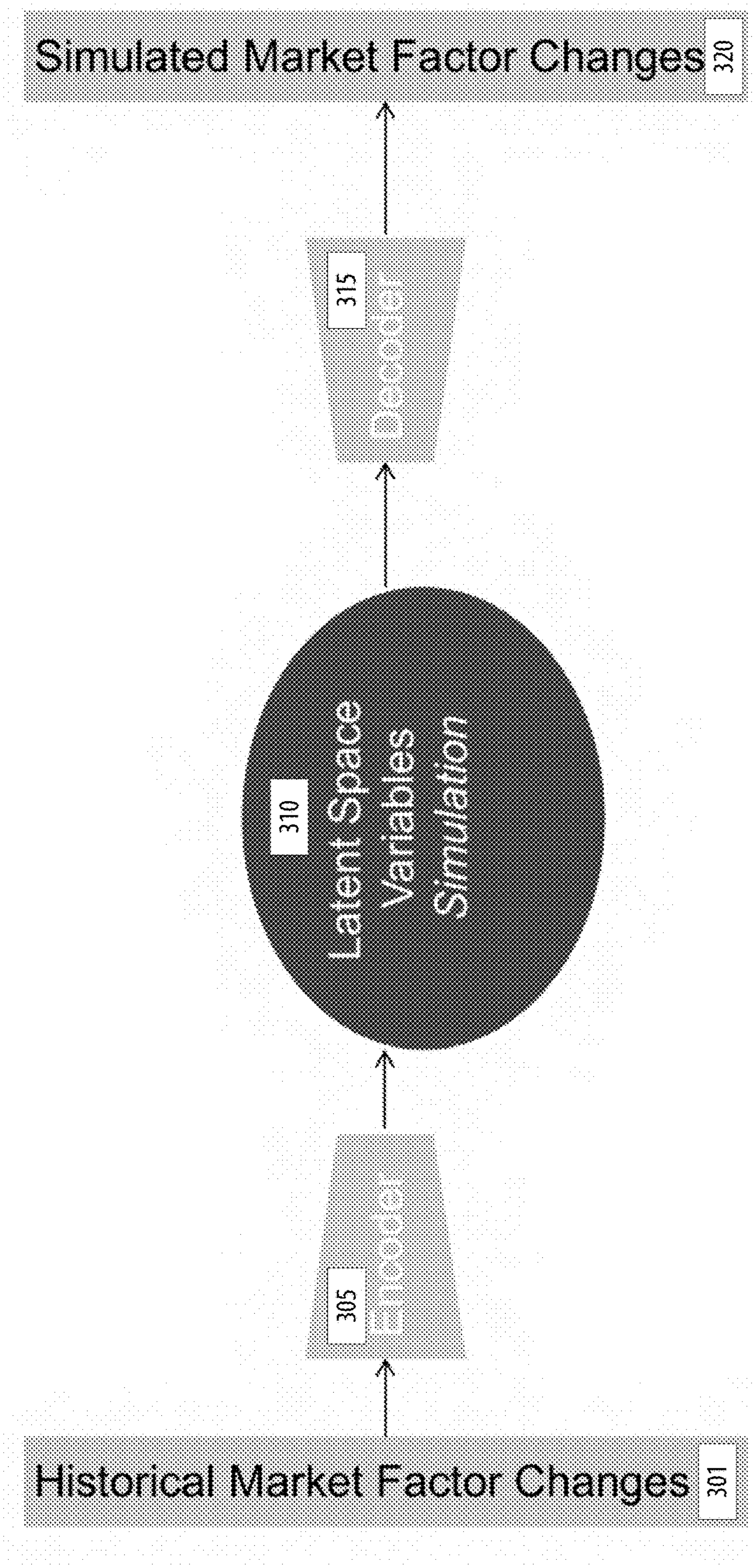
FIGURE 3: MLPO NEURAL NETWORK ARCHITECTURE

FIGURE 4: MLPO MLSSP COMPONENT
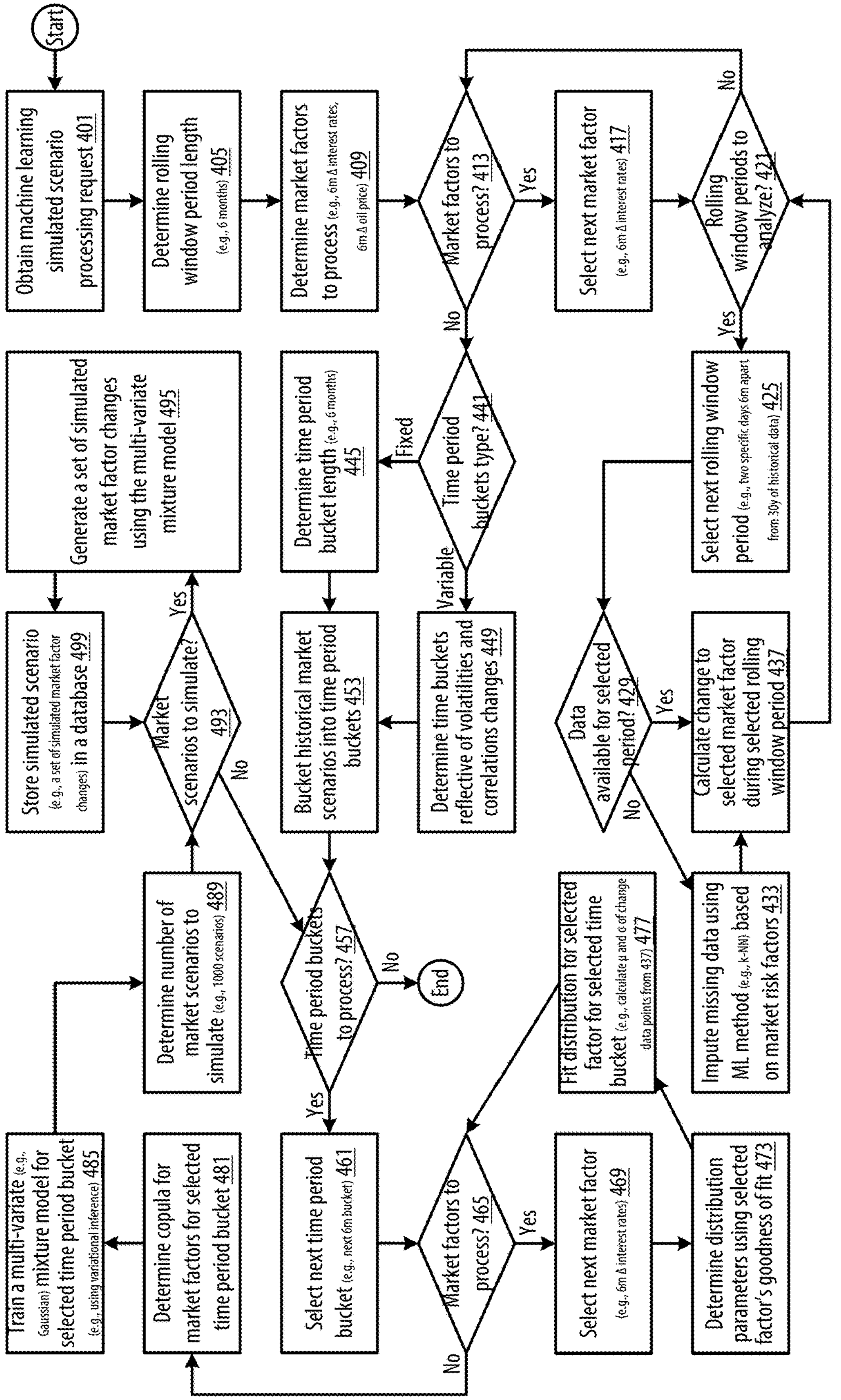

FIGURE 5: MLPO DTET COMPONENT
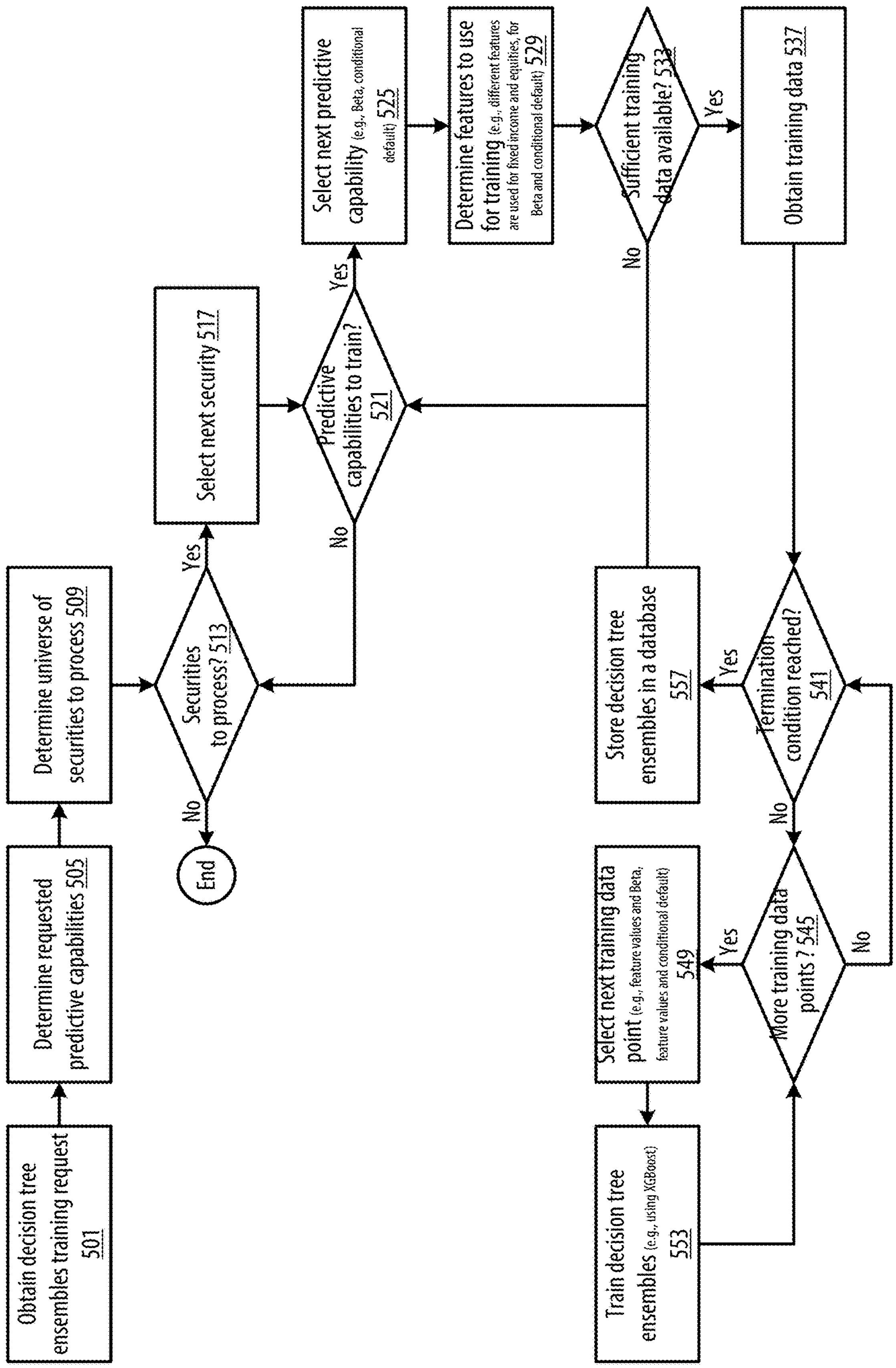

FIGURE 6A: MLPO IMPLEMENTATION CASE

Estimating Conditional Beta for Fixed Income - Use the following features:

- Realized Market Scenarios: 3 Month VIX change, 3 Month MUNI Index OAS change, Slope of VIX change over trailing month, Convexity of VIX change over trailing month, Slope of Muni Index OAS change over trailing month, Convexity of Muni Index OAS change over trailing month, Muni 2Y change, Muni 5Y change, Muni 10Y change, Muni 20Y change
- Instrument to Index relative measures: OAS Ratio, OAS Change Ratio, Slope of OAS Change Ratio over trailing month, Convexity of OAS Change Ratio over trailing month
- Market Scenarios of the next time period: Change in VIX, Change in MUNI Index OAS

Figure 6B:
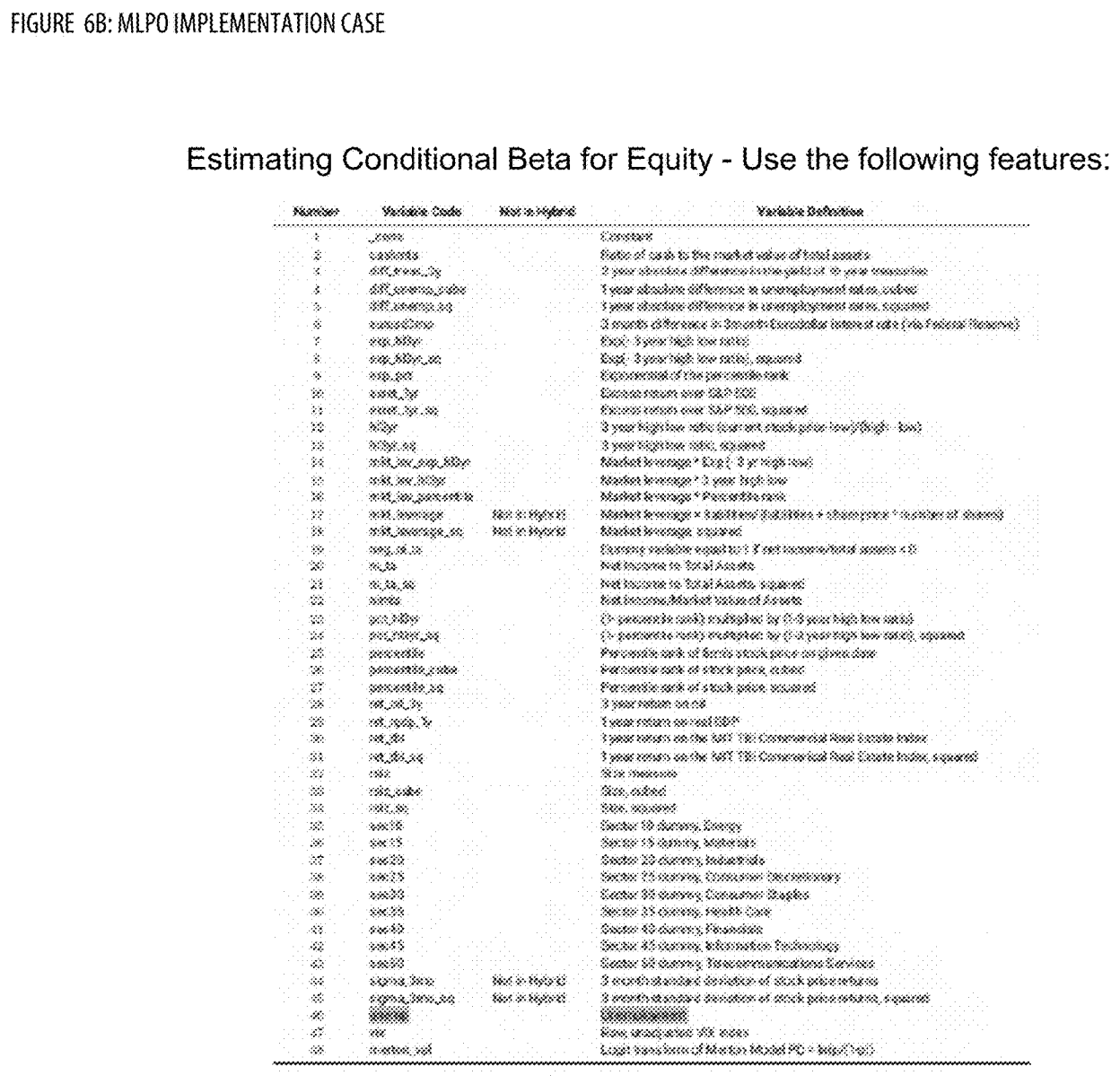

FIGURE 6B: MLPO IMPLEMENTATION CASE

Estimating Conditional Beta for Equity - Use the following features:

| Number | Variable Code | Not in Hybrid | Variable Definition |
|---|---|---|---|
| 1 | _cons | | Constant |
| 2 | cashmkta | | Ratio of cash to the market value of total assets |
| 3 | diff_treas_3y | | 3 year absolute difference in the yield of 10 year treasuries |
| 4 | diff_unemp_cube | | 1 year absolute difference in unemployment rates, cubed |
| 5 | diff_unemp_sq | | 1 year absolute difference in unemployment rates, squared |
| 6 | [illegible] | | 3 month difference in [illegible] interest rate (via Federal Reserve) |
| 7 | exp_hl3yr | | Exp(- 3 year high low ratio) |
| 8 | exp_hl3yr_sq | | Exp(- 3 year high low ratio), squared |
| 9 | exp_pct | | Exponential of the percentile rank |
| 10 | exret_3yr | | Excess return over S&P 500 |
| 11 | exret_3yr_sq | | Excess return over S&P 500, squared |
| 12 | hl3yr | | 3 year high low ratio (current stock price low)/(high - low) |
| 13 | hl3yr_sq | | 3 year high low ratio, squared |
| 14 | mkt_lev_exp_hl3yr | | Market leverage * Exp(- 3 yr high low) |
| 15 | mkt_lev_hl3yr | | Market leverage * 3 year high low |
| 16 | mkt_lev_percentile | | Market leverage * Percentile rank |
| 17 | mkt_leverage | Not in Hybrid | Market leverage = total liabilities/(liabilities + share price * number of shares) |
| 18 | mkt_leverage_sq | Not in Hybrid | Market leverage, squared |
| 19 | neg_ni_ta | | Dummy variable equal to 1 if net income/total assets < 0 |
| 20 | ni_ta | | Net Income to Total Assets |
| 21 | ni_ta_sq | | Net Income to Total Assets, squared |
| 22 | nimta | | Net Income/Market Value of Assets |
| 23 | pct_hl3yr | | (1- percentile rank) multiplied by (1-3 year high low ratio) |
| 24 | pct_hl3yr_sq | | (1- percentile rank) multiplied by (1-3 year high low ratio), squared |
| 25 | percentile | | Percentile rank of firm's stock price on given date |
| 26 | percentile_cube | | Percentile rank of stock price, cubed |
| 27 | percentile_sq | | Percentile rank of stock price, squared |
| 28 | [illegible] | | 3 year return on [illegible] |
| 29 | [illegible] | | 1 year return on [illegible] |
| 30 | [illegible] | | 1 year return on the MIT TBI Commercial Real Estate Index |
| 31 | [illegible] | | 1 year return on the MIT TBI Commercial Real Estate Index, squared |
| 32 | size | | Size measure |
| 33 | size_cube | | Size, cubed |
| 34 | size_sq | | Size, squared |
| 35 | sec10 | | Sector 10 dummy, Energy |
| 36 | sec15 | | Sector 15 dummy, Materials |
| 37 | sec20 | | Sector 20 dummy, Industrials |
| 38 | sec25 | | Sector 25 dummy, Consumer Discretionary |
| 39 | sec30 | | Sector 30 dummy, Consumer Staples |
| 40 | sec35 | | Sector 35 dummy, Health Care |
| 41 | sec40 | | Sector 40 dummy, Financials |
| 42 | sec45 | | Sector 45 dummy, Information Technology |
| 43 | sec50 | | Sector 50 dummy, Telecommunications Services |
| 44 | sigma_3mo | Not in Hybrid | 3 month standard deviation of stock price returns |
| 45 | sigma_3mo_sq | Not in Hybrid | 3 month standard deviation of stock price returns, squared |
| 46 | [illegible] | | [illegible] |
| 47 | vix | | Raw, unadjusted VIX index |
| 48 | [illegible] | | Logit transform of Merton Model PD = [illegible] |

FIGURE 6 C: MLPO IMPLEMENTATION CASE

Estimating Conditional Default for Fixed Income - Use the following features:

- Realized Market Scenarios: 3 Month VIX change, 3 Month Corporate Index OAS change, Slope of VIX change over trailing month, Convexity of VIX change over trailing month, Slope of Corporate Index OAS change over trailing month, Convexity of Corporate Index OAS change over trailing month, TSY Curve key rates changes
- Instrument to Index relative measures: OAS Ratio, OAS Change Ratio, Slope of OAS Change Ratio over trailing month, Convexity of OAS Change Ratio over trailing month
- Market Scenarios of the next time period: Change in VIX, Change in Corporate Index OAS

FIGURE 6 D: MLPO IMPLEMENTATION CASE

Estimating Conditional Default for Equity - Use the following features:

- Instrument to index relative OAS Ratio, Slope and Convexity of Instrument to index relative OAS Change Ratio over trailing month, Change in VIX, Change in Corporate Index OAS, Slope and Convexity of VIX change over trailing month, Slope and Convexity of Corporate Index OAS change over trailing month, TSY Curve key rates changes

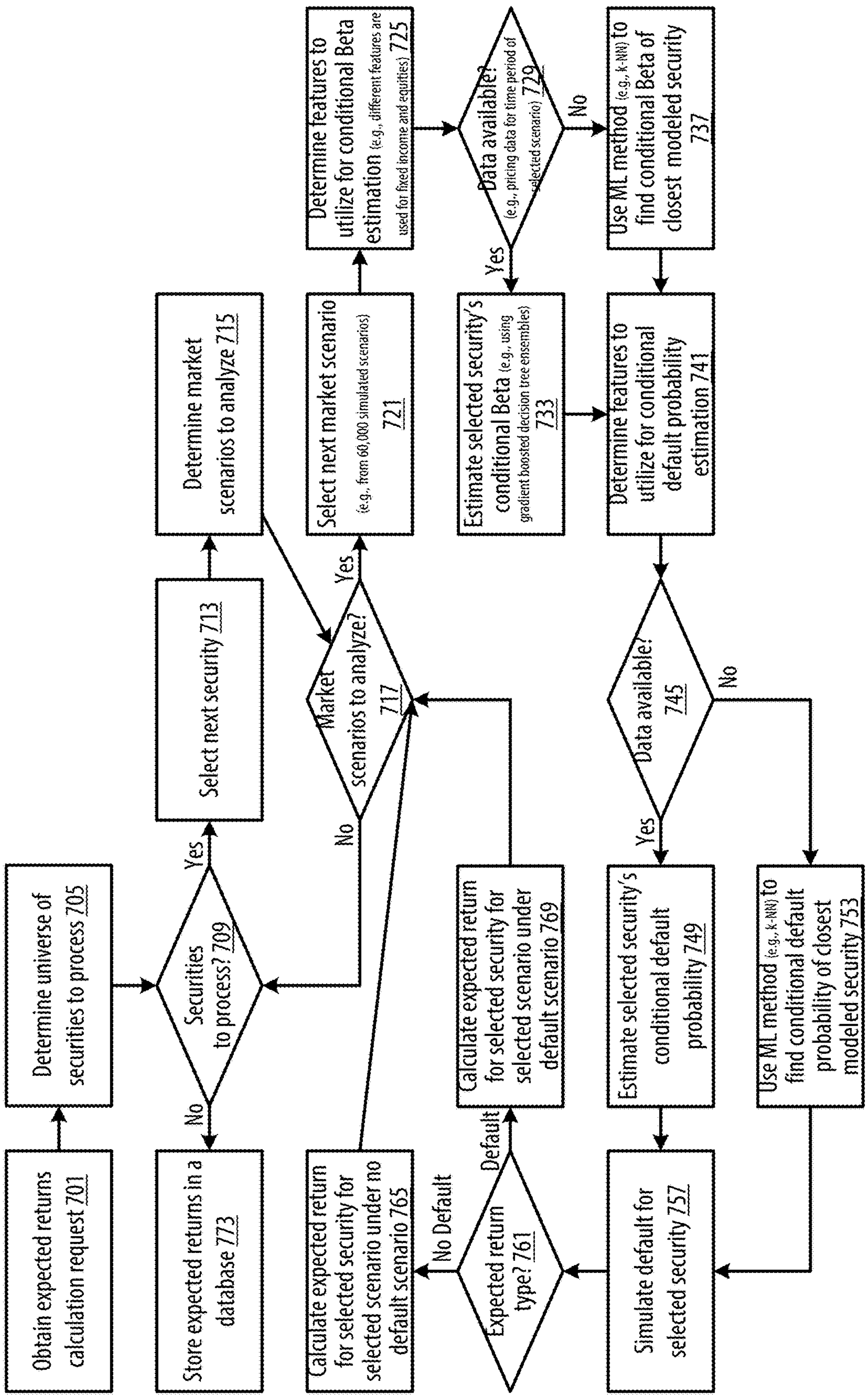
FIGURE 7A: MLPO ERC COMPONENT

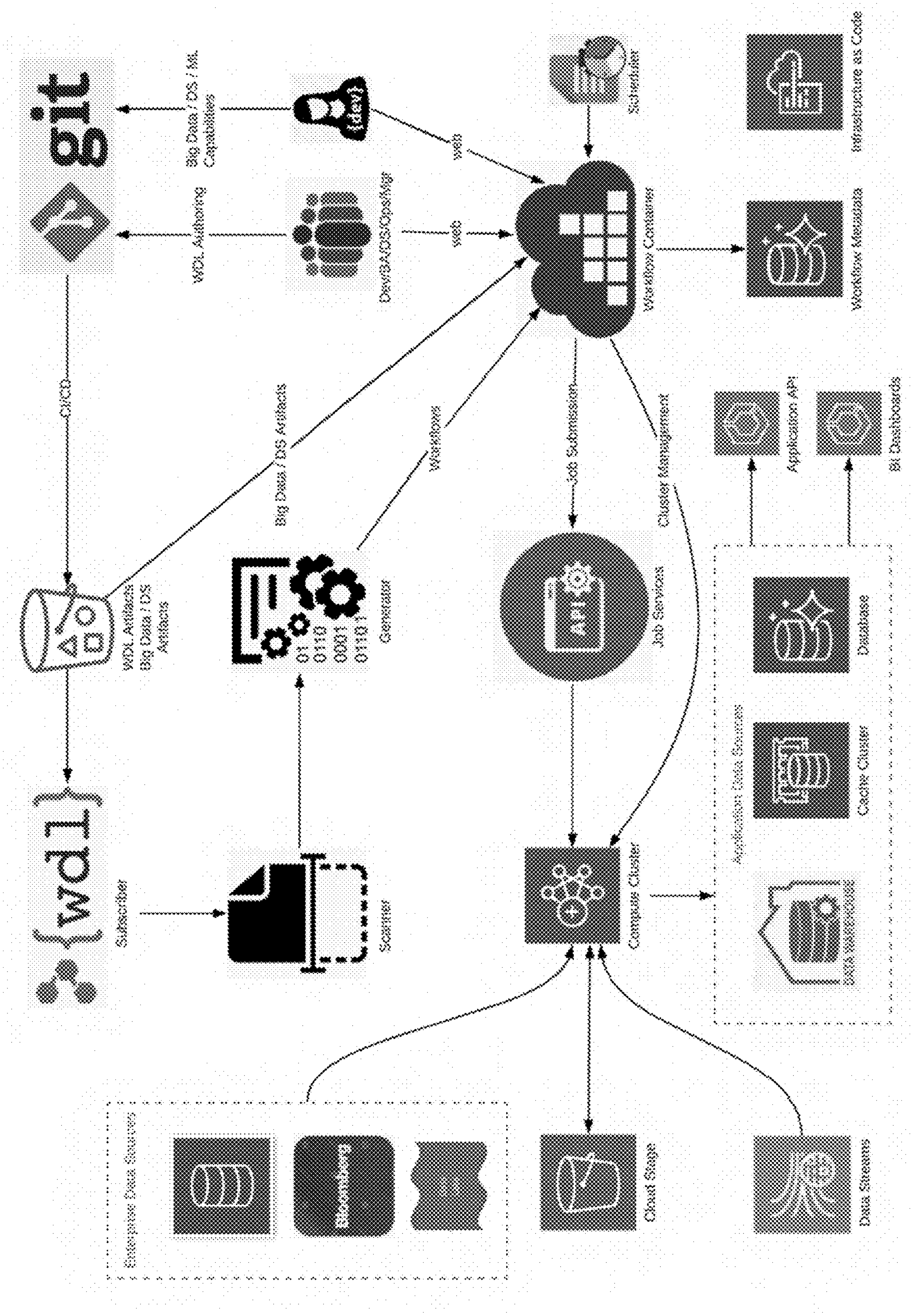
FIGURE 7B: MLPO ARCHITECTURE

FIGURE 7 C: MLPO ARCHITECTURE
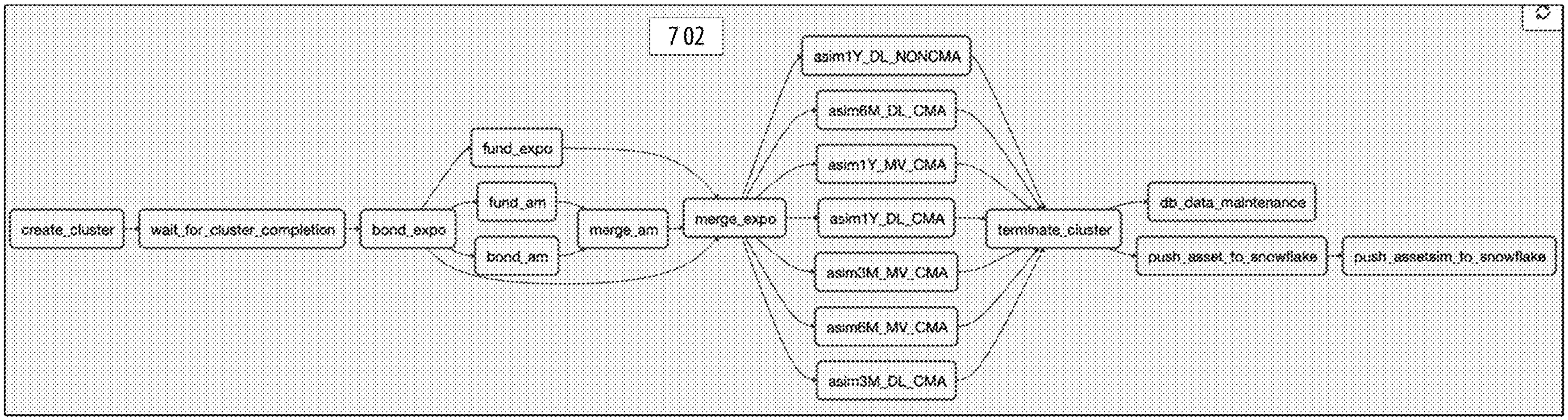
7 06
| asset_id | pricing_dt | sim_id | returns |
| --- | --- | --- | --- |
| 2012082100000122 | 2020-06-05 | 34 | {354,353,369,368,366,311,276,313,279,280,275,298,381,446,440,426,378,313,343,361,351,390,371,365,356,392,406,424,405,402,383,352,337,371,402,398,399,423,381,370,478,443,443,444,432,424,418,430,434,418,424,429,458,508,515,505,528,502,502,534,566,519,554,576,547,485,498,493,523,503,445,436,426,393,366,384,371,371,338,332,3... |
7 10
| asset_id | pricing_dt | sim_id | market_id | returns |
| --- | --- | --- | --- | --- |
| 2012082100000122 | 2020-06-05 | 34 | 0 | 354 |
| 2012082100000122 | 2020-06-05 | 34 | 1 | 353 |
| 2012082100000122 | 2020-06-05 | 34 | 2 | 369 |
| 2012082100000122 | 2020-06-05 | 34 | 3 | 368 |
| 2012082100000122 | 2020-06-05 | 34 | 4 | 366 |
| 2012082100000122 | 2020-06-05 | 34 | 5 | 311 |

FIGURE 8: MLPO DATA FLOW
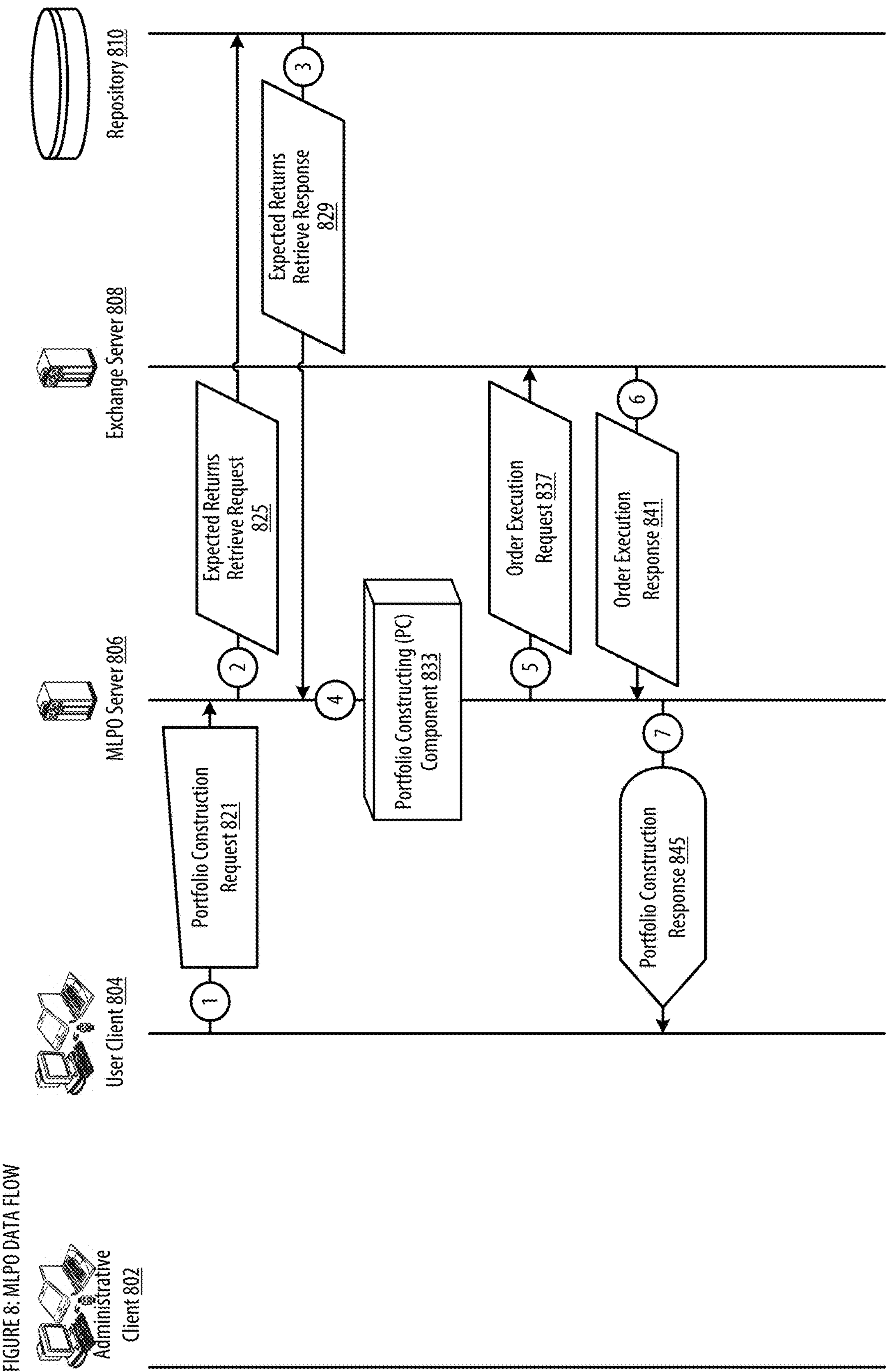

FIGURE 9: MLPO PC COMPONENT
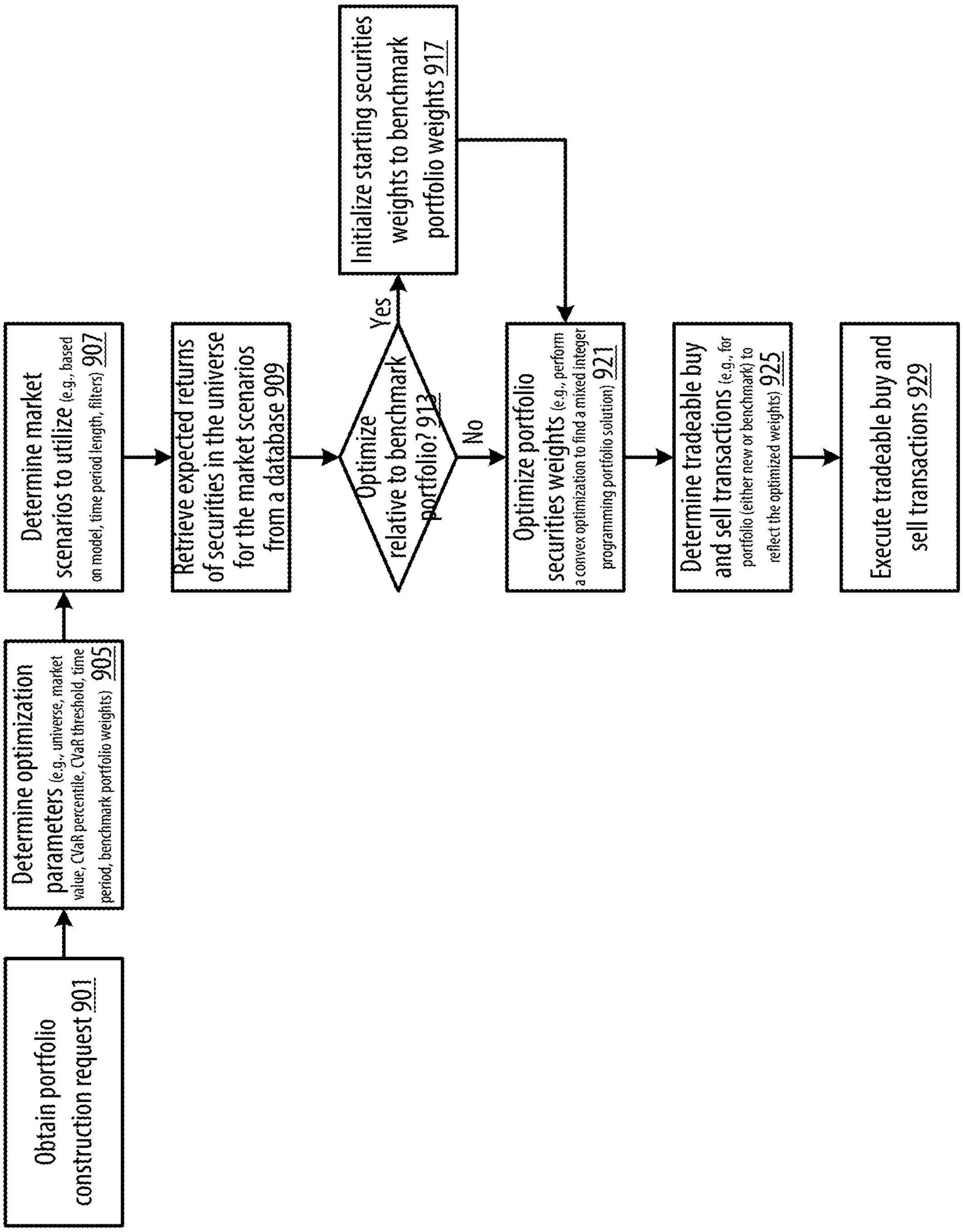

FIGURE 10: MLPO SCREENSHOT
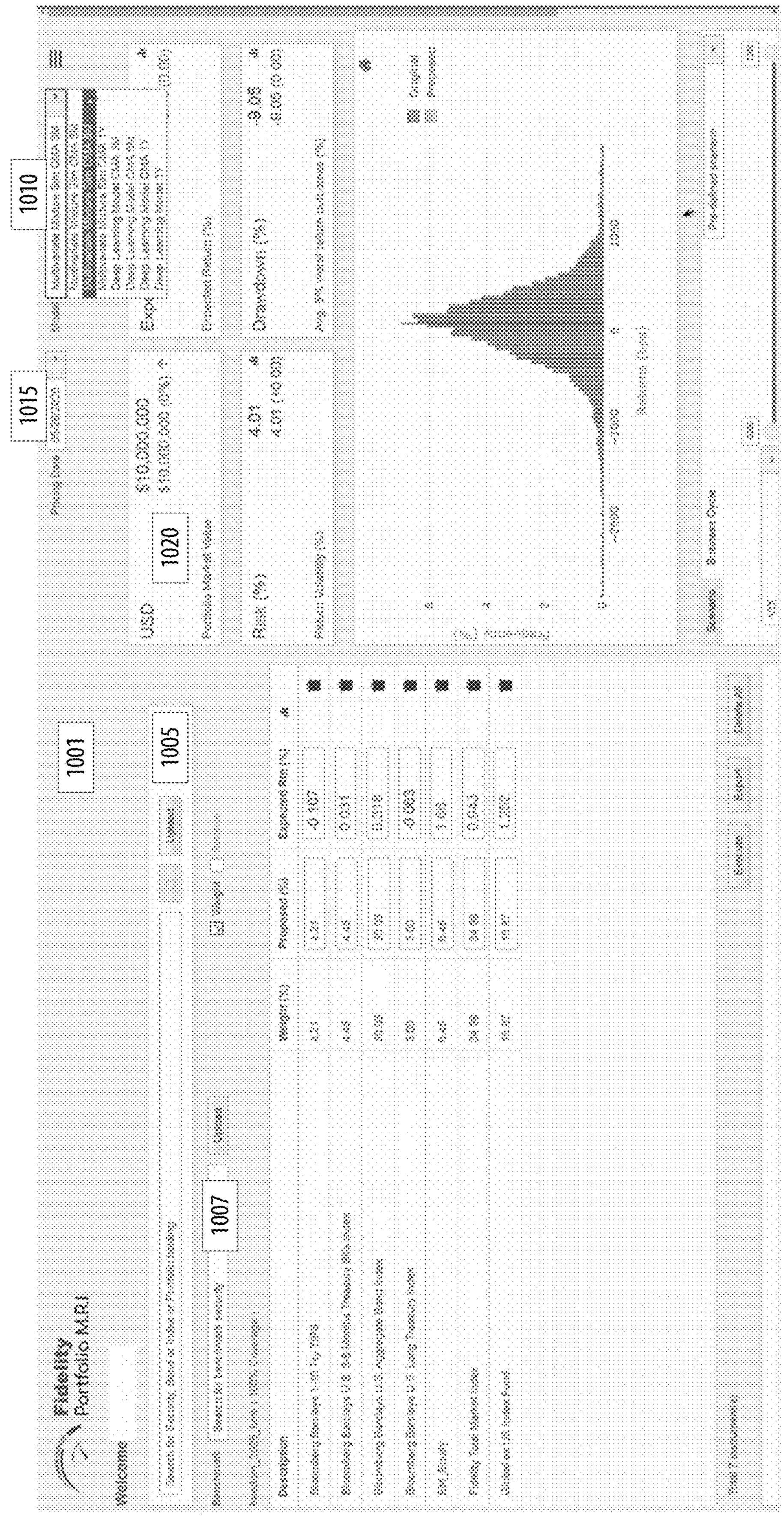

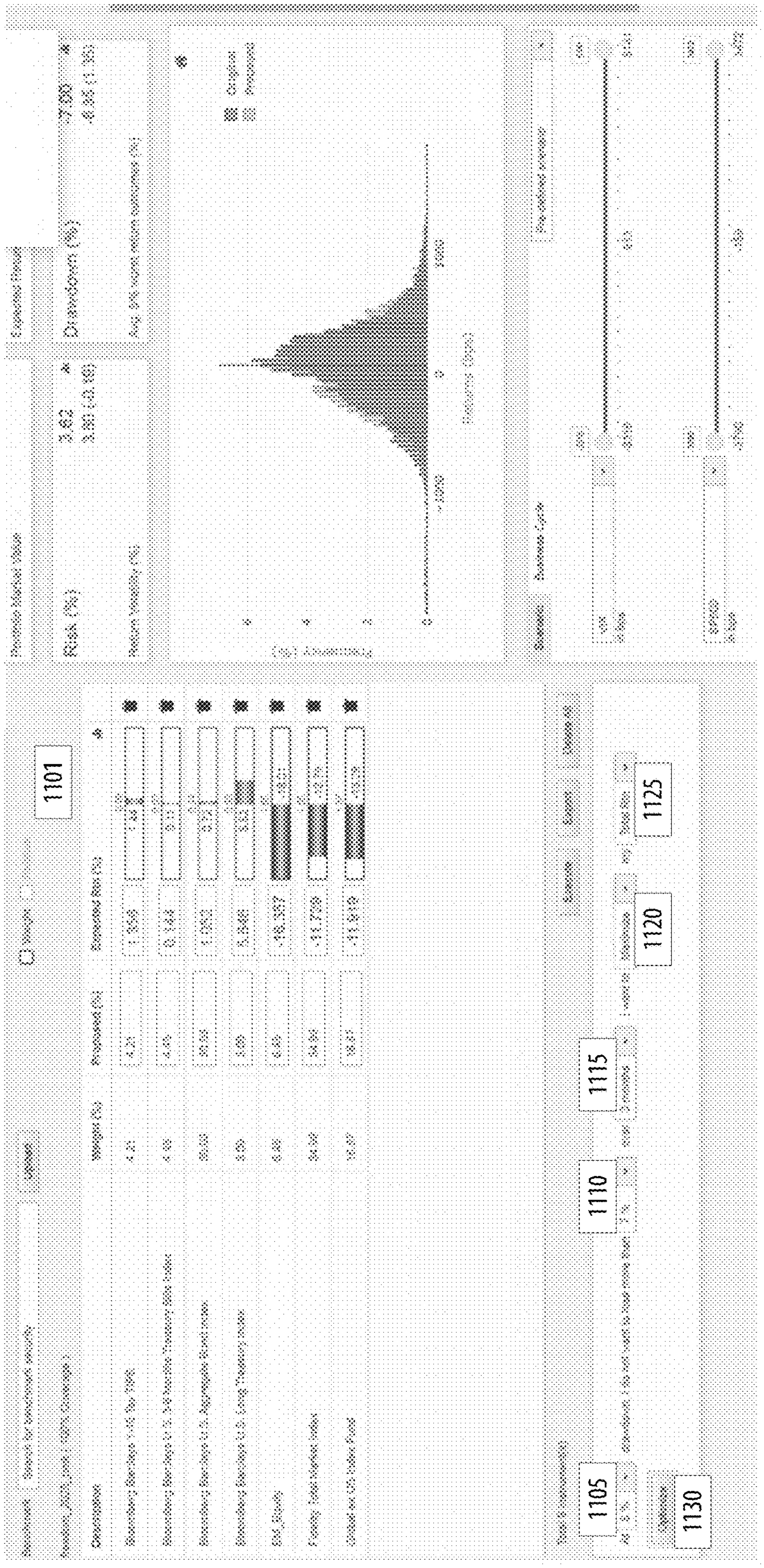
FIGURE 11: MLPO SCREENSHOT

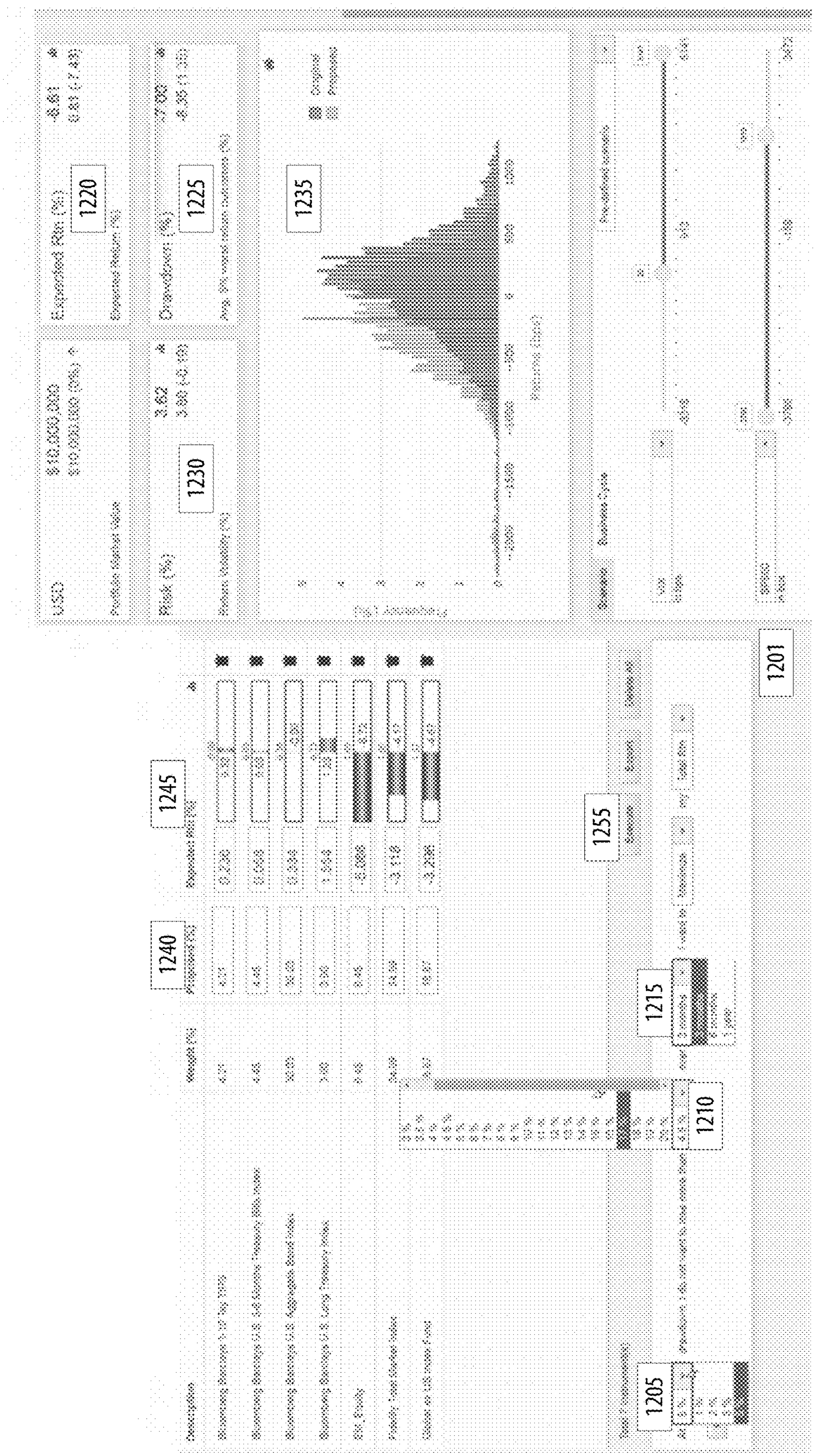
FIGURE 12: MLPO SCREENSHOT

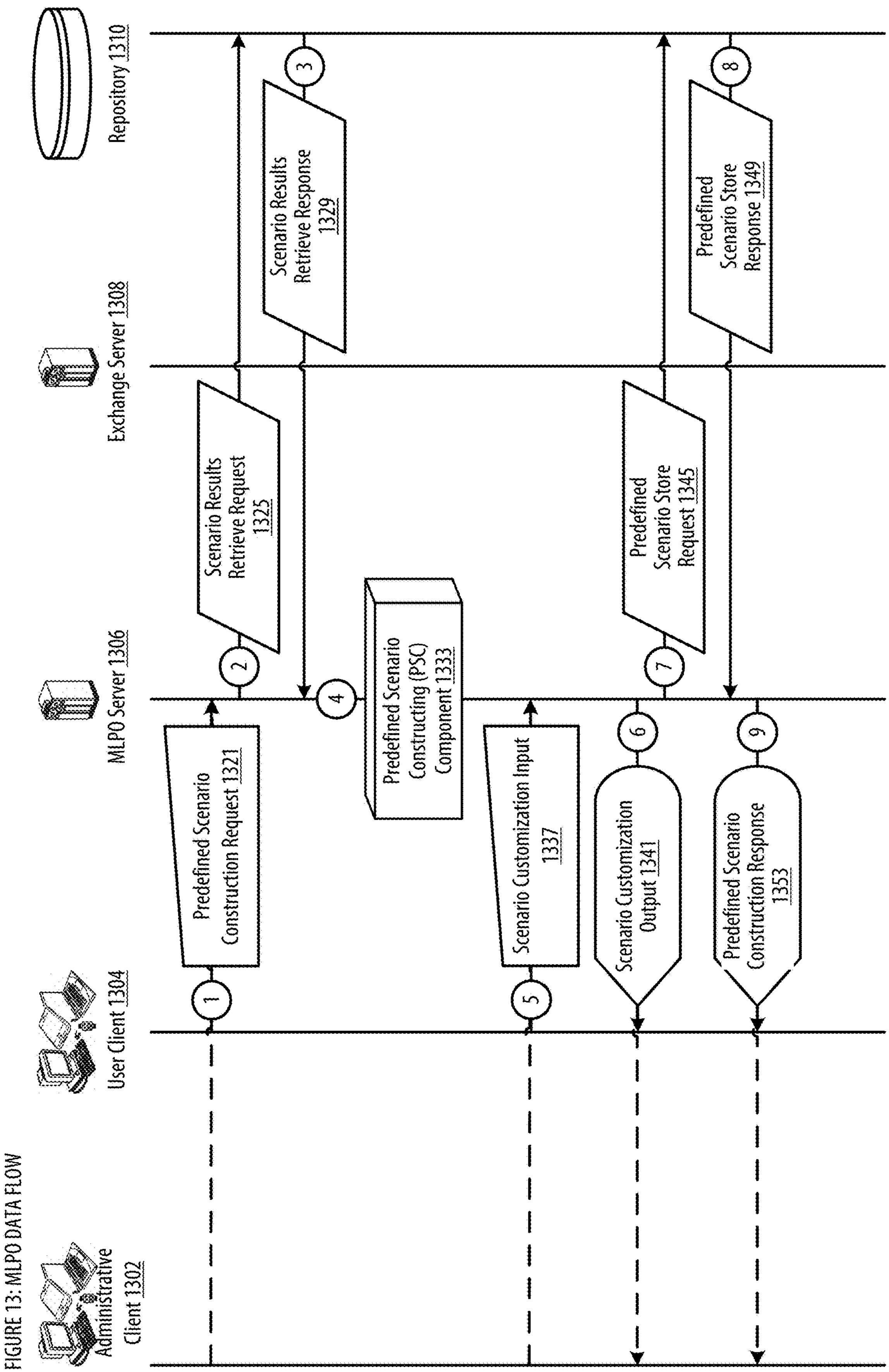
FIGURE 13: MLPO DATA FLOW
Administrative Client 1302
User Client 1304
MLPO Server 1306
Exchange Server 1308
Repository 1310
1
Predefined Scenario Construction Request 1321
2
Scenario Results Retrieve Request 1325
3
Scenario Results Retrieve Response 1329
4
Predefined Scenario Constructing (PSC) Component 1333
5
Scenario Customization Input 1337
6
Scenario Customization Output 1341
7
Predefined Scenario Store Request 1345
8
Predefined Scenario Store Response 1349
9
Predefined Scenario Construction Response 1353

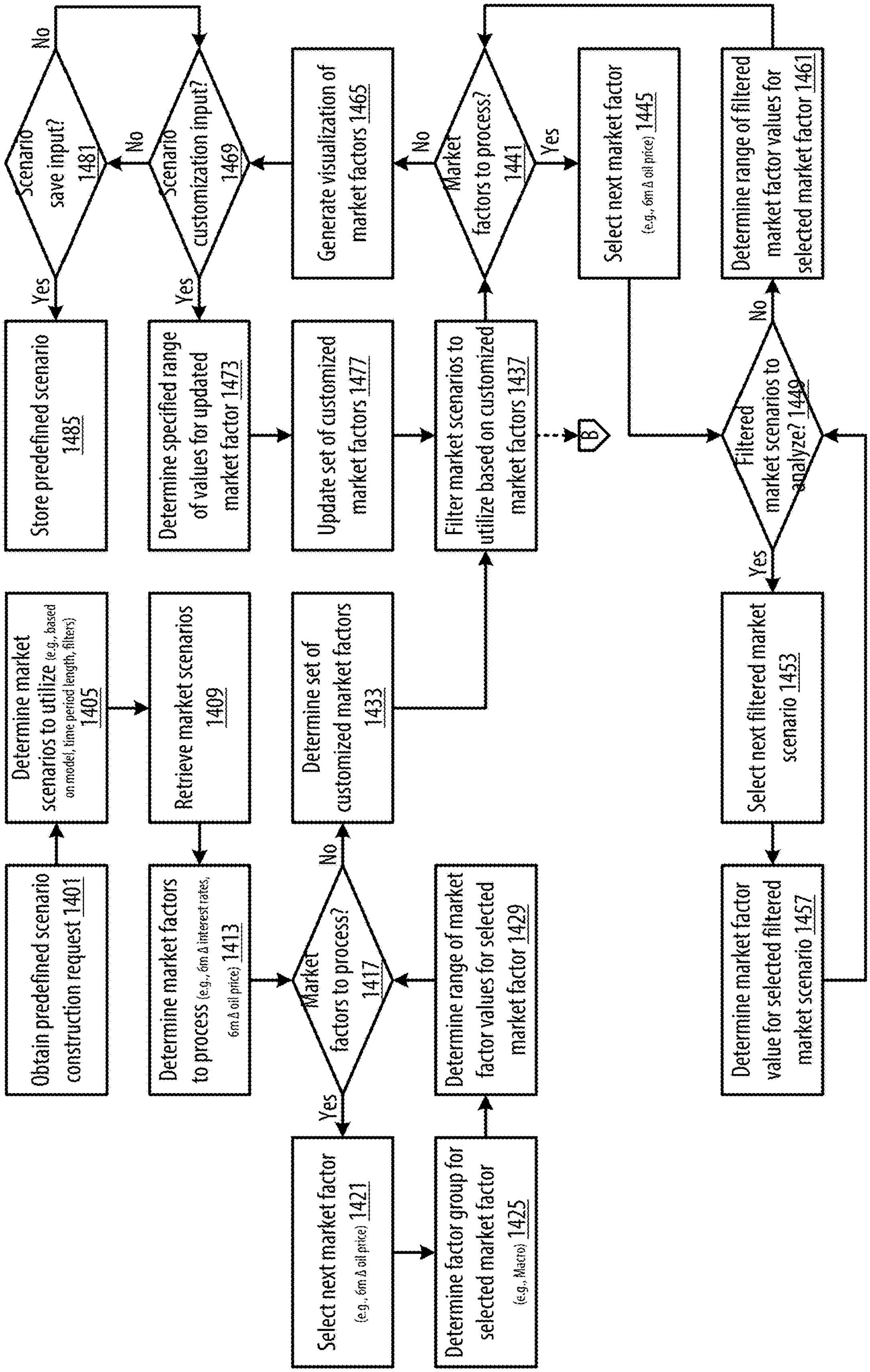
FIGURE 14A: MLPO PSC COMPONENT

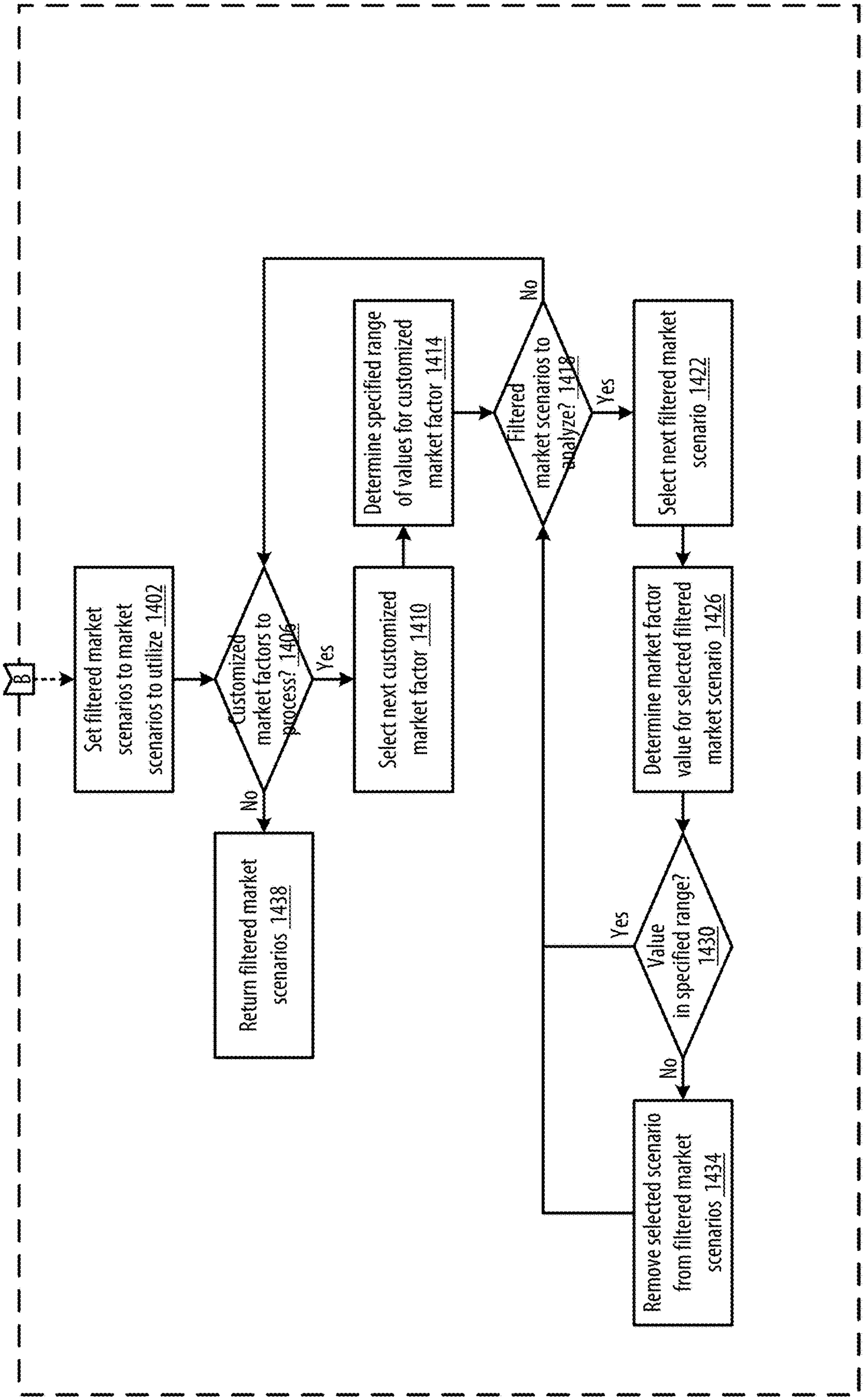
FIGURE 14B: MLPO PSC COMPONENT

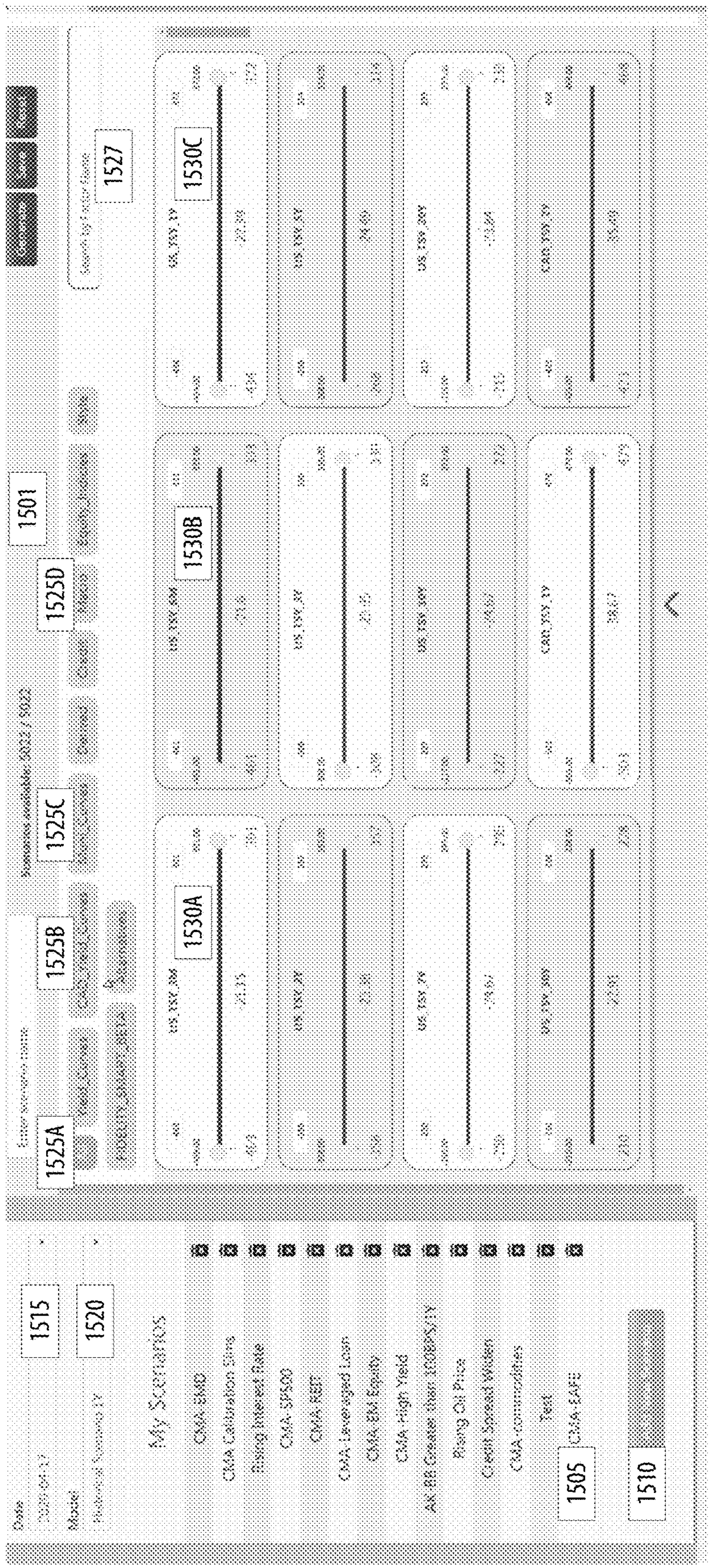
FIGURE 15: MLPO SCREENSHOT

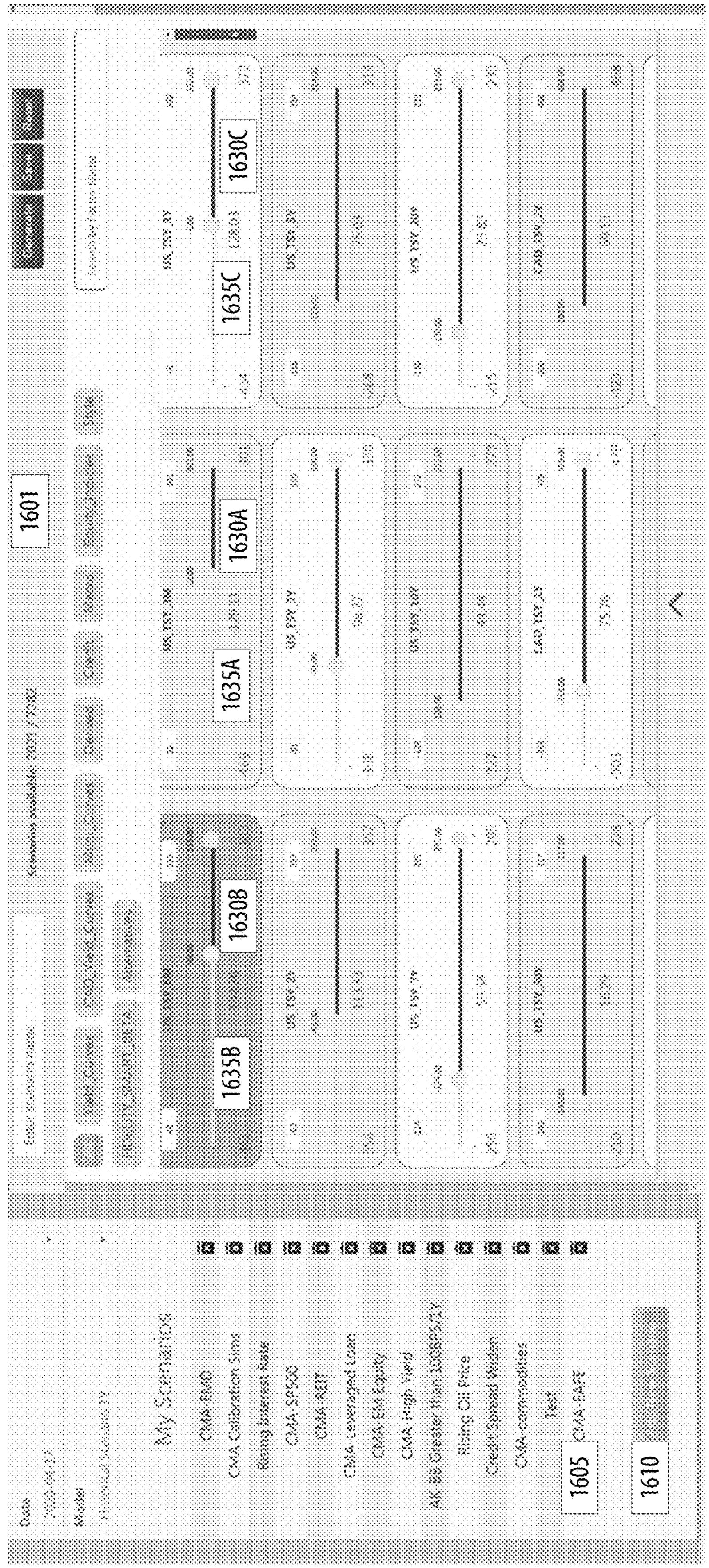
FIGURE 16: MLPO SCREENSHOT

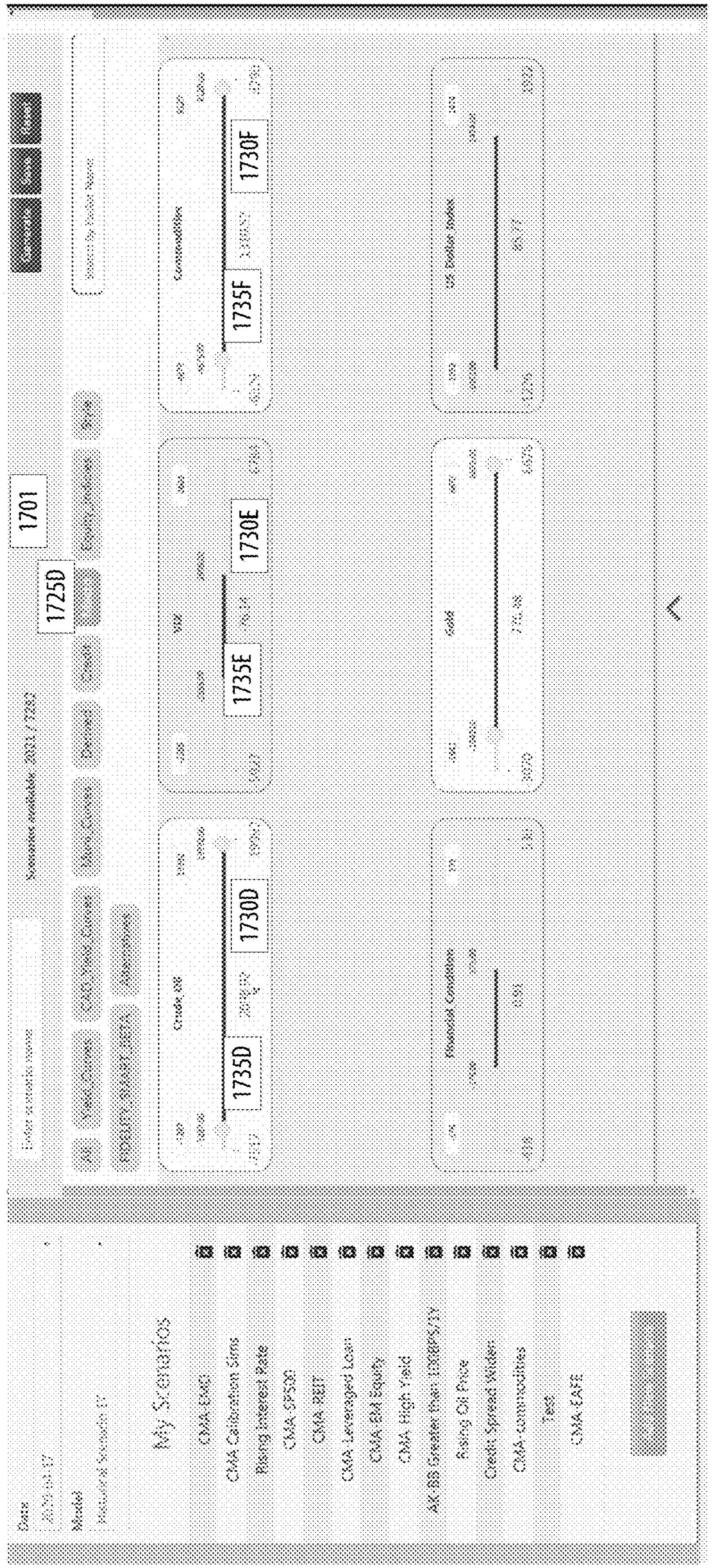
FIGURE 17: MLPO SCREENSHOT

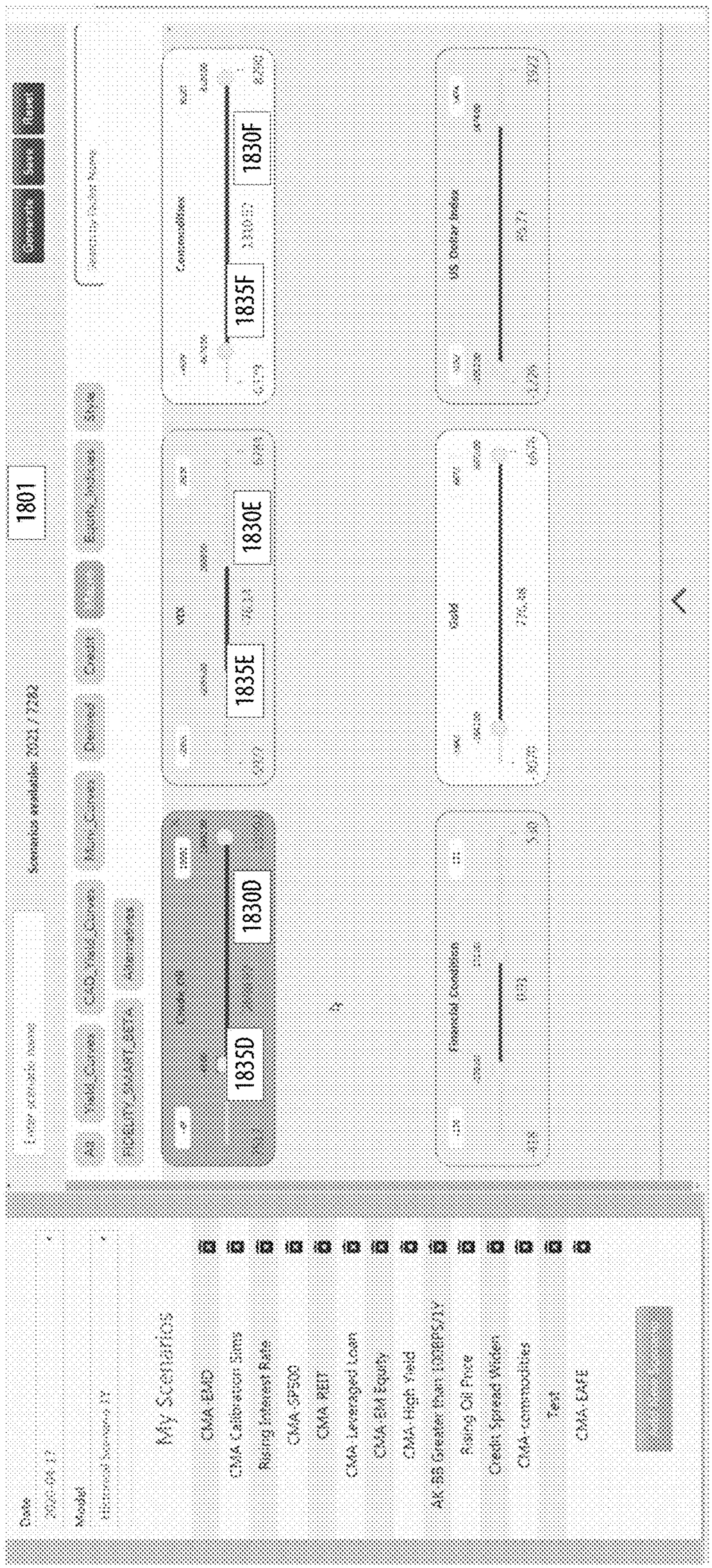
FIGURE 18: MLPO SCREENSHOT

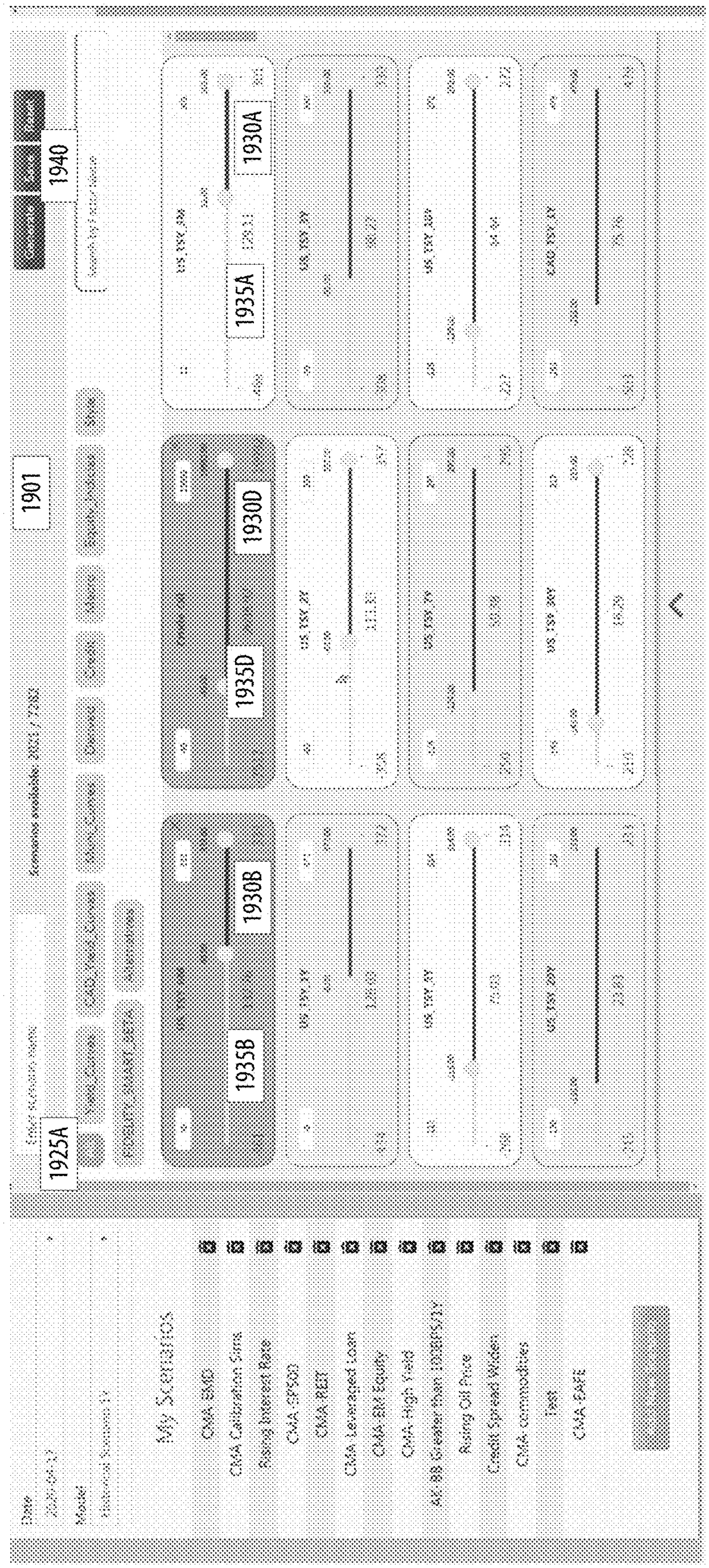
FIGURE 19: MLPO SCREENSHOT

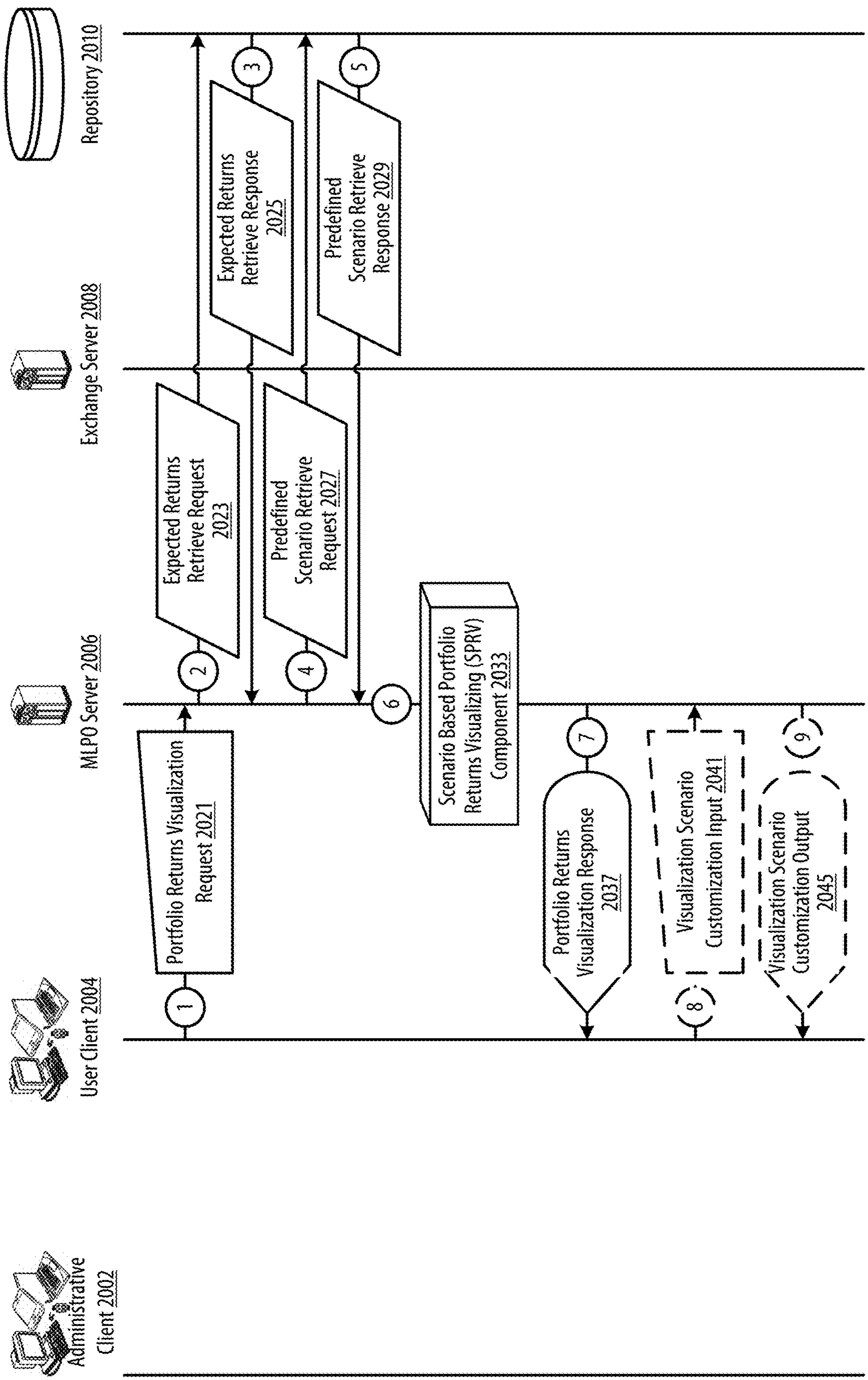
FIGURE 20: MLPO DATA FLOW

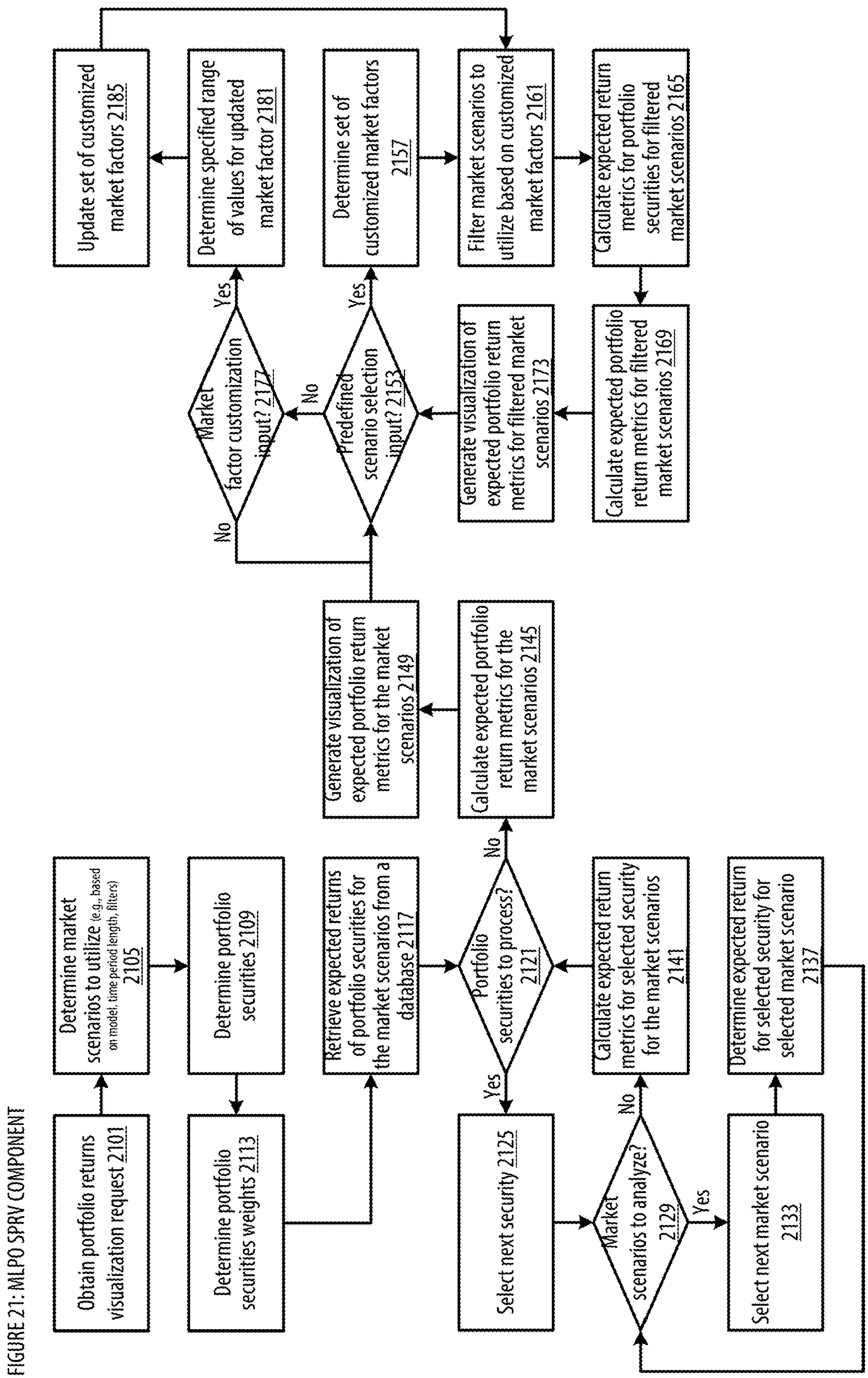
FIGURE 21: MLPO SPRV COMPONENT
Obtain portfolio returns visualization request 2101
Determine market scenarios to utilize (e.g., based on model, time period length, filters) 2105
Determine portfolio securities 2109
Determine portfolio securities weights 2113
Retrieve expected returns of portfolio securities for the market scenarios from a database 2117
Portfolio securities to process? 2121
Yes
No
Select next security 2125
Market scenarios to analyze? 2129
Yes
No
Select next market scenario 2133
Determine expected return for selected security for selected market scenario 2137
Calculate expected return metrics for selected security for the market scenarios 2141
Calculate expected portfolio return metrics for the market scenarios 2145
Generate visualization of expected portfolio return metrics for the market scenarios 2149
Predefined scenario selection input? 2153
Yes
No
Determine set of customized market factors 2157
Filter market scenarios to utilize based on customized market factors 2161
Calculate expected return metrics for portfolio securities for filtered market scenarios 2165
Calculate expected portfolio return metrics for filtered market scenarios 2169
Generate visualization of expected portfolio return metrics for filtered market scenarios 2173
Market factor customization input? 2177
Yes
No
Determine specified range of values for updated market factor 2181
Update set of customized market factors 2185

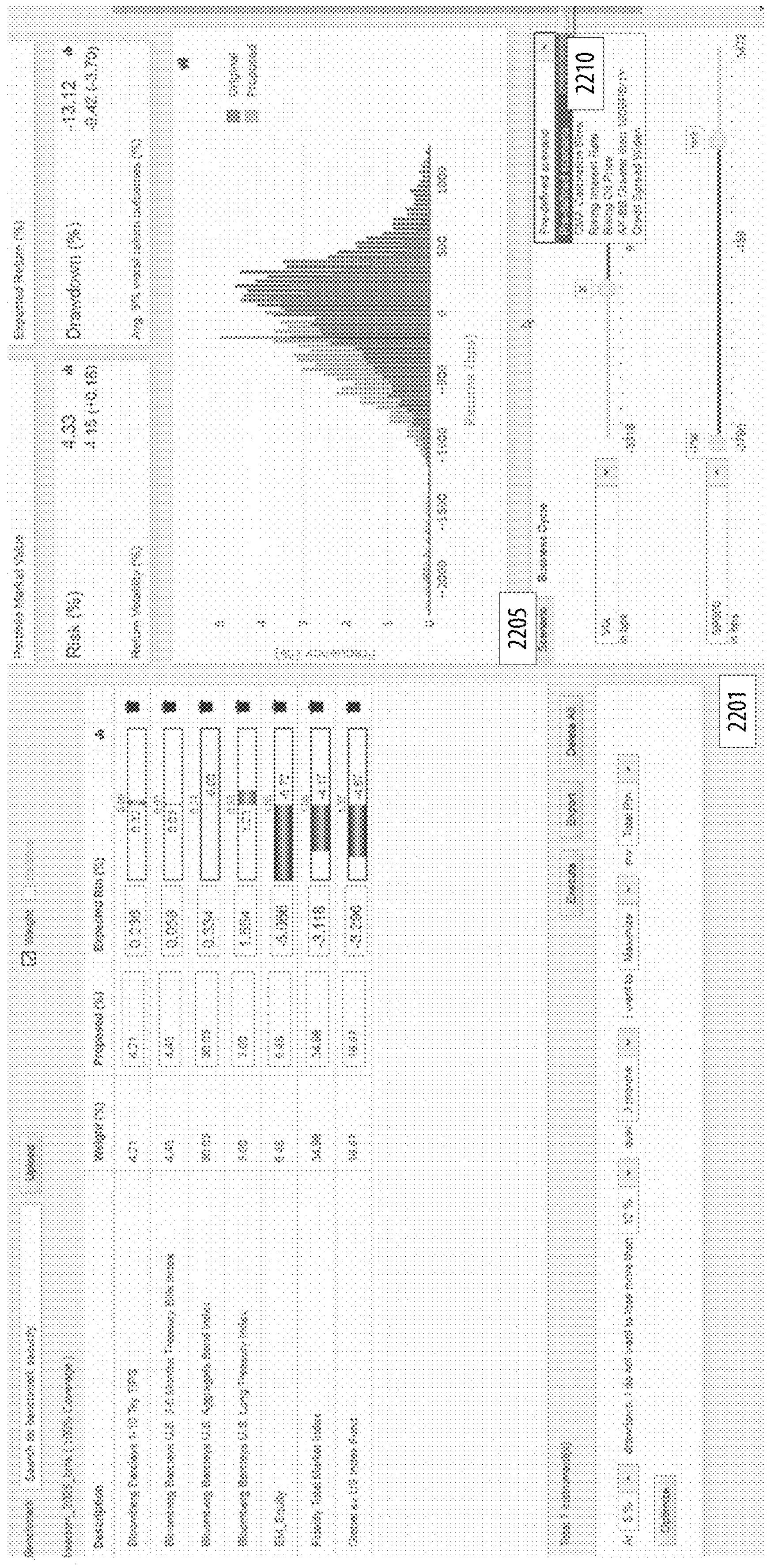
FIGURE 22: MLPO SCREENSHOT

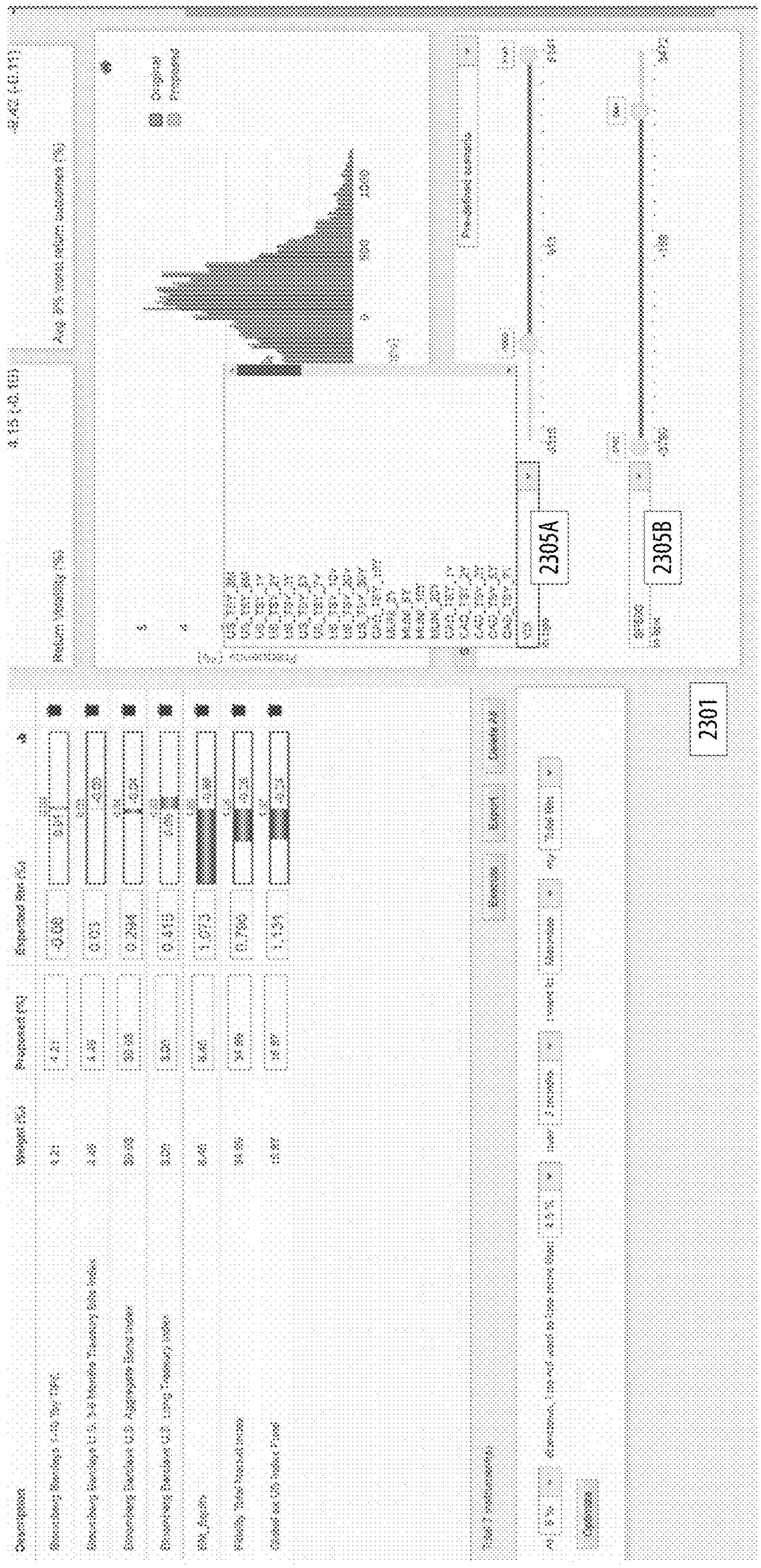
FIGURE 23: MLPO SCREENSHOT

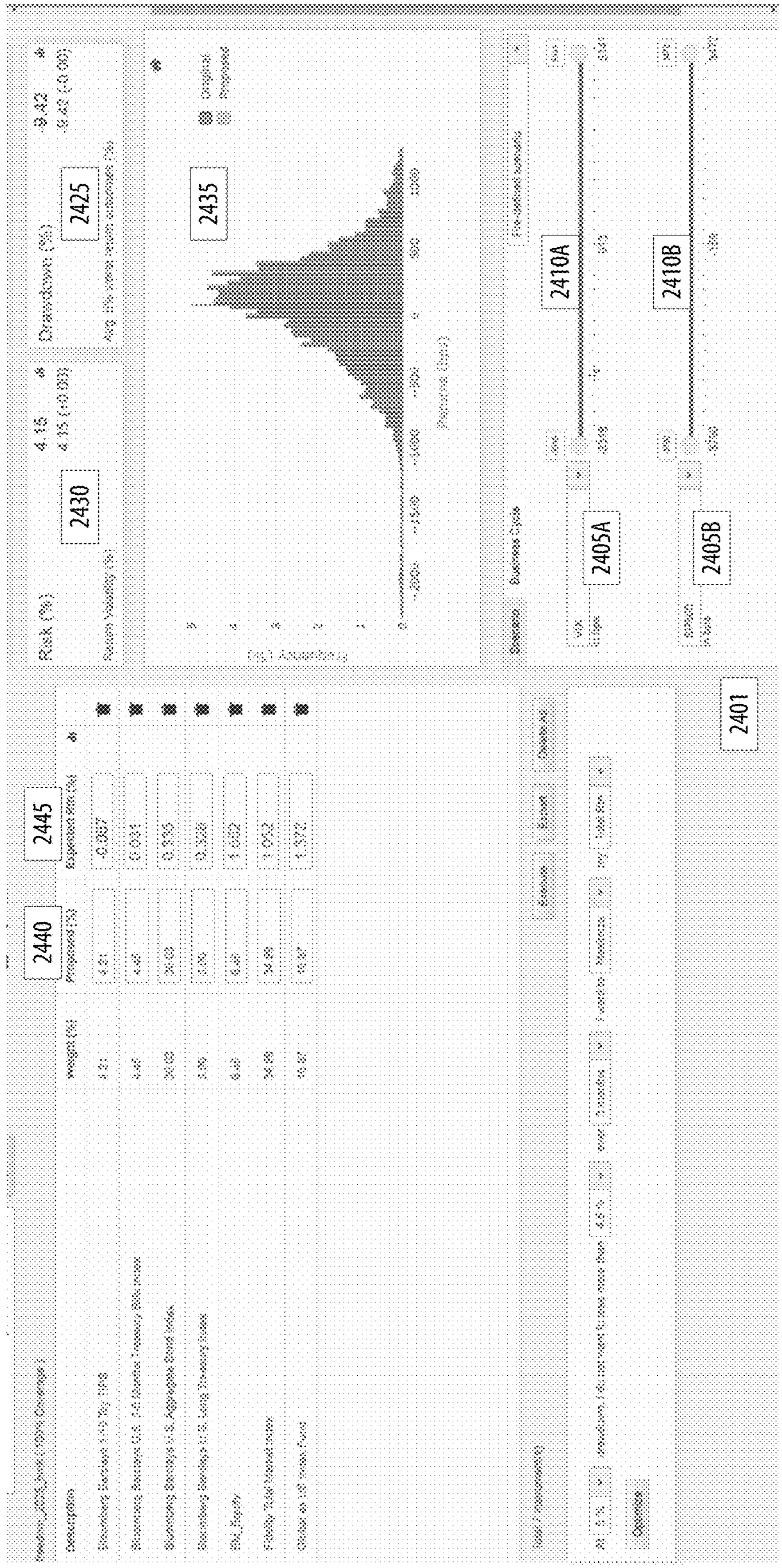
FIGURE 24: MLPO SCREENSHOT

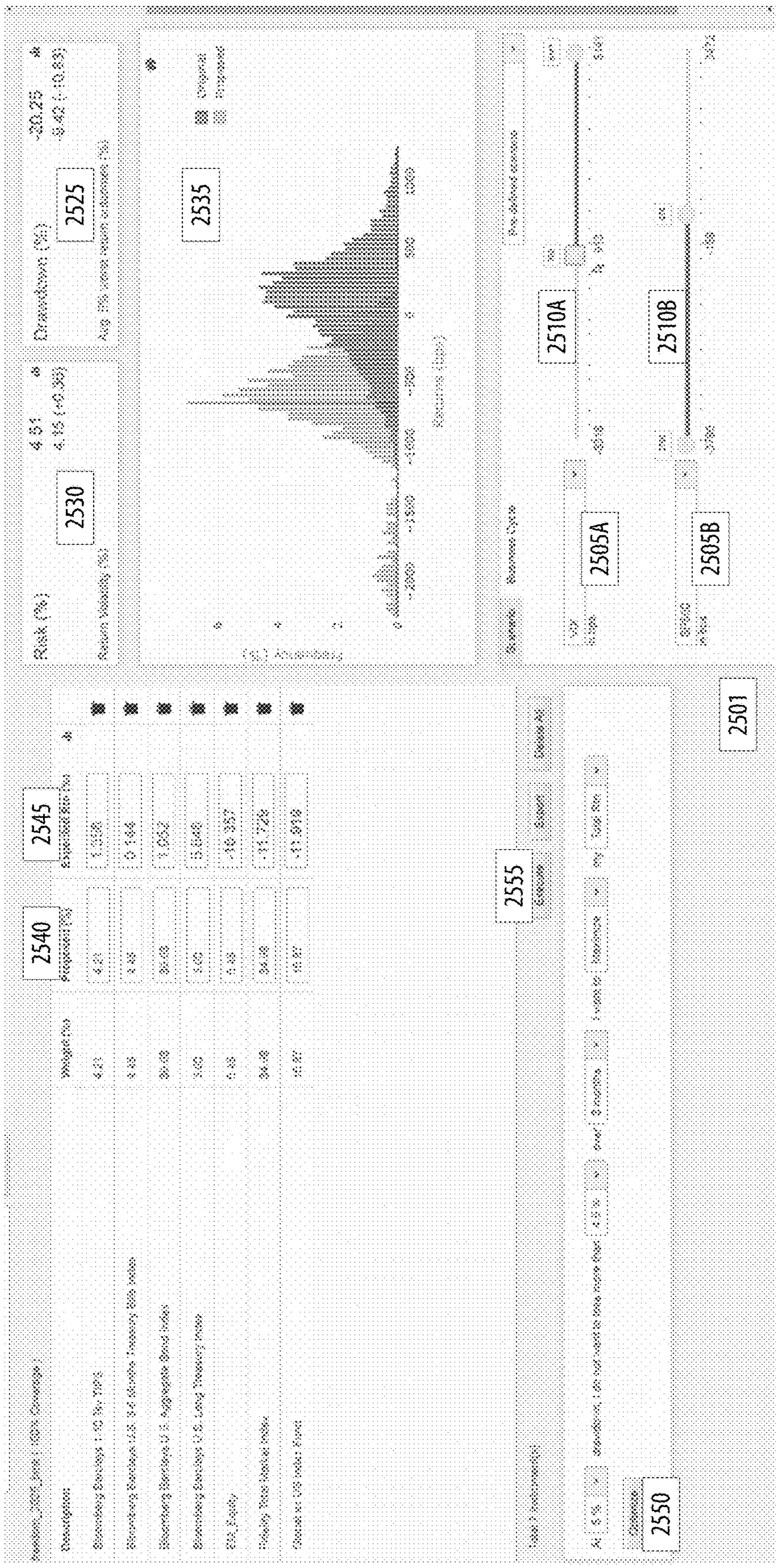
FIGURE 25: MLPO SCREENSHOT

FIGURE 26: MLPO DATA FLOW
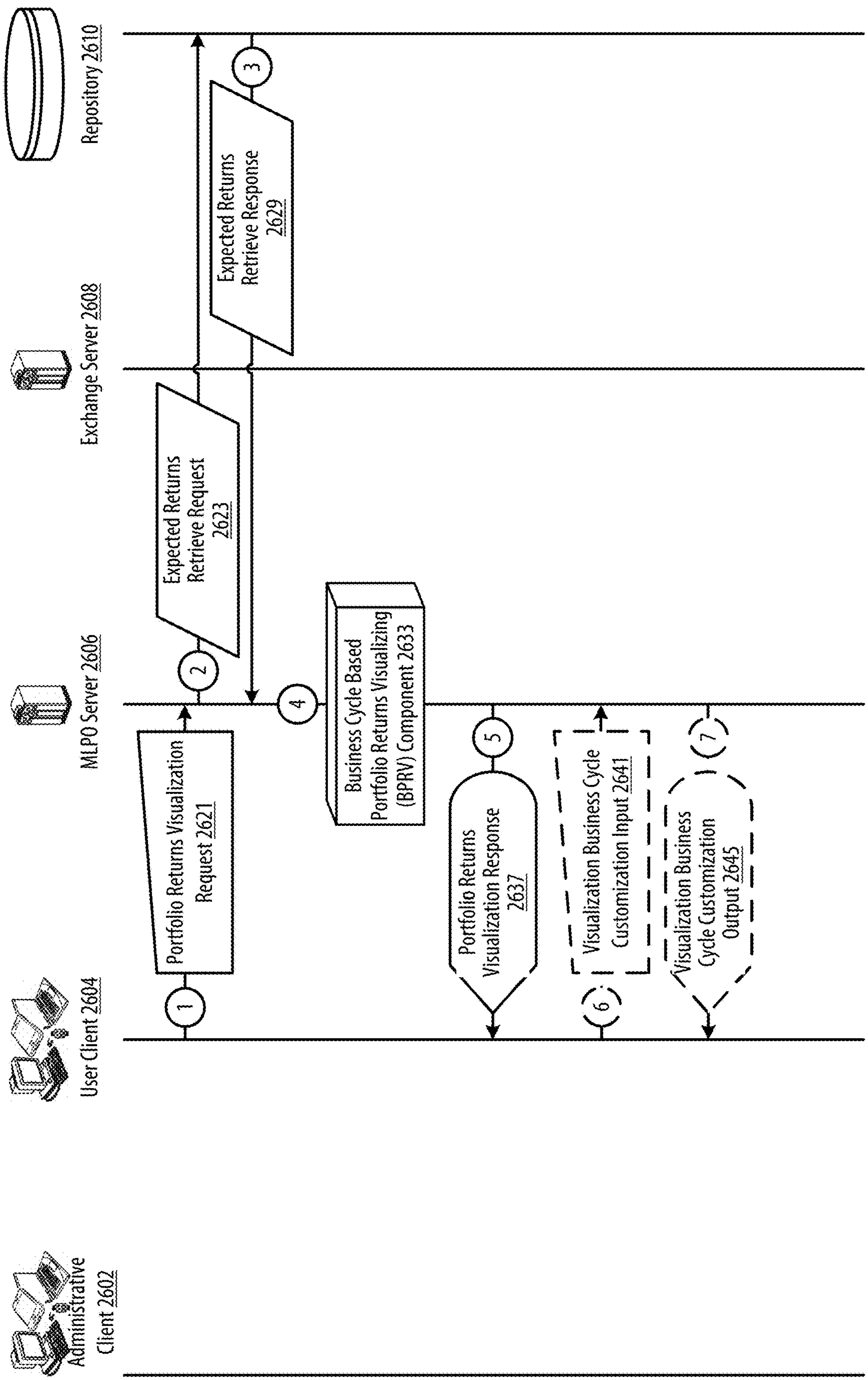

FIGURE 27: MLPO BPRV COMPONENT
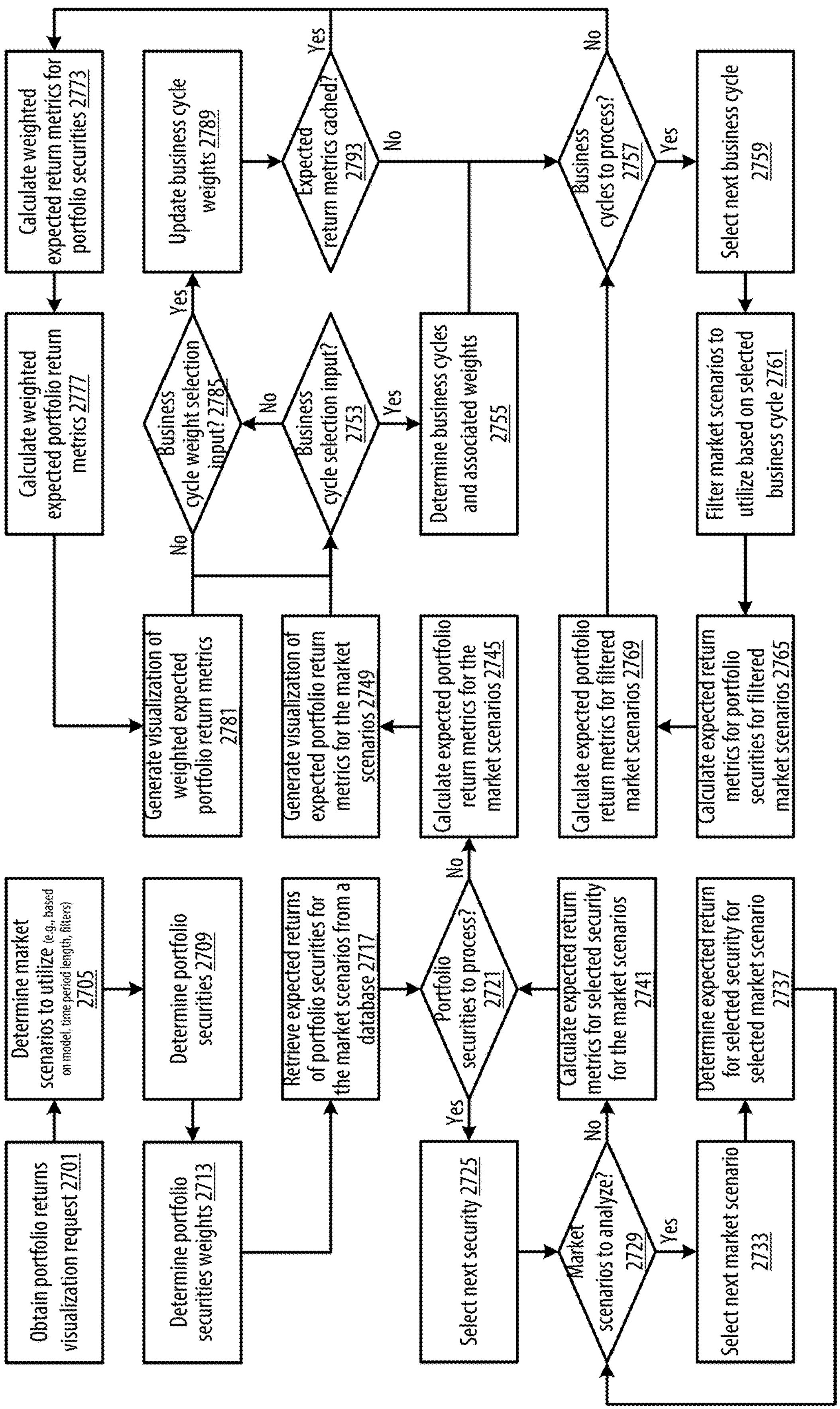

FIGURE 28: MLPO SCREENSHOT

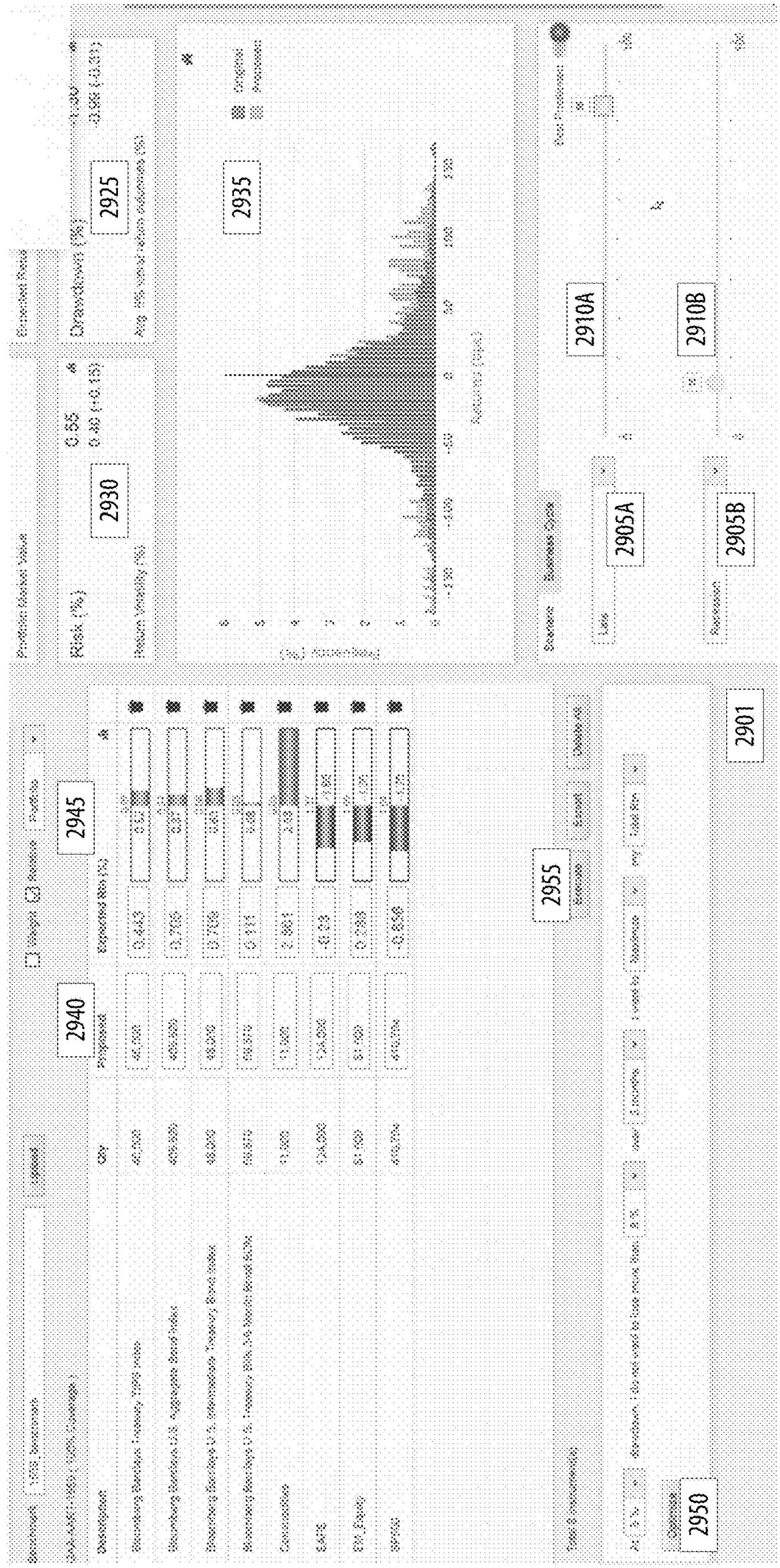
FIGURE 29: MLPO SCREENSHOT

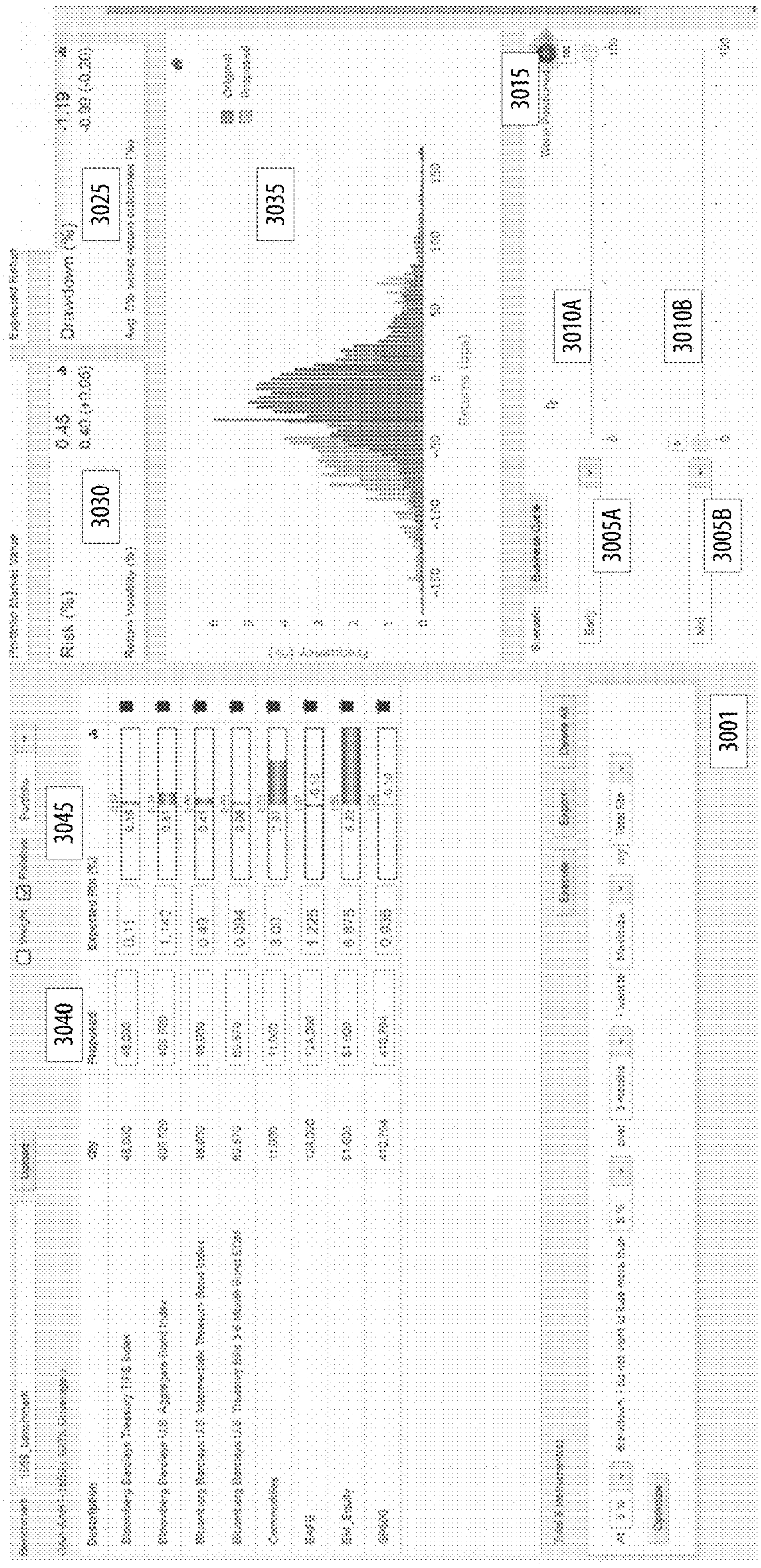
FIGURE 30: MLPO SCREENSHOT

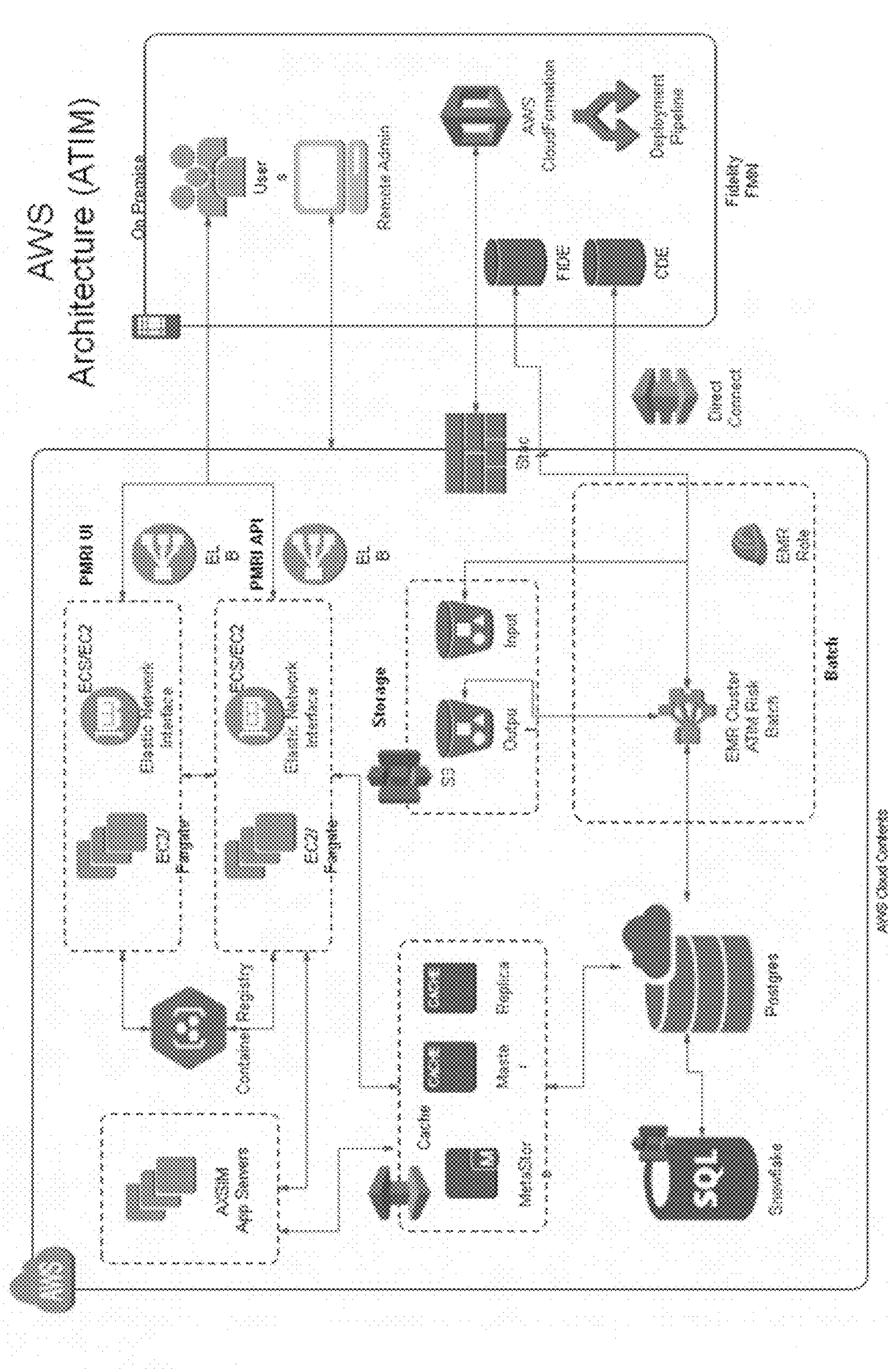
FIGURE 31: MLPO ARCHITECTURE

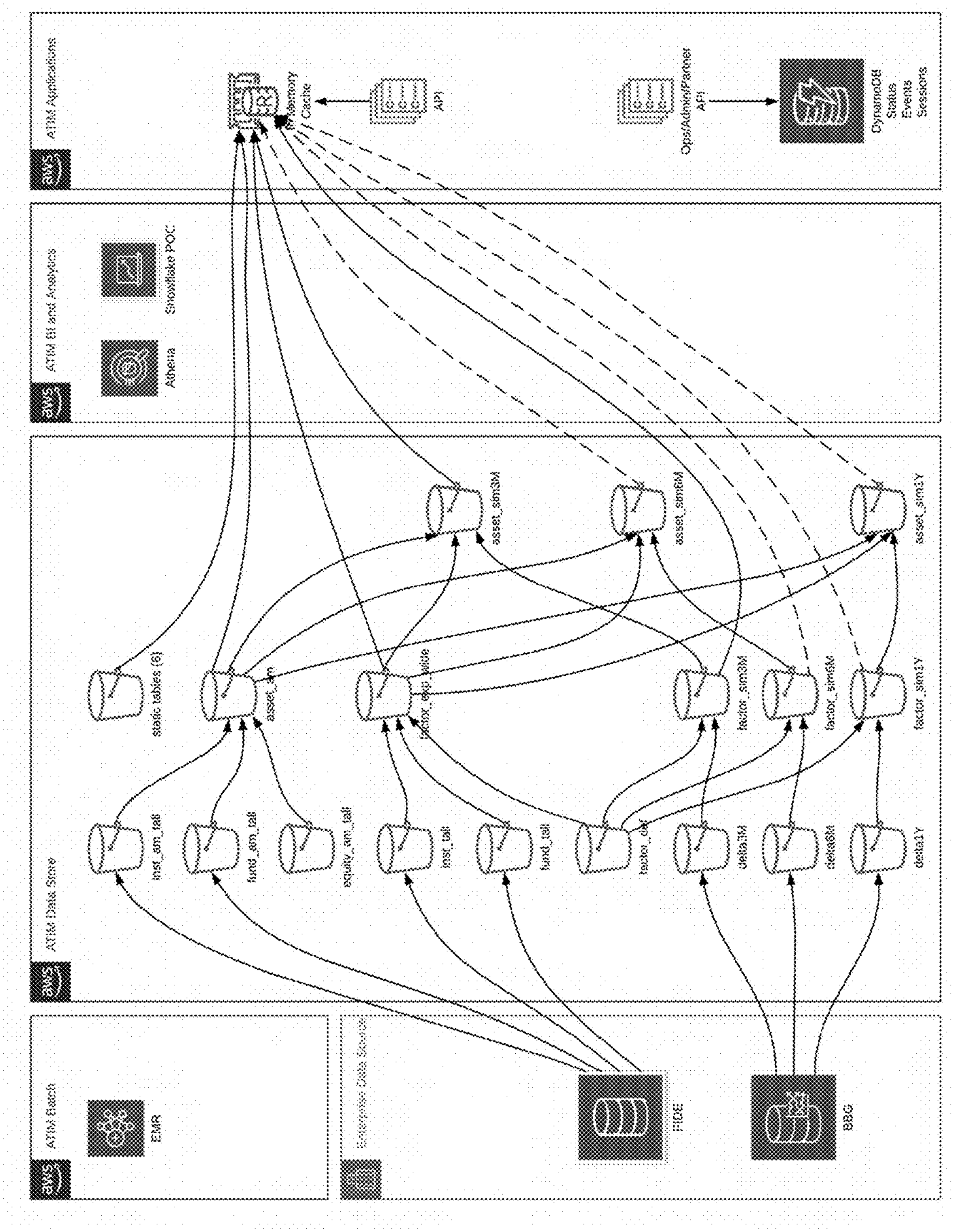
FIGURE 32: MLPO ARCHITECTURE

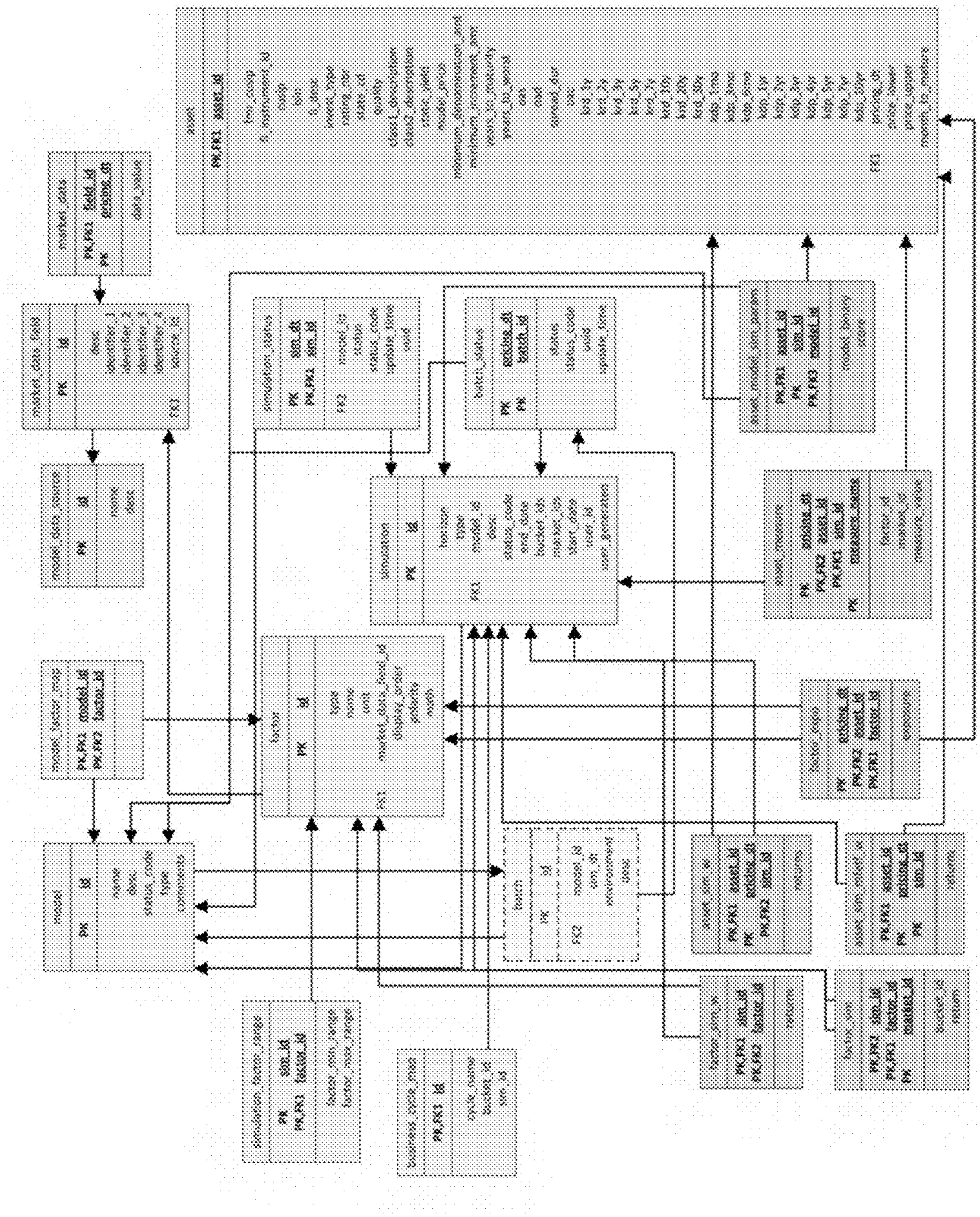
FIGURE 33A: MLPO ARCHITECTURE

FIGURE 33B: MLPO ARCHITECTURE
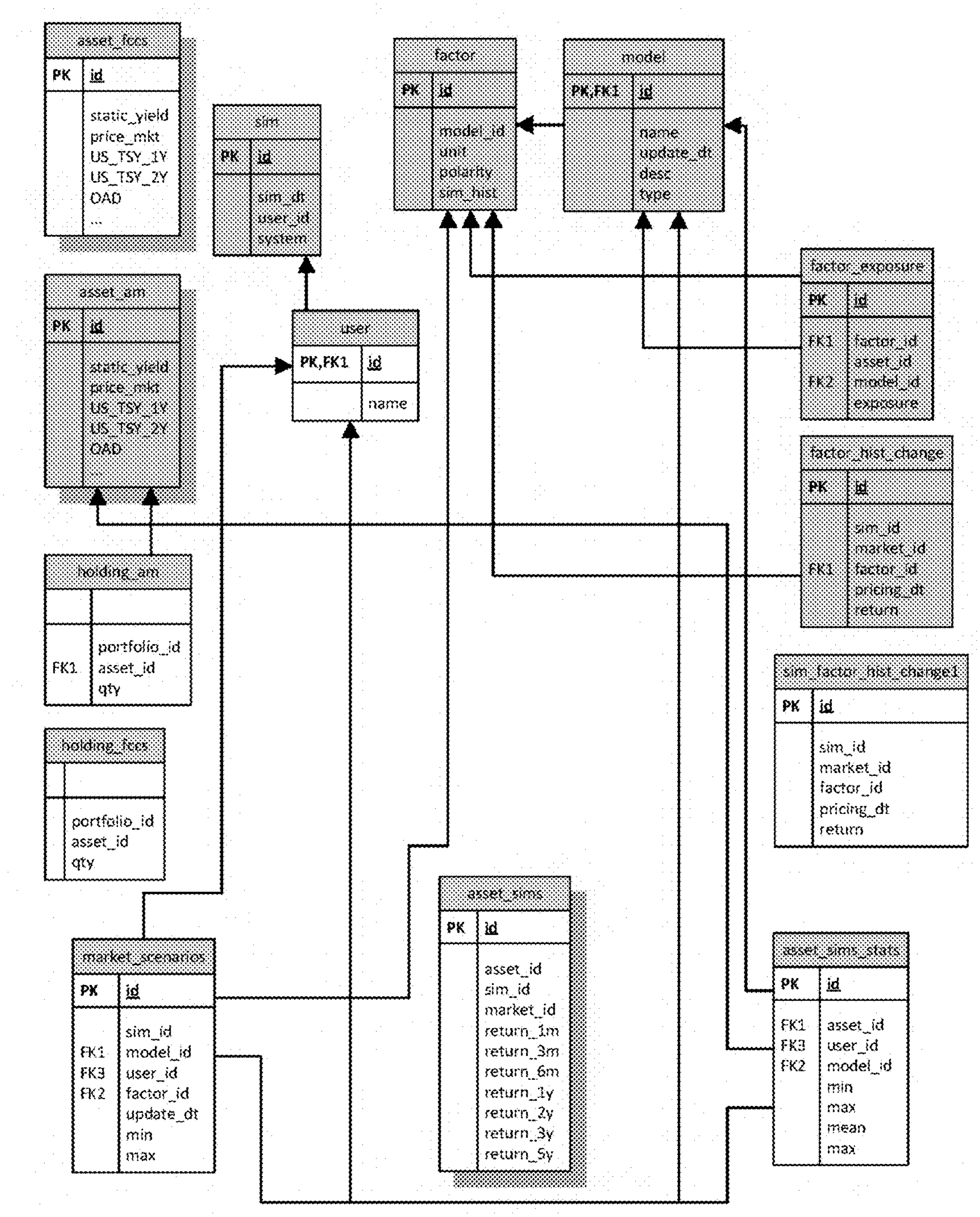

FIGURE 34: MLPO DATA FLOW
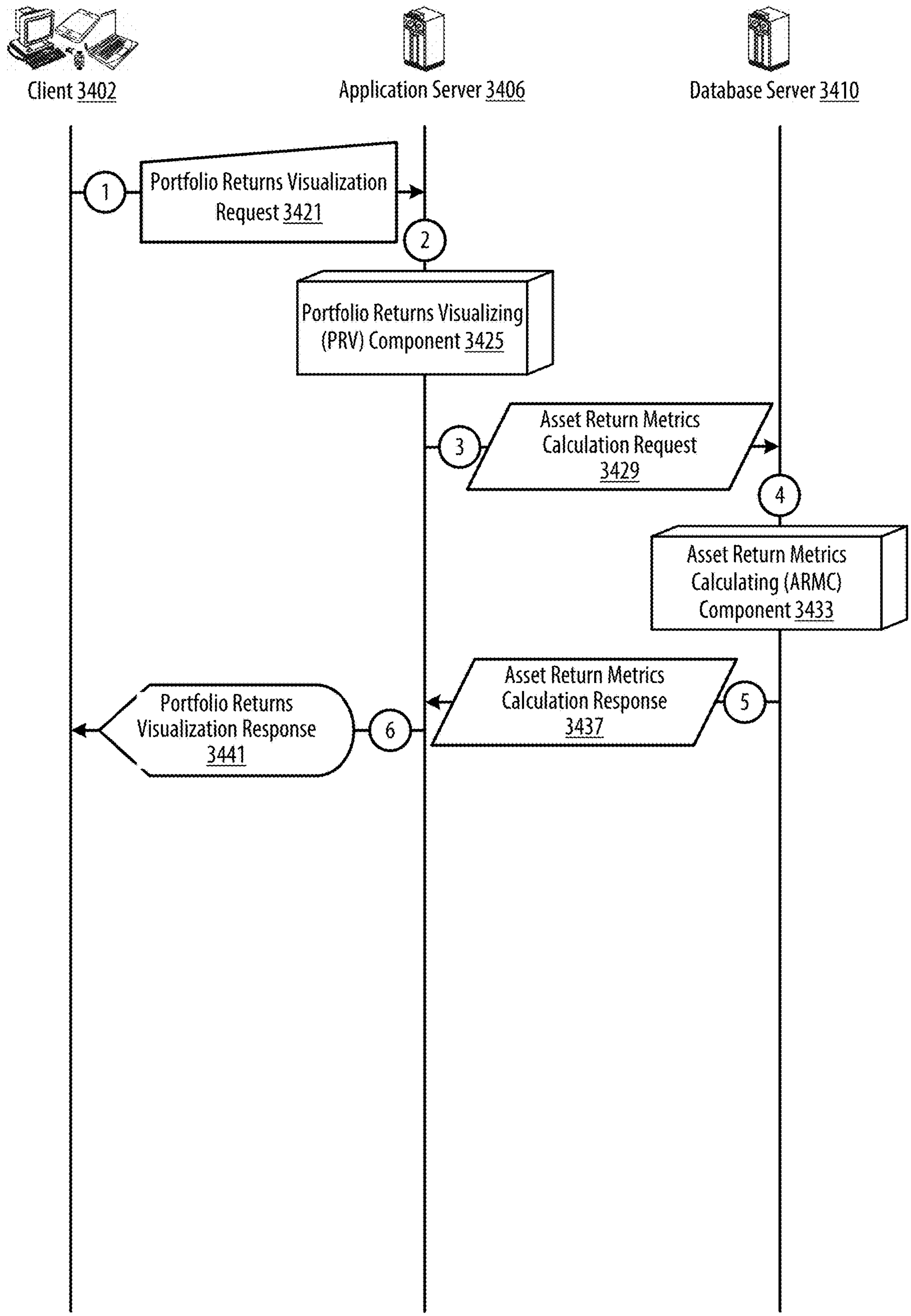

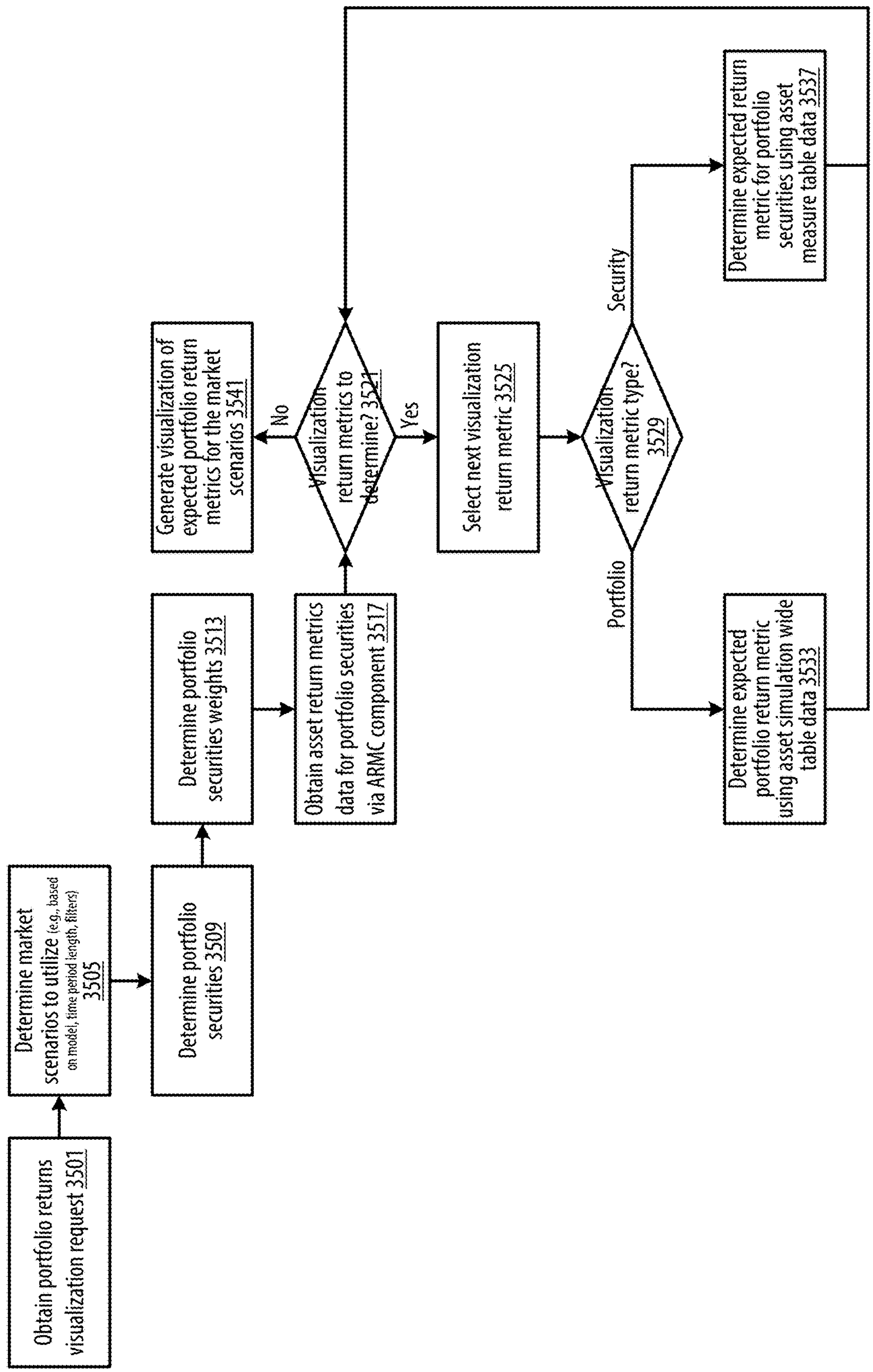
FIGURE 35: MLPO PRV COMPONENT

FIGURE 36: MLPO ARMC COMPONENT
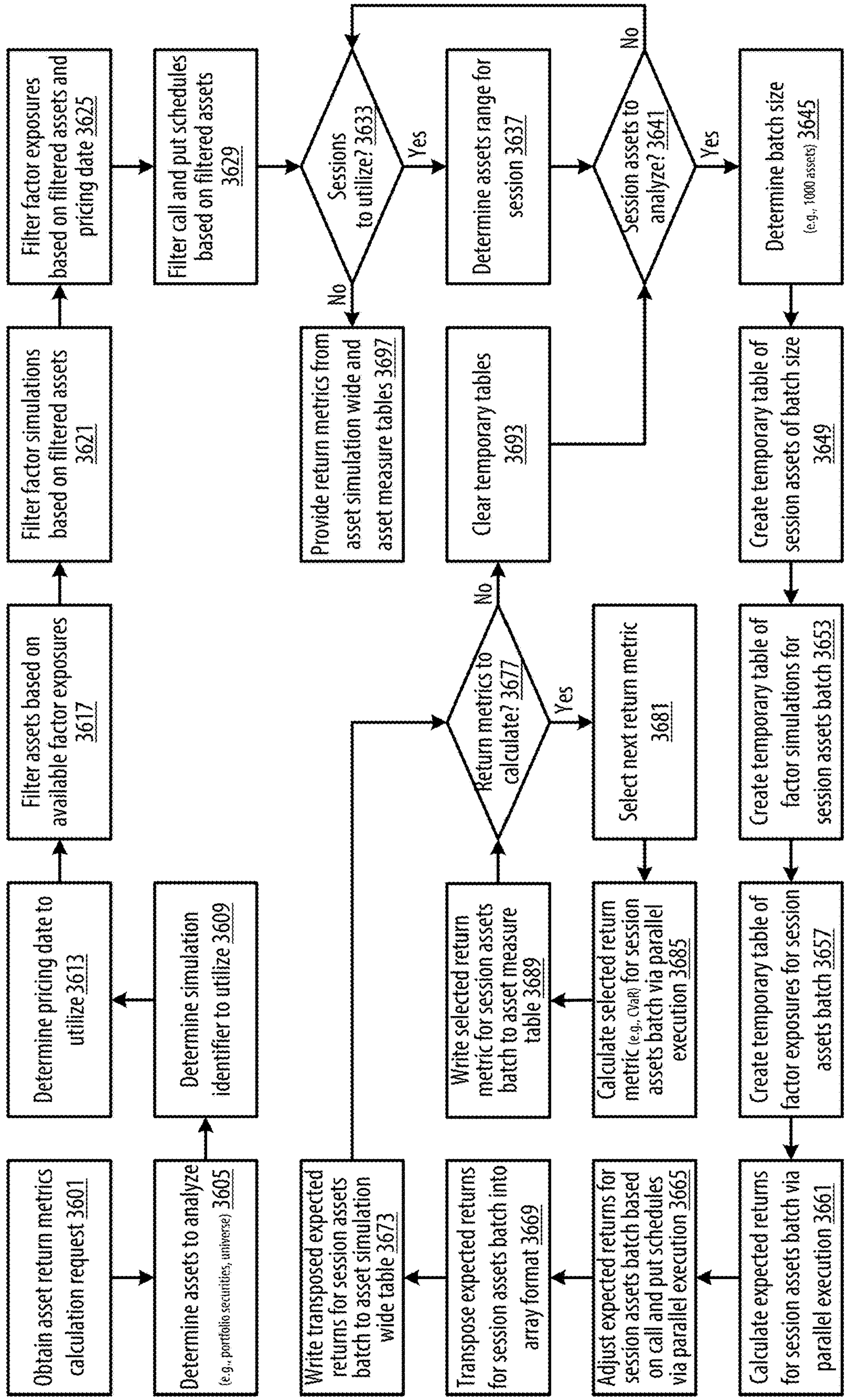

FIGURE 37: MLPO ARCHITECTURE
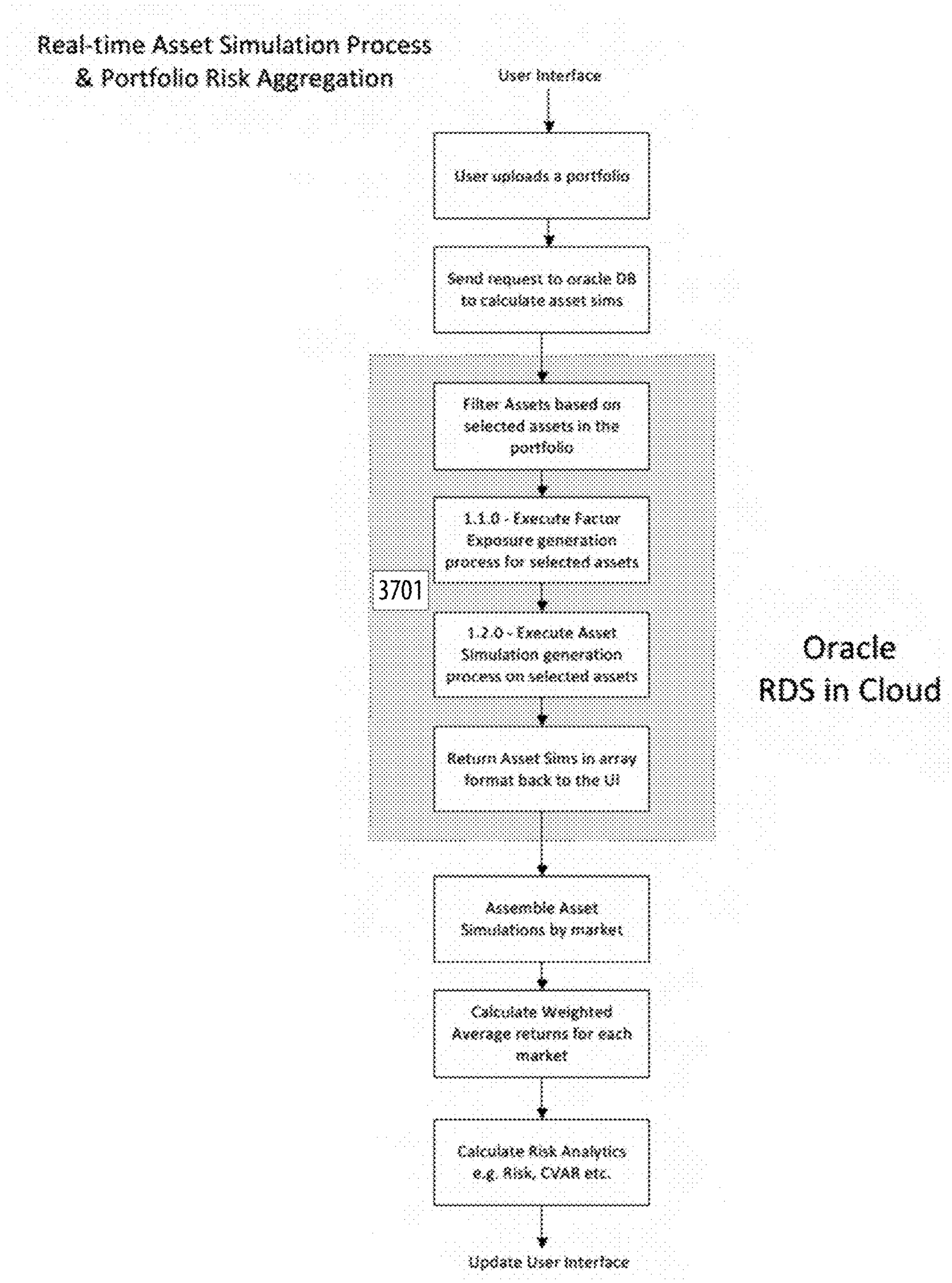

FIGURE 38: MLPO ARCHITECTURE
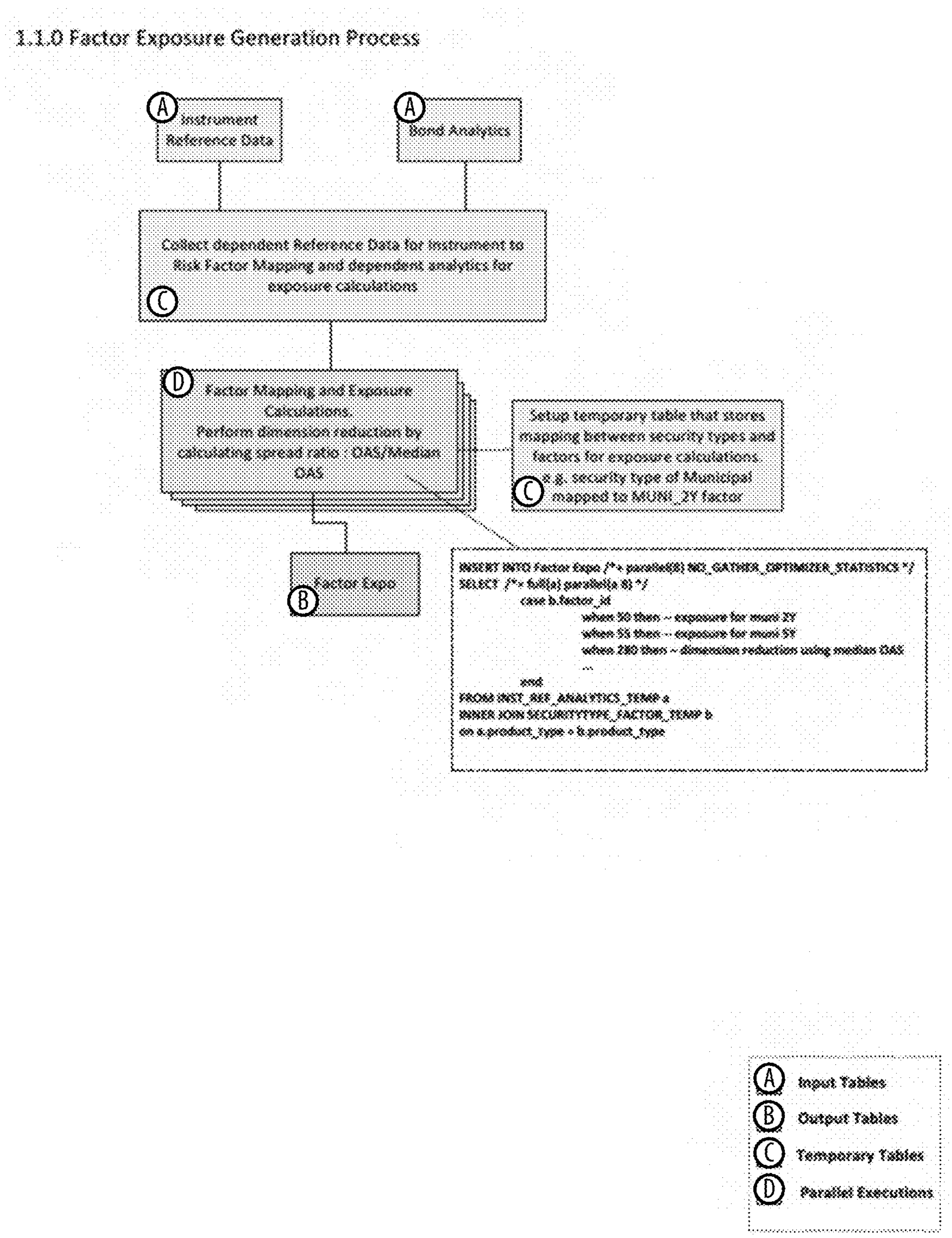

FIGURE 39: MLPO ARCHITECTURE
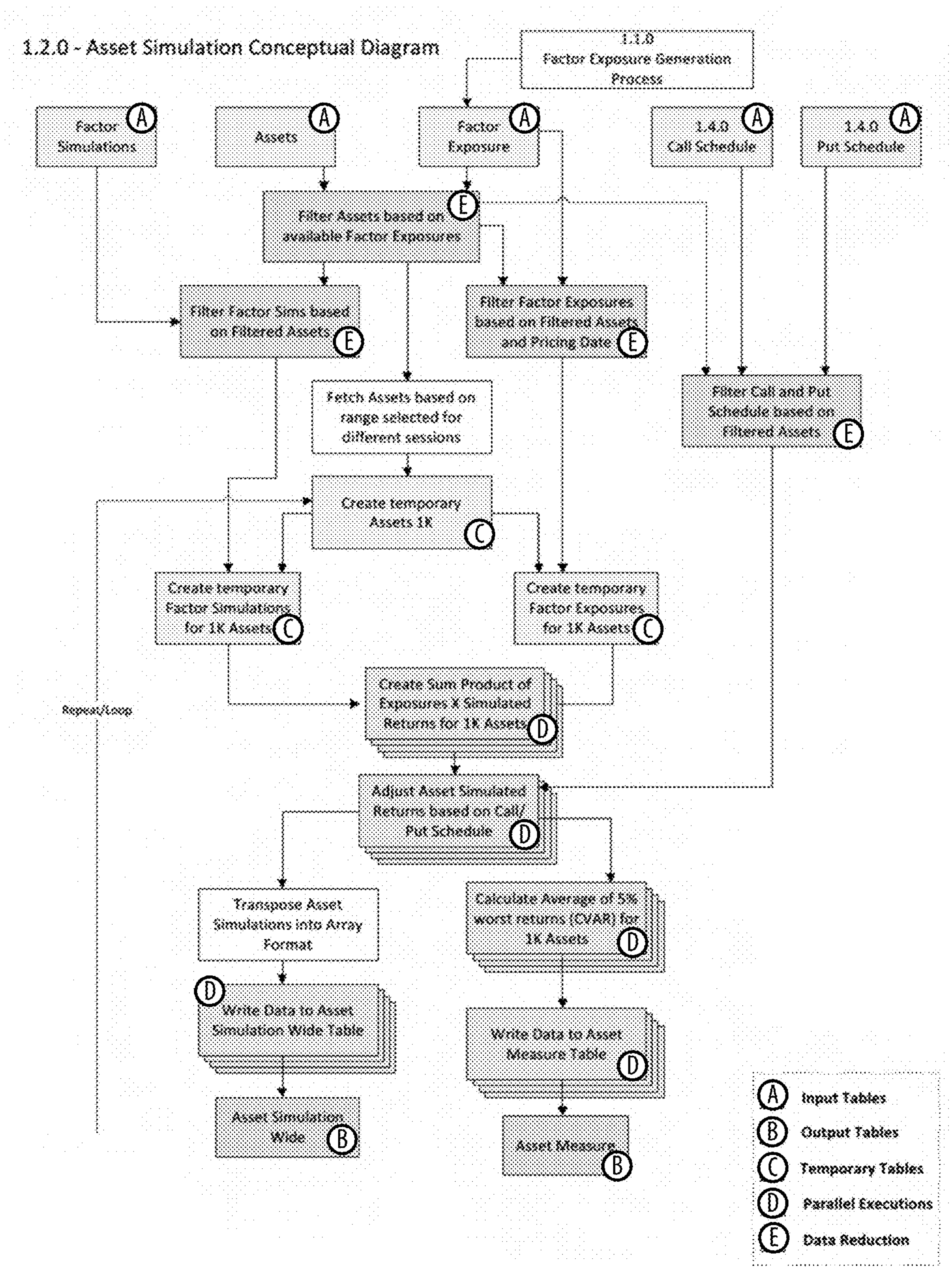

FIGURE 40: MLPO ARCHITECTURE
Asset Simulation ER Diagram
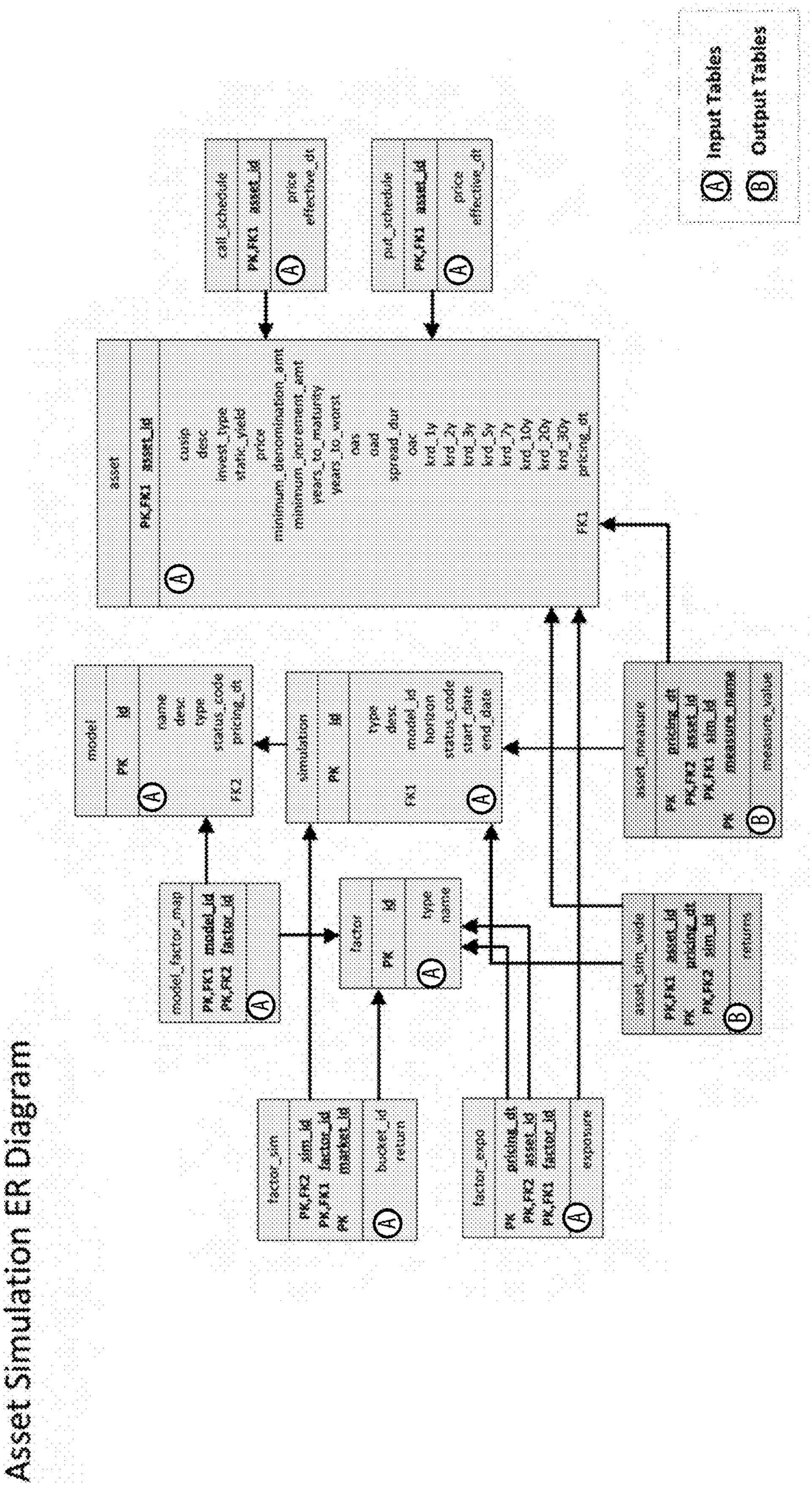

FIGURE 41: MLPO SCREENSHOT
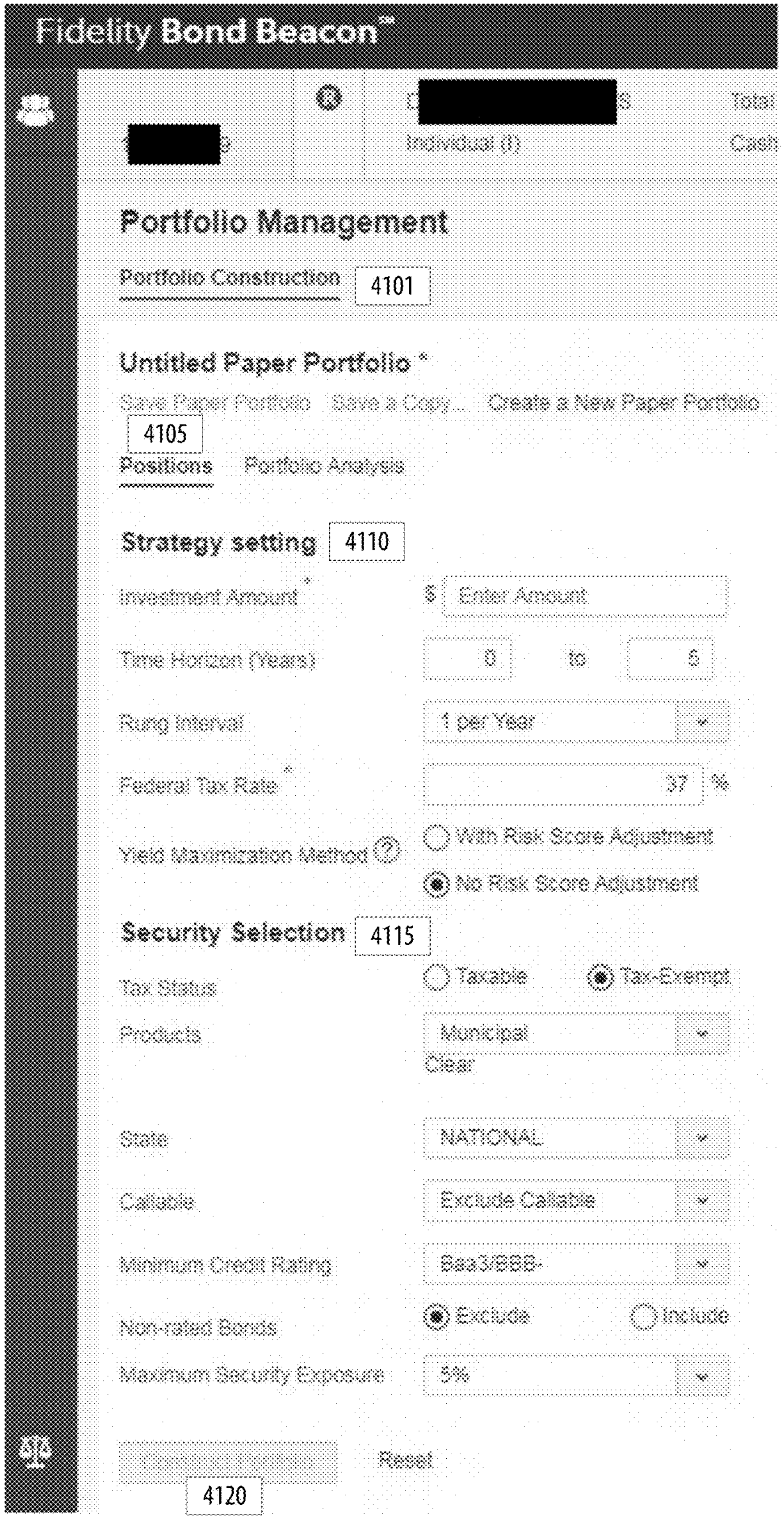

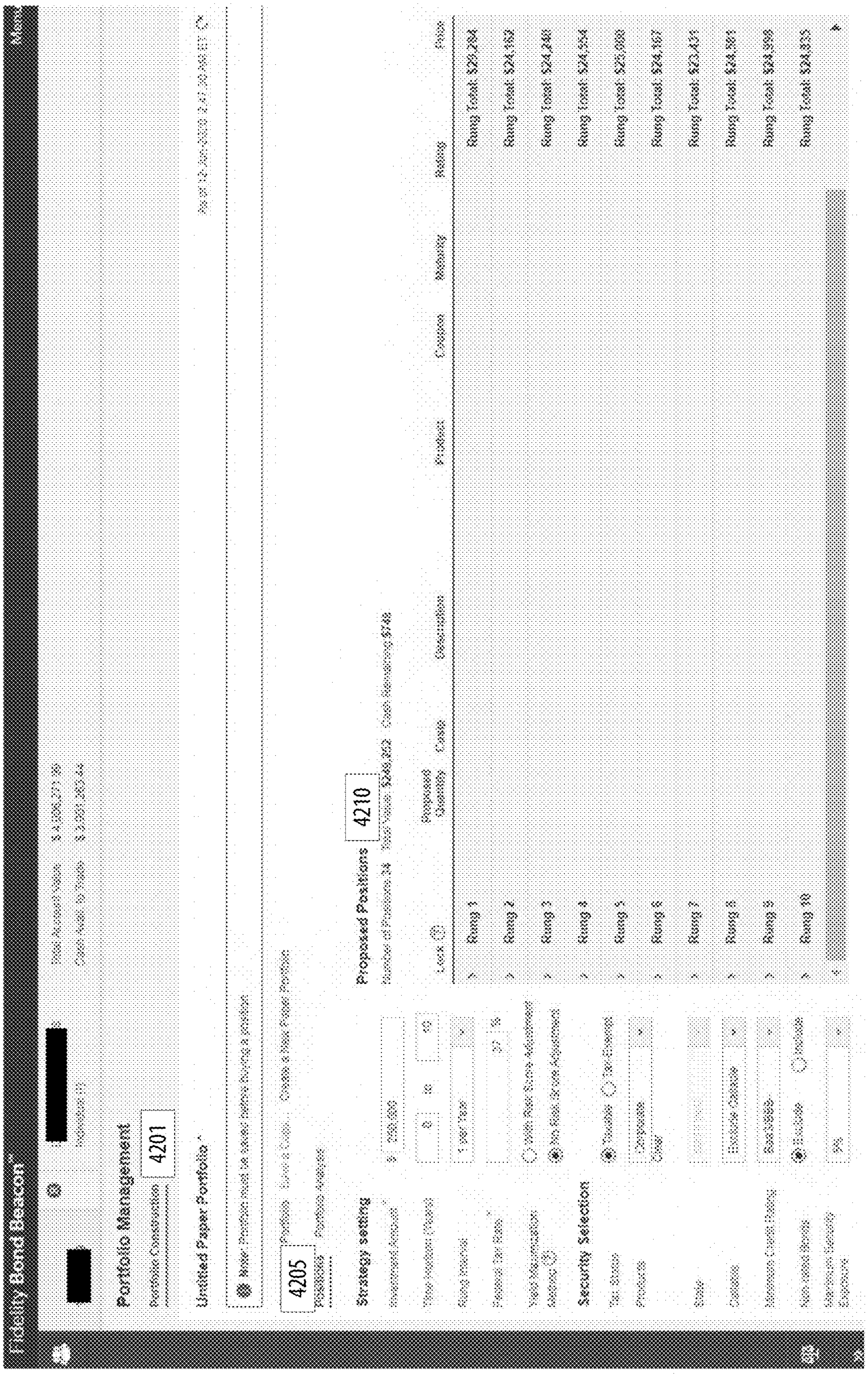
FIGURE 42: MLPO SCREENSHOT

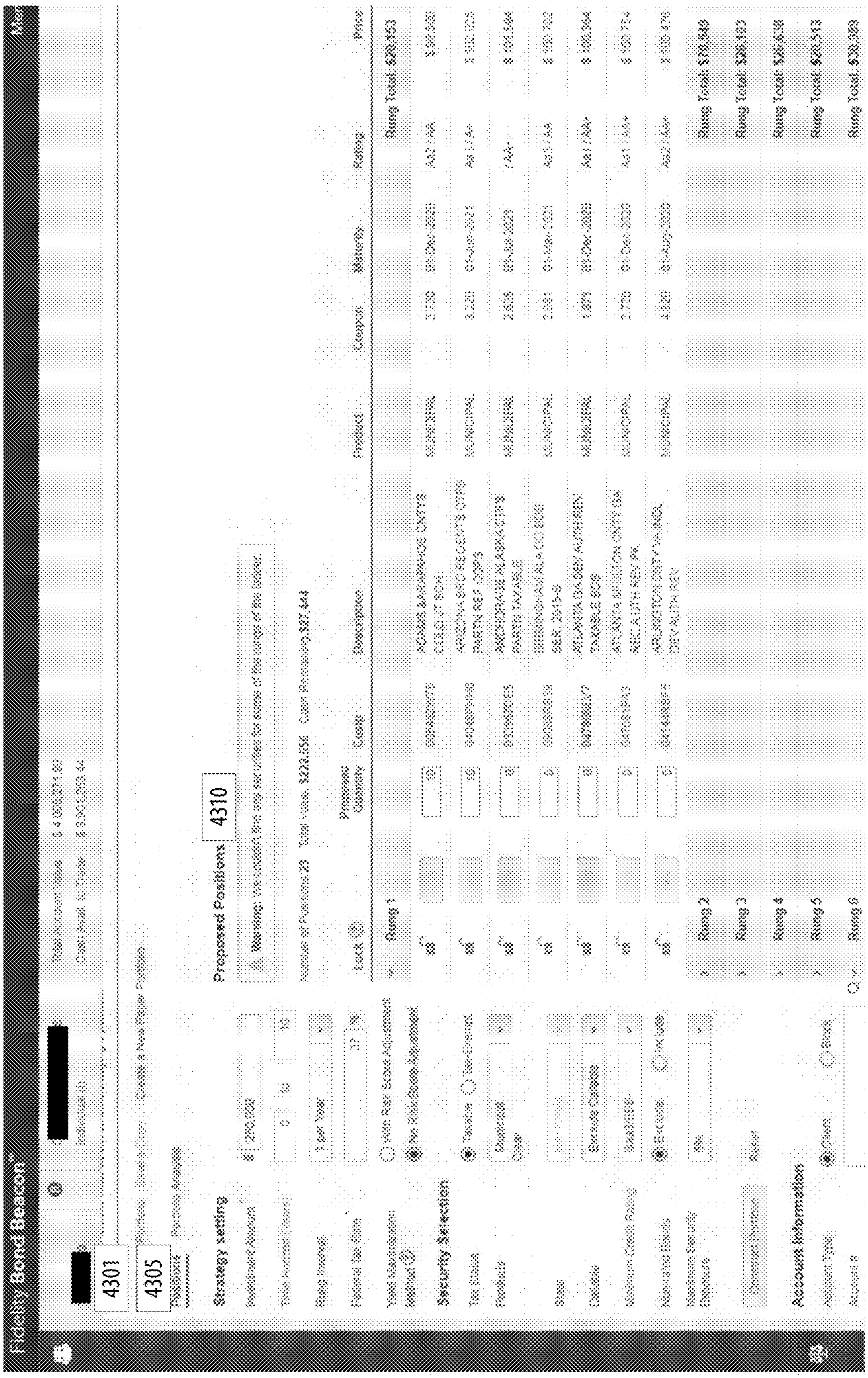
FIGURE 43: MLPO SCREENSHOT

FIGURE 44: MLPO SCREENSHOT
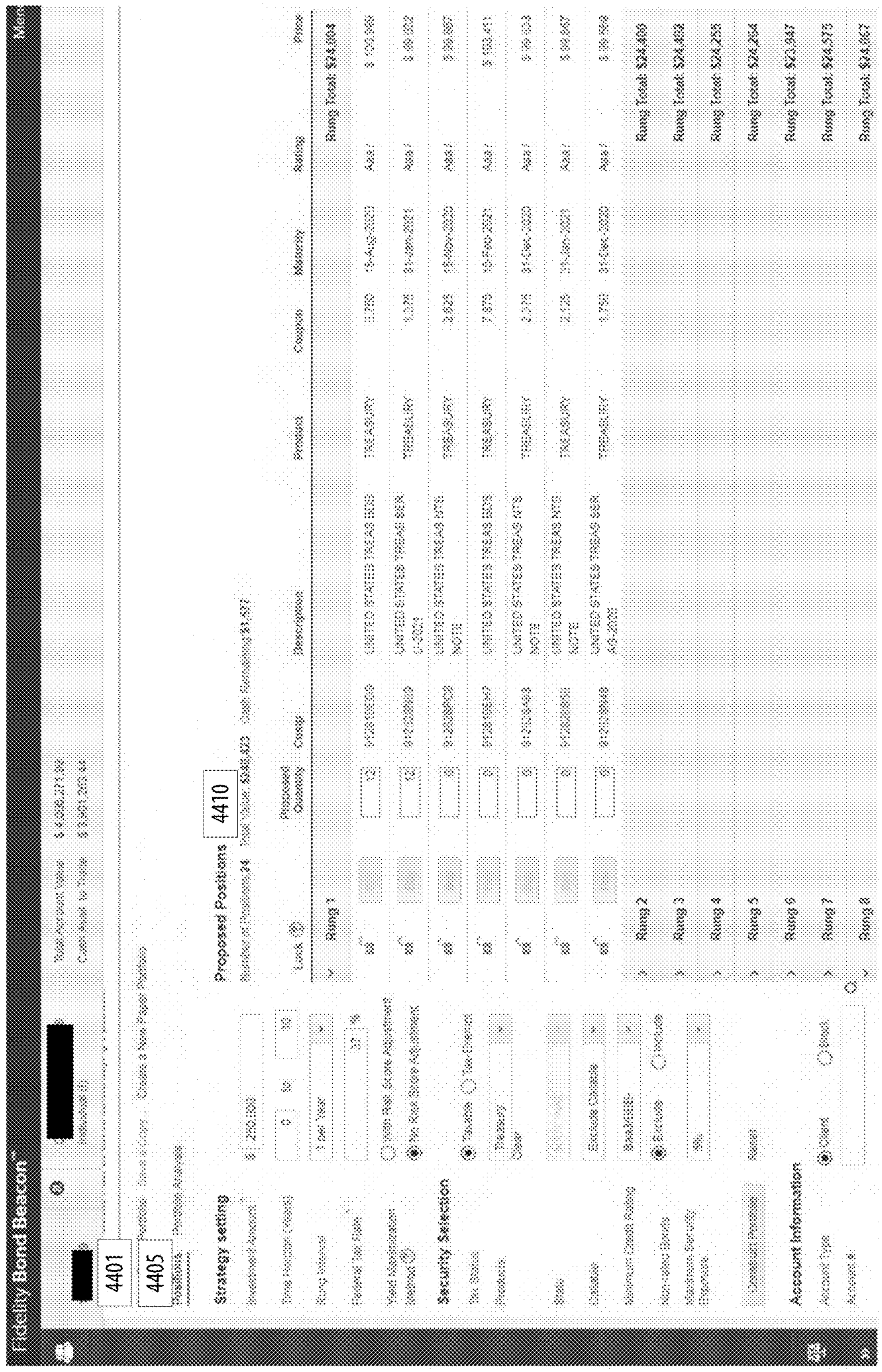

FIGURE 45: MLPO SCREENSHOT

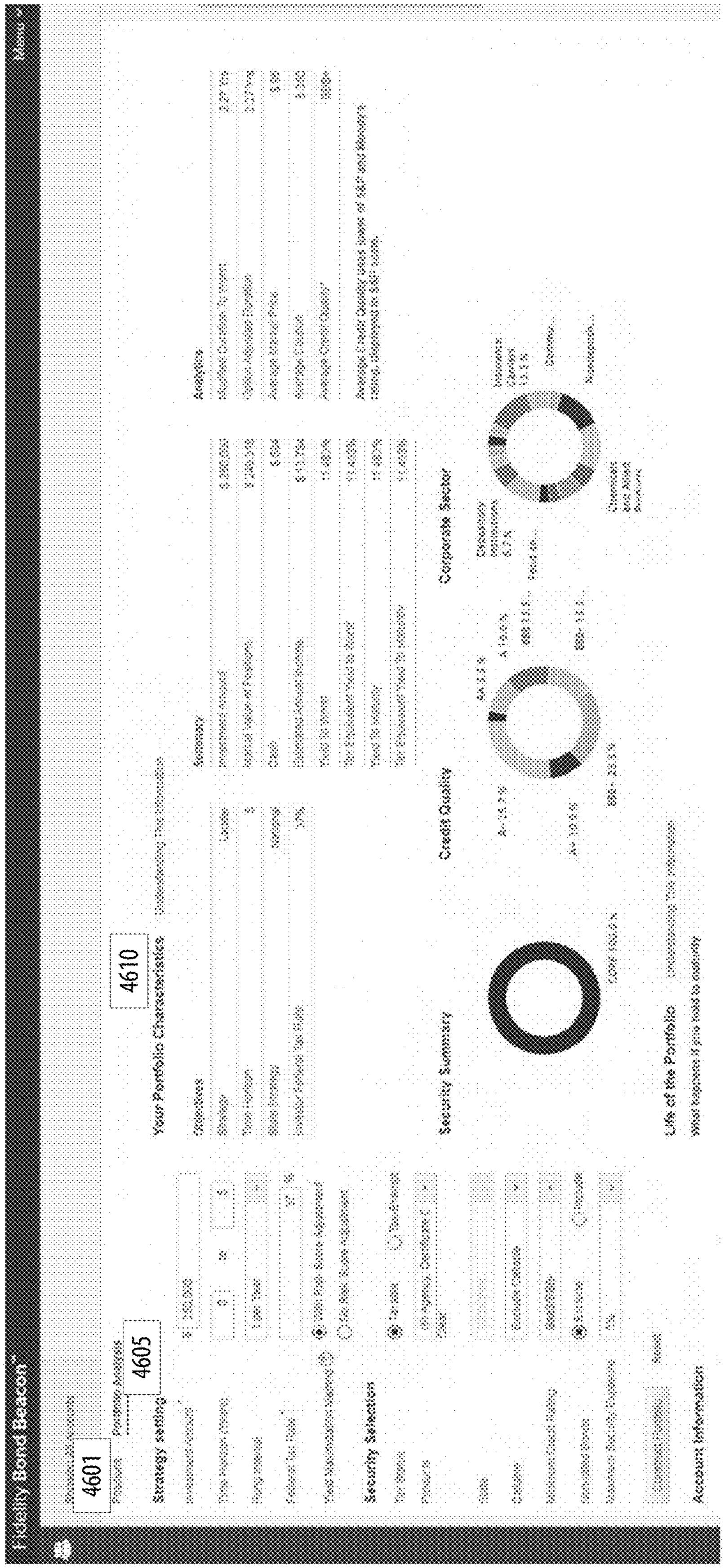
FIGURE 46: MLPO SCREENSHOT

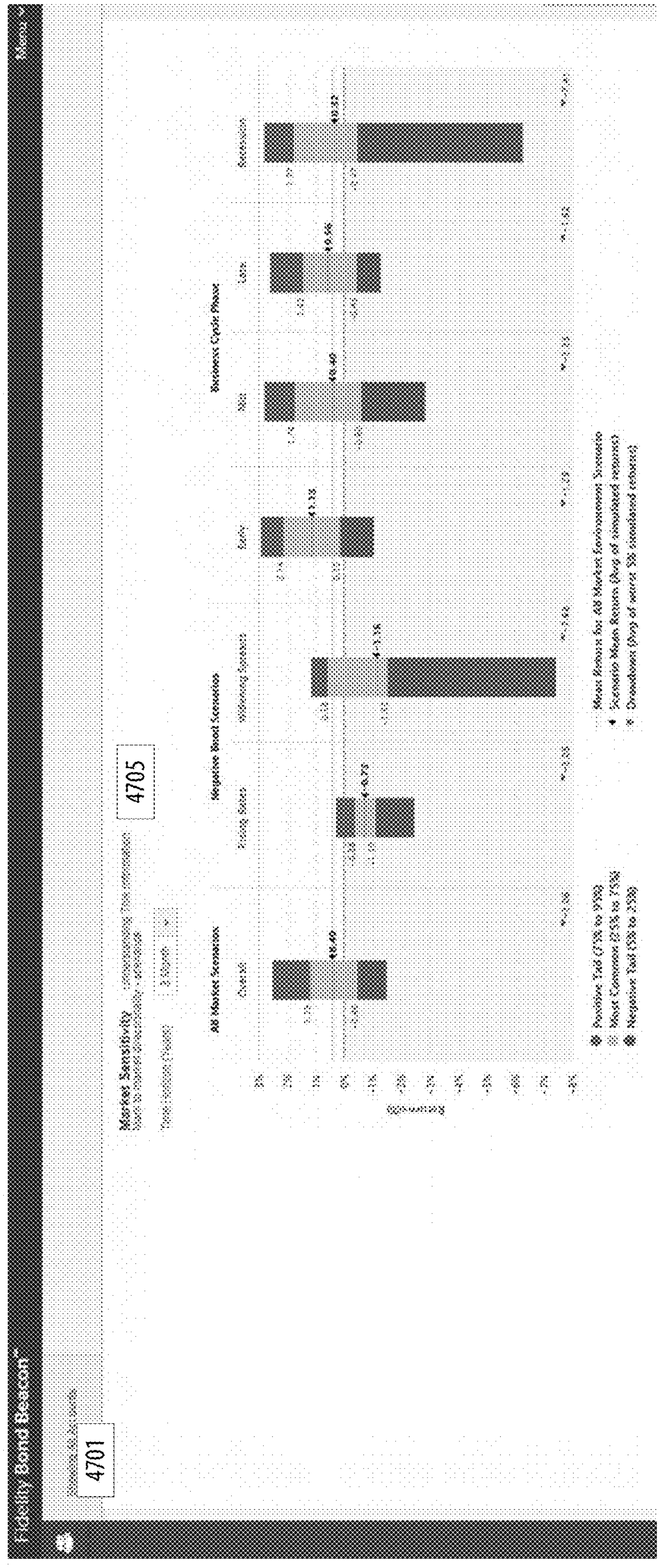
FIGURE 47: MLPO SCREENSHOT

FIGURE 48: MLPO ARCHITECTURE
Tail-Risk Adjusted Bond Ladder Construction
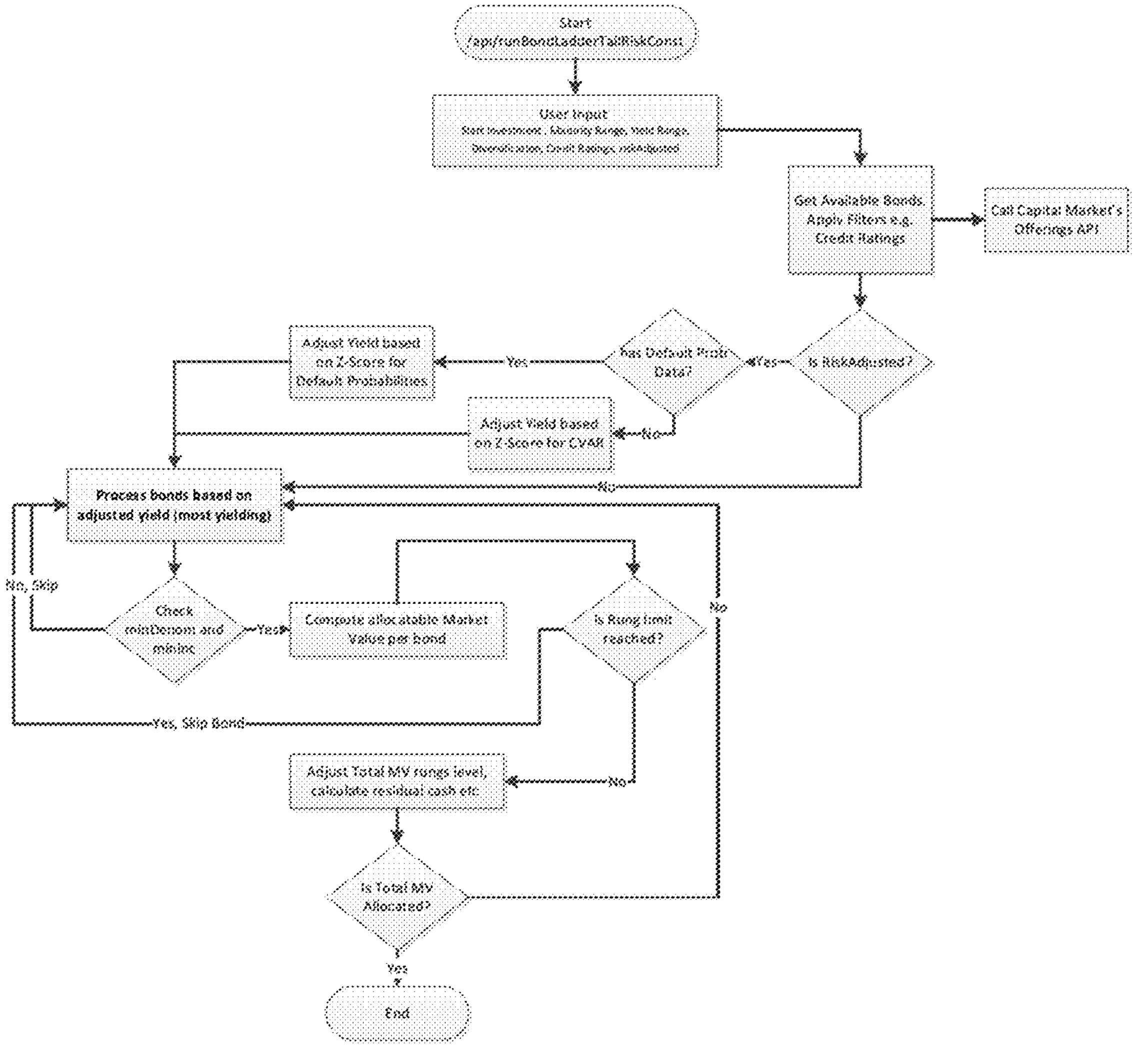

FIGURE 49: MLPO ARCHITECTURE
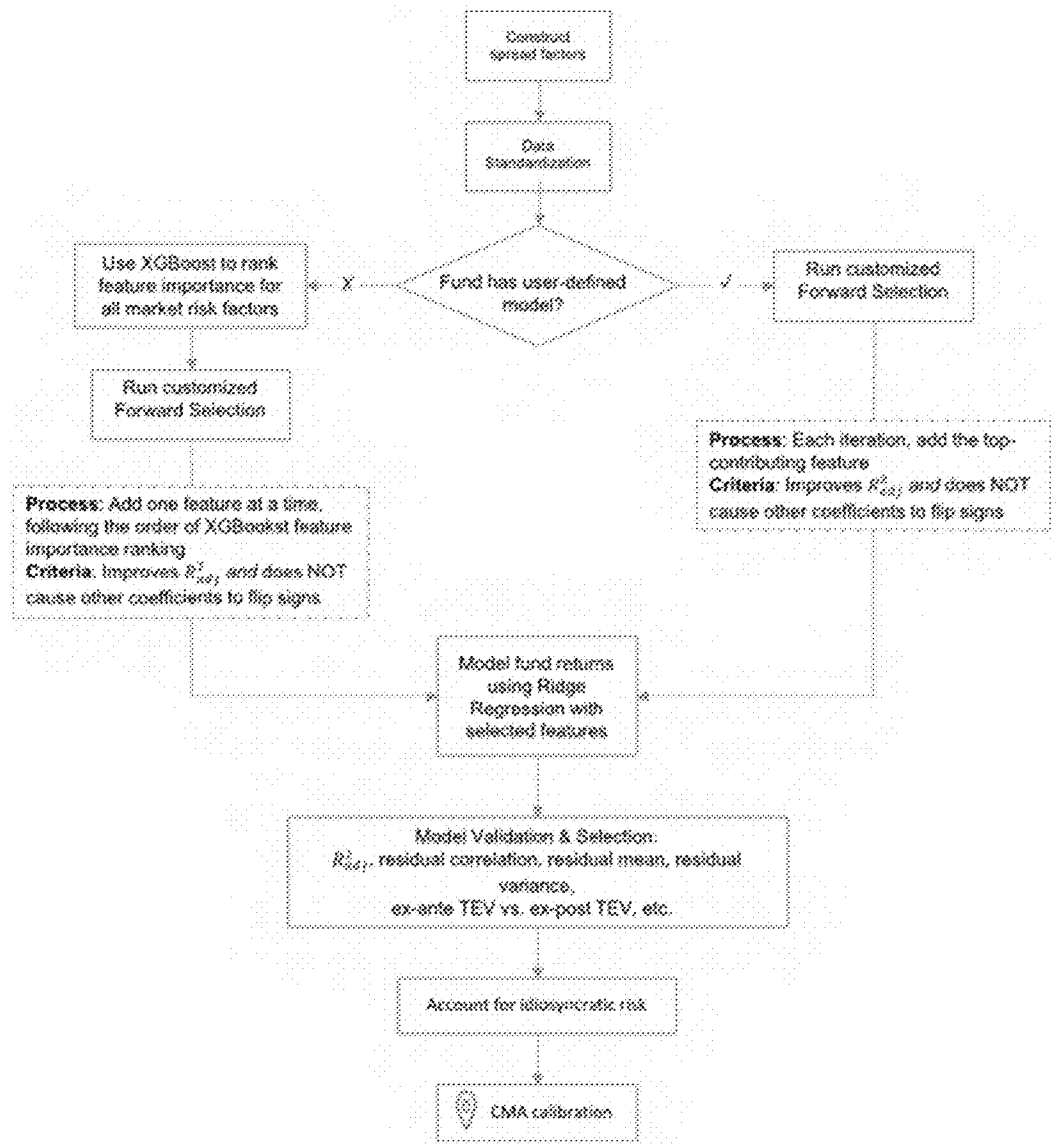

FIGURE 50: MLPO ARCHITECTURE

```
data_input = load_data_from_postgres(query,
                                     driver, number_of_partitions_for_parallel_computing,
                                     partition_column)

data_processed  = feature_engineering_process(data_input)
model = model_for_training(data_processed)

write_to_postgres_from_parallel_nodes(model)
```

FIGURE 51: MLPO ARCHITECTURE

| Table Name | Format | Comment |
|---|---|---|
| asset | tall | Contains referential information for funds and ETFs |
| asset_return_mfetf | tall | Contains historical returns for funds and ETFs |
| asset_sim_model_mapping | tall | Contains domain experts' subjective input, such as relevant market factors for a fund |
| asset_model_sim_param | tall | Contains the binary format of the models for all funds and ETFs |
| asset_measure_mfetf | tall | Contains the evaluation metrics for the models, such as feature importance scores, residual distribution statistics, etc. |
| asset_sim_mfetf_w | wide | Stores the simulated returns in array formats in order to enhance computing spped |
| asset_sim_mfetf_residual_w | wide | Stores regression model residuals in array formats in order to enhance computing speed |
| asset_model_coef | wide | Stores the features selected in array formats in order to enhance computing speed |

FIGURE 52: MLPO ARCHITECTURE

```
def forward_selection_xgb_order(X, y, fctr_order_0):
    sign_check = True
    fctr_order = fctr_order_0.copy()
    selected   = [fctr_order[0]]
    param_orig = pd.Series()
    current_score, new_score = 0.0, 0.0

    for candidate in fctr_order:
        fit = LinearRegression().fit(X[[candidate]],y)
        param_orig = param_orig.append(pd.Series(fit.coef_, index=[candidate]))
        if candidate == fctr_order[0]:
            current_score  = fit.score(X[[candidate]],y)
            current_score  = 1 - (1 - current_score) * (len(y) - 1) / (len(y) - X[[candidate]].shape[1] - 1)

    for candidate in fctr_order[1:]:
        fit = Ridge(alpha=200).fit(X[selected+[candidate]],y)
        param_curr = pd.Series(fit.coef_, index=selected+[candidate])
        sign_check = all((param_curr * param_orig[param_curr.index])>0)
        new_score  = fit.score(X[selected+[candidate]],y)
        new_score  = 1 - (1 - new_score) * (len(y) - 1) / (len(y) - X[selected+[candidate]].shape[1] - 1)
        # Select the candidate feature to be utilized in the return-simulating model if
        # 1. model's adj R2 improves and
        # 2. all coefficients do NOT flip signs
        if current_score < new_score and sign_check:
            selected.append(candidate)
            current_score = new_score

    return selected


def forward_selection(X, y):
    sign_check = True
    remaining  = set(X.columns)
    selected   = []
    param_orig = pd.Series()
    current_score, best_new_score = 0.0, 0.0

    for candidate in remaining:
        fit = LinearRegression().fit(X[[candidate]],y)
        param_orig = param_orig.append(pd.Series(fit.coef_, index=[candidate]))

    while remaining and current_score == best_new_score:
        candidate_info_df = pd.DataFrame(columns=['score','candidate','sign_check'])
        for candidate in remaining:
            fit        = Ridge(alpha=200).fit(X[selected+[candidate]],y)
            param_curr = pd.Series(fit.coef_, index=selected+[candidate])
            sign_check = all((param_curr * param_orig[param_curr.index])>0)
            score = fit.score(X[selected+[candidate]],y)
            score = 1 - (1 - score) * (len(y) - 1) / (len(y) - X[selected+[candidate]].shape[1] - 1)
            candidate_info_df.loc[len(candidate_info_df)] = [score,candidate,sign_check]
        candidate_info_df = candidate_info_df[candidate_info_df['sign_check']==True]
        if len(candidate_info_df)==0: # First stop criterion: adding any feature will cause sign flips
            break
        candidate_info_lst = candidate_info_df.values.tolist()
        candidate_info_lst.sort()
        best_new_score, best_candidate, best_sign_check = candidate_info_lst.pop()
        if current_score < best_new_score and best_sign_check: # Second criterion: adding the best feature won't improve adj-R2
            remaining.remove(best_candidate)
            selected.append(best_candidate)
            current_score = best_new_score
    return selected
```

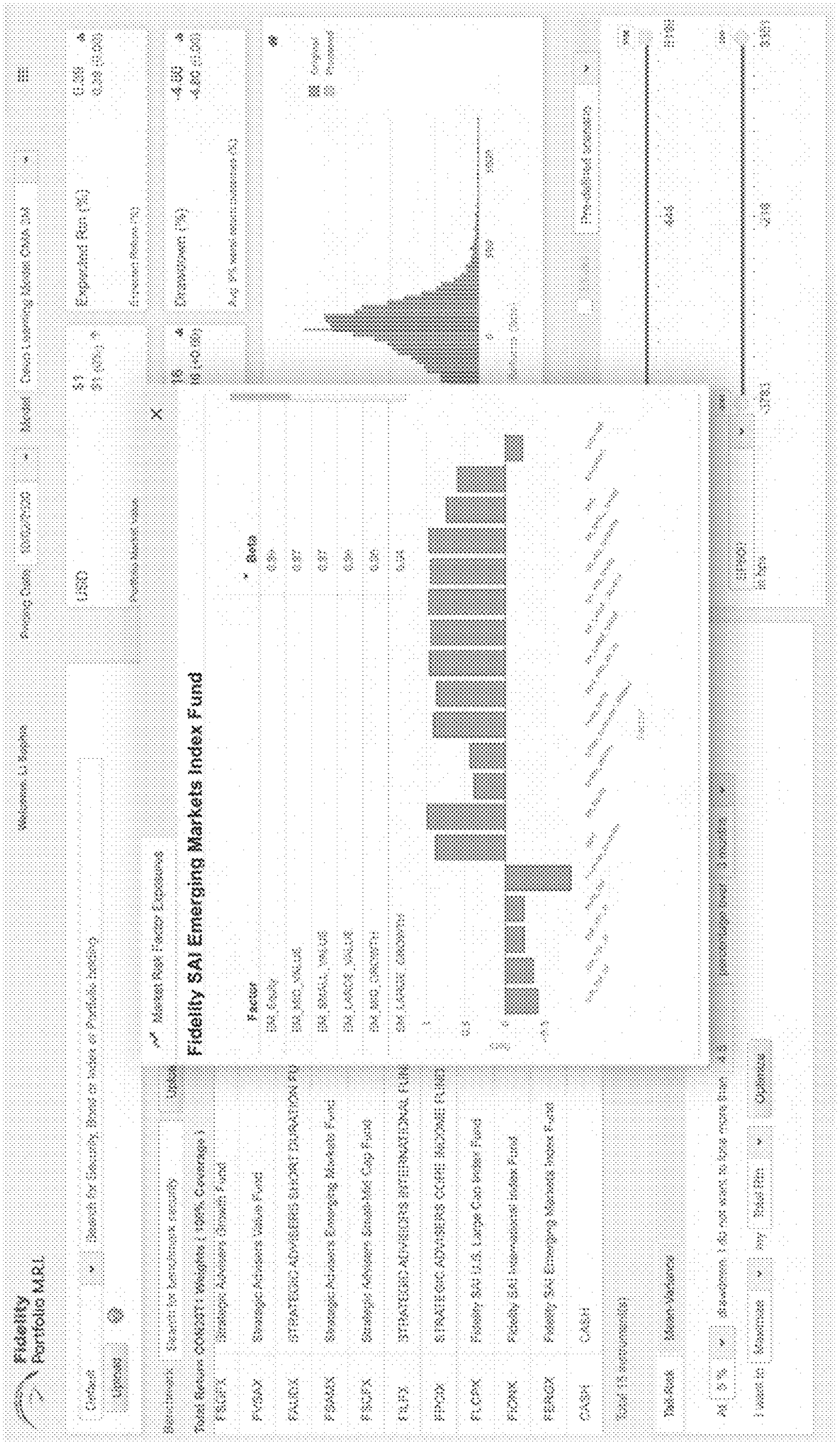
FIGURE 53: MLPO SCREENSHOT

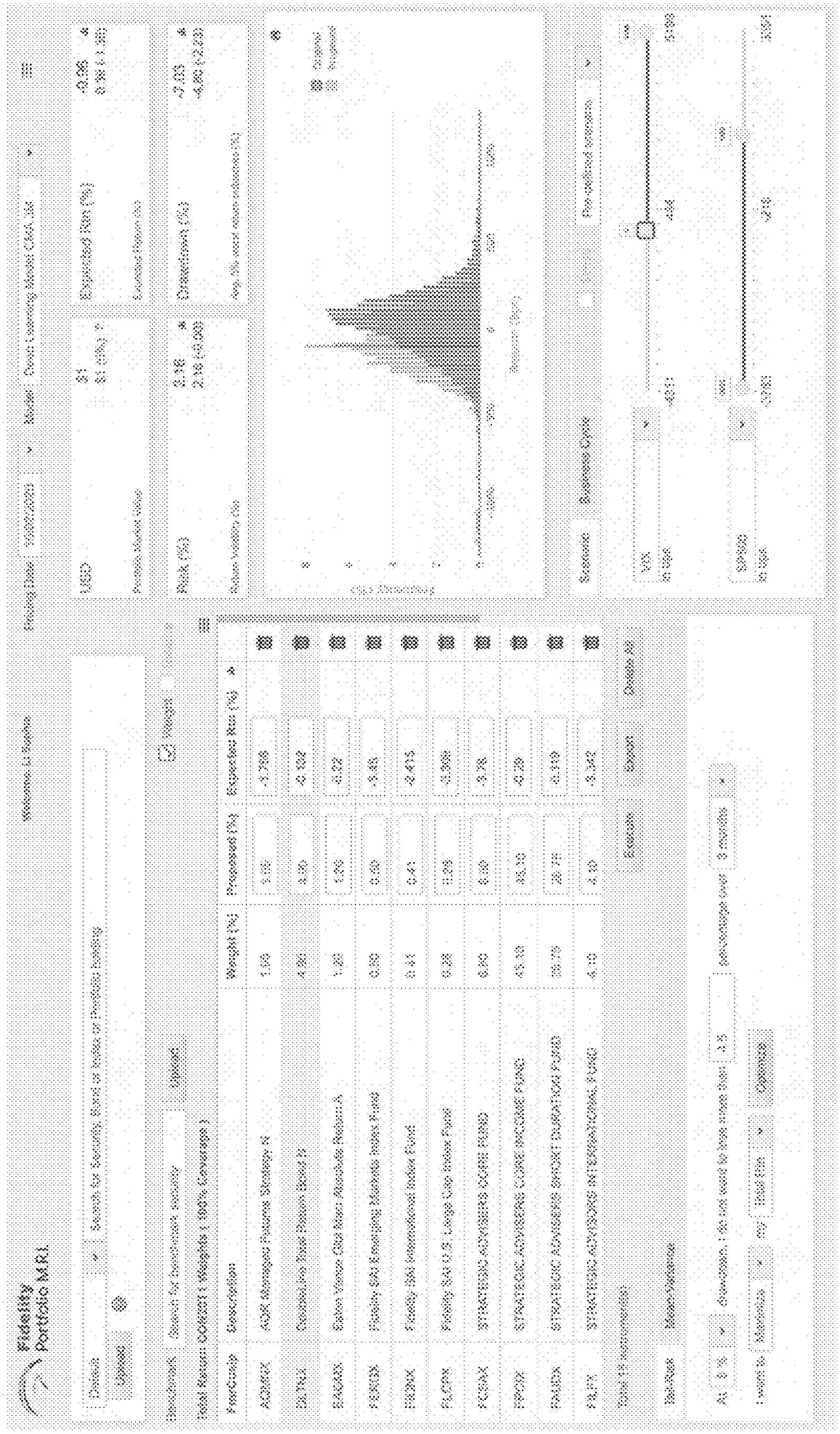
FIGURE 54: MLPO SCREENSHOT

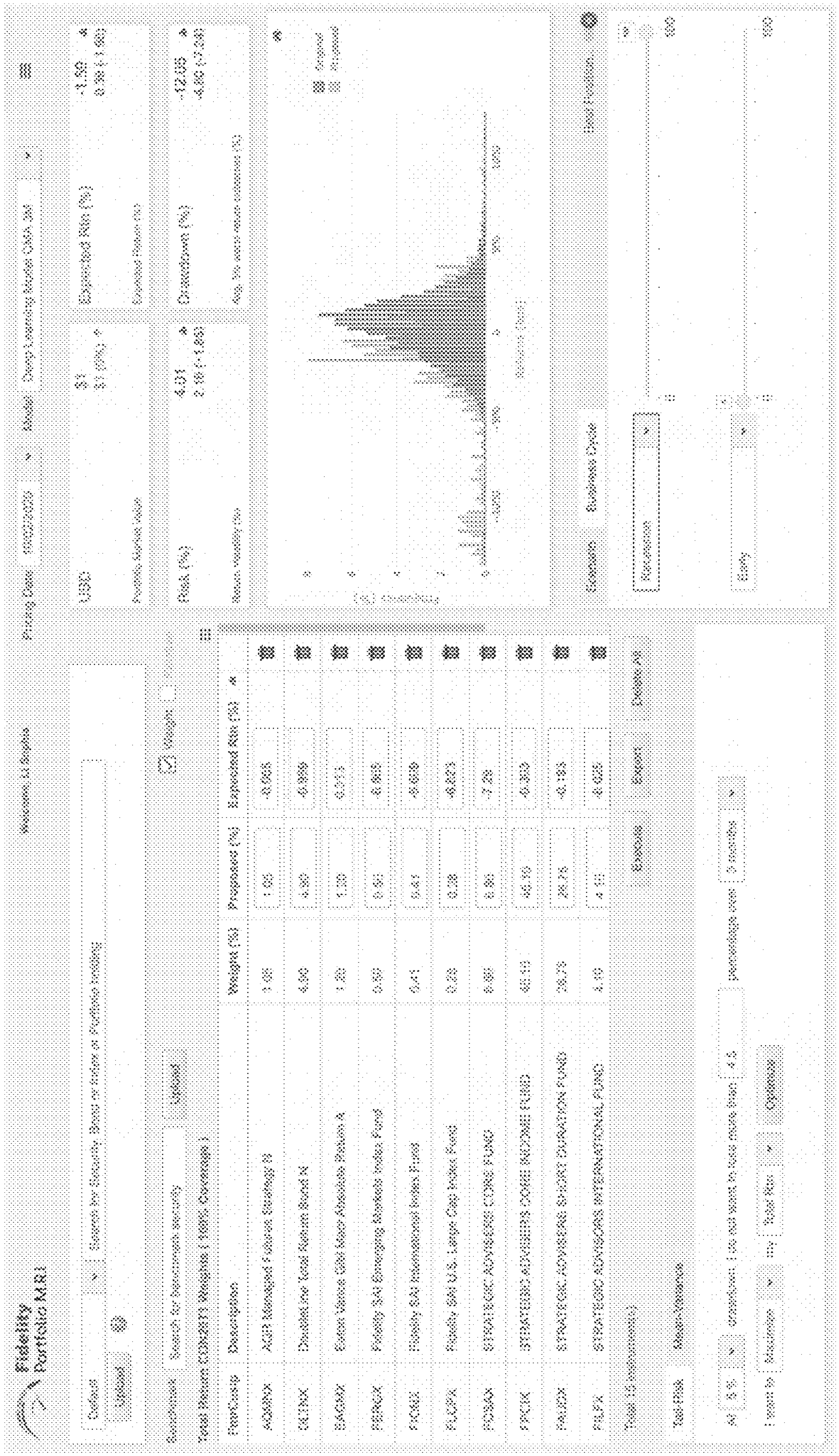
FIGURE 55: MLPO SCREENSHOT

*For each equity, simulated returns are modeled using a common workflow*
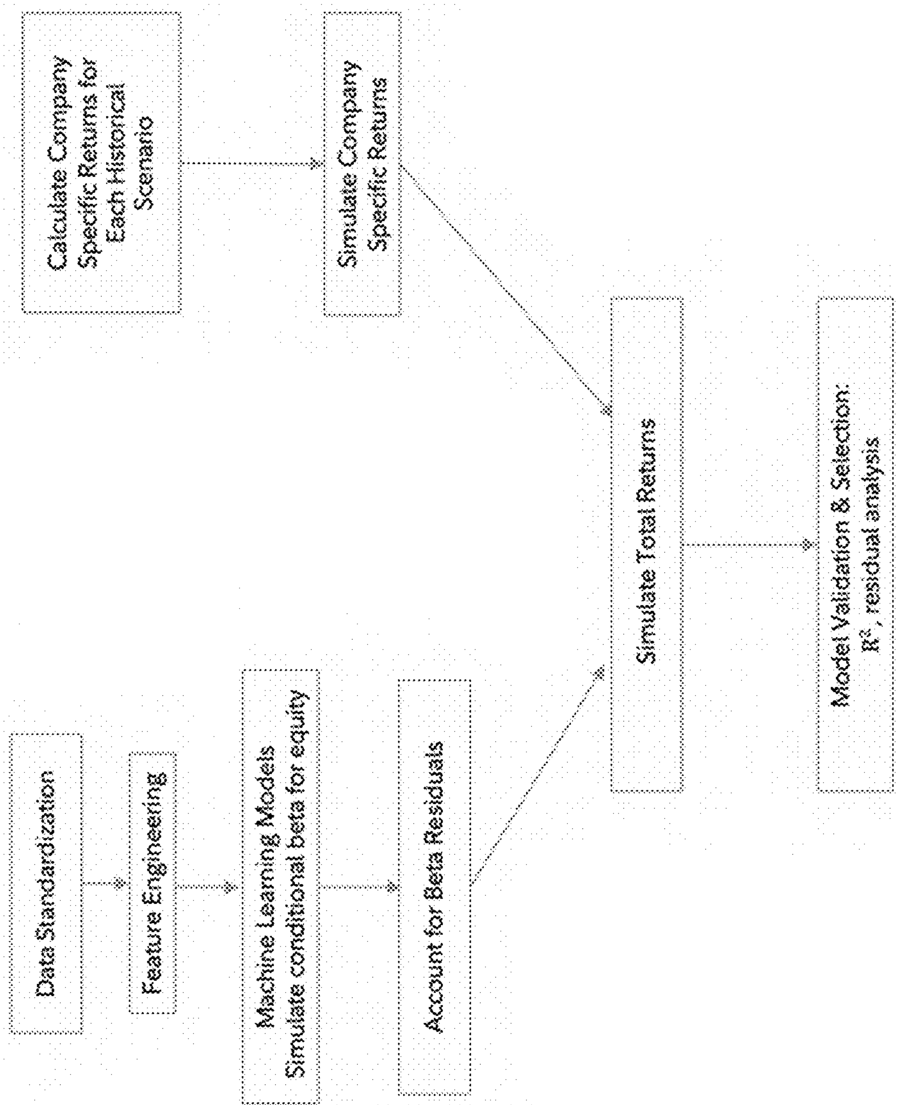
FIGURE 56: MLPO ARCHITECTURE

FIGURE 57: MLPO ARCHITECTURE

```
def forward_selection_xgb_order(X, y, fctr_order_0):
    sign_check = True
    fctr_order = fctr_order_0.copy()
    selected   = [fctr_order[0]]
    param_orig = pd.Series()
    current_score, new_score = 0.0, 0.0

    for candidate in fctr_order:
        fit = LinearRegression().fit(X[[candidate]],y)
        param_orig = param_orig.append(pd.Series(fit.coef_, index=[candidate]))
        if candidate == fctr_order[0]:
            score = fit.score(X[[candidate]],y)
            # Adjusted R2
            score = 1 - (1 - score) * (len(y) - 1) / (len(y) - X[[candidate]].shape[1] - 1)
            current_score  = score

    for candidate in fctr_order[1:]:
        fit = Ridge(alpha=50).fit(X[selected+[candidate]],y)
        candid_param_curr = fit.coef_[-1]
        candid_param_orig = param_orig[candidate]
        sign_check = (candid_param_orig*candid_param_curr)>0
        new_score  = fit.score(X[selected+[candidate]],y)
        new_score = 1 - (1 - new_score) * (len(y) - 1) / (len(y) - X[selected+[candidate]].shape[1] - 1)
        if current_score < new_score:
            selected.append(candidate)
            current_score = new_score
    return selected
```

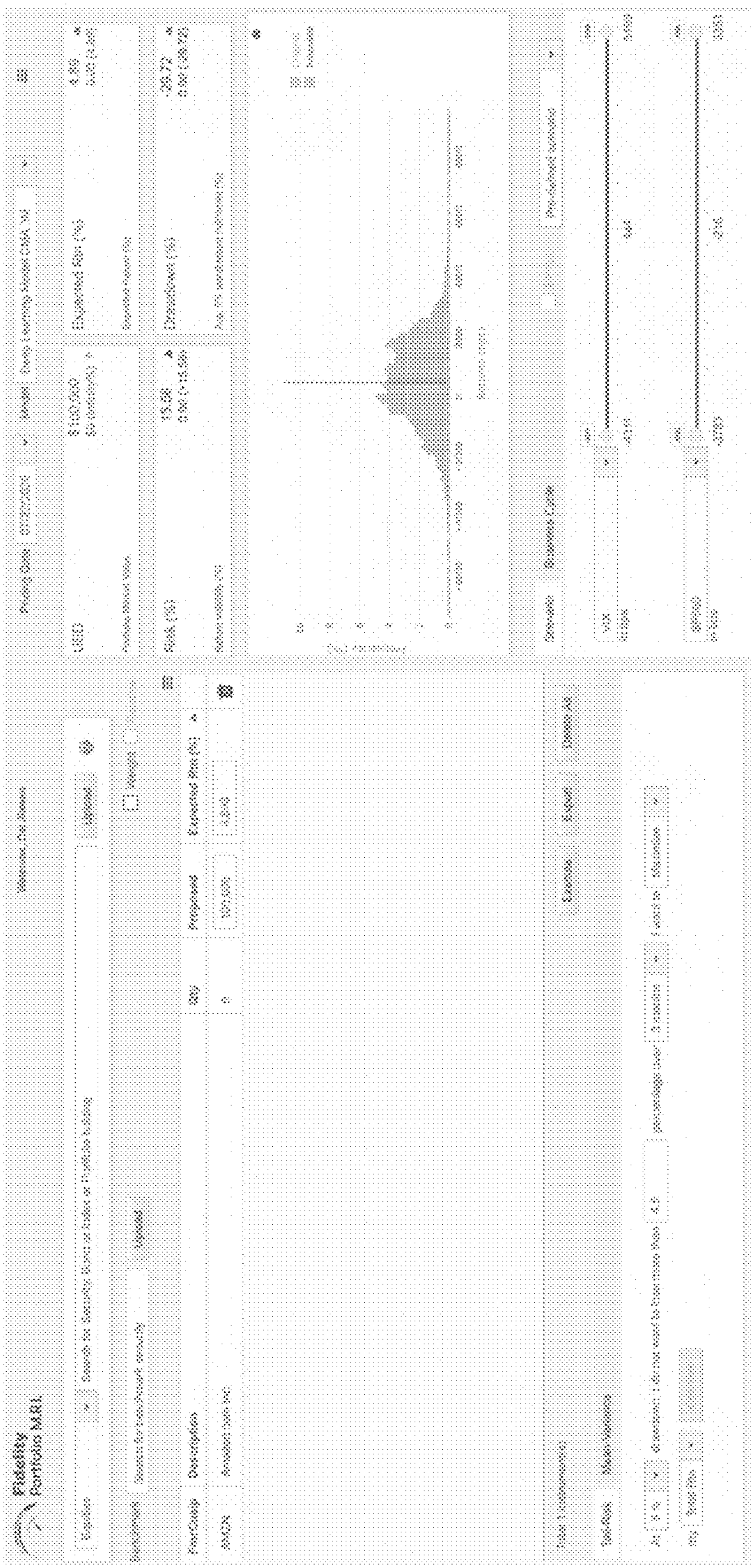
FIGURE 58: MLPO SCREENSHOT

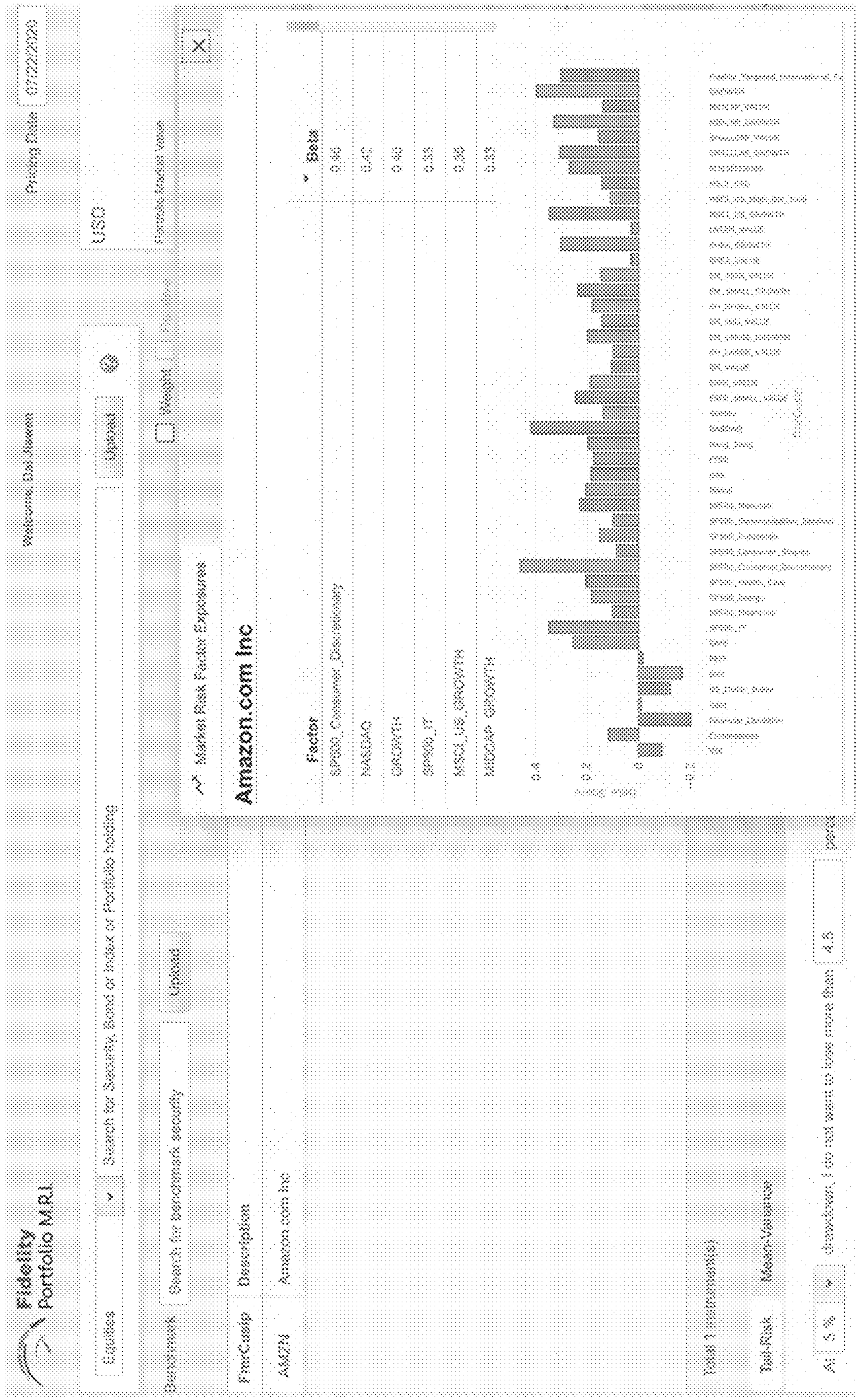
FIGURE 59: MLPO SCREENSHOT

FIGURE 60: MLPO SCREENSHOT
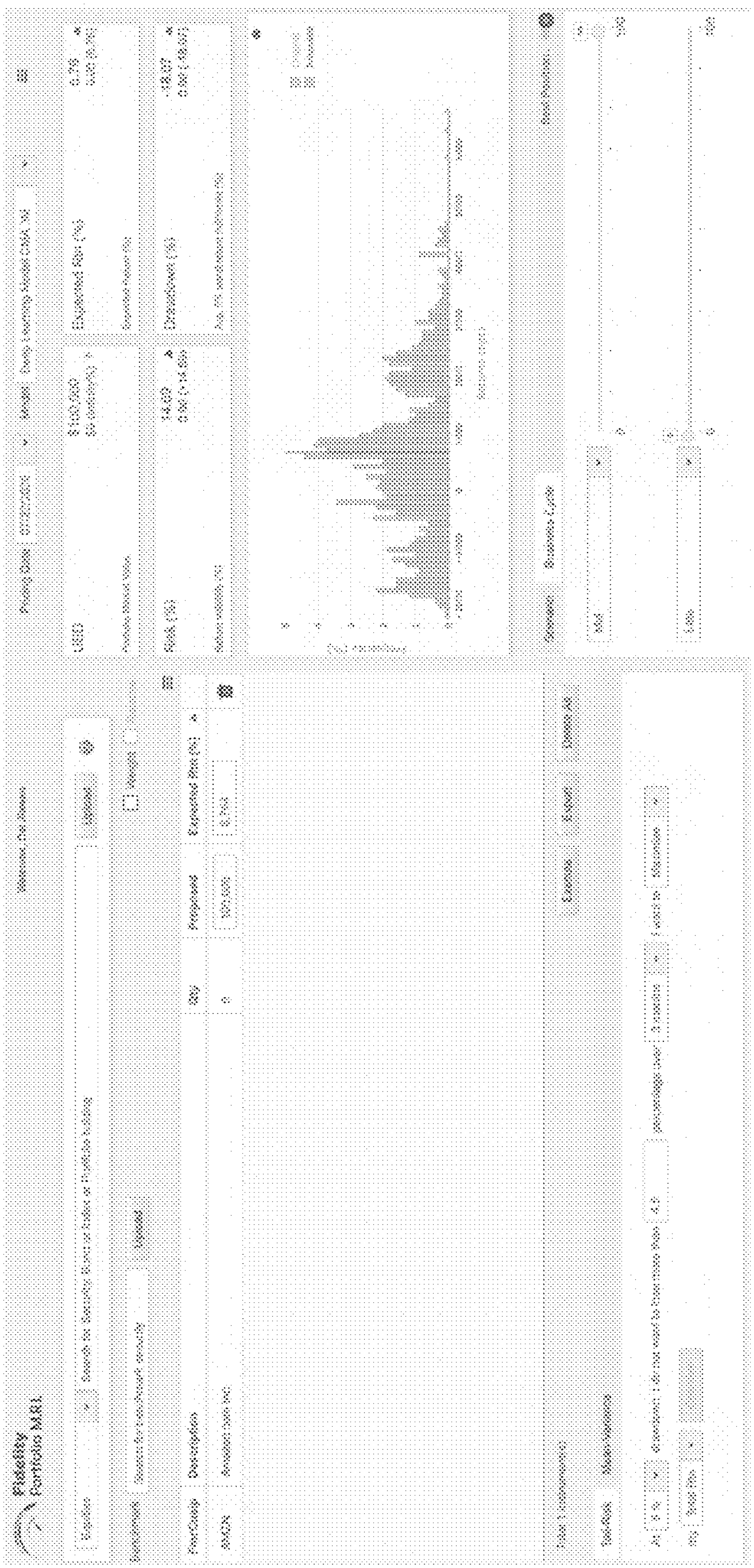

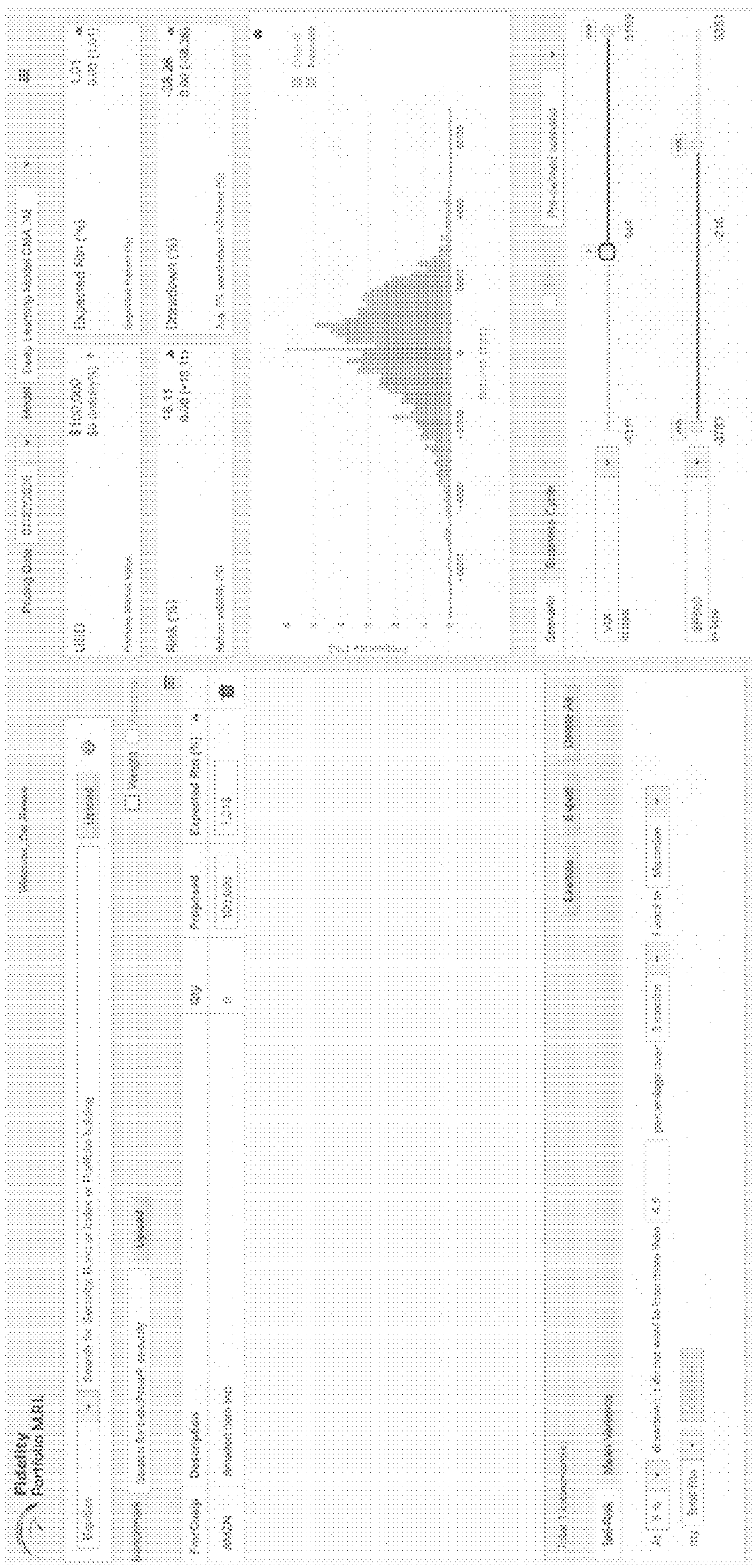
FIGURE 61: MLPO SCREENSHOT

FIGURE 62: MLPO ARCHITECTURE

```
data_input = load_data_from_postgres(query,
                                     driver,
                                     number_of_partitions_for_parallel_computing,
                                     partition_column)

data_processed  = feature_engineering_process(data_input)
model = model_for_training(data_processed)

write_to_postgres_from_parallel_nodes(model,
                                      driver,
                                      number_of_ partitions)
```

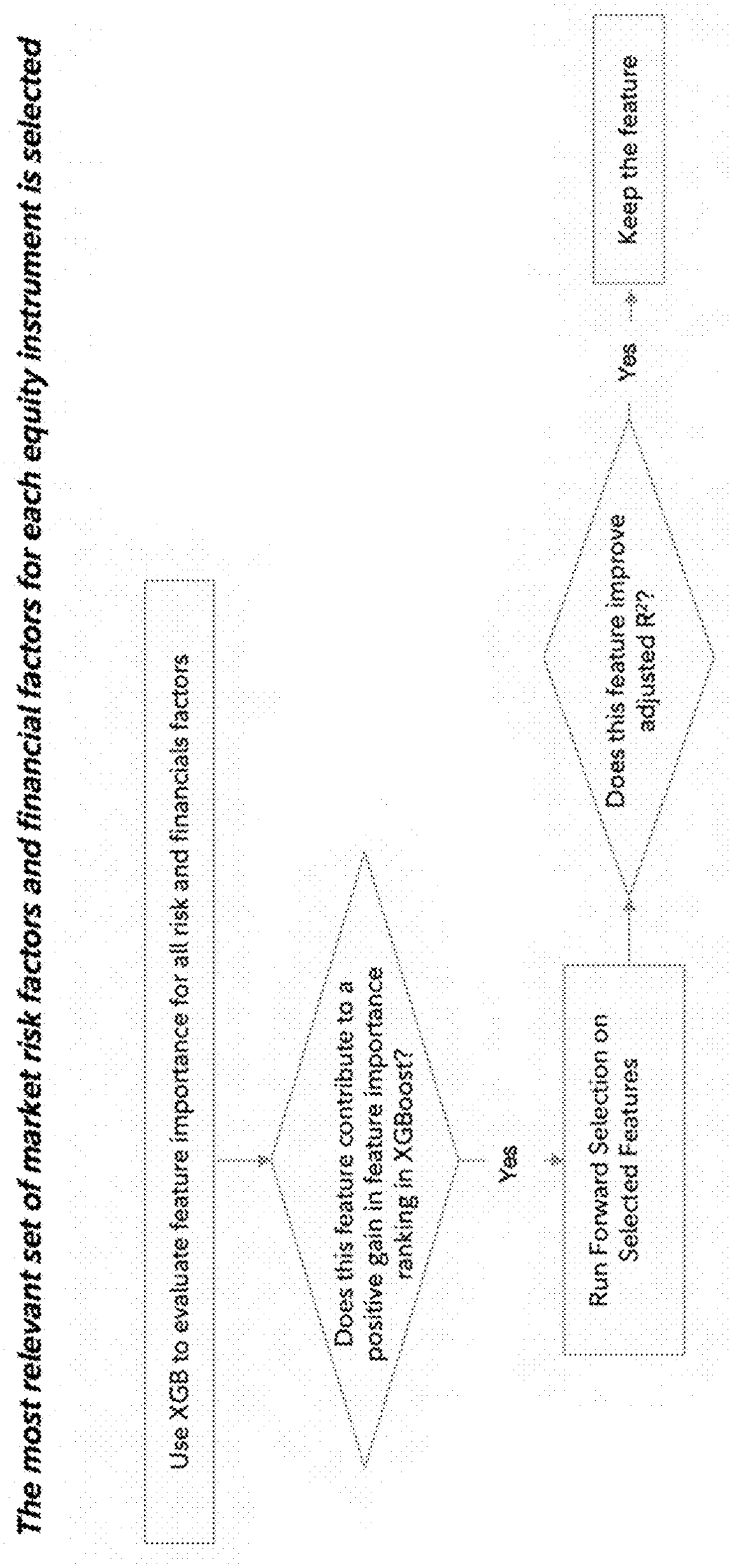
FIGURE 63: MLPO ARCHITECTURE

FIGURE 64: MLPO ARCHITECTURE
*Company specific returns are modeled with feature importance weighted historical sampling*
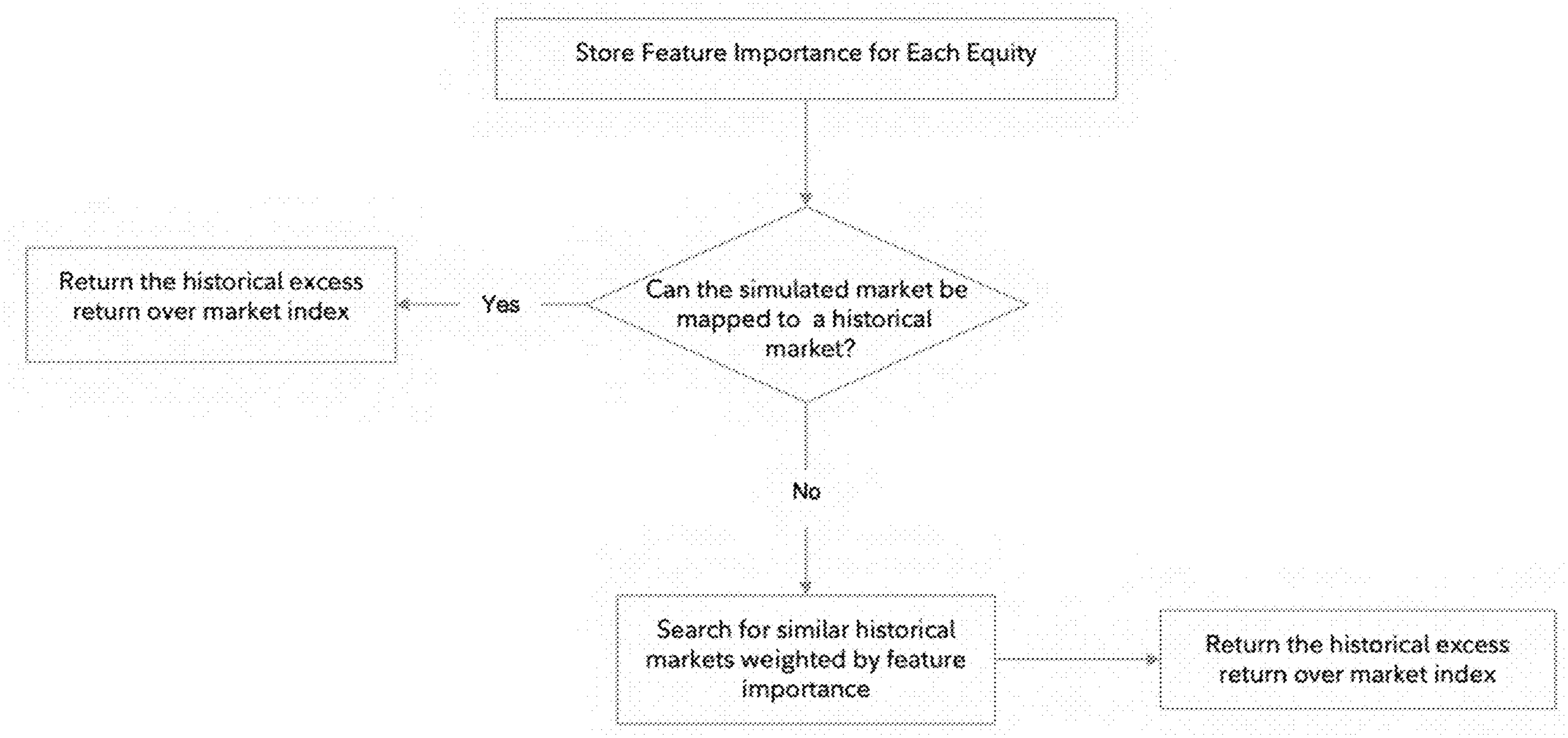

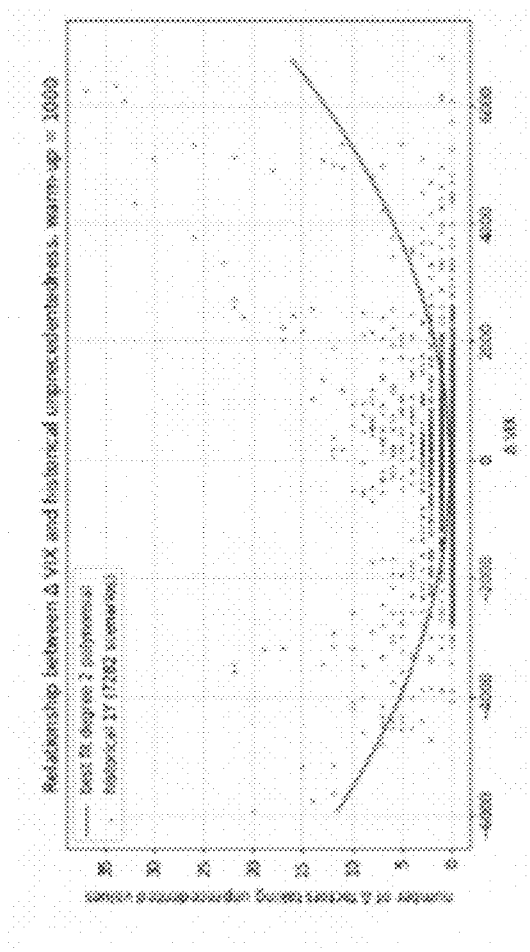
FIGURE 65: MLPO SCREENSHOT

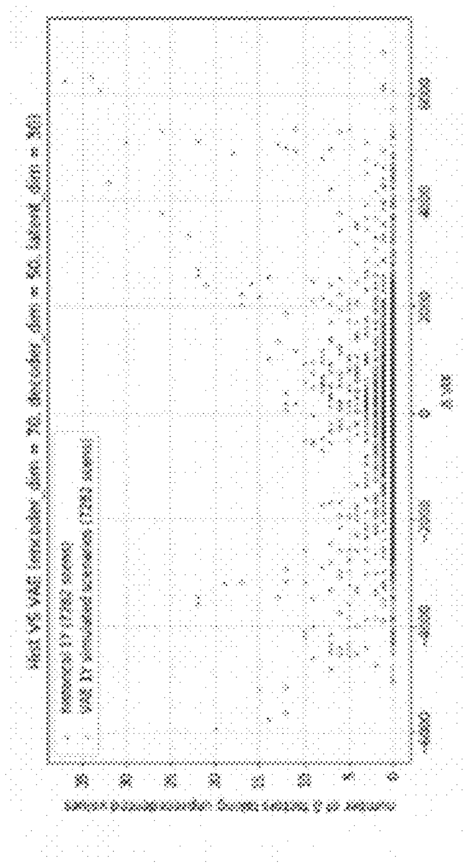
FIGURE 66: MLPO SCREENSHOT

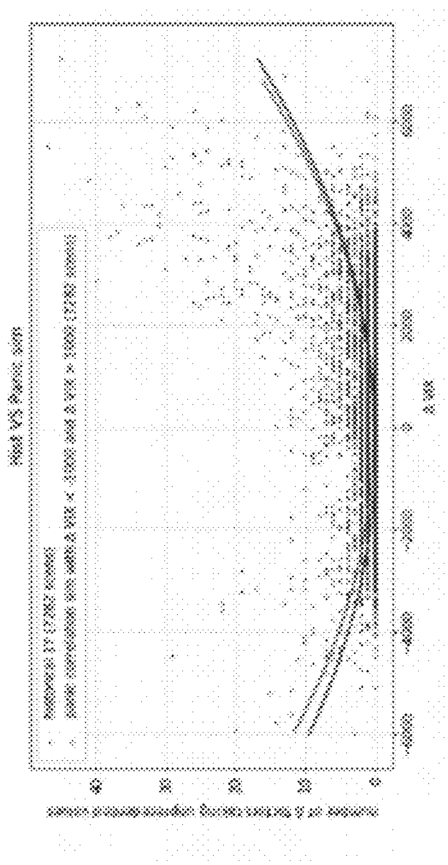
FIGURE 67: MLPO SCREENSHOT

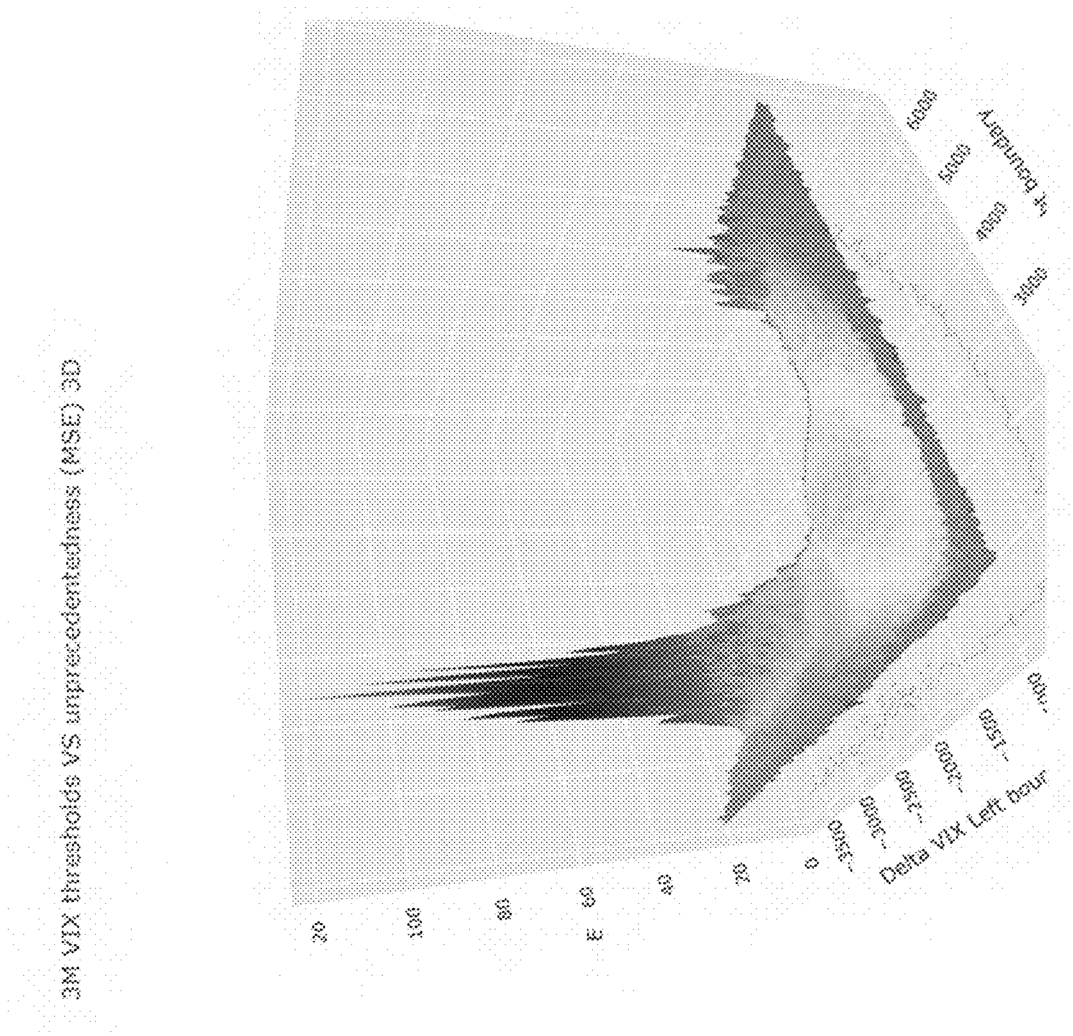
FIGURE 68: MLPO SCREENSHOT

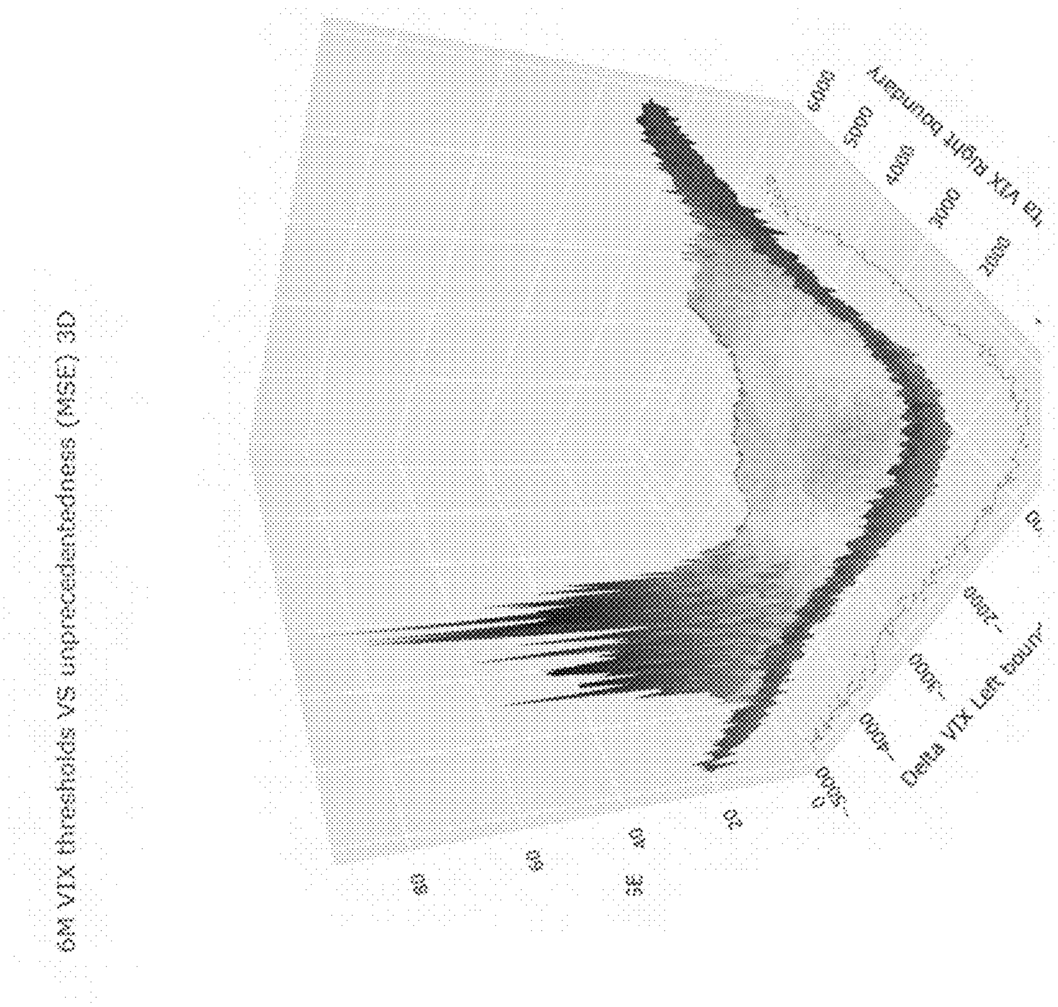
FIGURE 69: MLPO SCREENSHOT

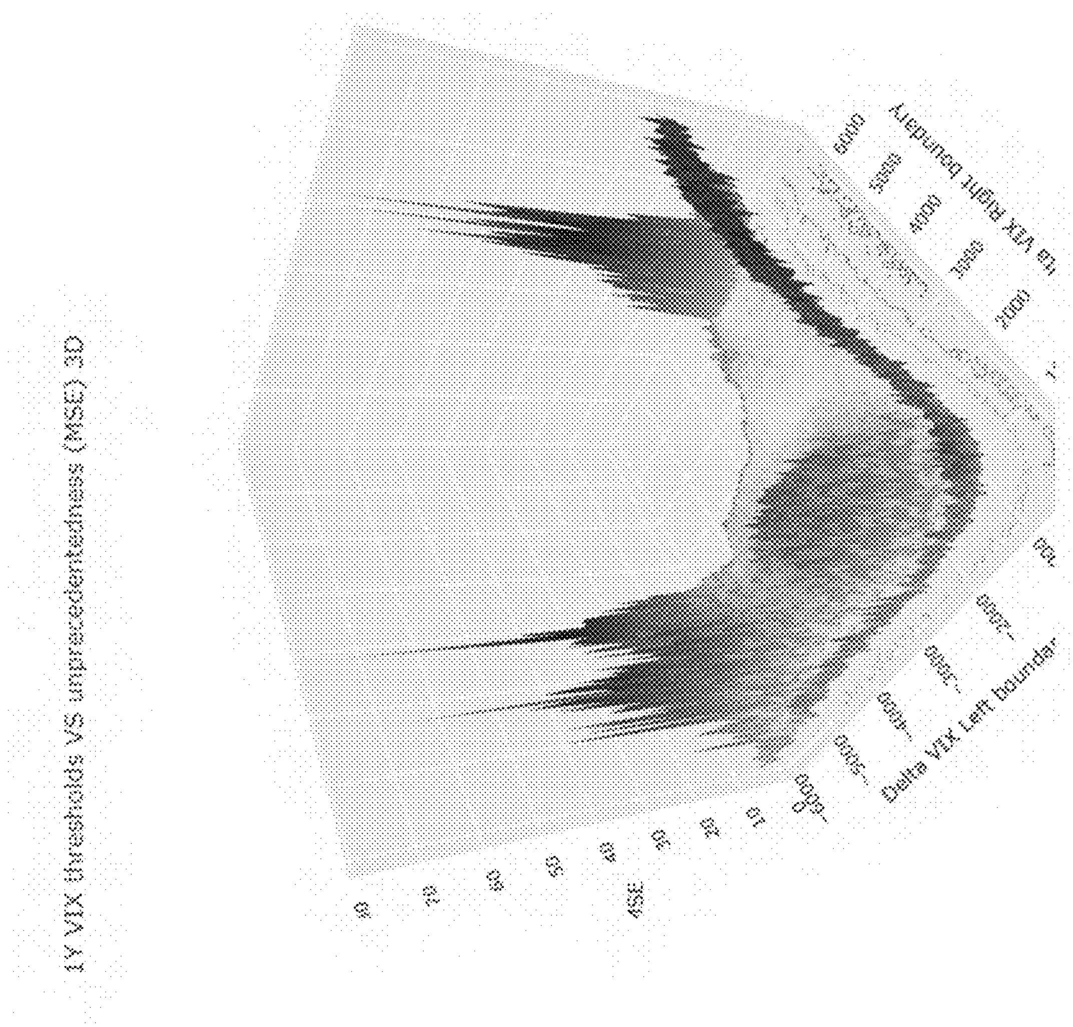
FIGURE 70: MLPO SCREENSHOT

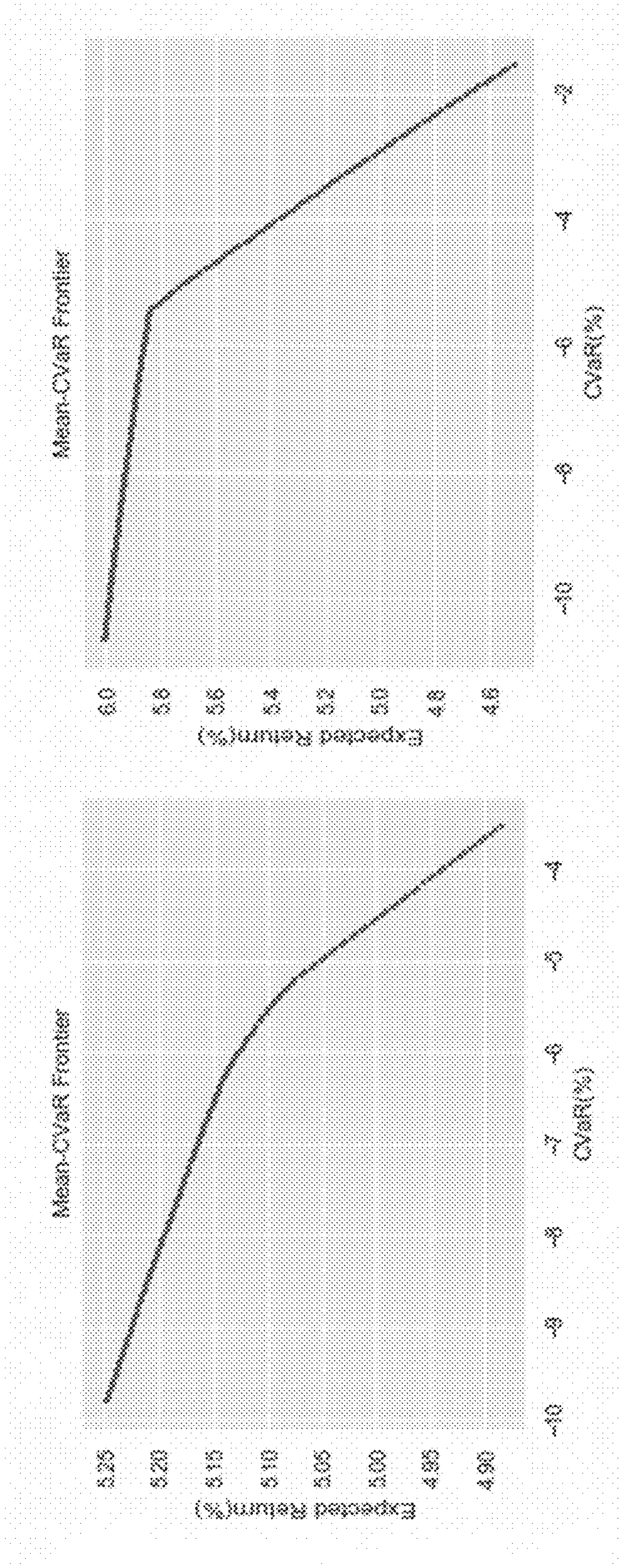
FIGURE 71: MLPO SCREENSHOT

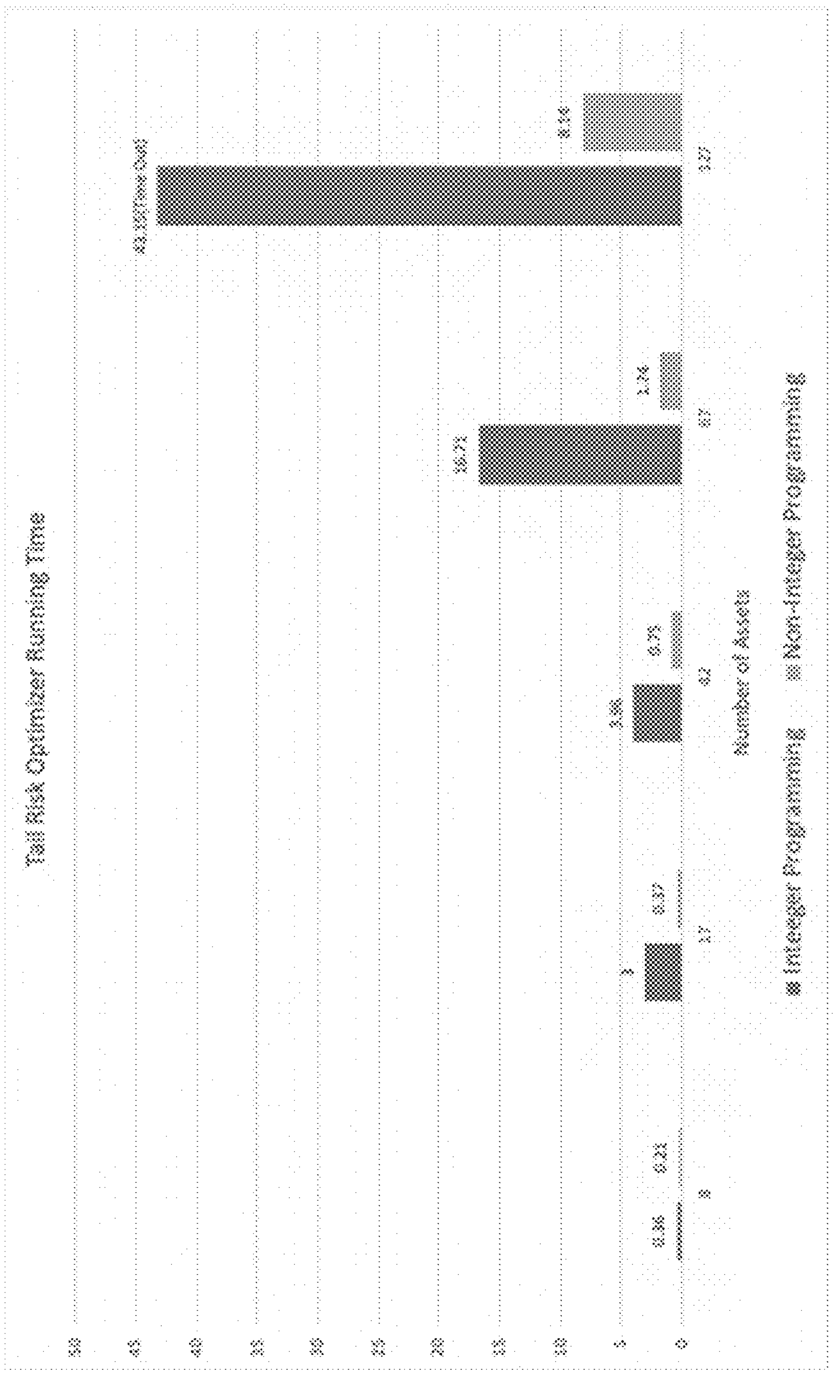
FIGURE 72: MLPO SCREENSHOT

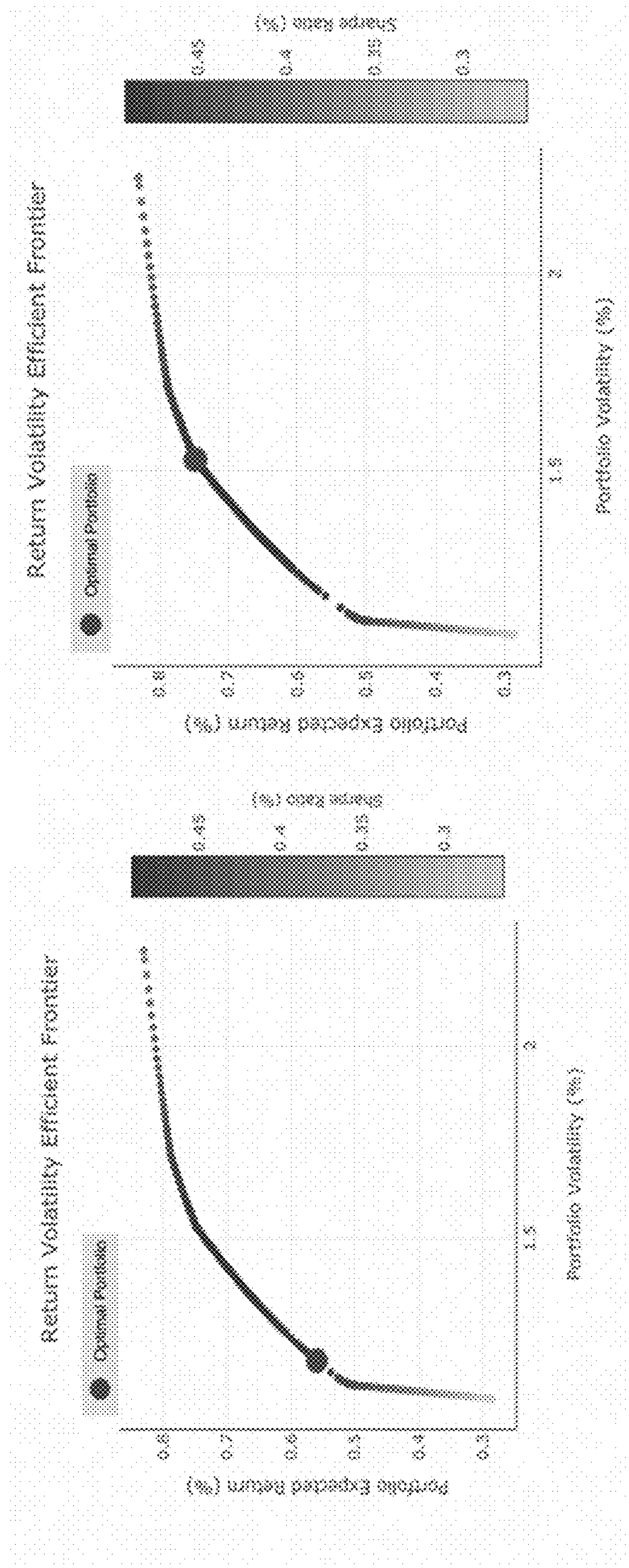
FIGURE 73: MLPO SCREENSHOT

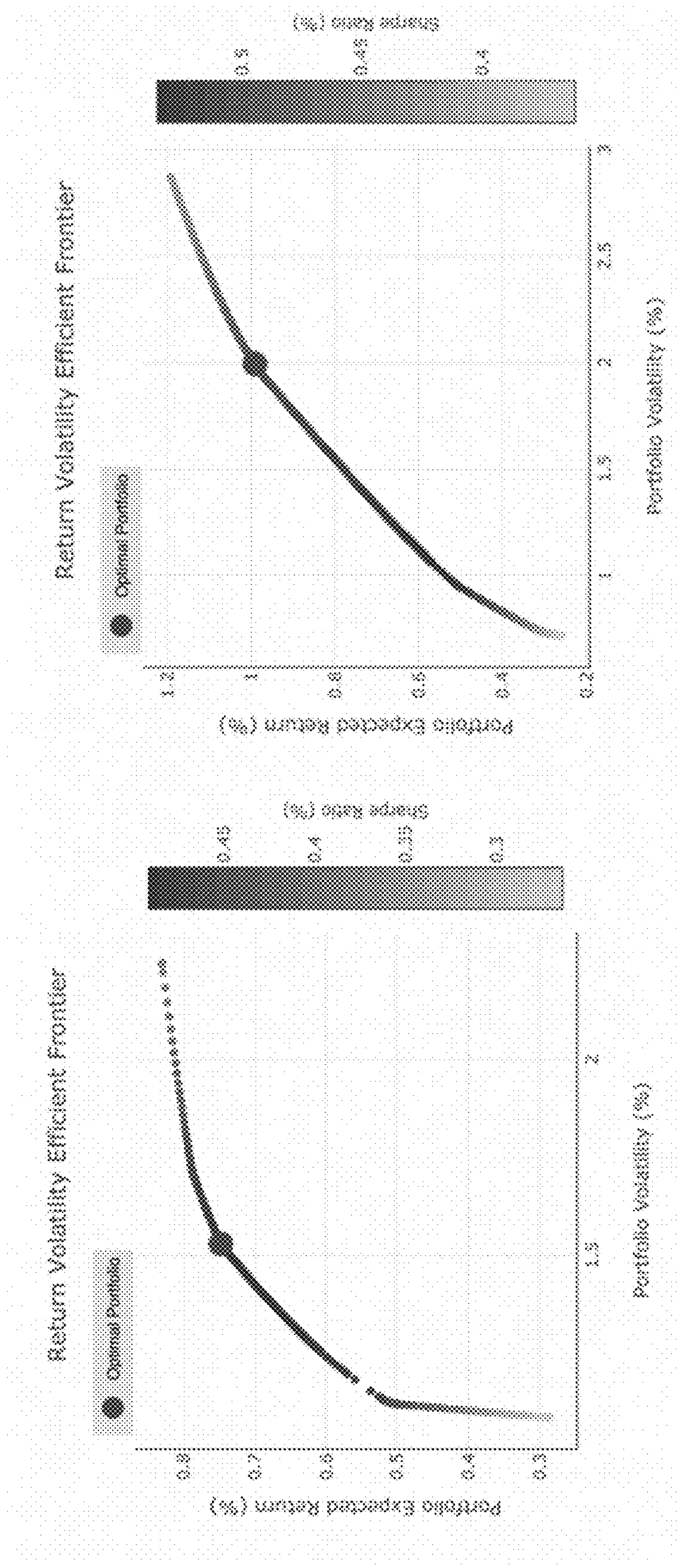
FIGURE 74: MLPO SCREENSHOT

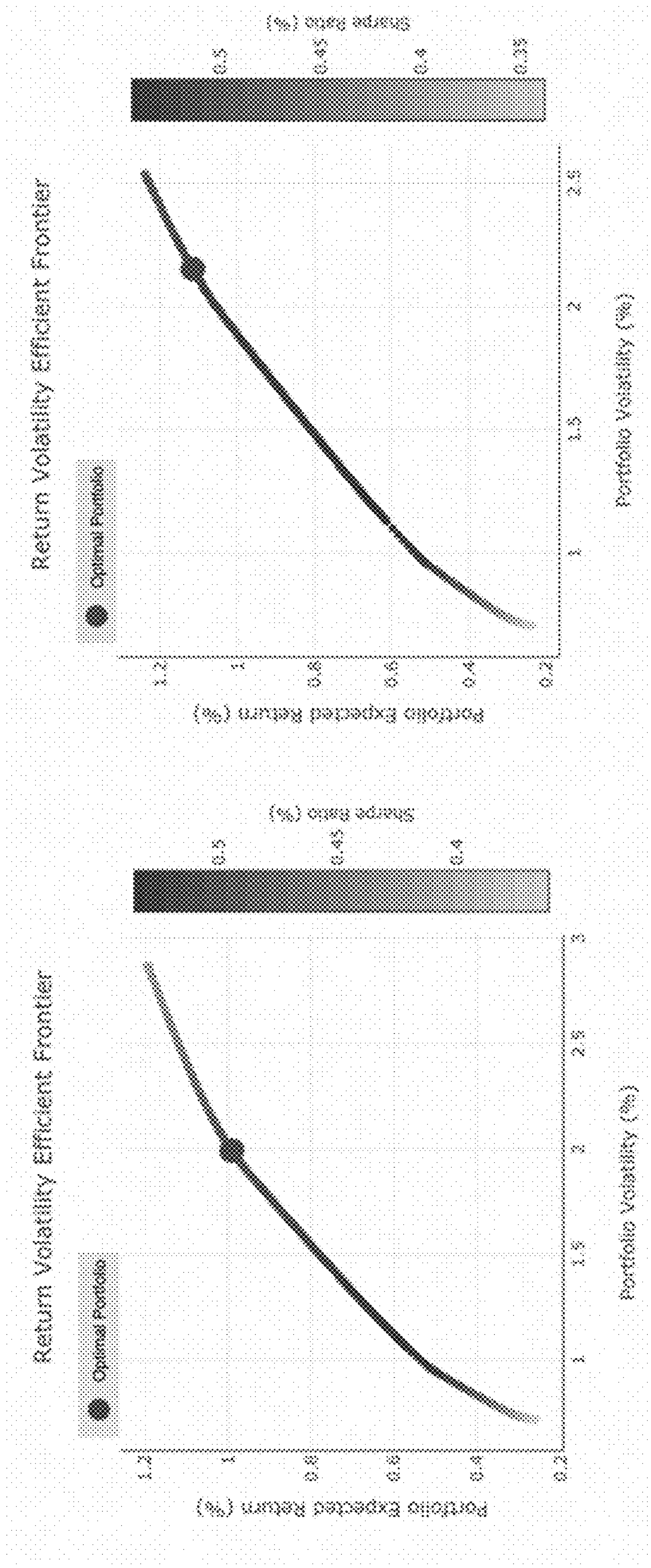
FIGURE 75: MLPO SCREENSHOT

FIGURE 76: MLPO ARCHITECTURE

CLEAR all temporary tables

COLLECT dependent Reference Data for Instrument to Risk Factor Mapping and dependent analytics for exposure calculations POPULATE temporary table that stores mapping between security type and factors for exposure calculations. e.g. security type of Municipal mapped to MUNI_2Y factor Run Factor Mapping and Exposure Calculations. Perform dimension reduction by calculating spread ratio : OAS/Median OAS (parallel execution)

SAVE exposures for all assets to Factor Expo table (parallel execution)

FIGURE 77: MLPO ARCHITECTURE

```
GET input of range of assets to run for the sessions
CLEAR all temporary tables
FIND target assets based on filter criteria/input
POPULATE temporary table with factor sims for target assets
POPULATE temporary table with factor exposure for target assets
SET no-of-target-assets to total number of target assets to be processed
WHILE no-of-target-assets > 0
    FETCH next 1000 assets from target assets
    POPULATE temporary factor sim with factors for 1K assets
    POPULATE temporary factor expo for 1K assets
    CALCULATE asset sims i.e. sum product of factor_sim and factor_expo for all 1K assets
    (parallel execution)
    TRANSPOSE asset sims in wide format by converting market returns into array format
    for 1K assets
    SAVE asset sims to table (parallel execution)
    CALCULATE CVAR in parallel for all 1K assets
    SAVE CVAR to asset measure table (parallel execution)
    CLEAR temporary tables
    ADJUST no-of-target-assets with number of records processed i.e. no-of-target-assets =
    no-of-target-assets - 1000
CONTINUE LOOP
```

FIGURE 78: MLPO ARCHITECTURE
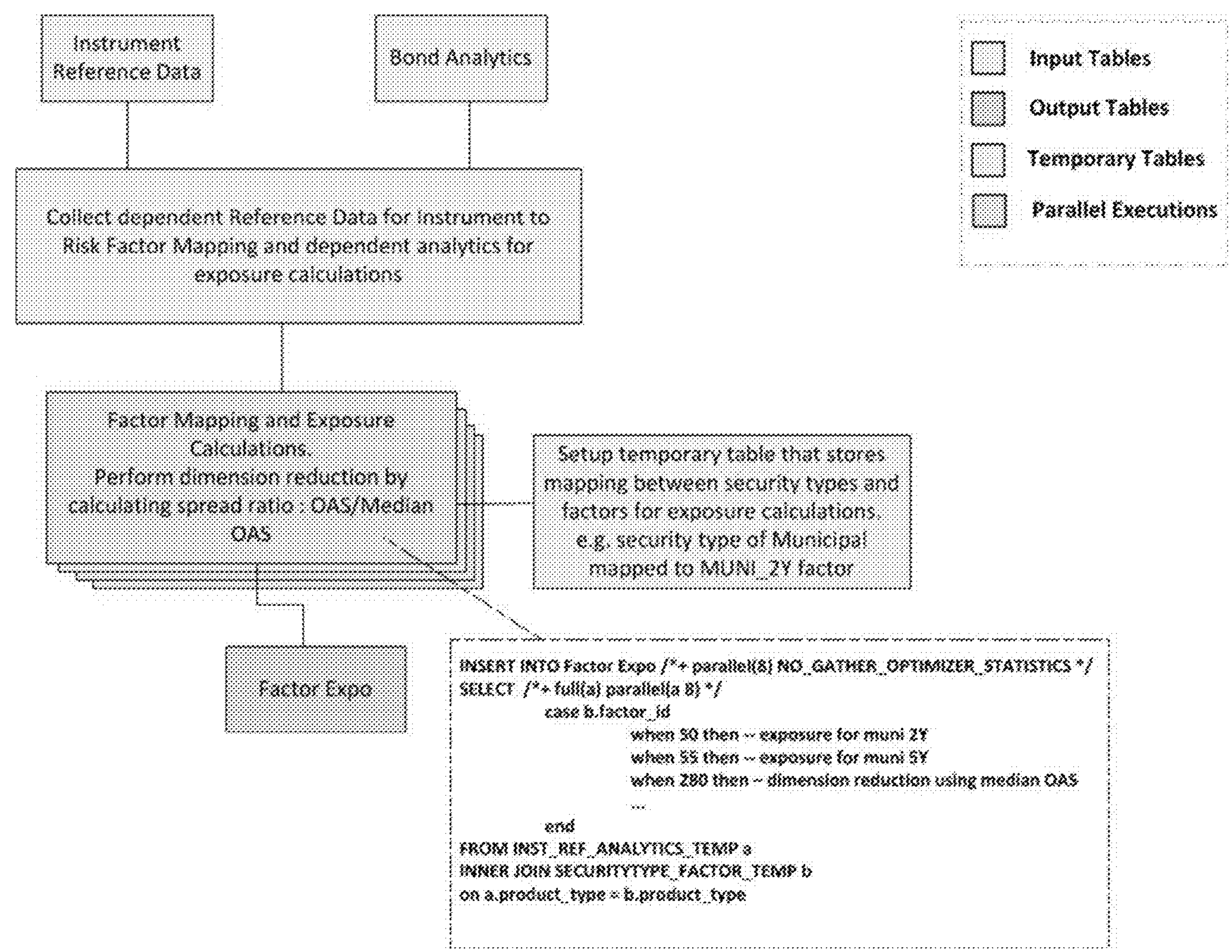

FIGURE 79: MLPO ARCHITECTURE
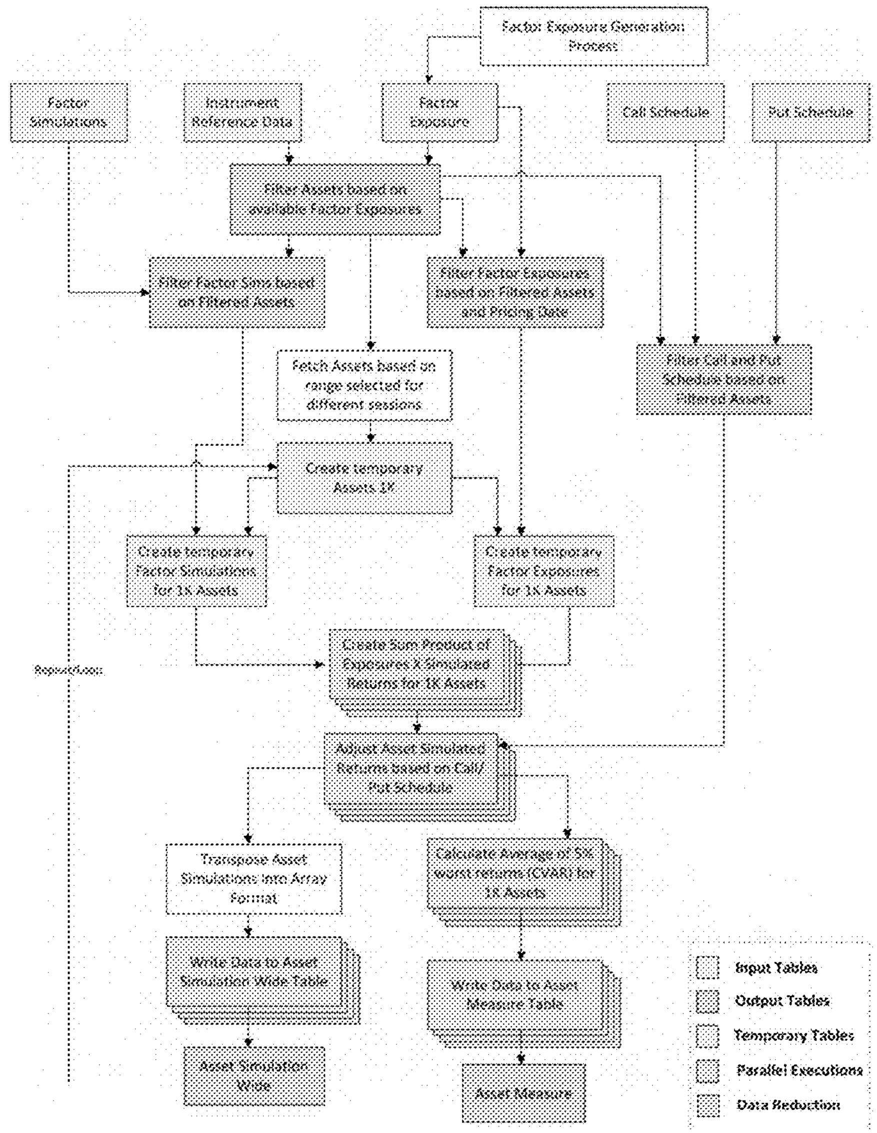

FIGURE 80: MLPO ARCHITECTURE

```
SELECT cusip as asset_id, 80 as factor_id, 1/2 * security_master.option_adjusted_convexity / 10000 as exposure
FROM security_master
WHERE product_name != 'Municipal'

Union all

Select cusip as asset_id, 81 as factor_id, 1/2 * security_master.option_adjusted_convexity / 10000 as exposure
From security_master
Where product_name = 'Municipal'
```

FIGURE 81: MLPO ARCHITECTURE

```
with oac_factor as
(
   select fs.sim_id, fs.market_id, power(avg(fs.return), 2) as return,
   case when f.type = 'Treasury Curves' then 80
            when f.type = 'Muni Curves' then 81
   end as  factor_id

   from factor_sim fs, factor f

   where fs.factor_id = f.id
   and      fs.factor_id in
               (select f.id from factor f where f.type = 'Treasury Curves' or f.type = 'Muni Curves')

   group by fs.sim_id, f.type, fs.market_id
   order by fs.market_id
)

select distinct fs.sim_id, fs.market_id, fs.bucket_id, oo.factor_id, oo.return
from oac_factor oo, factor_sim fs
where oo.sim_id=fs.sim_id
and oo.market_id=fs.market_id
order by sim_id, market_id
```

FIGURE 82: MLPO ARCHITECTURE

```
SELECT as1.pricing_dt, as1.sim_id, as1.asset_id, as1.market_id, greatest(least(as1.simulated_return,
(cs.next_call_price / sm.current_instrument_price - 1) * 10000), (ps.next_put_price /
sm.current_instrument_price - 1) * 10000)

FROM asset_sim as1, security_master sm, call_schedule cs, put_schedule ps

WHERE as1.asset_id = sm.cusip

AND as1.asset_id = cs.cusip

AND as1.asset_id = ps.cusip

AND cs.earliest_next_call_date <= as1.investment_horizon

AND ps.earliest_next_put_date <= as1.investment_horizon
```

FIGURE 83: MLPO ARCHITECTURE

GET Input as List of securities

LOAD Factor Exposures for securities

LOAD Factor Simulations for specific factors that have exposures

LOAD CALL and PUT schedule for securities if available

CALCULATE Dot product of Factor Exposure and Factor Simulations (parallel execution)

ADJUST Simulated Returns for securities based on CALL and PUT Schedule (parallel execution)

FIGURE 84: MLPO ARCHITECTURE
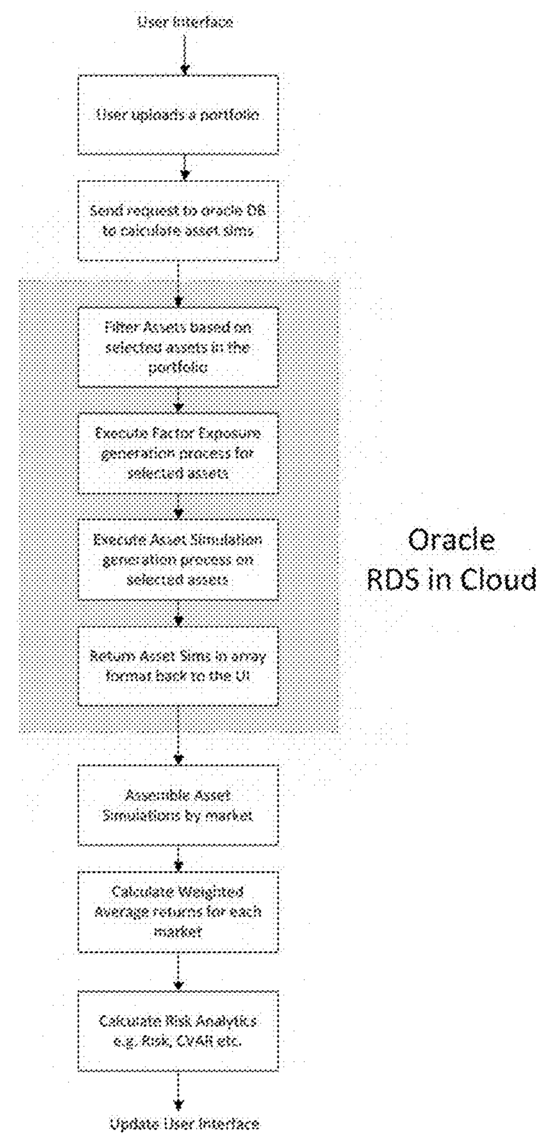

FIGURE 85: MLPO ARCHITECTURE

```
GET input of multiple user-defined scenarios, list of securities (with weights) and time horizon
LOAD simulated returns for securities if available
RUN real-time asset simulation process if simulated returns are not available for securities
FOR list of user-defined scenarios (parallel execution)
    FILTER markets based on multiple conditions in user-defined scenario
    FETCH simulated market returns for filtered markets
    CALCULATE weighted average simulated returns using simulated returns of securities
    and security weights
    CALCULATE risk summary such as, tail-risk, CVAR and other risk analytics
RETURN risk summary for multiple user-selected scenarios to user interface for rendering
```

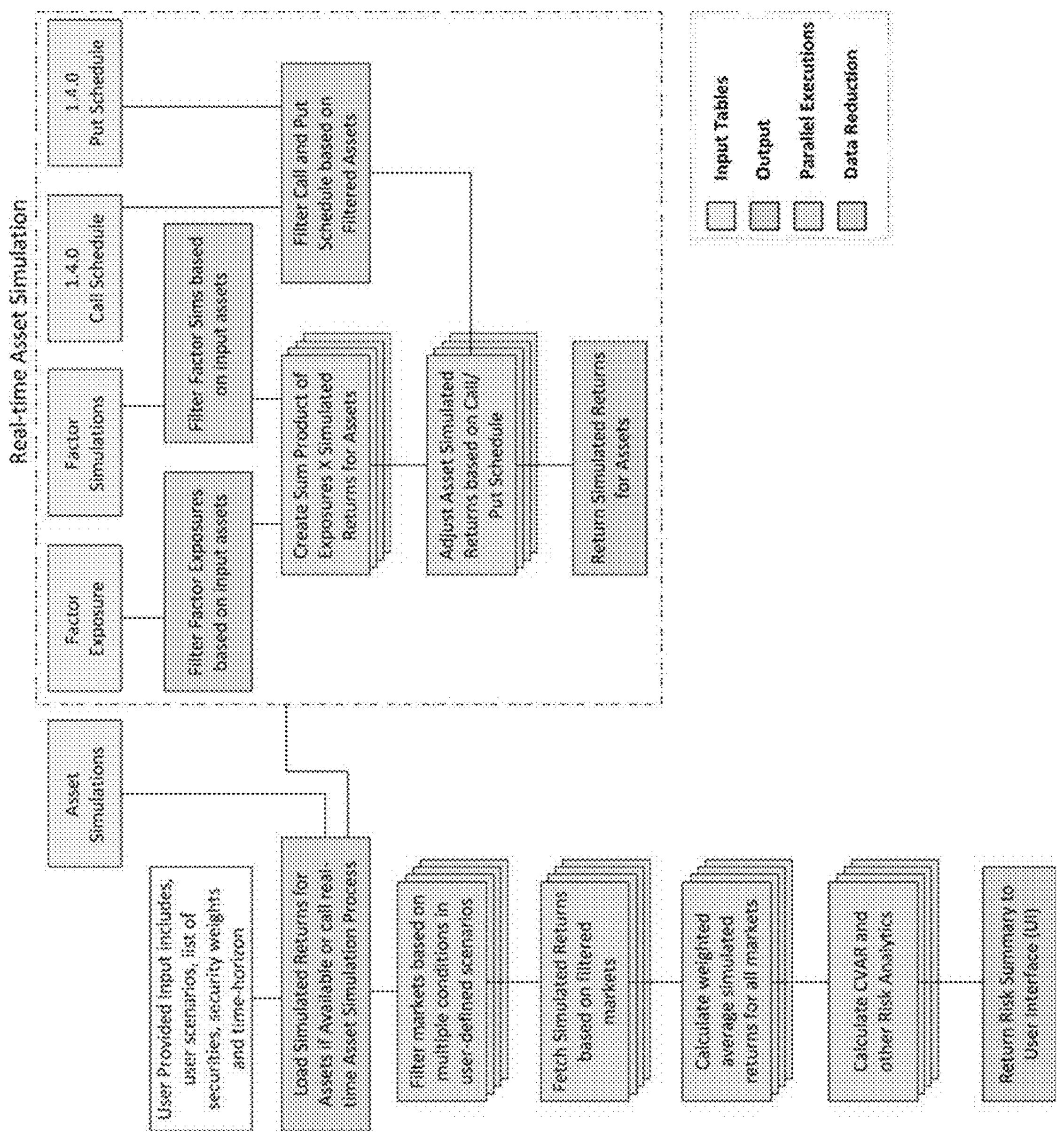
FIGURE 86: MLPO ARCHITECTURE

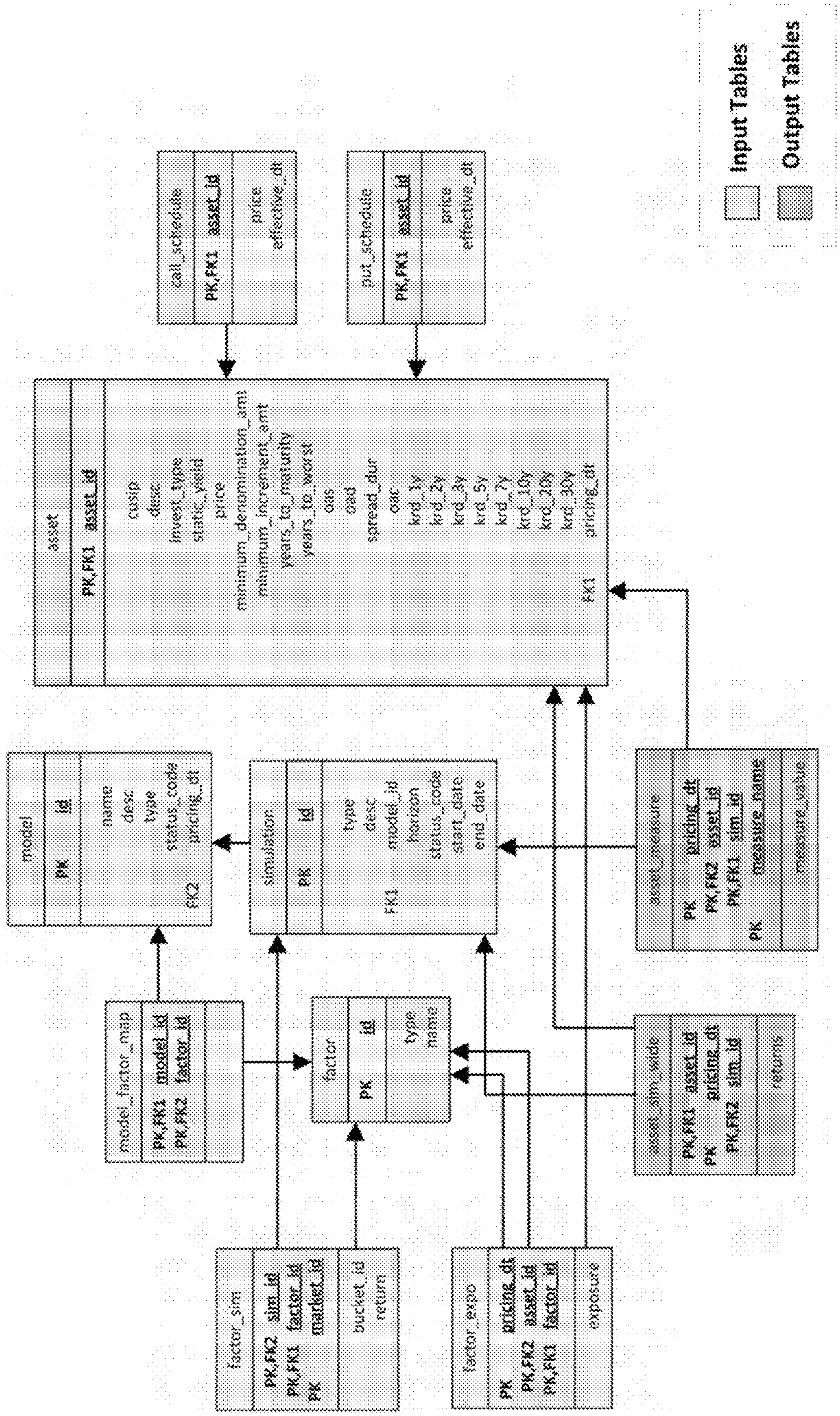
FIGURE 87: MLPO ARCHITECTURE

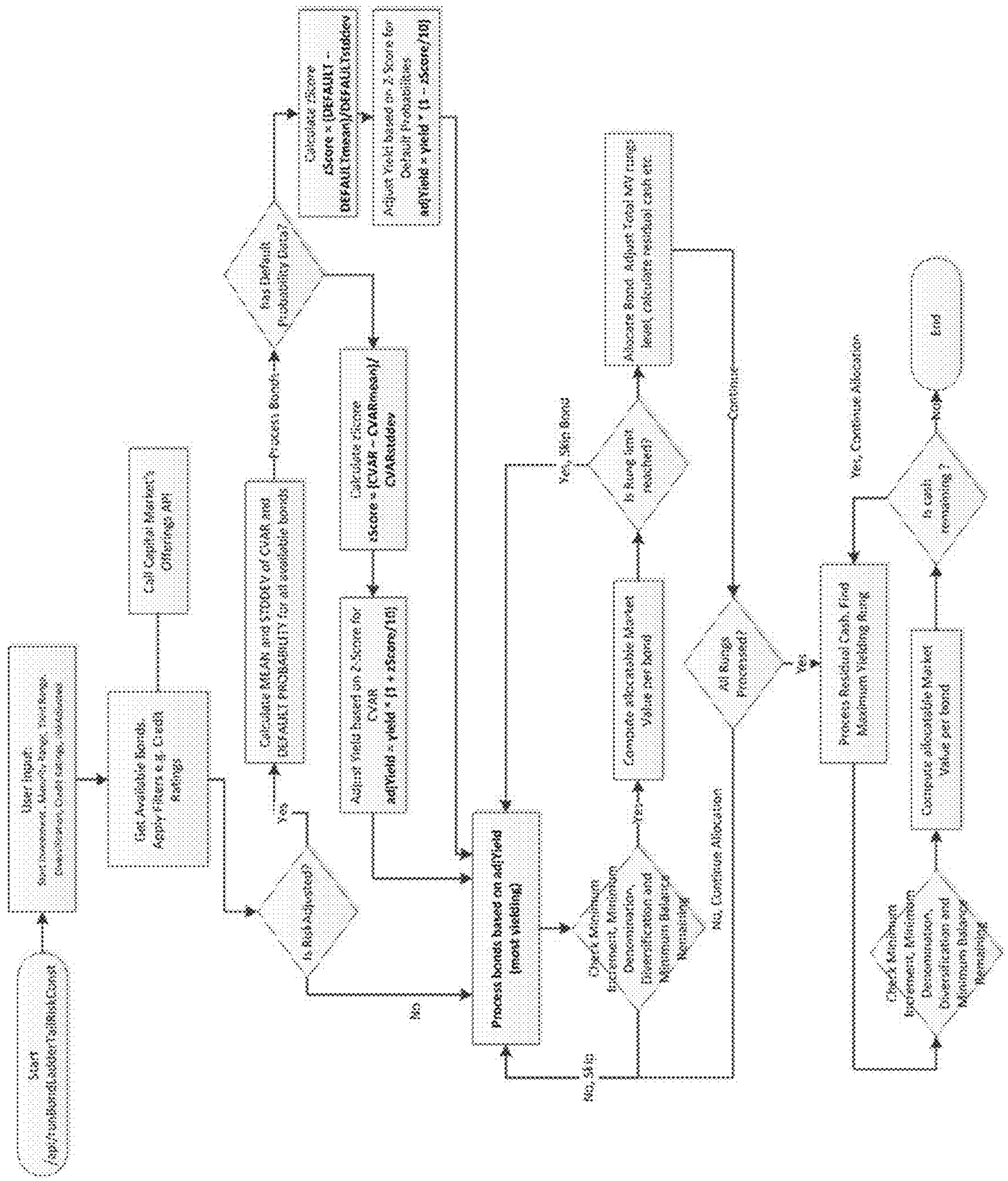
FIGURE 88: MLPO ARCHITECTURE

Figure 89:
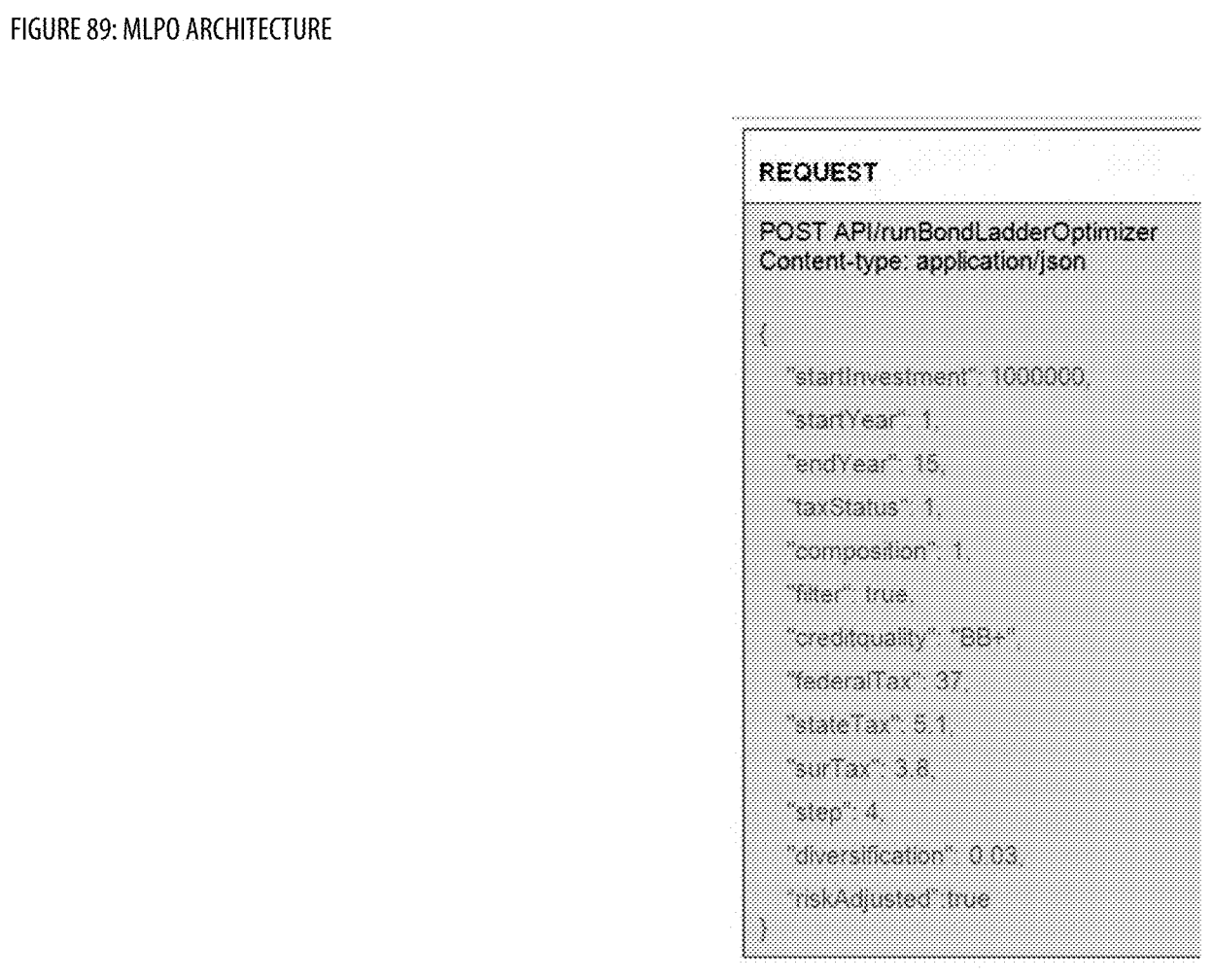

FIGURE 89: MLPO ARCHITECTURE

REQUEST

```
POST API/runBondLadderOptimizer
Content-type: application/json
```

```
{
  "startInvestment": 1000000,
  "startYear": 1,
  "endYear": 15,
  "taxStatus": 1,
  "composition": 1,
  "filter": true,
  "creditquality": "BB+",
  "federalTax": 37,
  "stateTax": 5.1,
  "surTax": 3.8,
  "step": 4,
  "diversification": 0.03,
  "riskAdjusted": true
}
```

FIGURE 90: MLPO ARCHITECTURE

FIGURE 91: MLPO ARCHITECTURE

REQUEST

POST API/runAnalysis
Content-type: application/json

```
{"securityInputs":[{"cusip":"80XX51EB9", "qty":9000,"price":101.11},
                                        {"cusip":"80X640VU8", "qty":14000,"price":100}],
"simulationId":6,
"scenarioInputs":[{
        "id":1,
        "type":1,
        "simulationInputs":[{"factorName":"VIX","rangeStart":-
4568,"rangeEnd":6796},{"factorName":"SP500","rangeStart":-5161,"rangeEnd":4082}],
        "businessCycleInputs":[]
},{
        "id":2,
        "type":1,
        "simulationInputs":[],
        "businessCycleInputs":[{cycleName:"Late",percentage:100},{cycleName:"Recession",
percentage:0}]
}, ],
"pricingDt":"02/26/2020",
"logger":true
}
```

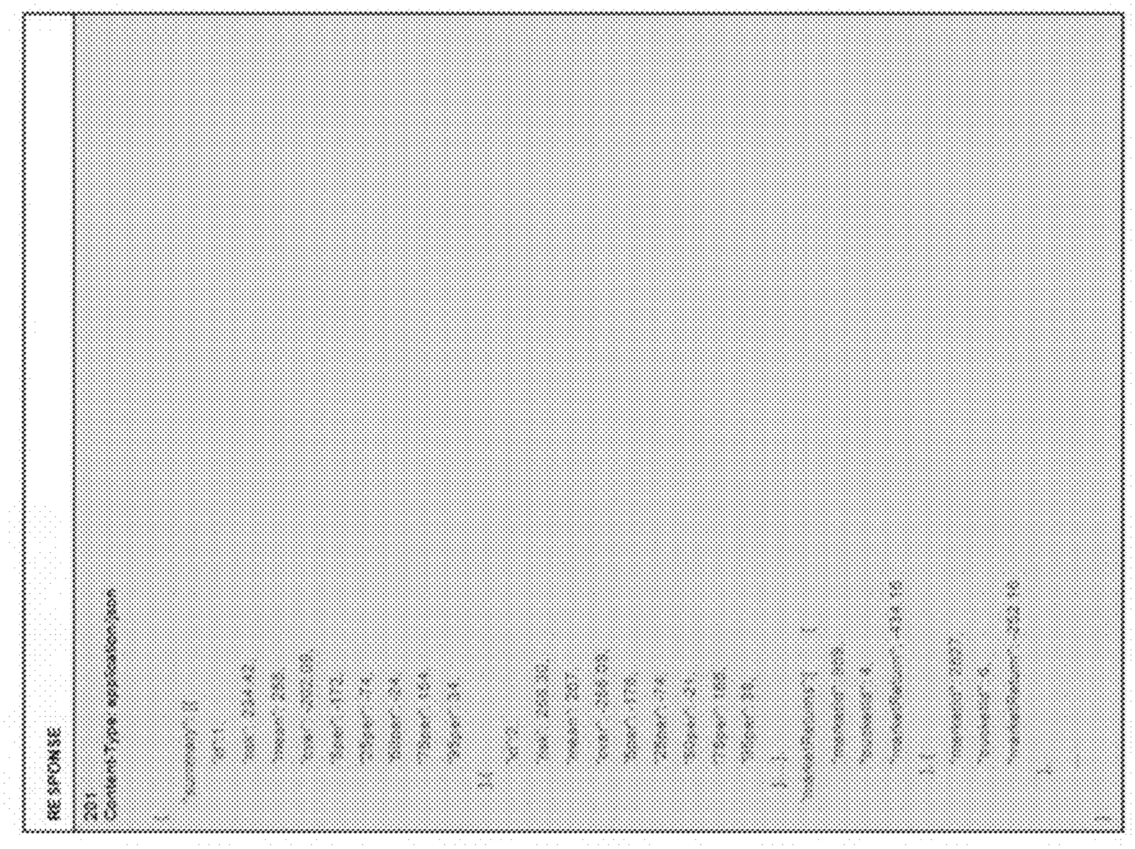
FIGURE 92: MLPO ARCHITECTURE

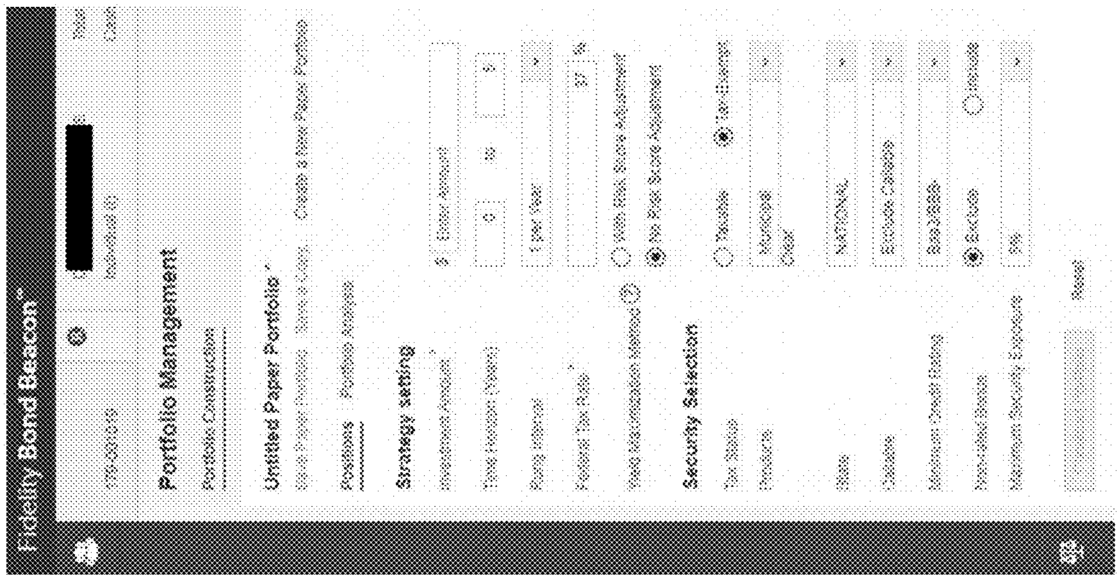
FIGURE 93: MLPO SCREENSHOT

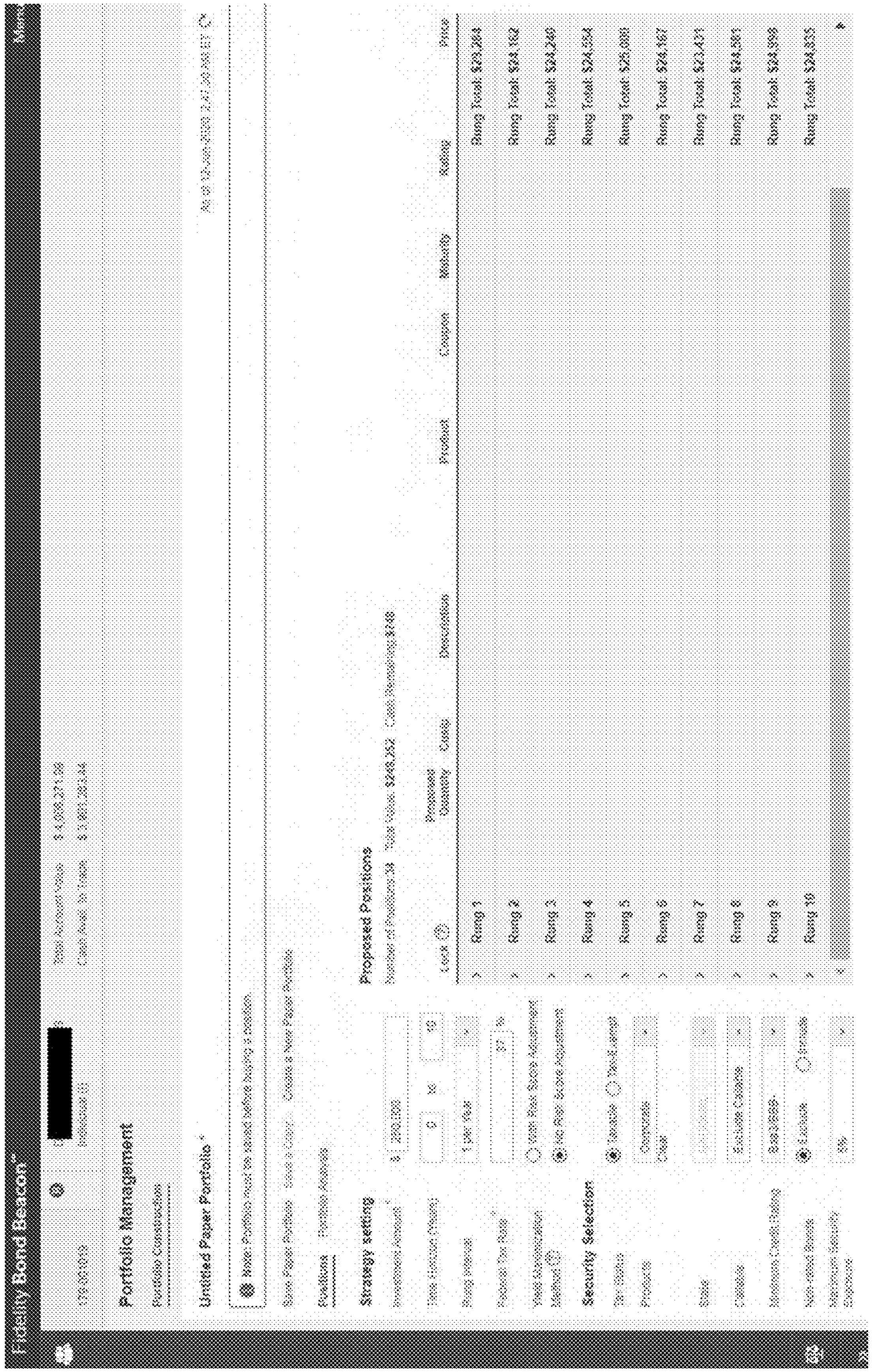
FIGURE 94: MLPO SCREENSHOT

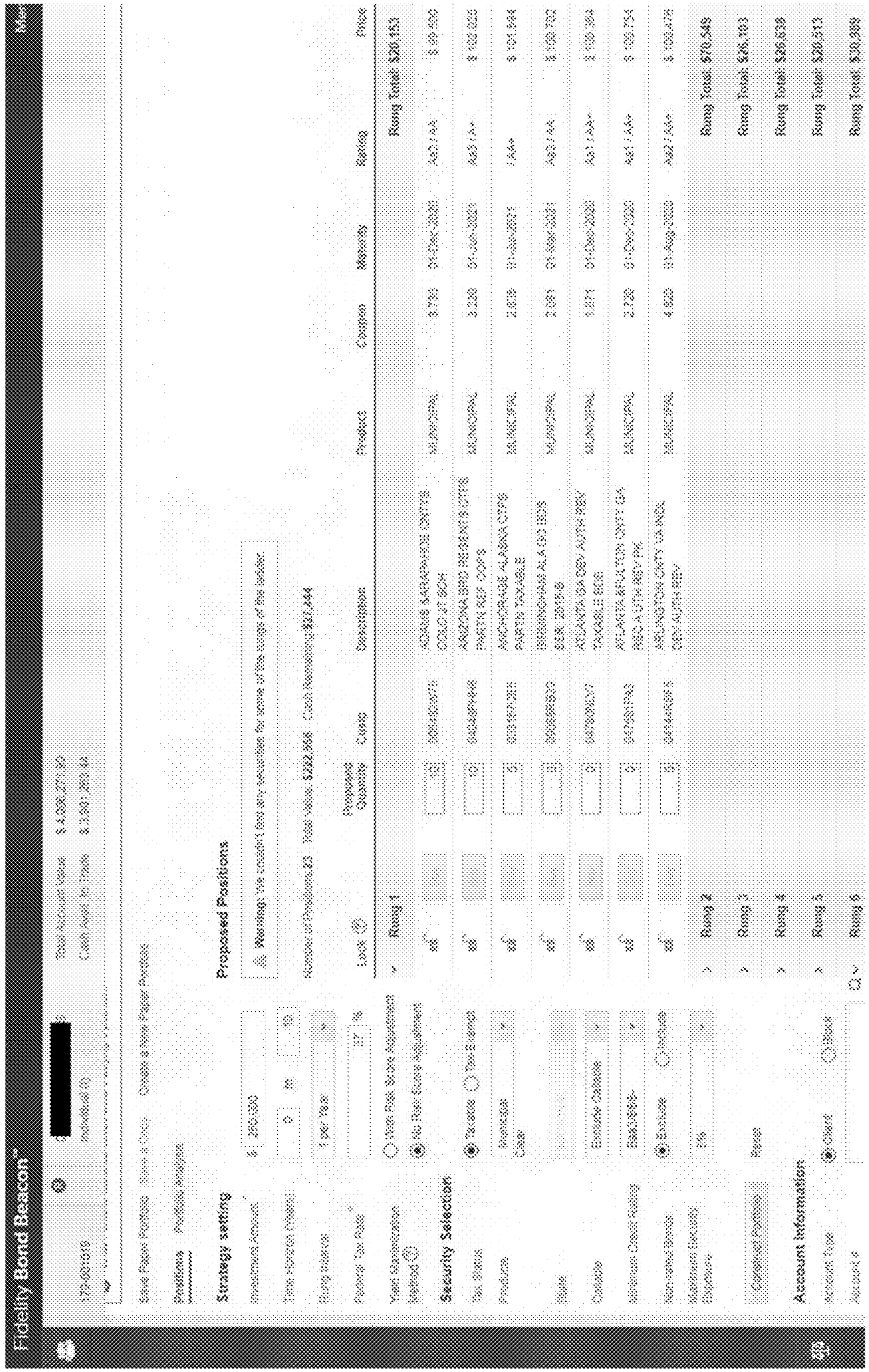
FIGURE 95: MLPO SCREENSHOT

Fidelity Bond Beacon
Strategy setting
Security Selection
Account Information
Your Portfolio Characteristics
Security Summary
Credit Quality
Municipal Use of Proceeds
Corporate Sector
Life of the Portfolio

FIGURE 96: MLPO SCREENSHOT

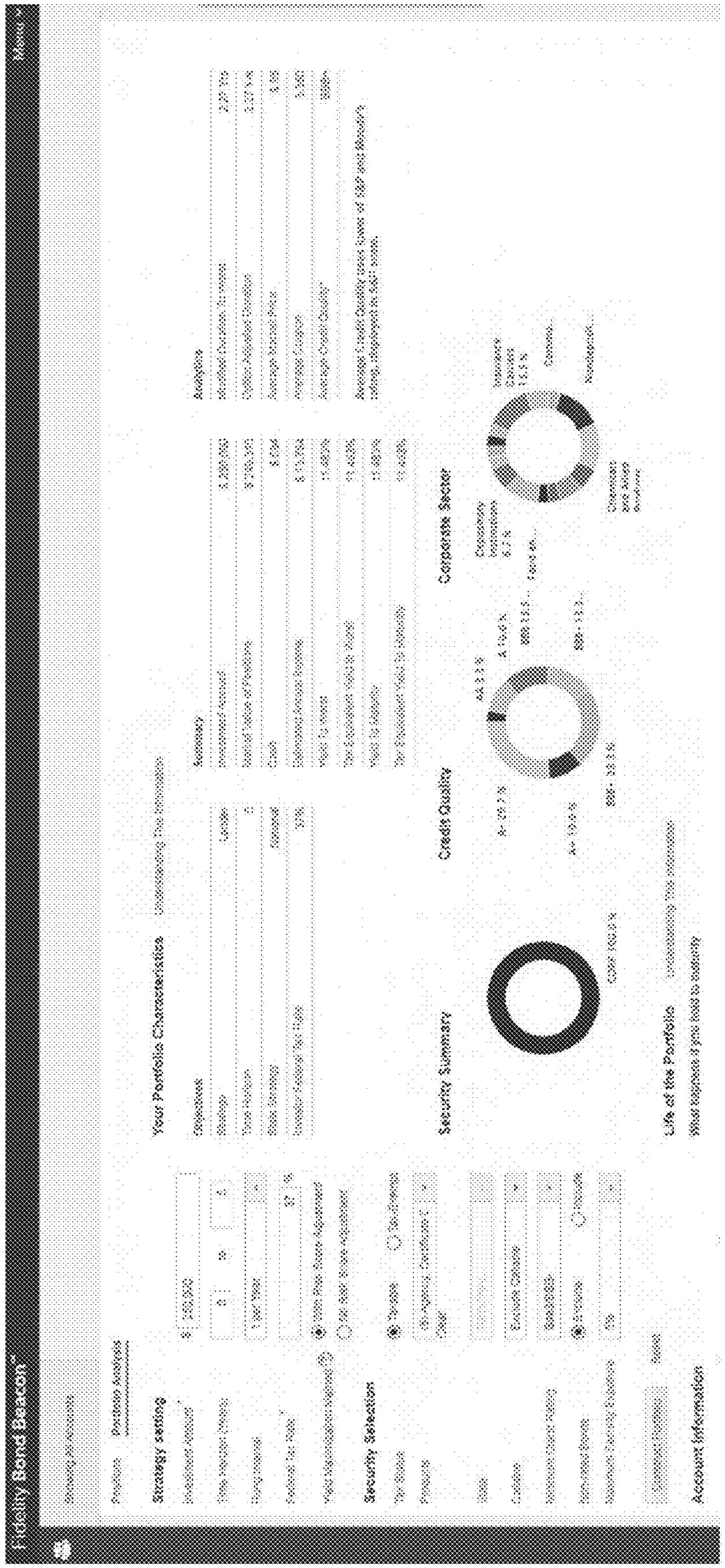
FIGURE 97: MLPO SCREENSHOT

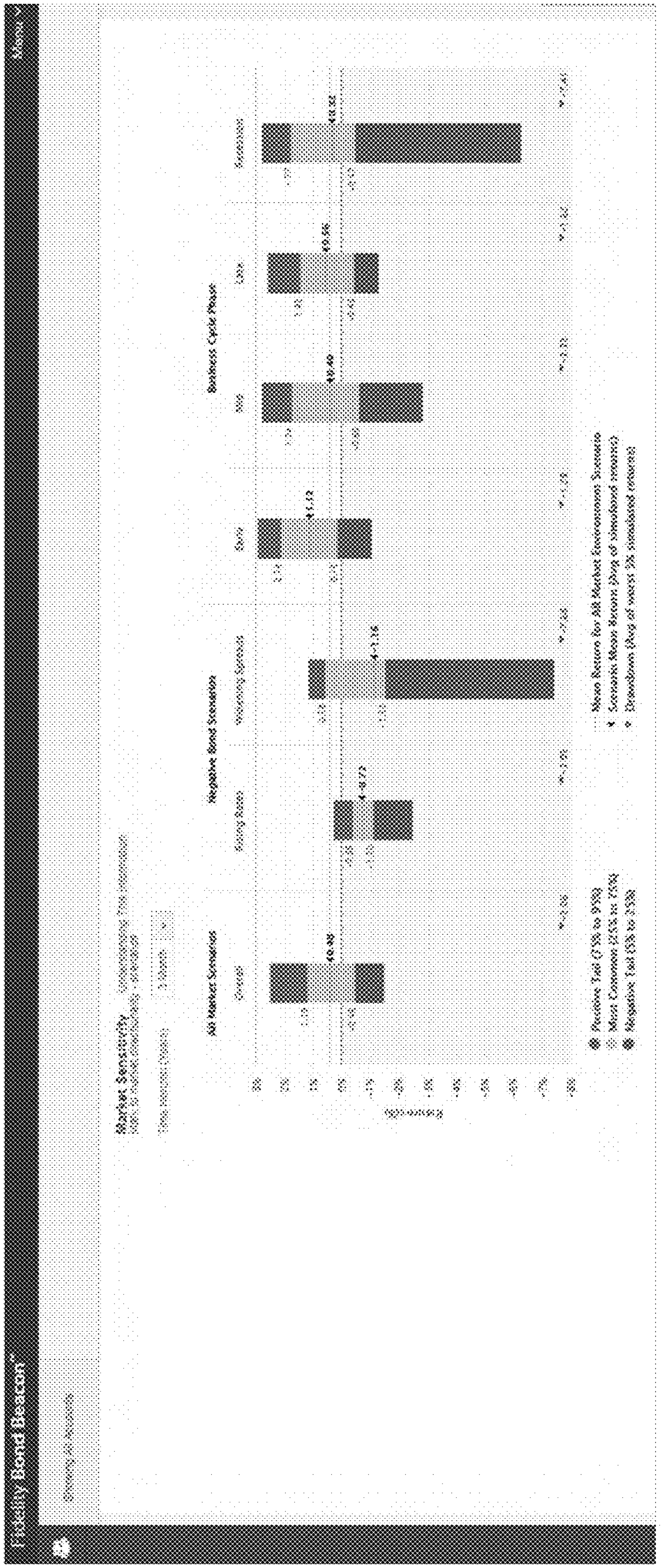
FIGURE 98: MLPO SCREENSHOT

FIGURE 99: MLPO Controller
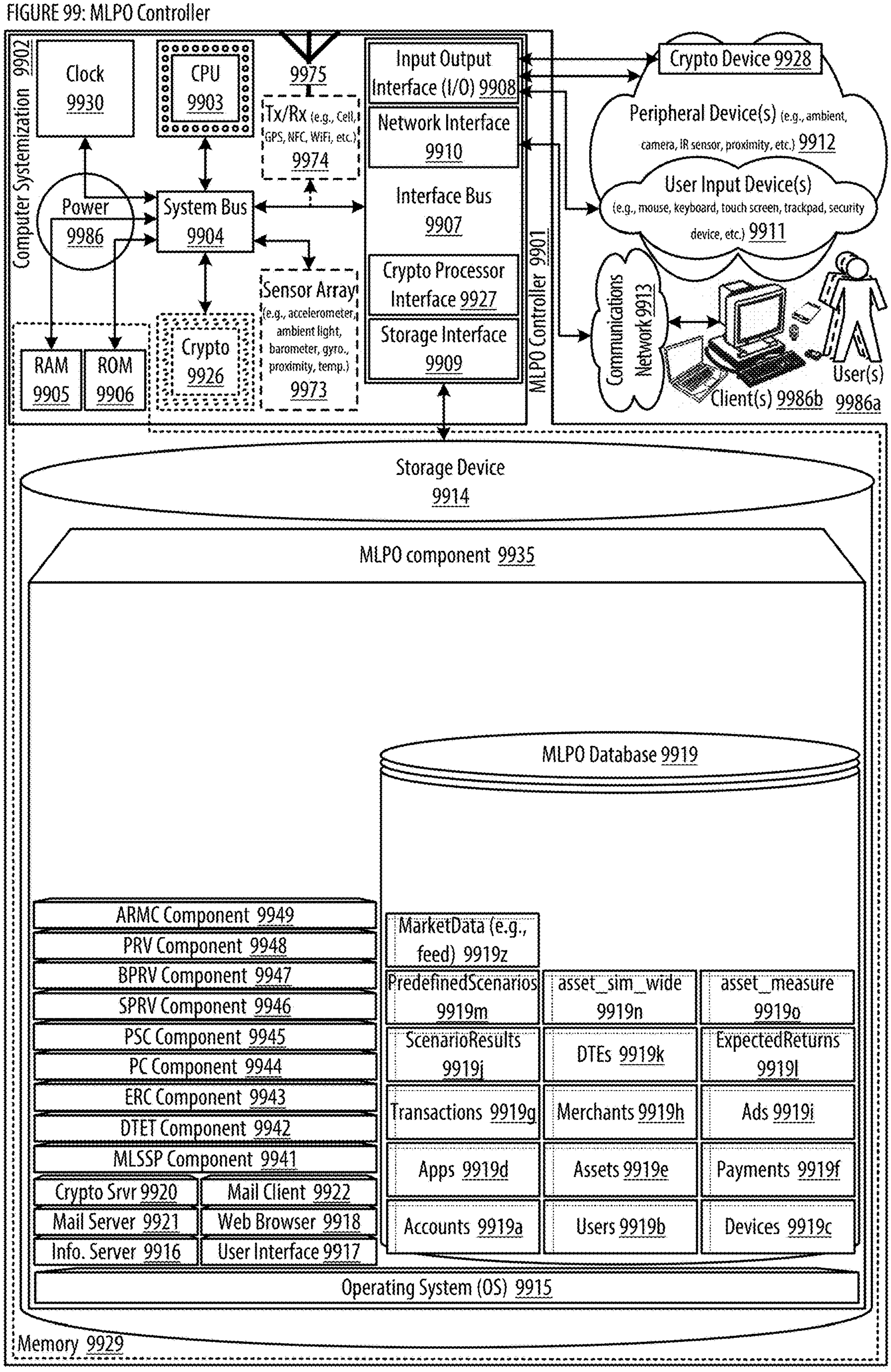

MACHINE LEARNING PORTFOLIO SIMULATING AND OPTIMIZING APPARATUSES, METHODS AND SYSTEMS

PRIORITY CLAIM

Applicant hereby claims benefit to priority under 35 USC § 119 as a non-provisional conversion of: U.S. provisional patent application Ser. No. 63/055,876, filed Jul. 23, 2020, entitled "Machine Learning Portfolio Simulating and Optimizing Apparatuses, Methods and Systems".

The entire contents of the aforementioned applications are herein expressly incorporated by reference.

OTHER APPLICATIONS

Applications of interest include: U.S. patent application Ser. No. 14/494,443, filed Sep. 23, 2014, entitled "Life Cycle Based Portfolio Construction Platform Apparatuses, Methods and Systems"; U.S. patent application Ser. No. 14/286,792, filed May 23, 2014, entitled "SEASONAL PORTFOLIO CONSTRUCTION PLATFORM APPARATUSES, METHODS AND SYSTEMS"; U.S. patent application Ser. No. 14/032,140, filed Sep. 19, 2013, entitled "SECTOR-BASED PORTFOLIO CONSTRUCTION PLATFORM APPARATUSES, METHODS AND SYSTEMS", U.S. patent application Ser. No. 13/370,396, filed Feb. 10, 2012, entitled "MULTI-FACTOR RISK MODELING PLATFORM".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address machine learning and database systems, and more particularly, include Machine Learning Portfolio Simulating and Optimizing Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

People own all types of assets, some of which are secured instruments to underlying assets. People have used exchanges to facilitate trading and selling of such assets. Computer information systems, such as NAICO-NET, Trade*Plus and E*Trade allowed owners to trade securities assets electronically.

BRIEF DESCRIPTION OF THE DRAWINGS

Appendices and/or drawings illustrating various, non-limiting, example, innovative aspects of the Machine Learning Portfolio Simulating and Optimizing Apparatuses, Methods and Systems (hereinafter "MLPO") disclosure, include:

FIGS. 1A-B show a datagraph illustrating data flow(s) for the MLPO;

FIGS. 2A-B show a logic flow illustrating embodiments of a machine learning simulated scenario processing (MLSSP) component for the MLPO;

FIG. 3 shows an architecture for the MLPO;

FIG. 4 shows a logic flow illustrating embodiments of a machine learning simulated scenario processing (MLSSP) component for the MLPO;

FIG. 5 show a logic flow illustrating embodiments of a decision tree ensembles training (DTET) component for the MLPO;

FIGS. 6A-D show implementation case(s) for the MLPO;

FIGS. 7A-C show a logic flow illustrating embodiments of an expected returns calculation (ERC) component for the MLPO;

FIG. 8 shows a datagraph illustrating data flow(s) for the MLPO;

FIG. 9 shows a logic flow illustrating embodiments of a portfolio constructing (PC) component for the MLPO;

FIG. 10 shows a screenshot illustrating user interface(s) of the MLPO;

FIG. 11 shows a screenshot illustrating user interface(s) of the MLPO;

FIG. 12 shows a screenshot illustrating user interface(s) of the MLPO;

FIG. 13 shows a datagraph illustrating data flow(s) for the MLPO;

FIGS. 14A-B show a logic flow illustrating embodiments of a predefined scenario constructing (PSC) component for the MLPO;

FIG. 15 shows a screenshot illustrating user interface(s) of the MLPO;

FIG. 16 shows a screenshot illustrating user interface(s) of the MLPO;

FIG. 17 shows a screenshot illustrating user interface(s) of the MLPO;

FIG. 18 shows a screenshot illustrating user interface(s) of the MLPO;

FIG. 19 shows a screenshot illustrating user interface(s) of the MLPO;

FIG. 20 shows a datagraph illustrating data flow(s) for the MLPO;

FIG. 21 shows a logic flow illustrating embodiments of a scenario based portfolio returns visualizing (SPRY) component for the MLPO;

FIG. 22 shows a screenshot illustrating user interface(s) of the MLPO;

FIG. 23 shows a screenshot illustrating user interface(s) of the MLPO;

FIG. 24 shows a screenshot illustrating user interface(s) of the MLPO;

FIG. 25 shows a screenshot illustrating user interface(s) of the MLPO;

FIG. 26 shows a datagraph illustrating data flow(s) for the MLPO;

FIG. 27 shows a logic flow illustrating embodiments of a business cycle based portfolio returns visualizing (BPRV) component for the MLPO;

FIG. 28 shows a screenshot illustrating user interface(s) of the MLPO;

FIG. 29 shows a screenshot illustrating user interface(s) of the MLPO;

FIG. 30 shows a screenshot illustrating user interface(s) of the MLPO;

FIG. 31 shows an architecture for the MLPO;

FIG. 32 shows an architecture for the MLPO;

FIGS. 33A-B show an architecture for the MLPO;

FIG. 34 shows a datagraph illustrating data flow(s) for the MLPO;

FIG. 35 shows a logic flow illustrating embodiments of a portfolio returns visualizing (PRV) component for the MLPO;

FIG. 36 shows a logic flow illustrating embodiments of an asset return metrics calculating (ARMC) component for the MLPO;

FIG. 37 shows an architecture for the MLPO;

FIG. 38 shows an architecture for the MLPO;

FIG. 39 shows an architecture for the MLPO;

FIG. 40 shows an architecture for the MLPO;

FIG. 41 shows a screenshot illustrating user interface(s) of the MLPO;

FIG. 42 shows a screenshot illustrating user interface(s) of the MLPO;

FIG. 43 shows a screenshot illustrating user interface(s) of the MLPO;

FIG. 44 shows a screenshot illustrating user interface(s) of the MLPO;

FIG. 45 shows a screenshot illustrating user interface(s) of the MLPO;

FIG. 46 shows a screenshot illustrating user interface(s) of the MLPO;

FIG. 47 shows a screenshot illustrating user interface(s) of the MLPO;

FIG. 48 shows an architecture for the MLPO;

FIG. 49 shows an architecture for the MLPO (e.g., Mutual Fund/ETF Model Architecture);

FIG. 50 shows an architecture for the MLPO (e.g., Mutual Fund/ETF Pseudo Code—Parallel Computing);

FIG. 51 shows an architecture for the MLPO (e.g., Mutual Fund/ETF Database Tables);

FIG. 52 shows an architecture for the MLPO (e.g., Mutual Fund/ETF Pseudo Code—Proprietary Feature Selection);

FIG. 53 shows a screenshot illustrating user interface(s) of the MLPO (e.g., Market Risk Factor Exposure);

FIG. 54 shows a screenshot illustrating user interface(s) of the MLPO (e.g., Simulated Return Distribution Conditional on Market Scenario);

FIG. 55 shows a screenshot illustrating user interface(s) of the MLPO (e.g., Simulated Return Distribution Conditional on Business Cycle);

FIG. 56 shows an architecture for the MLPO (e.g., EQUITY RISK MODELING WORKFLOW);

FIG. 57 shows an architecture for the MLPO (e.g., PROPRIETARY FEATURE SELECTION METHOD);

FIG. 58 shows a screenshot illustrating user interface(s) of the MLPO (e.g., PMRI RISK ANALYSIS SCREENSHOT);

FIG. 59 shows a screenshot illustrating user interface(s) of the MLPO (e.g., MRI RISK ANALYSIS RETURN DRIVER SCREENSHOT);

FIG. 60 shows a screenshot illustrating user interface(s) of the MLPO (e.g., PMRI RISK ANALYSIS BUSINESS CYCLE SCREENSHOT);

FIG. 61 shows a screenshot illustrating user interface(s) of the MLPO (e.g., PMRI RISK ANALYSIS RISING VIX SCENARIO SCREENSHOT);

FIG. 62 shows an architecture for the MLPO (e.g., PARALLEL COMPUTING PSEUDOCODE);

FIG. 63 shows an architecture for the MLPO (e.g., EQUITY RISK MODELING FEATURE ENGINEERING WORKFLOW);

FIG. 64 shows an architecture for the MLPO (e.g., EQUITY IDIOSYNCRATIC RISK MODELING WORKFLOW);

FIG. 65 shows a screenshot illustrating user interface(s) of the MLPO (e.g., A VIX VS HISTORICAL UNPRECEDENTEDNESS);

FIG. 66 shows a screenshot illustrating user interface(s) of the MLPO (e.g., HISTORICAL VS VAE);

FIG. 67 shows a screenshot illustrating user interface(s) of the MLPO (e.g., HISTORICAL VS PANIC SIM);

FIG. 68 shows a screenshot illustrating user interface(s) of the MLPO (e.g., 3M VIX THRESHOLDS VS UNPRECEDENTEDNESS (MSE) 3D);

FIG. 69 shows a screenshot illustrating user interface(s) of the MLPO (e.g., 6M VIX THRESHOLDS VS UNPRECEDENTEDNESS (MSE) 3D);

FIG. 70 shows a screenshot illustrating user interface(s) of the MLPO (e.g., 1Y VIX THRESHOLDS VS UNPRECEDENTEDNESS (MSE) 3D);

FIG. 71 shows a screenshot illustrating user interface(s) of the MLPO (e.g., CVaR FRONTIER COMPARISON WITH DIVERSIFITION OF 0.6 (LEFT) AND DIVERSIFICATION OF 0.3 (RIGHT));

FIG. 72 shows a screenshot illustrating user interface(s) of the MLPO (e.g., TAIL RISK OPTIMIZATION RUNNING TIME COMPARISON OF INTEGER PROGRAMMING AND NON-INTEGER PROGRAMMING);

FIG. 73 shows a screenshot illustrating user interface(s) of the MLPO (e.g., EFFICIENT FRONTIER COMPARISON WITH RISK TOLERANCE OF 7 (LEFT) AND RISK TOLERANCE OF 3 (RIGHT));

FIG. 74 shows a screenshot illustrating user interface(s) of the MLPO (e.g., EFFICIENT FRONTIER COMPARISON WITH DIVERSIFICATION OF 0.7 (LEFT) AND RISK DIVERSIFICATION OF 0.3 (RIGHT);

FIG. 75 shows a screenshot illustrating user interface(s) of the MLPO (e.g., EFFICIENT FRONTIER COMPARISON WITH VIX RANGE OF (−3500,5500) (LEFT AND VIX RANGE OF (−1500,3000) (RIGHT));

FIG. 76 shows an architecture for the MLPO (e.g., FACTOR EXPOSURE GENERATION PSEUDO CODE);

FIG. 77 shows an architecture for the MLPO (e.g., ASSET SIMULATION GENERATION PSEUDO CODE);

FIG. 78 shows an architecture for the MLPO (e.g., FACTOR EXPOSURE GENERATION CONCEPT DIAGRAM);

FIG. 79 shows an architecture for the MLPO (e.g., ASSET SIMULATION GENERATION CONCEPT DIAGRAM);

FIG. 80 shows an architecture for the MLPO (e.g., CONVEXITY ADJUSTMENT PSEUDO CODE (STEP 1));

FIG. 81 shows an architecture for the MLPO (e.g., CONVEXITY ADJUSTMENT PSEUDO CODE (STEP 2));

FIG. 82 shows an architecture for the MLPO (e.g., OPTIONALITY ADJUSTMENT PSEUDO CODE);

FIG. 83 shows an architecture for the MLPO (e.g., REAL-TIME ASSET SIMULATION PSEUDO CODE);

FIG. 84 shows an architecture for the MLPO (e.g., REAL-TIME ASSET SIMULATION CONCEPT DIAGRAM (ORACLE RDS ON CLOUD));

FIG. 85 shows an architecture for the MLPO (e.g., MULTIPLE USER-DEFINED SCENARIOS PSEUDO CODE);

FIG. 86 shows an architecture for the MLPO (e.g., MULTIPLE USER-DEFINED SCENARIOS CONCEPT DIAGRAM);

FIG. 87 shows an architecture for the MLPO (e.g., ASSET SIMULATION ER DIAGRAM);

FIG. 88 shows an architecture for the MLPO (e.g., BOND LADDER CONSTRUCTION FLOW);

FIG. 89 shows an architecture for the MLPO (e.g., BOND LADDER CONSTRUCTION API INPUT SAMPLE);

FIG. 90 shows an architecture for the MLPO (e.g., BOND LADDER CONSTRUCTION API OUTPUT SAMPLE);

FIG. 91 shows an architecture for the MLPO (e.g., RISK ANALYSIS API INPUT SAMPLE);

FIG. 92 shows an architecture for the MLPO (e.g., RISK ANALYSIS API OUTPUT SAMPLE);

FIG. 93 shows a screenshot illustrating user interface(s) of the MLPO (e.g., BOND LADDER CONSTRUCTION USER INPUT/SELECTION SCREEN);

FIG. 94 shows a screenshot illustrating user interface(s) of the MLPO (e.g., BOND LADDER CONSTRUCTION—SAMPLE CORPORATE LADDER);

FIG. 95 shows a screenshot illustrating user interface(s) of the MLPO (e.g., BOND LADDER CONSTRUCTION—SAMPLE MUNI LADDER);

FIG. 96 shows a screenshot illustrating user interface(s) of the MLPO (e.g., BOND LADDER CONSTRUCTION—MAXIMIZE YIELD METHOD/OPTION);

FIG. 97 shows a screenshot illustrating user interface(s) of the MLPO (e.g., BOND LADDER CONSTRUCTION—RISK SCORE ADJUSTED METHOD/OPTION);

FIG. 98 shows a screenshot illustrating user interface(s) of the MLPO (e.g., MULTIPLE USER-DEFINED SCENARIOS—MARKET SENSITIVITY ANALYSIS);

FIG. 99 shows a block diagram illustrating embodiments of a MLPO controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Machine Learning Portfolio Simulating and Optimizing Apparatuses, Methods and Systems (hereinafter "MLPO") transforms machine learning simulation request, decision tree ensembles training request, expected returns calculation request, portfolio construction request, predefined scenario construction request, portfolio returns visualization request inputs, via MLPO components (e.g., MLSSP, DTET, ERC, PC, PSC, SPRV, BPRV, PRV, ARMC, etc. components), into machine learning simulation response, decision tree ensembles training response, expected returns calculation response, portfolio construction response, predefined scenario construction response, portfolio returns visualization response outputs. The MLPO components, in various embodiments, implement advantageous features asset forth below.

Introduction

The MLPO provides unconventional features (e.g., executing tradeable transactions to create an optimized portfolio based on expected returns simulated using machine learning techniques, a SQL database calculation engine) that were never before available in machine learning and database systems.

Tail-events have rare historical occurrence. They are difficult to model and forecast. However, they can be an essential part of resilient decision processes. The MLPO demonstrates unique abilities to model variations in volatilities and dependency structures across factors and over different time periods; provides rich estimates of tail-event; enables conditional outcomes of tail-events; and uses advanced linear and non-linear optimization processes for superior decision support. The optimization results provide model recommended solutions, such as for portfolio construction.

The MLPO presents the latest innovations in two core capabilities of investment management: 1) simulation driven investment insights and decision support and 2) machine driven portfolio allocation guidance. It combines the latest machine learning methods with leading-edge cloud computing techniques. It enables differentiations across many business units: analytics and insights to power a commercial electronic bond trading platform, power tools for evaluating portfolio construction bias, smart Bond Ladder products, and/or the like.

In various embodiments, the MLPO may include one or more of the following features:

1 Maximizes the usage of high frequency historical data
   a. Machine learning processes to impute missing data (e.g., in order to preserve higher frequency time-series data with gaps, and maximize the utility of all available historical data)
   b. Flexible periodicity with overlapping techniques
2. Combines a mixer of copulas, flexible marginal distributions, rejection sampling and parallel computing for a single simulation engine which
   a. Models changes in correlations and volatilities for "fat tail" events (e.g., using massive parallel computing to concurrently perform simulation and/or conditional simulation and/or stress scenario generations over cloud computing infrastructure)
   b. Generates insights on the conditional impact of diverse factors on tail-events and volatilities
3. Allows calibration to forward-looking signals
4. Allows domain experts to incorporate their subjective views
5. Simulates longer horizon, multi-period outcomes with path dependency (e.g., using massive parallel computing frameworks in path-dependent, multi-period simulation to capture joint seasonality and mean-reversion tendencies across factors)
6. Preserves the cadence of historical cycles in forward-looking simulation paths
7. Allows forward-looking factor views to drive optimization results
8. Applies "simulation-data-driven" approach for tailed-constrained portfolio optimization (e.g., to recommend solutions allowing tail-risk, tradability controls, etc.). In one embodiment, applies linear relaxation to CVaR constraints and mixed integer linear programming for optimization problem solving. In another embodiment, applies stochastic optimizer with VaR or CVaR and integer constraints to solve a non-linear optimization problem.

In some embodiments, the MLPO may implement a database calculation engine for calculating simulation data. The database calculation engine may be a SQL-based solution that effectively utilizes different data reduction and parallel execution techniques to reduce the overall response time. Instead of using a dedicated high-performance platform (e.g., IBM Netezza Data Appliance) the database calculation engine may be used for simulation calculation providing a faster, streamlined, cost effective and scalable solution (e.g., using Oracle RDS on Cloud) that provides calculation results in substantially less amount of time. Further, the database calculation engine eliminates having to maintain a complex infrastructure and applications associated with using a dedicated high-performance platform, and having to pay for additional licensing and maintenance costs.

The database calculation engine solution is faster as data does not have to be transferred outside of the database with an innovative data reduction strategy that applies to simulation generation, less complex as the solution may run entirely on a database, scalable as the solution effectively utilizes vertical scalability offered by RDS on Cloud and more maintainable.

In some implementations, the database calculation engine may provide the following features:

- A novel way of calculating simulation data using a SQL only solution.
- Application of unique data reduction techniques applicable specifically to the way data is aggregated for simulation data.
- Use of vertical scalability and concurrency offered by Oracle RDS on Cloud for faster execution.
- Processing that happens at the database level, eliminating having to transfer data outside to external systems and maximizing processing of data using cloud computing.
- Faster and more cost effective than using high-performance platforms.

In some implementations, the database calculation engine may utilize various innovative data reduction, scaling and parallel computing techniques (e.g., techniques to use global temporary tables and sessions, data reduction techniques to drastically reduce the amount of data used for processing thus lowering processing time, and several other data parallelization techniques used for generating simulation data):

- Use of Multiple Batches to achieve higher degree of parallelism (DOP)
- Use of Global Temporary Tables (GTT) to be able to run batch in multiple sessions and limit temporary storage requirements
- Use of Data Reduction techniques to limit full table scans for joins between Factor Exposure and Factor Simulation table
- Use of Parallel Query to parallelize generation of Asset Simulation and Contribution to Value at Risk data
- Use of Parallel DML to parallelize inserting data related to Asset Simulation and Contribution to Value at Risk
- Use of DDL for faster execution of delete statements to speed up cleanup of global temporary tables

MLPO

FIGS. 1A-B show a datagraph illustrating data flow(s) for the MLPO. In FIGS. 1A-B, an administrative client 102 (e.g., of an administrative user) may send a machine learning simulation request 121 to a MLPO server 106 to facilitate generating a set of simulated scenarios (e.g., a scenario may be a set of simulated market factor changes). For example, the administrative client may be a desktop, a laptop, a tablet, a smartphone, a smartwatch, and/or the like that is executing a client application. In one implementation, the machine learning simulation request may include data such as a request identifier, configuration settings, and/or the like. In one embodiment, the administrative client may provide the following example machine learning simulation request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
      <user_account_credentials>
          <user_name>JohnDaDoeDoeDoooe@gmail.com</user_name>
          <password>abc123</password>
          //OPTIONAL <cookie>cookieID</cookie>
          //OPTIONAL <digital_cert_link>www.mydigitalcertificate.com/
JohnDoeDaDoeDoe@gmail.com/mycertifcate.dc</digital_cert_link>
          //OPTIONAL <digital_certificate>_DATA_<digital_certificate>
      </user_account_credentials>
  </user_accounts_details>
  <client_details> //iOS Client with App and Webkit
          //it should be noted that although several client details
          //sections are provided to show example variants of client
          //sources, further messages will include only on to save
          //space
      <client_IP>10.0.0.123</client_IP>
      <user_agent_string >Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
      <client_product_type>iPhone6,1</client_product_type>
      <client_serial_number>DNXXX1X1XXXX</client_serial_number>
      <client_UDID>3XXXXXXXXXXXXXXXXXXXXXXXXD</client_UDID>
      <client_OS>iOS</client_OS>
      <client_OS_version>7.1.1</client_OS_version>
      <client_app_type>app with webkit</client_app_type>
      <app_installed_flag>true</app_installed_flag>
      <app_name>MLPO.app</app_name>
```

-continued

```
        <app_version>1.0</app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <machine_learning_simulation_request>
      <request_identifier>ID_request_1</request_identifier>
      <configuration_settings>
        <historical_data>last 30 years</historical_data>
        <rolling_window_period_length>6 months</rolling_window_period_length>
        <time_period_bucket_type>FIXED</time_period_bucket_type>
        <time_period_bucket_length>6 months</time_period_bucket_length>
        <market_factors>
          ID_interest_rate_5Y, ID_oil_price, ID_credit_spread, ID_SP500
        </market_factors>
        <distribution_type>Gaussian</distribution_type>
        <machine_learning_structure_type>
          deep learning neural network
        </machine_learning_structure_type>
        <hyper_parameters_to_test>
          <hyper_parameters_option>
            <option_identifier>ID_option_1</option_identifier>
            <encoder>3 layers, 100 perceptrons each</encoder>
            <latent_space>50 variables<latent_space>
            <decoder>3 layers, 100 perceptrons each</decoder>
          </hyper_parameters_option>
          <hyper_parameters_option>
            <option_identifier>ID_option_2</option_identifier>
            <encoder>4 layers, 80 perceptrons each</encoder>
            <latent_space>60 variables<latent_space>
            <decoder>4 layers, 80 perceptrons each</decoder>
          </hyper_parameters_option>
          ...
        </hyper_parameters_to_test>
        <number_of_simulated_market_scenarios>
          1000 scenarios per time period bucket
        </number_of_simulated_market_scenarios>
      </configuration_settings>
```

-continued

```
  </machine_learning_simulation_request>
</auth request>
```

A machine learning simulated scenario processing (MLSSP) component 123 may utilize data provided in the machine learning simulation request to train a machine learning structure and/or to generate a set of simulated scenarios. See FIGS. 2A-B and FIG. 4 for additional details regarding the MLSSP component.

The MLPO server 106 may send a scenario results store request 125 to a repository 110 to facilitate storing the generated set of simulated scenarios (e.g., a simulation) in a database. In one implementation, the scenario results store request may include data such as a request identifier, a simulation identifier, simulated scenarios, and/or the like. In one embodiment, the MLPO server may provide the following example scenario results store request, substantially in the form of a HTTP(S) POST message including XML-formatted data, as provided below:

```
POST /scenario_results_store_request.php HTTP/1.1
Host: www.server.com
Content-Type: Application/XML
Content-Length: 667
<?XML version = "1.0" encoding = "UTF-8"?>
<scenario_results_store_request>
  <request_identifier>ID_request_2</request_identifier>
  <simulation_identifier>ID_sim_1</simulation_identifier>
  <simulated_scenarios>
    <scenario>
      <scenario_identifier>ID_scenario_1</scenario_identifier>
      <market_factor>
        <market_factor_identifier >ID_interest_rate_5Y</market_factor_identifier>
        <market_factor_change>25 basis points</market_factor_change>
      </market_factor>
      <market_factor>
        <market_factor_identifier>ID_oil_price</market_factor_identifier>
        <market_factor_change>$10</market_factor_change>
      </market_factor>
      ...
    </scenario>
    <scenario>
      <scenario_identifier>ID_scenario_2</scenario_identifier>
      <market_factor>
        <market_factor_identifier>ID_interest_rate_5Y</market_factor_identifier>
        <market_factor_change>50 basis points</market_factor_change>
      </market_factor>
      <market_factor>
        <market_factor_identifier>ID_oil_price</market_factor_identifier>
        <market_factor_change>$15</market_factor_change>
      </market_factor>
      ...
    </scenario>
    ...
  </simulated_scenarios>
</scenario_results_store_request>
```

The repository 110 may send a scenario results store response 127 to the MLPO server 106 to confirm that the generated set of simulated scenarios was stored successfully. In one implementation, the scenario results store response may include data such as a response identifier, a status, and/or the like. In one embodiment, the repository may provide the following example scenario results store response, substantially in the form of a HTTP(S) POST message including XML-formatted data, as provided below:

```
POST /scenario_results_store_response.php HTTP/1.1
Host: www.server.com
Content-Type: Application/XML
Content-Length: 667
<?XML version = "1.0" encoding = "UTF-8"?>
<scenario_results_store_response>
  <response_identifier>ID_response_2</response_identifier>
  <status>OK</status>
</scenario_results_store_response>
```

The MLPO server 106 may send a machine learning simulation response 129 to the administrative client 102 to inform the administrative user that a set of simulated scenarios was generated successfully. In one implementation, the machine learning simulation response may include data such as a response identifier, a status, and/or the like. In one embodiment, the MLPO server may provide the following example machine learning simulation response, substantially in the form of a HTTP(S) POST message including XML-formatted data, as provided below:

```
POST /machine_learning_simulation_response.php HTTP/1.1
Host: www.server.com
Content-Type: Application/XML
Content-Length: 667
<?XML version = "1.0" encoding = "UTF-8"?>
<machine_learning_simulation_response>
```

-continued

```
    <response_identifier>ID_response_1</response_identifier>
    <status>OK</status>
</machine_learning_simulation_response>
```

The administrative client 102 may send a decision tree ensembles training request 131 to the MLPO server 106 to facilitate training decision tree ensembles for a universe of securities. For example, different decision tree ensembles may be trained for each security for different predictive capabilities (e.g., one decision tree ensemble may be trained to estimate conditional Beta for a security, and another decision tree ensemble may be trained to estimate conditional default for the security). In one implementation, the decision tree ensembles training request may include data such as a request identifier, a universe of securities, predictive capabilities configuration, training features configuration, and/or the like. In one embodiment, the administrative client may provide the following example decision tree ensembles training request, substantially in the form of a HTTP(S) POST message including XML-formatted data, as provided below:

```
POST /decision_tree_ensembles_training_request.php HTTP/1.1
Host: www.server.com
Content-Type: Application/XML
Content-Length: 667
<?XML version = "1.0" encoding = "UTF-8"?>
<decision_tree_ensembles_training_request>
  <request_identifier>ID_request_3</request_identifier>
  <universe_of_securities>Securities in S&P 500</universe_of_securities>
  <predictive_capabilities_configuration>
    <predictive_capability>
      <predictive_capability_type>Conditional Beta
      </predictive_capability_type>
      <training_features>
        <feature>ratio of cash to market value of total assets</feature>
        <feature>ratio of net income to total assets</feature>
        <feature>size measure</feature>
        <feature>sector dummy variable</feature>
        ...
      </training_features>
    </predictive_capability>
    <predictive_capability>
      <predictive_capability_type>Conditional Default
      </predictive_capability_type>
      <training_features>
        <feature>ratio of cash to market value of total assets</feature>
        <feature>unemployment rate</feature>
        <feature>value of VIX index</feature>
        ...
      </training_features>
    </predictive_capability>
  </predictive_capabilities_configuration>
</decision_tree_ensembles_training_request>
```

A decision tree ensembles training (DTET) component 133 may utilize data provided in the decision tree ensembles training request to train decision tree ensembles for the universe of securities. See FIG. 5 for additional details regarding the DTET component.

The MLPO server 106 may send a decision tree ensembles store request 135 to the repository 110 to facilitate storing the trained decision tree ensembles. In one implementation, the decision tree ensembles store request may include data such as a request identifier, decision tree ensembles, and/or the like. In one embodiment, the MLPO server may provide the following example decision tree ensembles store request, substantially in the form of a HTTP(S) POST message including XML-formatted data, as provided below:

```
POST /decision_tree_ensembles_store_request.php HTTP/1.1
Host: www.server.com
Content-Type: Application/XML
Content-Length: 667
<?XML version = "1.0" encoding = "UTF-8"?>
<decision_tree_ensembles_store_request>
  <request_identifier>ID_request_4</request_identifier>
  <decision_tree_ensembles>
    <decision_tree_ensemble>
      <decision_tree_ensemble_id>ID_DTE_1
      </decision_tree_ensemble_id>
      <associated_security>MSFT</associated_security>
      <predictive_capability_type>Conditional Beta
      </predictive_capability_type>
      <decision_tree_ensemble_data>
        decision tree ensemble datastructure
      </decision_tree_ensemble_data>
    </decision_tree_ensemble>
    <decision_tree_ensemble>
      <decision_tree_ensemble_id>ID_DTE_2
      </decision_tree_ensemble_id>
      <associated_security>MSFT</associated_security>
      <predictive_capability_type>Conditional Default
      </predictive_capability_type>
      <decision_tree_ensemble_data>
        decision tree ensemble datastructure
      </decision_tree_ensemble_data>
    </decision_tree_ensemble>
      <decision_tree_ensemble_id>ID_DTE_3
      </decision_tree_ensemble_id>
      <associated_security>AAPL</associated_security>
      <predictive_capability_type>Conditional Beta
      </predictive_capability_type>
      <decision_tree_ensemble_data>
        decision tree ensemble datastructure
      </decision_tree_ensemble_data>
    </decision_tree_ensemble>
    <decision_tree_ensemble>
      <decision_tree_ensemble_id>ID_DTE_4
      </decision_tree_ensemble_id>
      <associated_security>AAPL</associated_security>
      <predictive_capability_type>Conditional Default
      </predictive_capability_type>
      <decision_tree_ensemble_data>
        decision tree ensemble datastructure
      </decision_tree_ensemble_data>
    </decision_tree_ensemble>
    ...
  </decision_tree_ensembles>
</decision_tree_ensembles_store_request>
```

The repository 110 may send a decision tree ensembles store response 137 to the MLPO server 106 to confirm that the trained decision tree ensembles were stored successfully. In one implementation, the decision tree ensembles store response may include data such as a response identifier, a status, and/or the like. In one embodiment, the repository may provide the following example decision tree ensembles store response, substantially in the form of a HTTP(S) POST message including XML-formatted data, as provided below:

```
POST /decision_tree_ensembles_store_response.php HTTP/1.1
Host: www.server.com
Content-Type: Application/XML
Content-Length: 667
<?XML version = "1.0" encoding = "UTF-8"?>
<decision_tree_ensembles_store_response>
  <response_identifier>ID_response_4</response_identifier>
  <status>OK</status>
</decision_tree_ensembles_store_response>
```

The MLPO server 106 may send a decision tree ensembles training response 139 to the administrative client 102 to inform the administrative user that decision tree ensembles were trained successfully. In one implementation, the decision tree ensembles training response may include data such as a response identifier, a status, and/or the like. In one embodiment, the MLPO server may provide the following example decision tree ensembles training response, substantially in the form of a HTTP(S) POST message including XML-formatted data, as provided below:

```
POST /decision_tree_ensembles_training_response.php HTTP/1.1
Host: www.server.com
Content-Type: Application/XML
Content-Length: 667
<?XML version = "1.0" encoding = "UTF-8"?>
<decision_tree_ensembles_training_response>
  <response_identifier>ID_response_3</response_identifier>
  <status>OK</status>
</decision_tree_ensembles_training_response>
```

The administrative client 102 may send an expected returns calculation request 141 to the MLPO server 106 to facilitate calculating expected returns for the universe of securities under the simulated scenarios. In one implementation, the expected returns calculation request may include data such as a request identifier, a universe of securities, a simulation identifier, a set of simulated scenarios, and/or the like. In one embodiment, the administrative client may provide the following example expected returns calculation request, substantially in the form of a HTTP(S) POST message including XML-formatted data, as provided below:

```
POST /expected_returns_calculation_request.php HTTP/1.1
Host: www.server.com
Content-Type: Application/XML
Content-Length: 667
<?XML version = "1.0" encoding = "UTF-8"?>
<expected_returns_calculation_request>
  <request_identifier>ID_request_5</request_identifier>
  <universe_of_securities>Securities in S&P 500
  </universe_of_securities>
  <simulation_identifier>ID_sim_1</simulation_identifier>
  <simulated_scenarios>ID_scenario_1, ID_scenario_2,
  ...</simulated_scenarios>
</expected_returns_calculation_request>
```

The MLPO server 106 may send a scenario results retrieve request 145 to the repository 110 to facilitate retrieving simulated market factor changes for a simulated scenario. In one implementation, the scenario results retrieve request may include data such as a request identifier, a simulation identifier, a scenario identifier, and/or the like. In one embodiment, the MLPO server may provide the following example scenario results retrieve request, substantially in the form of a HTTP(S) POST message including XML-formatted data, as provided below:

```
POST /scenario_results_retrieve_request.php HTTP/1.1
Host: www.server.com
Content-Type: Application/XML
Content-Length: 667
<?XML version = "1.0" encoding = "UTF-8"?>
<scenario_results_retrieve_request>
  <request_identifier>ID_request_6</request_identifier>
  <simulation_identifier>ID_sim_1</simulation_identifier>
  <scenario_identifier>ID_scenario_1</scenario_identifier>
</scenario_results_retrieve_request>
```

The repository 110 may send a scenario results retrieve response 147 to the MLPO server 106 with the requested simulated market factor changes data. In one implementation, the scenario results retrieve response may include data such as a response identifier, the requested simulated market factor changes data, and/or the like. In one embodiment, the repository may provide the following example scenario results retrieve response, substantially in the form of a HTTP(S) POST message including XML-formatted data, as provided below:

```
POST /scenario_results_retrieve_response.php HTTP/1.1
Host: www.server.com
Content-Type: Application/XML
Content-Length: 667
<?XML version = "1.0" encoding = "UTF-8"?>
<scenario_results_retrieve_response>
  <response_identifier>ID_response_6</response_identifier>
  <scenario_data>
    <market_factor>
      <market_factor_identifier>ID_interest_rate_5Y
      </market_factor_identifier>
      <market_factor_change>25 basis points
      </market_factor_change>
    </market_factor>
    <market_factor>
      <market_factor_identifier>ID_oil_price
      </market_factor_identifier>
      <market_factor_change>$10</market_factor_change>
    </market_factor>
    ...
  </scenario_data>
</scenario_results_retrieve_response>
```

An expected returns calculation (ERC) component 149 may utilize data provided in the expected returns calculation request, data provided in the scenario results retrieve response, and/or the trained decision tree ensembles to calculate expected returns for the universe of securities under the simulated scenarios. See FIG. 7A for additional details regarding the ERC component.

The MLPO server 106 may send an expected returns store request 151 to the repository 110 to facilitate storing the calculated expected returns. In one implementation, the expected returns store request may include data such as a request identifier, expected returns, and/or the like. In one embodiment, the MLPO server may provide the following example expected returns store request, substantially in the form of a HTTP(S) POST message including XML-formatted data, as provided below:

```
POST /expected_returns_store_request.php HTTP/1.1
Host: www.server.com
Content-Type: Application/XML
Content-Length: 667
<?XML version = "1.0" encoding = "UTF-8"?>
<expected_returns_store_request>
  <request_identifier>ID_request_7</request_identifier>
  <expected_returns>
    <simulation_identifier>ID_sim_1</simulation_identifier>
    <scenario>
      <scenario_identifier>ID_scenario_1</scenario_identifier>
      <security>
        <security_identifier>MSFT</security_identifier>
        <expected_return>10%</expected_return>
      </security>
      <security>
        <security_identifier>AAPL</security_identifier>
        <expected_return>12%</expected_return>
      </security>
      ...
    </scenario>
    <scenario>
      <scenario_identifier>ID_scenario_2</scenario_identifier>
      <security>
        <security_identifier>MSFT</security_identifier>
        <expected_return>15%</expected_return>
      </security>
```

-continued

```
        <security>
          <security_identifier>AAPL</security_identifier>
          <expected_return>13%</expected_return>
        </security>
        ...
      </scenario>
      ...
    </expected_returns>
</expected_returns_store_request>
```

The repository 110 may send an expected returns store response 153 to the MLPO server 106 to confirm that the calculated expected returns were stored successfully. In one implementation, the expected returns store response may include data such as a response identifier, a status, and/or the like. In one embodiment, the repository may provide the following example expected returns store response, substantially in the form of a HTTP(S) POST message including XML-formatted data, as provided below:

```
POST /expected_returns_store_response.php HTTP/1.1
Host: www.server.com
Content-Type: Application/XML
Content-Length: 667
<?XML version = "1.0" encoding = "UTF-8"?>
<expected_returns_store_response>
  <response_identifier>ID_response_7</response_identifier>
  <status>OK</status>
</expected_returns_store_response>
```

The MLPO server 106 may send an expected returns calculation response 155 to the administrative client 102 to inform the administrative user that expected returns for the universe of securities under the simulated scenarios were calculated successfully. In one implementation, the expected returns calculation response may include data such as a response identifier, a status, and/or the like. In one embodiment, the MLPO server may provide the following example expected returns calculation response, substantially in the form of a HTTP(S) POST message including XML-formatted data, as provided below:

```
POST /expected_returns_calculation_response.php HTTP/1.1
Host: www.server.com
Content-Type: Application/XML
Content-Length: 667
<?XML version = "1.0" encoding = "UTF-8"?>
<expected_returns_calculation_response>
  <response_identifier>ID_response_5</response_identifier>
  <status>OK</status>
</expected_returns_calculation_response>
```

FIGS. 2A-B show a logic flow illustrating embodiments of a machine learning simulated scenario processing (MLSSP) component for the MLPO. In FIG. 2A, a machine learning simulated scenario processing request may be obtained at 201. For example, the machine learning simulated scenario processing request may be obtained as a result of an administrative user requesting generation of a set of simulated scenarios.

A rolling window period length may be determined at 205. In one embodiment, historical data may be analyzed to calculate changes to a set of market factors during each rolling window period of a specified rolling window period length. In one implementation, the machine learning simulated scenario processing request may be parsed (e.g., using PHP commands) to determine historical data to analyze (e.g., based on the value of the historical_data field) and/or the rolling window period length to use for analysis (e.g., based on the value of the rolling_window_period_length field). For example, the machine learning simulated scenario processing request may specify that the last 30 years of historical data should be analyzed using 6 month rolling window periods.

Market factors to process may be determined at 209. For example, market factors may include interest rates, credit spread, oil price, equity indices, and/or the like, and changes to the market factors during a rolling window period jointly describe a market scenario (e.g., a historical market scenario for historical changes, a simulated market scenario for simulated changes). In one implementation, the machine learning simulated scenario processing request may be parsed (e.g., using PHP commands) to determine the market factors to process (e.g., based on the value of the market_factors field). In another implementation, a set of default market factors to process may be specified in a configuration setting.

A determination may be made at 213 whether there remain market factors to process. In one implementation, each of the market factors may be processed. If there remain market factors to process, the next market factor (e.g., 6 month change in interest rates) may be selected for processing at 217.

A determination may be made at 221 whether there remain rolling window periods to analyze. In one implementation, historical data for the selected market factor may be analyzed during each of the rolling window periods. If there remain rolling window periods to analyze, the next rolling window period may be selected for analysis at 225. For example, the next rolling window period may be two specific time points (e.g., days) 6 months apart.

A determination may be made at 229 whether data for the selected rolling window period is available. In one implementation, this determination may be made based on whether historical data for the selected market factor is available for both time points (e.g., for both days) of the selected rolling window period.

If historical market factor data is unavailable for one or both time points (e.g., days) of the selected rolling window period, the missing data may be imputed using a machine learning (e.g., k-Nearest Neighbors (k-NN)) method at 233 based on market factor data for other time points (e.g., for other days). In one implementation, the k-NN method may be used to match records (e.g., a record may be a set of market factors for a time point) with missing data points (e.g., a missing data point may be a missing market factor data for a time point) in a multi-dimensional space. For example, the missing data for the selected market factor for a time point may be calculated as the average of values of the selected market factor for k nearest neighbors of the time point as determined based on similarity of the other market factors.

Change to the selected market factor during the selected rolling window period may be calculated at 237. In one implementation, the change to the selected market factor during the selected rolling window period may be calculated by determining the delta between values of the selected market factor at the two time points of the selected rolling window period. For example, the 6 month change in 5 year interest rates for the rolling window period between Jan. 7, 2019 and Jul. 8, 2019, may be calculated by subtracting the US Treasury 5 Year Par Yield on Jan. 7, 2019 from the US Treasury 5 Year Par Yield on Jul. 8, 2019. In another example, the 6 month change in 5 year interest rates for the rolling window period between Jan. 8, 2019 and Jul. 9, 2019, may be calculated by subtracting the US Treasury 5 Year Par Yield on Jan. 8, 2019 from the US Treasury 5 Year Par Yield on Jul. 9, 2019.

Once changes to each of the market factors during each of the rolling window periods are calculated, a determination may be made at 241 regarding the type of time period buckets to utilize. In one embodiment, fixed length time period buckets may be utilized. In another embodiment, variable length time period buckets may be utilized. In one implementation, the machine learning simulated scenario processing request may be parsed (e.g., using PHP commands) to determine the type of time period buckets to utilize (e.g., based on the value of the time_period_bucket_type field).

If fixed length time period buckets are utilized, the length of time period buckets to utilize may be determined at 245. In one implementation, the machine learning simulated scenario processing request may be parsed (e.g., using PHP commands) to determine the length of time period buckets to utilize (e.g., based on the value of the time_period_bucket_length field). For example, the machine learning simulated scenario processing request may specify that historical market scenarios generated from the last 30 years of historical data (e.g., using calculated changes from 237) should be split using 6 month long time period buckets, resulting in 60 time period buckets to process. It is to be understood that the length of time period buckets is independent of the rolling window period length (e.g., the two lengths may be the same or may be different).

If variable length time period buckets are utilized, time period buckets reflective of changes in volatilities and correlations of the historical data may be determined at 249. In one implementation, the time period buckets may be selected by judging the overall goodness of fit between simulated data from the time period buckets and historical data. KS tests and Cramer test may be performed jointly between the simulated market scenarios and the historical market scenarios. The splitting into time period buckets may support the objective function of minimizing the KS test values of the marginal distributions and Cramer test value of the multivariate distribution of simulated market scenarios vs. realized historical market scenarios. For example, the machine learning simulated scenario processing request may specify that historical market scenarios generated from the last 30 years of historical data (e.g., using calculated changes from 237) should be split by bucketing historical market scenarios from the same economic cycle (e.g., early cycle, mid cycle, late cycle, recession) together to summarize the changes in volatilities and correlation structure. In some implementations, the number of time period buckets may be determined by balancing the amount of historical data vs. the number of market factors. For example, given that data frequency is constant, as the number of market factors increases the time duration utilized for each time period bucket increases.

The historical market scenarios may be bucketed in accordance with the determined time period buckets at 253. In one implementation, each historical market scenario may be assigned a bucket identifier that specifies the time period bucket associated with the respective historical market scenario.

A determination may be made at 257 whether there remain time period buckets to process. In one implementation, each of the time period buckets may be processed. If there remain time period buckets to process, the next time period bucket (e.g., historical market scenarios associated with the next 6 month long time period bucket) may be selected for processing at 261.

A deep learning neural network for the selected time period bucket may be trained at 281. For example, the deep learning neural network may be a Gaussian-Mixture Variational Autoencoder. In one embodiment, the deep learning neural network may be trained to map historical market factor changes to latent space variables and/or to map latent space variables to simulated market factor changes. See FIG. 2B for additional details regarding training the deep learning neural network. See FIG. 3 for an exemplary deep learning neural network architecture.

The number of market scenarios to simulate may be determined at 289. For example, 1,000 scenarios may be simulated (e.g., resulting in 60,000 total simulated scenarios over 60 time period buckets). In one implementation, the machine learning simulated scenario processing request may be parsed (e.g., using PHP commands) to determine the number of market scenarios to simulate for each of the time period buckets (e.g., based on the value of the number_of_simulated_market_scenarios field). In another implementation, the number of market scenarios to simulate for each of the time period buckets may be specified in a configuration setting. In another implementation, the number of market scenarios to simulate may differ for different time period buckets. For example, the number of market scenarios to simulate may be determined as an AI-driven weight learned by minimizing the L2 Norm between real data and simulated data.

A determination may be made at 293 whether there remain market scenarios to simulate. If so, simulated data may be generated using latent space variables at 295. In one implementation, random values for latent space variables of the trained deep learning neural network may be generated. For example, a random value for a latent space variable of the trained deep learning neural network may be generated (e.g., by optimizing the number of perceptrons, the number of layers of the encoder and decoder neural networks, and/or the number of latent space variables with the objective function of minimizing the L2 Norm between generated market factor changes and historical market factor changes) from a Gaussian or Gaussian mixture distribution (e.g., from a multivariate Gaussian distribution) using the Python NumPy library (e.g., with three inputs including the number of samples to be generated, mean and variance from the encoder).

A set of simulated market factor changes may be generated from the simulated data using a neural network decoder of the trained deep learning neural network at 297. In one implementation, the generated random values of latent space variables may be fed through the neural network decoder of the trained deep learning neural network to obtain a set of simulated market factor changes (e.g., the set of simulated market factor changes may be referred to as a simulated market scenario).

The simulated scenario may be stored in a database at 299. In one implementation, the simulated scenario may be stored (e.g., in a batch with other simulated scenarios) via a scenario results store request.

FIG. 2B shows additional details regarding training the deep learning neural network. In FIG. 2B, the historical market scenarios (e.g., a set of calculated market factor changes for each rolling window period of the selected time period bucket) may be obtained at 202. In one implementation, a reference to a historical market factor changes data structure (e.g., an array of arrays where each element of the outer array corresponds to a training data point of historical market factor changes for a rolling window period, and each element of the inner array corresponds to a historical return of a market factor during the rolling window period) with the calculated historical market factor changes may be obtained.

A determination may be made at 206 whether there remain hyper-parameters options of the deep learning neural network to analyze. For example, the hyper-parameters of the deep learning neural network may include the number of layers and/or perceptrons in each layer of encoder and/or decoder, the dimensionality of latent space, and/or the like. In one implementation, the machine learning simulated scenario processing request may be parsed (e.g., using PHP commands) to determine hyper-parameters options to test (e.g., based on the value of the hyper_parameters_to_test field). If there remain hyper-parameters options to analyze, the next set of hyper-parameters (e.g., specified in a hyper-_parameters_option field) for the deep learning neural network may be selected for testing at 210.

A determination may be made at 212 whether a termination condition for training the deep learning neural network has been reached. In various implementations, the termination condition may comprise one or more of a specified number of training iterations, a specified training time, a specified minimum deep learning neural network performance rank, and/or the like.

If the termination condition for training the deep learning neural network has not been reached, a determination may be made at 214 whether there remain more training data points to use for training the deep learning neural network. In one implementation, each of the training data points in the historical market factor changes data structure may be used for training. If there remain more training data points to use, the next training data point (e.g., historical market factor changes for a rolling window period) may be selected at 218.

Input and output layers of the deep learning neural network may be set to the selected training data point at 222. In one implementation, the input and output layers may be f-dimensional layers, where f is the number of market factors. For example, the input and output layers may be set to the values of the inner array of the historical market factor changes data structure corresponding to the selected training data point.

The deep learning neural network may be trained on the selected training data point using a variational autoencoder to generate a set of Gaussian-Mixture latent variables at 226. In one embodiment, the deep learning neural network may be trained using backpropagation with a specified loss function. In one implementation, the loss function may be chosen to minimize mean squared error of the Euclidean distances of individual market factors return values to the historical realized return values, and/or to minimize the variance of joint distributions across encoded market factors between simulated and historical markets in the latent space (e.g., the KL divergence score). In one embodiment, the loss function on factor returns may be in the original factor space, while the KL divergence constraint plays the role in the latent space (lower dimensional space) to map the encoded factors to Gaussian or Gaussian mixture distribution. In one implementation, the encoder and the decoder may be set to have the same structures and during the training process their weights may be synchronized, so that half of the total weights have to be learned to reduce the complexity of deep network training.

Once the deep learning neural network is trained on the training data points, performance of the trained deep learning neural network may be evaluated at 230. For example, the performance of the trained deep learning neural network may be evaluated using a set of testing data points (e.g., available data points may be split into 75% training data points and 25% testing data points). In one embodiment, the trained deep learning neural network may be assigned a performance rank (e.g., a score). In one implementation, differences between market factor changes at the input layer and market factor changes at the output layer may be evaluated using the Kolmogorov-Smirnov (KS) test for individual market factors and/or Cramer test for joint distribution to calculate a performance score for the trained deep learning neural network. For example, for the KS test and/or the Cramer test, the lower the scores, the better the performance. Accordingly, the scores may be sorted in ascending order and performance of deep learning neural networks may be ranked in the hyperparameter tuning process such that the deep learning neural network with the optimal performance is the one with the highest rank.

If the termination condition for training the deep learning neural network has been reached, the next set of hyper-parameters, if any, for the deep learning neural network may be analyzed at 206.

The neural network with the optimal performance may be selected at 234. In one implementation, the deep learning neural network with the best (e.g., highest) performance rank may be selected to simulate market scenarios.

FIG. 3 shows an architecture for the MLPO. In FIG. 3, an embodiment of how a deep learning neural network may be structured is illustrated. The deep learning neural network may have an input layer 301. The input layer may be an f-dimensional layer, where f is the number of market factors. Market factor changes data provided to the input layer may be converted using an encoder 305 into latent space variables 310. The encoder may comprise one or more hidden layers, and the number of hidden layers and/or the number of perceptrons in each layer may be hyper-parameters tuned for optimal performance. The latent space variables may comprise a hidden layer of Gaussian mixtures, and the dimensionality of latent space may be a hyper-parameter tuned for optimal performance. In one embodiment, the latent space may be implemented using a Gaussian distribution and a mixture layer. The mixture layer may be designed to introduce richer correlations across encoded factors and thus approximately formulate a Gaussian mixture distribution. The simulation may be conducted by sampling from the Gaussian distribution, then the samples may be transferred to a near Gaussian mixture space via the mixture layer, and then sent to a decoder that maps to the original factor space. In another embodiment, the latent space may be implemented using a standard Gaussian mixture distribution (GM), where the mixture weights are hyper-parameters to be fine-tuned. The simulation may be conducted by sampling from the GM, and then the samples may be sent to a decoder. Latent space variables data may be converted using a decoder 315 into market factor changes data in an output layer 320. The decoder may comprise one or more hidden layers, and the number of hidden layers and/or the number of perceptrons in each layer may be hyper-parameters tuned for optimal performance. The output layer may be an f-dimensional layer, where f is the number of market factors.

FIG. 4 shows a logic flow illustrating embodiments of a machine learning simulated scenario processing (MLSSP) component for the MLPO. In FIG. 4, a machine learning simulated scenario processing request may be obtained at 401. For example, the machine learning simulated scenario processing request may be obtained as a result of an administrative user requesting generation of a set of simulated scenarios.

A rolling window period length may be determined at 405. In one embodiment, historical data may be analyzed to calculate changes to a set of market factors during each rolling window period of a specified rolling window period length. In one implementation, the machine learning simulated scenario processing request may be parsed (e.g., using PHP commands) to determine historical data to analyze (e.g., based on the value of the historical_data field) and/or the rolling window period length to use for analysis (e.g., based on the value of the rolling_window_period_length field). For example, the machine learning simulated scenario processing request may specify that the last 30 years of historical data should be analyzed using 6 month rolling window periods.

Market factors to process may be determined at 409. For example, market factors may include interest rates, credit spread, oil price, equity indices, and/or the like, and changes to the market factors during a rolling window period jointly describe a market scenario (e.g., a historical market scenario for historical changes, a simulated market scenario for simulated changes). In one implementation, the machine learning simulated scenario processing request may be parsed (e.g., using PHP commands) to determine the market factors to process (e.g., based on the value of the market_factors field). In another implementation, a set of default market factors to process may be specified in a configuration setting.

A determination may be made at 413 whether there remain market factors to process. In one implementation, each of the market factors may be processed. If there remain market factors to process, the next market factor (e.g., 6 month change in interest rates) may be selected for processing at 417.

A determination may be made at 421 whether there remain rolling window periods to analyze. In one implementation, historical data for the selected market factor may be analyzed during each of the rolling window periods. If there remain rolling window periods to analyze, the next rolling window period may be selected for analysis at 425. For example, the next rolling window period may be two specific time points (e.g., days) 6 months apart.

A determination may be made at 429 whether data for the selected rolling window period is available. In one implementation, this determination may be made based on whether historical data for the selected market factor is available for both time points (e.g., for both days) of the selected rolling window period.

If historical market factor data is unavailable for one or both time points (e.g., days) of the selected rolling window period, the missing data may be imputed using a machine learning (e.g., k-Nearest Neighbors (k-NN)) method at 433 based on market factor data for other time points (e.g., for other days). In one implementation, the k-NN method may be used to match records (e.g., a record may be a set of market factors for a time point) with missing data points (e.g., a missing data point may be a missing market factor data for a time point) in a multi-dimensional space. For example, the missing data for the selected market factor for a time point may be calculated as the average of values of the selected market factor for k nearest neighbors of the time point as determined based on similarity of the other market factors.

Change to the selected market factor during the selected rolling window period may be calculated at 437. In one implementation, the change to the selected market factor during the selected rolling window period may be calculated by determining the delta between values of the selected market factor at the two time points of the selected rolling window period. For example, the 6 month change in 5 year interest rates for the rolling window period between Jan. 7, 2019 and Jul. 8, 2019, may be calculated by subtracting the US Treasury 5 Year Par Yield on Jan. 7, 2019 from the US Treasury 5 Year Par Yield on Jul. 8, 2019. In another example, the 6 month change in 5 year interest rates for the rolling window period between Jan. 8, 2019 and Jul. 9, 2019, may be calculated by subtracting the US Treasury 5 Year Par Yield on Jan. 8, 2019 from the US Treasury 5 Year Par Yield on Jul. 9, 2019.

Once changes to each of the market factors during each of the rolling window periods are calculated, a determination may be made at 441 regarding the type of time period buckets to utilize. In one embodiment, fixed length time period buckets may be utilized. In another embodiment, variable length time period buckets may be utilized. In one implementation, the machine learning simulated scenario processing request may be parsed (e.g., using PHP commands) to determine the type of time period buckets to utilize (e.g., based on the value of the time_period_bucket_type field).

If fixed length time period buckets are utilized, the length of time period buckets to utilize may be determined at 445. In one implementation, the machine learning simulated scenario processing request may be parsed (e.g., using PHP commands) to determine the length of time period buckets to utilize (e.g., based on the value of the time_period_bucket_length field). For example, the machine learning simulated scenario processing request may specify that historical market scenarios generated from the last 30 years of historical data (e.g., using calculated changes from 437) should be split using 6 month long time period buckets, resulting in 60 time period buckets to process. It is to be understood that the length of time period buckets is independent of the rolling window period length (e.g., the two lengths may be the same or may be different).

If variable length time period buckets are utilized, time period buckets reflective of changes in volatilities and correlations of the historical data may be determined at 449. In one implementation, the time period buckets may be selected by judging the overall goodness of fit between simulated data from the time period buckets and historical data. KS tests and Cramer test may be performed jointly between the simulated market scenarios and the historical market scenarios. The splitting into time period buckets may support the objective function of minimizing the KS test values of the marginal distributions and Cramer test value of the multivariate distribution of simulated market scenarios vs. realized historical market scenarios. For example, the machine learning simulated scenario processing request may specify that historical market scenarios generated from the last 30 years of historical data (e.g., using calculated changes from 437) should be split by bucketing historical market scenarios from the same economic cycle (e.g., early cycle, mid cycle, late cycle, recession) together to summarize the changes in volatilities and correlation structure. In some implementations, the number of time period buckets may be determined by balancing the amount of historical data vs. the number of market factors. For example, given that data frequency is constant, as the number of market factors increases the time duration utilized for each time period bucket increases.

The historical market scenarios may be bucketed in accordance with the determined time period buckets at 453. In one implementation, each historical market scenario may be assigned a bucket identifier that specifies the time period bucket associated with the respective historical market scenario.

A determination may be made at 457 whether there remain time period buckets to process. In one implementation, each of the time period buckets may be processed. If there remain time period buckets to process, the next time period bucket (e.g., historical market scenarios associated with the next 6 month long time period bucket) may be selected for processing at 461.

A determination may be made at 465 whether there remain market factors to process. In one implementation, each of the market factors may be processed. If there remain market factors to process, the next market factor (e.g., 6 month change in interest rates) may be selected for processing at 469.

A distribution to use for the selected market factor during the selected time period bucket may be determined using the selected market factor's goodness of fit at 473. For example, a distribution to use may be Gaussian, log-normal, and/or the like. In one implementation, goodness of fit calculation may be performed to determine which distribution fits the historical returns (e.g., the calculated changes) for each time bucket using Kolmogorov-Smirnov Test (KS test) and/or Cramer test. For example, the distribution to use may be determined as the one with the best KS test performance for each of the individual factor and/or Cramer test performance for the overall distribution.

The determined marginal distribution to use may be fitted to the historical returns of the selected market factor during the selected time period bucket at 477. For example, the determined marginal distribution to use may be a Gaussian distribution. Accordingly, μ and σ of the Gaussian distribution may be determined. In one implementation, the Gaussian distribution may be fitted by calculating μ and σ of the historical returns (e.g., of the calculated changes) of the selected market factor during the selected time bucket. In one embodiment, the fitting may be implemented using Apache Spark. In some implementations, the fitting for multiple time buckets may occur in parallel. For example, a mapper function that performs the fitting and simulation for each time bucket and utilizes group by on time buckets may be implemented as follows:

```
reducer_simulator = generate_reducer_func(sim_id, 1 +
num_sim_row / num_buckets)
us_tsy_sim = us_tsy.map(lambda x:
  (x[0], x[2])).groupByKey
  (num_buckets).flatMap(reducer_simulator)
```

A copula for the processed market factors for the selected time period bucket may be determined at 481. For example, the copula may be utilized to capture the dependency structure between marginal distributions of the market factors during the selected time period bucket. In one implementation, the copula may be fitted as follows:

1. Feed factor return through its own CDF function to a distribution of the grades; a uniformly distributed random variable
2. Copula of a set of factors will be the joint distribution of factors' grades. Joint=Copula+Marginals For example, the SN R package may be utilized to determine the copula and supports Gaussian, skewed Gaussian, T and Skewed T Copula.

A multi-variate mixture model for the selected time period bucket may be trained at 485. For example, the multi-variate mixture model may be a multi-variate Gaussian mixture model. In one implementation, in Python, scipy.stats.multivariate_normal may be used for the different time period buckets to formulate a multi-variate Gaussian mixture. In another implementation, the SN R package may be utilized. In another implementation, training of the Gaussian mixture models may be implemented using Apache Spark. For example, the multi-variate mixture model for the selected time period bucket may be trained using the org.apache.spark.ml.clustering.GaussianMixture.fit( ) function, and the multi-variate mixture model may take the form of a org.apache.spark.ml.clustering.GaussianMixture multi-variate mixture datastructure. In one embodiment, the marginal distribution may be fitted to optimize the distributional families and their respective distributional parameters to minimize the KS test value between the marginal distribution and the historical distribution. In selecting various probability density functions such as Gaussian, skewed Gaussian, student T or skewed T copula, Cramer test and KS test values may be applied to minimize the multivariate and/or marginal distributions between simulated and historical data.

The number of market scenarios to simulate may be determined at 489. For example, 1,000 scenarios may be simulated (e.g., resulting in 60,000 total simulated scenarios over 60 time period buckets). In one implementation, the machine learning simulated scenario processing request may be parsed (e.g., using PHP commands) to determine the number of market scenarios to simulate for each of the time period buckets (e.g., based on the value of the number_of_simulated_market_scenarios field). In another implementation, the number of market scenarios to simulate for each of the time period buckets may be specified in a configuration setting. In another implementation, the number of market scenarios to simulate may differ for different time period buckets.

A determination may be made at 493 whether there remain market scenarios to simulate. If so, a set of simulated market factor changes may be generated using the multi-variate mixture model at 495. In one implementation, in Python, scipy.stats.multivariate_normal may be used to generate the set of simulated market factor changes. In another implementation, the SN R package may be utilized. In an alternative implementation, the set of simulated market factor changes may be generated using the scikit-learn sklearn.mixture.BayesianGaussianMixture.sample( ) method.

The simulated scenario may be stored in a database at 499. In one implementation, the simulated scenario may be stored (e.g., in a batch with other simulated scenarios) via a scenario results store request.

FIG. 5 shows a logic flow illustrating embodiments of a decision tree ensembles training (DTET) component for the MLPO. In FIG. 5, a decision tree ensembles training request may be obtained at 501. For example, the decision tree ensembles training request may be obtained as a result of an administrative user requesting training of decision tree ensembles.

Requested predictive capabilities may be determined at 505. For example, predictive capabilities may include estimating conditional Beta for a security, estimating conditional default for a security, and/or the like. In one implementation, the decision tree ensembles training request may be parsed (e.g., using PHP commands) to determine the requested predictive capabilities (e.g., based on the value of the predictive_capability_type fields). In another implementation, the requested predictive capabilities may be specified in a configuration setting.

A universe of securities to process may be determined at 509. For example, the universe of securities (e.g., securities in the S&P 500 Index) may include a list of equities, fixed income, and/or the like securities. In one implementation, the decision tree ensembles training request may be parsed (e.g., using PHP commands) to determine the universe of securities (e.g., based on the value of the universe_of_securities field). In another implementation, the universe of securities may be specified in a configuration setting.

A determination may be made at 513 whether there remain securities to process. In one implementation, each of the securities in the universe of securities may be processed. If there remain securities to process, the next security may be selected for processing at 517.

A determination may be made at 521 whether there remain predictive capabilities to train for the selected security. In one implementation, each of the requested predictive capabilities for the selected security may be trained. If there remain predictive capabilities to train, the next predictive capability may be selected for training at 525.

Features to use for training decision tree ensembles that provide the selected predictive capability for the selected security may be determined at 529. For example, different features may be used when training decision tree ensembles for fixed income and equity securities, for conditional Beta and conditional default. See FIGS. 6A-D for examples of features that may be used when training decision tree ensembles. In one implementation, the decision tree ensembles training request may be parsed (e.g., using PHP commands) to determine the features to use for training (e.g., based on the value of the training_features field). In another implementation, the features to use for training may be specified in a configuration setting.

A determination may be made at 533 whether sufficient training data is available for training decision tree ensembles that provide the selected predictive capability for the selected security. For example, if the features to use for training include pricing history features, a determination may be made if sufficient pricing history data for the selected security is available.

If sufficient training data is available for training decision tree ensembles that provide the selected predictive capability for the selected security, the training data may be obtained at 537. In one implementation, a reference to a training data datastructure may be obtained. For example, the training data datastructure may be structured as follows:

| | Target (Beta) | Feature_1_ID:Value (cashmta) | Feature_2_ID:Value ... (ni_ta) | Feature_N_ID:Value (sec45) |
|---|---|---|---|---|
| Data Point 1 | 1.1 | 1:0.3 | 2:0.5 | 4:1 |
| Data Point 2 | 1.4 | 1:0.2 | 2:0.6 | 4:0 |
| ... | | | | |

As an example of training data for a muni instrument for estimating Beta, the Beta of the instrument returns vs. muni index average return over a three month time period may be calculated using rolling 3 month daily returns. This set of Beta is the target variable. The market scenarios leading up to the return period are the trailing market scenario features. Instrument to index relative features are used to capture idiosyncratic risk (e.g., some muni instruments spread will trade richer, others cheaper relative to the muni index average spread). The market scenarios within the return period are also used as features.

A determination may be made at 541 whether a termination condition for training decision tree ensembles that provide the selected predictive capability for the selected security has been reached. In various implementations, the termination condition may comprise one or more of a specified number of training iterations, a specified training time, a specified minimum performance rank, and/or the like. For example, a performance rank may be determined by calculating $R^2$ for the decision tree ensembles (e.g., available data points may be split into 75% training data points and 25% testing data points for validation).

If the termination condition for training the decision tree ensembles has not been reached, a determination may be made at 545 whether there remain more training data points to use for training the decision tree ensembles. In one implementation, each of the training data points in the training data datastructure may be used for training. If there remain more training data points, the next training data point (e.g., Beta and feature values) may be selected at 549. The decision tree ensembles may be trained on the selected training data point using gradient boosting at 553. In one implementation, the XGBoost library may be used to train the decision tree ensembles using the training data datastructure. For example, in Python, using the XGBoost package, the decision tree ensembles may be trained as follows:

```
Training:
def exe_xgb(ft_pd):
  data = ft_pd.copy( )
  X = data.iloc[:, 1:]
  y = data.iloc[:, 0]
  X_train, X_test, y_train, y_test = train_test_split(X, y, test_size=0.25)
  model = xgb.XGBRegressor( )
  model.fit(X_train, y_train)
  score = model.score(X_test, y_test)
  return model, score
Scoring:
def calculate_inst(x):
  key_cusip = x[0]
  ft_no_sim = x[1]
  model_cusip = x[2]
  Row_list =[ ]
  features_pd = ft_sim_pd_orig.copy( )
  scoring_df = features_pd[features_pd.columns[:ft_sim_ini]]
  ft_row_num = len(features_pd)
  ft_left = ft_no_sim.values * ft_row_num
  ft_left = pd.DataFrame(ft_left, columns=list(ft_no_sim.columns))
  ft_right = features_pd[features_pd.columns[ft_sim_ini:]]
  X_scoring = pd.concat([ft_left, ft_right], axis=1)
```

-continued

```
  y_scoring = model_cusip.predict(X_scoring)
  y_scoring = pd.DataFrame(y_scoring, columns=['measure_value'])
  y_scoring['asset_id'] = key_cusip
  y_scoring_complete = scoring_df.join(y_scoring)
```

-continued

```
y_scoring_complete = y_scoring_complete[col_order]
for index, rows in y_scoring_complete.iterrows( ):
   my_list =[int(rows.asset_id), int(rows.market_id),
   float(rows.measure_value)]
   Row_list.append(my_list)
return Row_list
```

If the termination condition for training the decision tree ensembles has been reached, the trained decision tree ensembles that provide the selected predictive capability for the selected security may be stored in a database at 557. In one implementation, the decision tree ensembles may be stored via a decision tree ensembles store request.

FIGS. 6A-D show implementation case(s) for the MLPO. In FIGS. 6A-D, features that may be used for estimating conditional Beta and/or conditional default are illustrated.

FIG. 7A shows a logic flow illustrating embodiments of an expected returns calculation (ERC) component for the MLPO. In FIG. 7A, an expected returns calculation request may be obtained at 701. For example, the expected returns calculation request may be obtained as a result of an administrative user requesting calculation of expected returns for a universe of securities under simulated scenarios (e.g., of a simulation).

The universe of securities to process may be determined at 705. For example, the universe of securities (e.g., securities in the S&P 500 Index) may include a list of equities, fixed income, and/or the like securities. In one implementation, the expected returns calculation request may be parsed (e.g., using PHP commands) to determine the universe of securities (e.g., based on the value of the universe_of_securities field). In another implementation, the universe of securities may be specified in a configuration setting.

A determination may be made at 709 whether there remain securities to process. In one implementation, each of the securities in the universe of securities may be processed. If there remain securities to process, the next security may be selected for processing at 713.

Simulated market scenarios to analyze may be determined at 715. In one implementation, the expected returns calculation request may be parsed (e.g., using PHP commands) to determine the simulated market scenarios to analyze (e.g., based on the values of the simulation_identifier field and/or the simulated_scenarios field). In another implementation, the simulated market scenarios to analyze may be specified in a configuration setting.

A determination may be made at 717 whether there remain simulated market scenarios to analyze. In one implementation, each of the simulated market scenarios (e.g., of the simulation) may be analyzed. If there remain simulated market scenarios to analyze, the next market scenario (e.g., from the 60,000 simulated scenarios) may be selected for analysis at 721.

Features to utilize for conditional Beta estimation for the selected security under the selected simulated market scenario may be determined at 725. For example, different features may be used when estimating conditional Beta for fixed income and equity securities. In one implementation, the features that were used for training decision tree ensembles for estimating conditional Beta, as discussed with regard to FIG. 5, may be utilized. In one embodiment, the calculation of conditional Beta for different assets may be parallelized using Apache Spark. The mapper function may partition by asset_id, such as CUSIP, and may use XGBoost to train a model for each asset. The data frames for the XGBoost models may be stored as binary data as part of the calculation workflow to a relational database concurrently. The scoring process that generates a distribution of Beta for each asset may also be parallelized. The data storage design and parallel computing implementation of the MLPO allows each asset to have its own set of residuals. The residuals may be further analyzed to ensure that there is no systematic bias overstating or understating the simulated Beta, and/or that the residuals are not correlated with the simulated Beta. The sum of the simulated Beta from common risk factors and the residuals may be stored as the final simulated Beta. For example, the XGBoost model may be executed as follows:

```
model_function = generate_model(model_column, instrument_column,
ratio_column,
   factor_column, delta_length, time_series_length, delta_name,
   feature_engineering_function_name, xgb_function_name)
conditional_beta_model = raw_data.rdd \
      .map(extract cusip)\
      .groupByKey(num_partitions)\
      .map(function_including_feature_engineering_and_xgb)
```

A determination may be made at 729 whether sufficient estimation data is available for estimating conditional Beta for the selected security under the selected simulated market scenario. In one implementation, a determination may be made whether instrument data for the selected security during the time period associated with the selected simulated market scenario is available. For example, if the features to use for conditional Beta estimation include pricing history features, a determination may be made if pricing history data for the selected security is available during the time period associated with the selected simulated market scenario. In another implementation, a determination may be made whether decision tree ensembles for estimating conditional Beta for the selected security exist. For example, if sufficient training data was not available, decision tree ensembles for estimating conditional Beta for the selected security may not have been trained.

If sufficient estimation data is available (e.g., decision tree ensembles exist and pricing history data is available), the selected security's conditional Beta may be estimated using the decision tree ensembles trained to estimate conditional Beta for the selected security at 733. In one implementation, the decision tree ensembles may be queried to predict the selected security's conditional Beta based on the estimation data.

If sufficient estimation data is not available (e.g., decision tree ensembles do not exist or pricing history data is not available), the selected security's conditional Beta may be estimated using a machine learning (ML) method at 737. In one implementation, the k-NN method may be used to estimate conditional Beta for the selected security by finding the closest modeled security to the selected security, and using the closest modeled security's estimated conditional Beta as a proxy of the selected security's estimated conditional Beta. For example, the features to utilize for conditional Beta estimation may be used as inputs to the k-NN to find the closest modeled security.

Features to utilize for conditional default probability estimation for the selected security under the selected simulated market scenario may be determined at 741. For example, different features may be used when estimating conditional default probability for fixed income and equity securities. In one implementation, the features that were used for training decision tree ensembles for estimating conditional default probability, as discussed with regard to FIG. 5, may be utilized.

A determination may be made at 745 whether sufficient estimation data is available for estimating conditional default probability for the selected security under the selected simulated market scenario. In one implementation, a determination may be made whether instrument data for the selected security during the time period associated with the selected simulated market scenario is available. For example, if the features to use for conditional default probability estimation include pricing history features, a determination may be made if pricing history data for the selected security is available during the time period associated with the selected simulated market scenario. In another implementation, a determination may be made whether decision tree ensembles for estimating conditional default probability for the selected security exist. For example, if sufficient training data was not available, decision tree ensembles for estimating conditional default probability for the selected security may not have been trained. In one embodiment, the calculation of default probability for different assets may be parallelized using Apache Spark. The mapper function may partition by asset_id, such as CUSIP, and may use XGBoost to train a model for each asset. Features, such as company financials data and macro factors, may be distributed by asset id. The data frames for the XGBoost models may be stored as binary data as part of the calculation workflow to a relational database concurrently. The scoring process that generates a default probability distribution for each asset under various simulated market scenarios may also be parallelized with factor simulation data broadcasted to the worker nodes. The data storage design and parallel computing implementation of the MLPO allows each instrument to have its own XGBoost model. For example, the XGBoost model may be executed as follows:

```
model_function = generate_model(model_column, instrument_column,
ratio_column,
  factor_column, delta_length, time_series_length, delta_name,
  feature_engineering_function_name, xgb_function_name, sector_column,
  default_probability_column)
conditional_default_model = raw_data.rdd \
    .map(extract cusip)\
    .groupByKey(num_partitions)\
    .map(function_including_feature_engineering_and_xgb)
```

If sufficient estimation data is available (e.g., decision tree ensembles exist and pricing history data is available), the selected security's conditional default probability may be estimated using the decision tree ensembles trained to estimate conditional default probability for the selected security at 749. In one implementation, the decision tree ensembles may be queried to predict the selected security's conditional default probability based on the estimation data.

If sufficient estimation data is not available (e.g., decision tree ensembles do not exist or pricing history data is not available), the selected security's conditional default probability may be estimated using a machine learning (ML) method at 753. In one implementation, the k-NN method may be used to estimate conditional default probability for the selected security by finding the closest modeled security to the selected security, and using the closest modeled security's estimated conditional default probability as a proxy of the selected security's estimated conditional default probability. For example, the features to utilize for conditional default probability estimation may be used as inputs to the k-NN to find the closest modeled security.

Default for the selected security under the selected simulated market scenario may be simulated at 757. In one implementation, the value of a random variable that has values corresponding to Default (e.g., with probability equal to: the selected security's conditional default probability) and No Default (e.g., with probability equal to: 1—the selected security's conditional default probability) expected return types may be simulated. For example, the value of the random variable may be randomly generated from a standard normal distribution as a number from 0 to 1. If the number is smaller than the estimated conditional default probability, the default value is set to 1 (Default), otherwise to 0 (No Default) (e.g., if the conditional default probability for market scenario 10001 is 10% and the randomly generated number is 0.312, then the asset's default flag for scenario 10001 is set to 0 (No Default); if the randomly generated number is 0.05, which is smaller than 0.1 (10% default probability), then the asset's default flag for scenario 10001 is set to 1 (Default)).

A determination may be made at 761 whether the expected return type for the selected security under the selected simulated market scenario is Default or No Default. If the expected return type is No Default, an expected return for the selected security under the selected simulated market scenario may be calculated at 765. For example, the expected return (ER) may be calculated as follows:

Fixed Income Assets—No Default:

$$ER = \sum_{factor=1}^{n} \text{Exposure}(f, i) \times \text{Conditional Beta}(i, m) \times \text{Simulated Factor Change}(f, m) + \text{Carry} + \text{Rolldown}$$

Equity Assets—No Default:

$$ER = \text{Conditional Beta}(i, m) \times \text{Simulated Return of Equity Index}(f, m)$$

Where:

f is the number of market factors for which an instrument has price sensitivities i is the number of instruments in the investable universe Exposure is a f by i matrix that contains instruments' return sensitivities to market factors. They are calculated as the Beta of instruments' return to the market factor change. For example, for fixed income instruments, the exposure to interest rate risk factors may be option adjusted durations. They may be calculated by moving the rates up and down "shocking the yield curve", discounting the cashflows of the bond while adjusting for optionality. The bigger the differences in present values for a given unit of interest rate shock, the higher the duration, aka "return sensitivity to rates".

m is the number of simulated market scenarios

For example, each instrument i may have a different Beta along each simulated market scenario Conditional Beta is a i by m matrix Simulated Factor Change is a f by m matrix; each market factor may have a simulated change value along each market scenario Equity Index is a market factor simulated along with other market factors Conditional beta may be calculated for individual equities against their respective equity indices for each simulated market scenario.

If the expected return type is Default, an expected return for the selected security under the selected simulated market scenario may be calculated at 769. For example, the expected return (ER) may be calculated as follows:

Fixed Income Assets—Default:

$$ER = \frac{((\text{Recovery Rate} \times 100) - \text{Price})}{\text{Price}}$$

Equity Assets—Default:

$$ER = 0$$

Where:

$$\text{Recovery Rate} = 1 - \frac{\text{Credit Spread}}{\text{Conditional Default Probability}}$$

The calculated expected returns may be stored in a database at 773. In one implementation, the calculated expected returns may be stored via an expected returns store request.

FIG. 7B illustrates embodiments of a computation engine architecture that supports and implements the business logic. In various implementations the computation engine may be characterized by the following features:

1: Parallel on Parallel Hierarchy and Flexible Calculation Dependencies: Use Apache AirFlow to define calculation workflow and enable concurrent processing of a single or multiple calculation module(s) and flexible dependencies. For example, 3 month, 6 month and 12 months (e.g., based on rolling window period length) simulations from multiple factor simulation models may be processed in parallel. The dependency management allows risk data maintenance and pushing risk analytics to a cloud based datamart (e.g., SnowFlake) upon the completion of asset return simulation for assets across time horizons and simulation models. Furthermore, within each calculation module, Apache Spark may be used to enable parallel computing of instruments. For example, to calculate 12 month asset return simulation for the deep learning model (asim1Y_DL_CMA), over 130,000 bond instruments may be distributed across hundreds of worker nodes in the cloud. This type of parallel on top of parallel technology approach maximizes the utilization of cloud based computing power and provides control and flexibility for defining calculation dependencies.

2: Self-Service: Computation capabilities may be authored by domain experts. Team members may orchestrate and assemble the capabilities and declare dependencies with custom built WDL (Workflow Declaration Language). In one implementation, YAML may be used as the WDL.

3: Heterogenous Platforms: Various computation platforms such as parallel computing using Apache Spark using Scala/Java/Python, distributed computing on Virtual Servers using Golang, SQL and shell scripts, and/or the like may be supported.

4: Event-Based: Tasks in the Workflow may be automatically triggered based on events.

5: Cloud provider Agnostic: Open source technologies such as Apache Airflow, Apache Spark and Postgresql, and/or the like may be leveraged.

6: Performance Optimization: Computation performance may be optimized by using network-optimized, memory-optimized and/or compute-optimized cloud instances based on the nature of the computation. Multiple jobs may be scheduled to single or multiple clusters.

7: Cost Optimization: Inexpensive commodity-grade virtual servers may be provisioned dynamically leveraging inexpensive Spot Instances or Reserved Instances.

An exemplary WDL that orchestrates the workflow and the dependencies may be implemented as follows:

```
default:
  owner: 'atim-de'
dag:
  dag_id: atim-pg-prod
  tasks:
    create_cluster:
      operator: PythonOperator
      python_callable: create_emr
      op_kwargs: {'num_core_nodes': 28}
    wait_for_cluster_completion:
      operator: PythonOperator
      python_callable: wait_for_completion
    terminate_cluster:
      operator: PythonOperator
      python_callable: terminate_emr
    bond_am:
      operator: PythonOperator
      python_callable: run_spark_job
      op_kwargs: {'file': 's3://codebase/bond_am.jar', 'conf':
's3://codebase/bond_am/app.conf', 'className': 'com.atim.data.ETLHashDirect'}
    fund_am:
      operator: PythonOperator
      python_callable: run_spark_job
      op_kwargs: {'file': 's3://codebase/fund_am.jar', 'conf':
's3://codebase/fund_am/app.conf', 'className': 'com.atim.data.ETLHashDirect'}
    bond_expo:
      operator: PythonOperator
      python_callable: run_spark_job
      op_kwargs: {'file': 's3://codebase/bond_expo.jar', 'conf':
's3://codebase/bond_expo/app.conf', 'className': 'com.atim.data.ETLHashDirect'}
```

-continued

```
    fund_expo:
      operator: PythonOperator
      python_callable: run_spark_job
      op_kwargs: {'file': 's3://codebase/fund_expo.jar', 'conf':
's3://codebase/fund_expo/app.conf', 'className': 'com.atim.data.ETLHashDirect'}
    merge_am:
      operator: PythonOperator
      python_callable: run_spark_job
      op_kwargs: {'file': 's3://codebase/merge_am.jar', 'conf':
's3://codebase/merge_am/app.conf', 'className': 'com.atim.data.S3MergeMapAm'}
    merge_expo:
      operator: PythonOperator
      python_callable: run_spark_job
      op_kwargs: {'file': 's3://codebase/merge_expo.jar', 'conf':
's3://codebase/merge_expo/app.conf', 'className': 'com.atim.data.S3MergeMap'}
    asim3M_DL_CMA:
      operator: PythonOperator
      python_callable: run_spark_job
      op_kwargs: {'file': 's3://codebase/postgres/main.py', 'pyFiles':
["s3://codebase/postgres/asim.zip"], 'args': ['atimProdConfig_DL_3M.yml']}
    asim6M_DL_CMA:
      operator: PythonOperator
      python_callable: run_spark_job
      op_kwargs: {'file': 's3://codebase/postgres/main.py', 'pyFiles':
["s3://codebase/postgres/asim.zip"], 'args': ratimProdConfig_DL_6M.yml']}
    asim1Y_DL_CMA:
      operator: PythonOperator
      python_callable: run_spark_job
      op_kwargs: {'file': 's3://codebase/postgres/main.py', 'pyFiles':
["s3://codebase/postgres/asim.zip"], 'args': ratimProdConfig_DL_1Y.yml']}
    asim1Y_DL_NONCMA:
      operator: PythonOperator
      python_callable: run_spark_job
      op_kwargs: {'file': 's3://codebase/postgres/main.py', 'pyFiles':
["s3://codebase/postgres/asim.zip"], 'args': ratimProdConfig_DL_1Y_NonCMA.yml']}
    asim3M_MV_CMA:
      operator: PythonOperator
      python_callable: run_spark_job
      op_kwargs: {'file': 's3://codebase/postgres/main.py', 'pyFiles':
["s3://codebase/postgres/asim.zip"], 'args': 'atimProdConfig_MV_3M.yml']}
    asim6M_MV_CMA:
      operator: PythonOperator
      python_callable: run_spark_job
      op_kwargs: {'file': 's3://codebase/postgres/main.py', 'pyFiles':
["s3://codebase/postgres/asim.zip"], 'args': 'atimProdConfig_MV_6M.yml']}
    asim1Y_MV_CMA:
      operator: PythonOperator
      python_callable: run_spark_job
      op_kwargs: {'file': 's3://codebase/postgres/main.py', 'pyFiles':
["s3://codebase/postgres/asim.zip"], 'args': 'atimProdConfig_MV_1Y.yml']}
    db_data_maintenance:
      operator: BashOperator
      bash_command: 'query'
    push_asset_to_snowflake:
      operator: BashOperator
      bash_command: "snowflake_asset.sh'"
    push_assetsim_to_snowflake:
      operator: BashOperator
      bash_command: "snowflake_assetsim.sh"
  dependancies:
    - create_cluster » wait_for_cluster_completion
    - wait_for_cluster_completion » bond_expo
    - bond_expo » fund_expo, bond_am, fund_am
    - bond_am, fund_am » merge_am
    - bond_expo, fund_expo » merge_expo
    - merge_am » merge_expo
    - merge_expo » asim3M_DL_CMA, asim6M_DL_CMA, asim1Y_DL_CMA, asim1Y_DL_NONCMA,
asim3M_MV_CMA, asim6M_MV_CMA, asim1Y_MV_CMA
    - asim3M_DL_CMA, asim6M_DL_CMA, asim1Y_DL_CMA, asim1Y_DL_NONCMA, asim3M_MV_CMA,
asim6M_MV_CMA, asim1Y_MV_CMA » terminate_cluster
    - terminate_cluster » db_data_maintenance
    - terminate_cluster » push_asset_to_snowflake
    - push_asset_to_snowflake » push_assetsim_to_snowflake
```

The visual view of the above workflow is illustrated at 702 in FIG. 7C.

Exemplary pseudo code that distributes the asset simulation across provisioned clusters of nodes is shown below. Exposure data in 'expo' and factor simulation data (encapsulated in the curried function fsim_func) may be broadcasted to the worker nodes for distributed computation.

```
Expo data are read and partitioned by asset_id:
expo_tall_sdf = self.sqlContext.read.jdbc(
    url=self.jdbc_conn_str,
    table=fexpo_sql,
    properties=conn_props
)
partition_meta = {
    'numPartitions': str(self.read_partitions),
    'partitionColumn': ' asset_id',
    'lowerBound': '0',
    'upperBound': str(self.select_fexpo_count(pricing_dt))
}
expo.rdd.map(fsim_func)
```

Calculations may be executed concurrently on the worker nodes using pseudo code such as shown below. Factor Sims may be broadcasted to the worker nodes.

```
def calculate_inst(x):
    """
    Performs dot product between row of Factor Exposer RDD (x)
    and Factor Sim matrix return as list of lists.
    """
    sy = asset_ref_dict.get(str(x.asset_id), { }).get("static_yield", Decimal('0.0'))
    # month to mature
    mon2mature = asset_ref_dict.get(str(x.asset_id), { }).get("month_to_mature", { })
    bias_coef = bias_coef_with_month2mature(mon2mature, horizon)
    # Dot product and set datatype as float
    fsim = fsim_vals.astype(float)
    fexpo = np.array(x)[fexpo_fctr_idx].astype(float)
    return_arry = fsim.dot(fexpo)
    # clip return via option price upper and lower
    p_lower = asset_ref_dict.get(str(x.asset_id), { }).get("price_lower", { })
    p_upper = asset_ref_dict.get(str(x.asset_id), { }).get("price_upper", { })
    return_clip = clip_lower_and_upper(p_lower, p_upper, return_arry)
    # add carry
    return_clip_plus_carry = np.array(return_clip).astype(float) + float(bias_coef) *
float(sy)
    # CVaR calculation
    cvar_minus =
np.mean(np.sort(return_clip_plus_carry)[:int(len(return_clip_plus_carry) *
cvar_percentile * 0.01)])
    return_int = array2int(return_clip_plus_carry)
    return [x.asset_id, x.pricing_dt, sim_id, return_int, float(cvar_minus)]
```

The generated asset simulation data may be populated into RDMS Postgresql and Enterprise Snowflake Data Lake in a wide format for optimal performance. The wide format is illustrated at 706 in FIG. 7C.

The wide format may be turned into a tall format for reporting and analysis as follows:

```
SELECT asset_id, sim_id, generate_series(0,7449) market_id, unnest(returns) as
returns
FROM prod.asset_sim_w
WHERE asset_id=2012082100000122 and sim_id=34 and pricing_dt='2020-06-05'
ORDER BY 1,2,3;
```

The tall format is illustrated at 710 in FIG. 7C. In this figure, market scenario identifier field scenario_identifier is referred to as market_id.

FIG. 8 shows a datagraph illustrating data flow(s) for the MLPO. In FIG. 8, a user client 804 (e.g., of a user) may send a portfolio construction request 821 to a MLPO server 806 to facilitate creating an optimized portfolio. For example, the user client may be a desktop, a laptop, a tablet, a smartphone, a smartwatch, and/or the like that is executing a client application. In one implementation, the portfolio construction request may include data such as a request identifier, optimization parameters (e.g., investable universe, time period, total investment amount, conditional value at risk (CVaR) percentile, CVaR threshold, whether to optimize relative to a benchmark portfolio, benchmark portfolio weights, integer quantity constraint, number of positions threshold (e.g., lower bound), position market value weight threshold (e.g., upper bound), etc.), and/or the like. In one embodiment, the user client may provide the following example portfolio construction request, substantially in the form of a HTTP(S) POST message including XML-formatted data, as provided below:

```
POST /portfolio_construction_request.php HTTP/1.1
Host: www.server.com
Content-Type: Application/XML
Content-Length: 667
<?XML version = "1.0" encoding = "UTF-8"?>
<portfolio_construction_request>
```

-continued

```
  <request_identifier>ID_request_11</request_identifier>
  <optimization_parameters>
    <investable_universe>Securities in S&P 500</investable_universe>
    <time_period>6 months</time_period>
    <total_amount>$1,000,000</total_amount>
    <CVAR_percentile>5%</CVAR_percentile>
    <CVAR_threshold>10%</CVAR_threshold>
    <is_relative_to_benchmark_portfolio>FALSE</is_relative_to_benchmark_portfolio>
    <integer_quantity_constraint>TRUE</integer_quantity_constraint>
    <number_of_positions_threshold>at least 30</number_of_positions_threshold>
    <position_weight_threshold>10%</position_weight_threshold>
  </optimization_parameters>
</portfolio_construction_request>
```

The MLPO server 806 may send an expected returns retrieve request 825 to a repository 810 to facilitate retrieving expected returns for securities in the portfolio universe for simulated scenarios (e.g., filtered) corresponding to the specified time period. In one implementation, the expected returns retrieve request may include data such as a request identifier, expected returns to retrieve specification, and/or the like. In one embodiment, the MLPO server may provide the following example expected returns retrieve request, substantially in the form of a HTTP(S) POST message including XML-formatted data, as provided below:

```
POST /expected_returns_retrieve_request.php HTTP/1.1
Host: www.server.com
Content-Type: Application/XML
Content-Length: 667
<?XML version = "1.0" encoding ="UTF-8"?>
<expected_returns_retrieve_request>
  <request_identifier>ID_request_12</request_identifier>
  <expected_returns_specification>
    <simulation_identifier>ID_sim_1</simulation_identifier>
    <scenario>
      <scenario_identifier>ID_scenario_1</scenario_identifier>
      <securities>MSFT, AAPL, ...</securities>
    </scenario>
    <scenario>
      <scenario_identifier>ID_scenario_2</scenario_identifier>
      <securities>MSFT, AAPL, ...</securities>
    </scenario>
    ...
  </expected_returns_specification>
</expected_returns_retrieve_request>
```

The repository 810 may send an expected returns retrieve response 829 to the MLPO server 806 with the requested expected returns data. In one implementation, the expected returns retrieve response may include data such as a response identifier, the requested expected returns data, and/or the like. In one embodiment, the repository may provide the following example expected returns retrieve response, substantially in the form of a HTTP(S) POST message including XML-formatted data, as provided below:

```
POST /expected_returns_retrieve_response.php HTTP/1.1
Host: www.server.com
Content-Type: Application/XML
Content-Length: 667
<?XML version = "1.0" encoding = "UTF-8"?>
<expected_returns_retrieve_response>
  <response_identifier>ID_response_12</response_identifier>
  <expected_returns>
    <scenario>
      <scenario_identifier>ID_scenario_1</scenario_identifier>
      <security>
        <security_identifier>MSFT</security_identifier>
```

-continued

```
        <expected_return>10%</expected_return>
      </security>
      <security>
        <security_identifier>AAPL</security_identifier>
        <expected_return>12%</expected_return>
      </security>
      ...
    </scenario>
    <scenario>
      <scenario_identifier>ID_scenario_2</scenario_identifier>
      <security>
        <security_identifier>MSFT</security_identifier>
        <expected_return>15%</expected_return>
      </security>
      <security>
        <security_identifier>AAPL</security_identifier>
        <expected_return>13%</expected_return>
      </security>
      ...
    </scenario>
    ...
  </expected_returns>
</expected_returns_retrieve_response>
```

A portfolio constructing (PC) component 833 may utilize data provided in the portfolio construction request and/or the expected returns retrieve response and/or via filters to determine and/or execute a set of tradeable buy and/or sell transactions to construct an optimized portfolio. See FIG. 9 for additional details regarding the PC component.

The MLPO server 806 may send an order execution request 837 to an exchange server 808 to facilitate executing a tradeable buy and/or sell transaction used to construct the optimized portfolio. In one implementation, the order execution request may include data such as a request identifier, order details, and/or the like. In one embodiment, the MLPO server may provide the following example order execution request, substantially in the form of a HTTP(S) POST message including XML-formatted data, as provided below:

```
POST /order_execution_request.php HTTP/1.1
Host: www.server.com
Content-Type: Application/XML
Content-Length: 667
<?XML version = "1.0" encoding = "UTF-8"?>
<order_execution_request>
  <request_identifier>ID_request_13</request_identifier>
  <order_details>
    <security_identifier>AAPL</security_identifier>
    <action>BUY</action>
    <quantity>1000 shares</quantity>
  </order_details>
</order_execution_request>
```

The exchange server 808 may send an order execution response 841 to the MLPO server 806 to confirm that the tradeable buy and/or sell transaction was executed successfully. In one implementation, the order execution response may include data such as a response identifier, a status, and/or the like. In one embodiment, the exchange server may provide the following example order execution response, substantially in the form of a HTTP(S) POST message including XML-formatted data, as provided below:

```
POST /order_execution_response.php HTTP/1.1
Host: www.server.com
Content-Type: Application/XML
Content-Length: 667
<?XML version = "1.0" encoding = "UTF-8"?>
<order_execution_response>
  <response_identifier>ID_response_13</response_identifier>
  <status>0K</status>
</order_execution_response>
```

The MLPO server 806 may send a portfolio construction response 845 to the user client 804 to inform the user that an optimized portfolio was constructed successfully. In one implementation, the portfolio construction response may include data such as a response identifier, a status, and/or the like. In one embodiment, the MLPO server may provide the following example portfolio construction response, substantially in the form of a HTTP(S) POST message including XML-formatted data, as Provided below:

```
POST /portfolio_construction_response.php HTTP/1.1
Host: www.server.com
Content-Type: Application/XML
Content-Length: 667
<?XML version = "1.0" encoding = "UTF-8"?>
<portfolio_construction_response>
  <response_identifier>ID_response_11</response_identifier>
  <status>0K</status>
</portfolio_construction_response>
```

FIG. 9 shows a logic flow illustrating embodiments of a portfolio constructing (PC) component for the MLPO. In FIG. 9, a portfolio construction request may be obtained at 901. For example, the portfolio construction request may be obtained as a result of a user requesting creation of an optimized portfolio.

Optimization parameters for constructing the optimized portfolio may be determined at 905. For example, the optimization parameters may include a universe of investment securities, investment amount, Conditional Value at Risk (CVaR) percentile, CVaR threshold, an investment time period, whether to optimize relative to a benchmark portfolio, benchmark portfolio weights, integer quantity constraint, and/or the like. In one implementation, the portfolio construction request may be parsed (e.g., using PHP commands) to determine the optimization parameters (e.g., based on the value of the optimization_parameters field). For example, the optimization parameters may be specified as follows:

Arguments 1. market_value=1e7
   Total amount of cash (e.g., in US dollars) provided for investment. Default 1e7. Note that (the holding portfolio market value)+(cash residue)=total_dollar_amount.
2. cvar_percentile=5
   The percentage of worst outcome. Default 5.
3. cvar_threshold=−450
   The expected loss at the cvar_percentile worst outcome. Default −450.
4. investable_universe
   A list of the assets that could be allocated.
5. asset_sim
   A 2d list, each row is a simulated scenario, and each column is an asset. The order of the columns should be the same as the order in the investable_universe.
6. asset_return
   A list of expected yields of the assets, with the same order of the investable_universe.
7. asset_price
   A list of price (e.g., in US dollar) of the assets with the same order of the investable_universe.
8. asset_min_denom
   A list of the minimum par-amount to purchase for each asset, following the same order in the investable_universe. Rescaled to quantity by dividing 100 inside the optimization solver.
9. asset_min_incrmnt
   A list of the par-amount increment to purchase for each asset, following the same order in the investable_universe. Rescaled to quantity by dividing 100 inside the optimization solver.

Additional Optional Arguments 10. pct_univ_allocated=0.8 when number of assets <=10 else 0.6
    The fraction of the allocated assets in all the assets. Default 0.8 when number of assets <=10, else 0.6.
11. allocation_ub=0.8*market_value/asset_price
    A 1d list of the upper bound of allocated quantity of each asset with the same order of the investable_universe. Default 0.8*market_value/asset_price.
12. allocation_lb=1e-3*market_value/asset_price
    A 1d list of the lower bound of allocated quantity of the allocated assets with the same order of the investable_universe. Default 1e-3*market_value/asset_price.
13. available_2_trade=market_value/asset_price
    A 1d list of the maximum available quantity of the assets with the same order of the investable_universe. Default market_value/asset_price.
14. is_allocate_neg_rtn=True
    Boolean. If True, assign zero weights to assets with negative expected return (in arg #6). Default True.
15. max_exe_time=120
    The maximum execution time in seconds. If no allocation solution found within the max_exe_time (e.g., default 2 mins), the optimization solver returns 0 for the assets.
16. is_relative=False
    Boolean. If True and tracking_error (arg #17) is not None and asset_quant_base (arg #18) is not None, relative algorithm may be triggered. Default False.
17. bmk_weight=None
    A 1d list of the allocation weights of the benchmark portfolio. Default is None. Note that when arg #16 is True, and arg #17 is not None, and arg #18 is not None, the relative algorithm may be triggered.
18. bmk_sim=None
    A 2d list of the simulation scenarios of the assets in the benchmark portfolio. Each row is a scenario, and each column is an asset. Rows follows the order of that in asset_sim(arg #5), and columns follow the order of that in bmk_weight(arg #17). Default None.

Note that when arg #16 is True, and arg #17 is not None, and arg #18 is not None, the relative algorithm may be triggered.

19. convergence_threshold=1e-3

The minimum delta of the objective function in the branch-and-cut searching algorithm.

Market scenarios to utilize for constructing the optimized portfolio may be determined at 907. In one embodiment, the market scenarios to utilize may be determined based on the simulation model (e.g., for a specified pricing date) and/or time period length selected by the user. For example, the user may choose to utilize simulated market scenarios generated using a deep learning neural network simulation model (e.g., for the specified pricing date) for a 3 month, 6 month or 1 year investment time period (e.g., as discussed with regard to FIGS. 2A-B), or to utilize simulated market scenarios generated using a multivariate mixture simulation model (e.g., for the specified pricing date) for a 3 month, 6 month or 1 year investment time period (e.g., as discussed with regard to FIG. 4). In another embodiment, the market scenarios to utilize may be determined based on filters applied to simulated market scenarios. For example, the user may choose to filter simulated market scenarios based on specified ranges of allowable values for specified customized market factors (e.g., as discussed with regard to FIG. 21), and/or based on specified business cycle settings (e.g., as discussed with regard to FIG. 27).

Expected returns of securities in the universe of investment securities for the determined market scenarios to utilize may be retrieved from a database at 909. For example, if the user wishes to construct an optimized portfolio for a 6 month investment time period using a deep learning neural network simulation model, expected returns of securities in the universe of investment securities for simulated market scenarios generated by the deep learning neural network simulation model for 6 month rolling window periods (e.g., for the 60,000 simulated scenarios) may be retrieved. In another example, if the user wishes to construct an optimized portfolio conditional on VIX rising more than 400 bps over a 3 month horizon, expected returns of securities in the universe of investment securities for filtered simulated market scenarios having VIX change greater than 400 bps over the 3 month horizon may be retrieved. In another example, if the user wishes to construct an optimized portfolio conditional on having Late business cycle over a 3 month horizon, expected returns of securities in the universe of investment securities for filtered simulated market scenarios associated with Late business cycle over the 3 month horizon may be retrieved (e.g., alternatively, weighted expected security returns may be utilized when multiple business cycles with associated business cycle weights are utilized). In one implementation, the expected returns may be retrieved via an expected returns retrieve request.

A determination may be made at 913 whether the optimized portfolio should be optimized relative to a benchmark portfolio. If so, starting securities weights may be initialized to benchmark portfolio weights at 917.

Portfolio securities weights may be optimized in accordance with the optimization parameters at 921. In one implementation, the PC component may perform a convex optimization to find a mixed integer linear programming (MILP) portfolio solution that ensures that tradable buy and sell transactions can be generated. The optimization objective may be set to maximize the expected portfolio return. In various embodiments, a variety of approaches may be used to perform the optimization. For example, one approach is to use stochastic optimization process to search for suboptimal weights of the asset for a fixed amount of time and/or iterations and select the solution with allowable CVaR and maximum returns. For example, a second approach is to use MILP to solve for the global optimum solution and use linear relaxation of CVaR constraint with the weights result in tradability for each security respecting the trading rules such as minimum denomination and minimum increments. For example, a third approach is to use linear relaxation of CVaR constraint, but use a binary branch and cut modified MILP implementation (BILP), where non-integer solutions are allowed for those bigger than the minimum denomination values. For example, a fourth approach is to use linear relaxation of CVaR constrain and conduct a direct linear programing optimization, allowing the allocated weights to be a non-integer (decimal) solution and rounding the trade quantity to the nearable tradable amount. In one embodiment, the optimization implementation may be solver independent. In various implementations, multiple linear programming, quadratic programming and mixed integer programming solvers may be supported, including both commercial solvers and open-source solvers (e.g., CVXOPT (SIMPLEX), GUROBI, scypy.optimize(interior point)). For example, the user may select which solvers to use from a portfolio construction graphical user interface.

Tradeable buy and/or sell transactions to execute may be determined at 925. In one embodiment, the tradeable buy and/or sell transactions are generated to make weights of securities in the optimized portfolio correspond to the determined optimized portfolio securities weights. In one implementation, the optimized portfolio may be a newly created portfolio. For example, tradeable buy transactions may be determined to obtain each security with a non-zero weight in accordance with its optimized portfolio weight. In another implementation, the optimized portfolio may be an existing portfolio (e.g., the benchmark portfolio). For example, tradeable buy and/or sell transactions may be determined to increase and/or reduce weights of securities in the existing portfolio to make the weight of each security correspond to its optimized portfolio weight.

The tradeable buy and/or sell transactions may be executed at 929. In one implementation, orders corresponding the tradeable buy and/or sell transactions may be sent to an exchange server via one or more order execution requests.

FIG. 10 shows a screenshot illustrating user interface(s) of the MLPO. In FIG. 10, an exemplary user interface (e.g., for a mobile device, for a website) for constructing an optimized portfolio is illustrated. Screen 1001 shows that a user may utilize a securities universe widget 1005 to specify a universe of investment securities. For example, the user may specify a set of equities, bonds, indexes, portfolio holdings, and/or the like. The user may utilize a benchmark widget 1007 to specify a benchmark portfolio relative to which the optimized portfolio should be optimized. The user may utilize a simulation model widget 1010 to specify a simulation model that should be utilized. The user may utilize a pricing date widget 1015 to specify a pricing date associated with the simulation model. The user may utilize a portfolio market value widget 1020 to specify an investment amount.

FIG. 11 shows a screenshot illustrating user interface(s) of the MLPO. In FIG. 11, an exemplary user interface (e.g., for a mobile device, for a website) for constructing an optimized portfolio is illustrated. Screen 1101 shows that the user may utilize a CVaR percentile widget 1105 to specify the percentile (e.g., 5%) of the worst return outcomes. The user may utilize a CVaR threshold widget 1110 to specify the expected loss (e.g., 7%) at the worst CVaR percentile outcomes (e.g., the expected loss based on a weighted average (e.g., weighted based on occurrence probability) of the worst 5% of return outcomes). The user may utilize an investment time period widget 1115 to specify the investment time frame (e.g., over a 3 month time period). The user may utilize optimization objective widgets 1120, 1125 to specify the optimization objective (e.g., maximize total return). Other portfolio construction constraints that may be specified by the user may include: maximum percentage market value (PMV) per allocated asset, minimum number of allocated assets per portfolio, and/or the like. The user may utilize an optimize widget 1130 to initiate the creation of the optimized portfolio.

FIG. 12 shows a screenshot illustrating user interface(s) of the MLPO. In FIG. 12, an exemplary user interface (e.g., for a mobile device, for a website) for constructing an optimized portfolio is illustrated. Screen 1201 shows exemplary values that the user may select using the CVaR percentile widget 1205, the CVaR threshold widget 1210, and the investment time period widget 1215. The user may utilize an expected return widget 1220 to view the expected return (e.g., −6.61%) of the optimized portfolio, the expected return (e.g., 0.81%) of the original portfolio before changes to the portfolio securities weights, and the difference in the expected return (e.g., −7.43%) between the two portfolios. The user may utilize a drawdown widget 1225 to view the expected loss (e.g., −7.00%) at the worst CVaR percentile outcomes for the optimized portfolio, the expected loss (e.g., −8.35%) at the worst CVaR percentile outcomes for the original portfolio before changes to the portfolio securities weights, and the difference in the expected loss at the worst CVaR percentile outcomes (e.g., 1.35) between the two portfolios. The user may utilize a return volatility widget 1230 to view the return volatility (e.g., 3.62%) of the optimized portfolio, the return volatility (e.g., 3.80%) of the original portfolio before changes to the portfolio securities weights, and the difference in the return volatility (e.g., −0.19%) between the two portfolios. The user may utilize a returns distribution widget 1235 to view how the returns distribution of the optimized portfolio compares to the returns distribution of the original portfolio before changes to the portfolio securities weights. The user may utilize a portfolio securities weights widget 1240 to view and/or modify portfolio securities weights of individual portfolio securities of the optimized portfolio. The user may utilize a portfolio securities returns widget 1245 to view expected returns of individual portfolio securities of the optimized portfolio. The user may utilize an execute widget 1255 to initiate the execution of tradeable buy and/or sell transactions utilized to create the optimized portfolio.

FIG. 13 shows a datagraph illustrating data flow(s) for the MLPO. In FIG. 13, dashed lines indicate data flow elements that may be more likely to be optional. In FIG. 13, a user client 1304 (e.g., of a user) may send a predefined scenario construction request 1321 to a MLPO server 1306 to facilitate constructing a predefined scenario (e.g., a set of customized market factors used to generate a set of filtered simulated market scenarios). For example, the user client may be a desktop, a laptop, a tablet, a smartphone, a smartwatch, and/or the like that is executing a client application. In some alternative embodiments, the predefined scenario construction request may instead be sent by an administrative client 1302 (e.g., of an administrative user). In one implementation, the predefined scenario construction request may include data such as a request identifier, a user identifier, a predefined scenario identifier, a simulation model, a pricing date, and/or the like. In one embodiment, the user client may provide the following example predefined scenario construction request, substantially in the form of a HTTP(S) POST message including XML-formatted data, as provided below:

```
POST /predefined_scenario_construction_request.php HTTP/1.1
Host: www.server.com
Content-Type: Application/XML
Content-Length: 667
<?XML version = "1.0" encoding = "UTF-8"?>
<predefined_scenario_construction_request>
  <request_identifier>ID_request_21</request_identifier>
  <user_identifier>ID_user_1</user_identifier>
  <predefined_scenario_identifier>
    ID_predefined_scenario_1
  </predefined_scenario_identifier>
  <simulation_model>ID_neural_network_simulation_model_1Y</simulation_model>
  <pricing_date>2020-04-17</pricing_date>
</predefined_scenario_construction_request>
```

The MLPO server 1306 may send a scenario results retrieve request 1325 to a repository 1310 to facilitate retrieving simulated market scenarios associated with the specified simulation. In one implementation, the scenario results retrieve request may include data such as a request identifier, a simulation identifier (e.g., determined based on the specified pricing date and/or simulation model), a set of simulated market scenarios (e.g., filtered), and/or the like. In one embodiment, the MLPO server may provide the following example scenario results retrieve request, substantially in the form of a HTTP(S) POST message including XML-formatted data, as provided below:

```
POST /scenario_results_retrieve_request.php HTTP/1.1
Host: www.server.com
Content-Type: Application/XML
Content-Length: 667
<?XML version = "1.0" encoding = "UTF-8"?>
<scenario_results_retrieve_request>
  <request_identifier>ID_request_22</request_identifier>
  <simulation_identifier>ID_sim_1</simulation_identifier>
  <scenario_identifiers>ALL</scenario_identifiers>
</scenario_results_retrieve_request>
```

The repository 1310 may send a scenario results retrieve response 1329 to the MLPO server 1306 with the requested simulated market scenarios data. In one implementation, the scenario results retrieve response may include data such as a response identifier, the requested simulated market scenarios data, and/or the like. In one embodiment, the repository may provide the following example scenario results retrieve response, substantially in the form of a HTTP(S) POST message including XML-formatted data, as provided below:

```
POST /scenario_results_retrieve_response.php HTTP/1.1
Host: www.server.com
Content-Type: Application/XML
Content-Length: 667
<?XML version = "1.0" encoding = "UTF-8"?>
<scenario_results_retrieve_response>
  <response_identifier>ID_response_22</response_identifier>
  <scenarios_data>
    <scenario_data>
      <scenario_identifier>ID_scenario_1</scenario_identifier>
      <market_factor>
        <market_factor_identifier>ID_interest_rate_5Y</market_factor_identifier>
        <market_factor_change>25 basis points</market_factor_change>
      </market_factor>
      <market_factor>
        <market_factor_identifier>ID_oil_price</market_factor_identifier>
        <market_factor_change>$10</market_factor_change>
      </market_factor>
      ...
    </scenario_data>
    <scenario_data>
      <scenario_identifier>ID_scenario_2</scenario_identifier>
      <market_factor>
        <market_factor_identifier>ID_interest_rate_5Y</market_factor_identifier>
        <market_factor_change>50 basis points</market_factor_change>
      </market_factor>
      <market_factor>
        <market_factor_identifier>ID_oil_price</market_factor_identifier>
        <market_factor_change>$15</market_factor_change>
      </market_factor>
      ...
    </scenario_data>
    ...
  </scenarios_data>
</scenario_results_retrieve_response>
```

A predefined scenario constructing (PSC) component 1333 may utilize data provided in the predefined scenario construction request, data provided in the scenario results retrieve response, and/or data provided via scenario customization input to construct the predefined scenario. See FIGS. 14A-B for additional details regarding the PSC component.

The user client 1304 may send a scenario customization input 1337 to the MLPO server 1306 to specify a range of values for a customized market factor. In some alternative embodiments, the scenario customization input may instead be sent by the administrative client 1302. In one implementation, the scenario customization input may include data such as a request identifier, a market factor identifier, a minimum range value, a maximum range value, and/or the like. In one embodiment, the user client may provide the following example scenario customization input, substantially in the form of a HTTP(S) POST message including XML-formatted data, as provided below:

```
POST /scenario_customization_input.php HTTP/1.1
Host: www.server.com
Content-Type: Application/XML
Content-Length: 667
```

-continued

```
<?XML version = "1.0" encoding = "UTF-8"?>
<scenario_customization_input>
  <request_identifier>ID_request_23</request_identifier>
  <market_factor_identifier>ID_oil_price</market_factor_identifier>
  <minimum_range_value>-49.00</minimum_range_value>
  <maximum_range_value>19992.00</maximum_range_value>
</scenario_customization_input>
```

The MLPO server 1306 may send a scenario customization output 1341 to the user client 1304 to inform the user how ranges of values for other market factors have been affected by the change to the customized market factor. In some alternative embodiments, the scenario customization output may instead be sent to the administrative client 1302. In one implementation, the scenario customization output may include data such as a response identifier, ranges of values for market factors, and/or the like. In one embodiment, the MLPO server may provide the following example scenario customization output, substantially in the form of a HTTP(S) POST message including XML-formatted data, as provided below:

```
POST /scenario_customization_output.php HTTP/1.1
Host: www.server.com
Content-Type: Application/XML
Content-Length: 667
<?XML version = "1.0" encoding = "UTF-8"?>
```

-continued

```
<scenario_customization_output>
  <response_identifier>ID_response_23</response_identifier>
  <market_factors>
    <market_factor>
      <market_factor_identifier>ID_interest_rate_5Y</market_factor_identifier>
      <minimum_range_value>-115.00</minimum_range_value>
      <maximum_range_value>314.00</maximum_range_value>
      <average_range_value>75.03</average_range_value>
    </market_factor>
    <market_factor>
      <market_factor_identifier>ID_oil_price</market_factor_identifier>
      <minimum_range_value>-49.00</minimum_range_value>
      <maximum_range_value>19992.00</maximum_range_value>
      <average_range_value>2698.92</average_range_value>
    </market_factor>
      ...
  </market_factors>
</scenario_customization_output>
```

The MLPO server 1306 may send a predefined scenario store request 1345 to the repository 1310 to facilitate storing the constructed predefined scenario. In one implementation, the predefined scenario may be stored as a set of customized market factors and specified ranges of values for customized market factors in the set, and the predefined scenario store request may include data such as a request identifier, a user identifier, a predefined scenario identifier, a simulation model, a pricing date, ranges of values for market factors, and/or the like. In one embodiment, the MLPO server may provide the following example predefined scenario store request, substantially in the form of a HTTP(S) POST message including XML-formatted data, as provided below:

```
POST /predefined_scenario_store_request.php HTTP/1.1
Host: www.server.com
Content-Type: Application/XML
Content-Length: 667
<?XML version = "1.0" encoding = "UTF-8"?>
<predefined_scenario_store_request>
  <request_identifier>ID_request_24</request_identifier>
  <user_identifier>ID_user_1</user_identifier>
  <predefined_scenario_identifier>
    ID_predefined_scenario_1
  </predefined_scenario_identifier>
  <simulation_model>ID_neural_network_simulation_model_1Y</simulation_model>
  <pricing_date>2020-04-17</pricing_date>
  <customized_market_factors>
    <customized_market_factor>
      <market_factor_identifier>ID_oil_price</market_factor_identifier>
      <minimum_range_value> −49.00</minimum_range_value>
      <maximum_range_value>19992.00</maximum_range_value>
      <average_range_value>2698.92</average_range_value>
    </customized_market_factor>
    <customized_market_factor>
      <market_factor_identifier>ID_interest_rate_6M</market_factor_identifier>
      <minimum_range_value>40.00</minimum_range_value>
      <maximum_range_value>333.00</maximum_range_value>
      <average_range_value>132.76</average_range_value>
    </customized_market_factor>
  </customized_market_factors>
</predefined_scenario_store_request>
```

In another implementation, the predefined scenario may be stored as a set of simulated market scenarios that satisfy specified ranges of values for customized market factors, and the predefined scenario store request may include data such as a request identifier, a user identifier, a predefined scenario identifier, a simulation identifier, a set of simulated market scenarios (e.g., filtered), and/or the like. In one embodiment, the MLPO server may provide the following example predefined scenario store request, substantially in the form of a HTTP(S) POST message including XML-formatted data, as provided below:

```
POST /predefined_scenario_store_request.php HTTP/1.1
Host: www.server.com
Content-Type: Application/XML
Content-Length: 667
<?XML version = "1.0" encoding = "UTF-8"?>
```

-continued

```
<predefined_scenario_store_request>
  <request_identifier>ID_request_24</request_identifier>
  <user_identifier>ID_user_1</user_identifier>
  <predefined_scenario_identifier>
    ID_predefined_scenario_1
  </predefined_scenario_identifier>
  <simulation_identifier>ID_sim_1</simulation_identifier>
  <scenario_identifiers>ID_scenario_1, ID_scenario_2, ...</scenario_identifiers>
</predefined_scenario_store_request>
```

The repository 1310 may send a predefined scenario store response 1349 to the MLPO server 1306 to confirm that the constructed predefined scenario was stored successfully. In one implementation, the predefined scenario store response may include data such as a response identifier, a status, and/or the like. In one embodiment, the repository may provide the following example predefined scenario store response, substantially in the form of a HTTP(S) POST message including XML-formatted data, as provided below:

```
POST /predefined_scenario_store_response.php HTTP/1.1
Host: www.server.com
Content-Type: Application/XML
Content-Length: 667
<?XML version = "1.0" encoding = "UTF-8"?>
<predefined_scenario_store_response>
  <response_identifier>ID_response_24</response_identifier>
  <status>OK</status>
</predefined_scenario_store_response>
```

The MLPO server 1306 may send a predefined scenario construction response 1353 to the user client 1304 to inform the user that the constructed predefined scenario was stored successfully. In some alternative embodiments, the predefined scenario construction response may instead be sent to the administrative client 1302. In one implementation, the predefined scenario construction response may include data such as a response identifier, a status, and/or the like. In one embodiment, the MLPO server may provide the following example predefined scenario construction response, substantially in the form of a HTTP(S) POST message including XML-formatted data, as provided below:

```
POST /predefined_scenario_construction_response.php HTTP/1.1
Host: www.server.com
Content-Type: Application/XML
Content-Length: 667
<?XML version = "1.0" encoding = "UTF-8"?>
<predefined_scenario_construction_response>
  <response_identifier>ID_response_21</response_identifier>
  <status>OK</status>
</predefined_scenario_construction_response>
```

FIGS. 14A-B show a logic flow illustrating embodiments of a predefined scenario constructing (PSC) component for the MLPO. In FIG. 14A, a predefined scenario construction request may be obtained at 1401. For example, the predefined scenario construction request may be obtained as a result of a user requesting construction of a predefined scenario.

Market scenarios to utilize for constructing the predefined scenario may be determined at 1405. In one embodiment, the market scenarios to utilize may be determined based on the simulation model (e.g., for a specified pricing date) and/or time period length selected by the user. In another embodiment, the market scenarios to utilize may be determined based on filters applied to simulated market scenarios. In one implementation, the predefined scenario construction request may be parsed (e.g., using PHP commands) to determine the market scenarios to utilize (e.g., based on the values of the simulation_model and/or pricing_date fields). For example, the selected simulation model and/or pricing date may be used to determine a simulation identifier (e.g., ID_sim_1) of the corresponding simulation (e.g., a set of simulated market scenarios).

The market scenarios to utilize may be retrieved from a database at 1409. In one implementation, the market scenarios to utilize may be retrieved via a scenario results retrieve request.

Market factors to process may be determined at 1413. For example, market factors may include interest rates, credit spread, oil price, equity indices, and/or the like. In one implementation, the market factors to process may be determined based on market factors utilized in the simulation. For example, the market factors to process may be determined via a MySQL database command similar to the following:

```
SELECT scenarioMarketFactorID
FROM ScenarioResults
WHERE simulationID = ID_sim_1;
```

In another implementation, a set of default market factors to process may be specified in a configuration setting.

A determination may be made at 1417 whether there remain market factors to process. In one implementation, each of the market factors may be processed. If there remain market factors to process, the next market factor (e.g., 6 month change in oil price) may be selected for processing at 1421.

A factor group for the selected market factor may be determined at 1425. In one embodiment, market factors may be organized into factor groups to facilitate searching for market factors by the user. For example, the change in oil prices market factor may be associated with the Macro factor group. In one implementation, the factor group associated with each market factor may be specified in a configuration setting. In some implementations, multiple factor groups may be associated with a market factor.

A range of market factor values for the selected market factor may be determined at 1429. For example, the range may include a minimum market factor value, a maximum market factor value, an average market factor value, and/or the like for the market scenarios to utilize. In one implementation, the range of market factor values for each market factor may be precalculated. For example, the range of market factor values for the selected market factor may be determined via a MySQL database command similar to the following:

```
SELECT simulationMarketFactorRangeMin,
   simulationMarketFactorRangeMax,
   simulationMarketFactorRangeAverage
FROM ScenarioResults
WHERE simulationID = ID_sim_1 AND scenarioMarketFactorID =
ID_oil_price;
```

In another implementation, the range of market factor values for each market factor may be determined by iterating through the market scenarios to utilize and calculating the range based on the market factor values for the market scenarios to utilize. For example, the range of market factor values for the selected market factor may be determined via a MySQL database command similar to the following:

```
SELECT MIN(scenarioSimulatedMarketFactorChange),
   MAX(scenarioSimulatedMarketFactorChange),
   AVG(scenarioSimulatedMarketFactorChange)
FROM ScenarioResults
WHERE simulationID = ID_sim_1 AND scenarioMarketFactorID =
ID_oil_price;
```

A set of customized market factors may be determined at 1433. For example, a market factor may be customized by specifying a subrange of allowable values for the market factor. In one embodiment, the user may utilize a user interface widget to create a new predefined scenario (e.g., with no customized market factors). In another embodiment, the user may utilize a user interface widget to select an existing predefined scenario with a set of customized market factors. In one implementation, the set of customized market factors for a predefined scenario (e.g., with identifier ID_predefined_scenario_1) may be retrieved from a database. For example, the set of customized market factors for the predefined scenario may be determined via a MySQL database command similar to the following:

```
SELECT customizedMarketFactorID
FROM PredefinedScenarios
WHERE predefinedScenarioID = ID_predefined_scenario_1;
```

The market scenarios to utilize may be filtered based on the set of customized market factors at 1437. In one embodiment, the market scenarios to utilize may be filtered to the subset of market scenarios that satisfy the subrange of allowable values for each customized market factor. See FIG. 14B for additional details regarding filtering the market scenarios to utilize based on customized market factors.

A determination may be made at 1441 whether there remain market factors to process. In one implementation, each of the market factors may be processed to determine ranges for the filtered market scenarios. If there remain market factors to process, the next market factor (e.g., 6 month change in oil price) may be selected for processing at 1445.

A determination may be made at 1449 whether there remain filtered market scenarios to analyze. In one implementation, each of the filtered market scenarios may be analyzed. If there remain filtered market scenarios to analyze, the next filtered market scenario (e.g., with identifier ID_scenario_1) may be selected for analysis at 1453.

A market factor value of the selected market factor for the selected filtered market scenario may be determined at 1457. In one implementation, the market factor value may be retrieved from a database. For example, the market factor value of the selected market factor for the selected market scenario may be determined via a MySQL database command similar to the following:

```
SELECT scenarioSimulatedMarketFactorChange
FROM ScenarioResults
WHERE simulationID = ID_sim_1 AND scenarioID = ID_
   scenario_1 AND scenarioMarketFactorID = ID_oil_price;
```

The determined market factor values may be analyzed to determine a range of filtered market factor values for the selected market factor at 1461. For example, the range may include a minimum market factor value, a maximum market factor value, an average market factor value, and/or the like for the filtered market scenarios.

A visualization of the market factors may be generated at 1465. In one embodiment, the visualization may show the range of unfiltered market factor values and/or the range of filtered market factor values for each of the market factors. In one implementation, a user interface widget may be generated for each of the market factors showing the range of unfiltered market factor values and/or the range of filtered market factor values for the respective market factor. See FIGS. 15-19 for examples of visualizations that may be generated.

A determination may be made at 1469 whether a scenario customization input was obtained from the user. In one embodiment, the scenario customization input may be a user interface input from the user with a user-specified range of allowable values for an updated market factor. If a scenario customization input was obtained, the specified range of allowable values for the updated market factor may be determined at 1473. For example, the user may specify an updated subrange of allowable values for a customized market factor (e.g., an existing customized market factor, a newly customized market factor). In another example, the user may specify that a previously customized market factor should no longer be customized (e.g., by updating the subrange of allowable values to the full range for the previously customized market factor). In one implementation, the scenario customization input may be parsed (e.g., using PHP commands) to determine the specified range of allowable values for the updated market factor (e.g., based on the values of the market_factor_identifier, minimum_range_value, and/or maximum_range_value fields). The set of customized market factors may be updated at 1477. In one embodiment, a newly customized market factor may be added to the set of customized market factors. In another embodiment, a previously customized market factor may be removed from the set of customized market factors. In one implementation, a list (e.g., an array of market factor identifiers, a map of market factor identifier values to customized status Boolean values) of customized market factors may be updated. The market scenarios to utilize may be filtered based on the updated set of customized market factors and an updated visualization of the market factors may be generated as discussed with regard to 1437-1465.

A determination may be made at 1481 whether a scenario save input was obtained from the user. In one embodiment, the scenario save input may be a user interface input from the user indicating that the predefined scenario should be saved. If a scenario save input was obtained, the predefined scenario may be stored at 1485. In one implementation, the predefined scenario may be stored via a predefined scenario store request.

FIG. 14B shows additional details regarding filtering the market scenarios to utilize based on customized market factors. In FIG. 14B, filtered market scenarios (e.g., an array of filtered market scenario identifiers, a map of market scenario identifier values to filtered status Boolean values) may be set to the market scenarios to utilize at 1402 (e.g., to clear any previously set filters).

A determination may be made at 1406 whether there remain customized market factors to process. In one implementation, each of the market factors in the set of customized market factors may be processed. If there remain customized market factors to process, the next customized market factor may be selected for processing at 1410.

The specified range of allowable values for the selected customized market factor may be determined at 1414. For example, the specified range of allowable values may include a minimum value and a maximum value. In one implementation, the specified range of allowable values for the selected customized market factor may be determined as discussed with regard to 1473 (e.g., for a new user-specified range). In another implementation, the specified range of allowable values for the selected customized market factor may be retrieved from a database (e.g., for an existing predefined scenario). For example, the specified range of allowable values for the selected customized market factor may be determined via a MySQL database command similar to the following:

```
SELECT customizedMarketFactorRangeMin,
customizedMarketFactorRangeMax
FROM PredefinedScenarios
WHERE predefinedScenarioID = ID_predefined_scenario_1;
```

A determination may be made at 1418 whether there remain filtered market scenarios to analyze. In one implementation, each of the market scenarios that have not been removed from the filtered market scenarios (e.g., during processing of previously processed customized market factors) may be analyzed. If there remain filtered market scenarios to analyze, the next filtered market scenario may be selected for analysis at 1422.

A market factor value of the selected customized market factor for the selected filtered market scenario may be determined at 1426. In one implementation, the market factor value may be retrieved from a database. For example, the market factor value of the selected customized market factor for the selected filtered market scenario may be determined via a MySQL database command similar to the following:

```
SELECT scenarioSimulatedMarketFactorChange
FROM ScenarioResults
WHERE simulationID = ID_sim_1 AND scenarioID = ID_
  scenario_1 AND scenarioMarketFactorID = ID_oil_price;
```

A determination may be made at 1430 whether the determined market factor value is in the specified range of allowable values for the selected customized market factor. If the determined market factor value is outside the specified range of allowable values for the selected customized market factor, the selected filtered market scenario may be removed from the filtered market scenarios at 1434.

Once the customized market factors have been processed, the remaining filtered market scenarios may be returned at 1438. In one embodiment, the returned filtered market scenarios are market scenarios having market factor values that fall within the subrange of allowable values for each of the market factors in the set of customized market factors.

FIG. 15 shows a screenshot illustrating user interface(s) of the MLPO. In FIG. 15, an exemplary user interface (e.g., for a mobile device, for a website) for constructing a predefined scenario is illustrated. Screen 1501 shows that a user may utilize a load predefined scenario widget 1505 to select an existing predefined scenario (e.g., from predefined scenarios associated with the user's user identifier). The user may utilize an add new predefined scenario widget 1510 to create a new predefined scenario.

The user may utilize a pricing date widget 1515 and/or a simulation model widget 1520 to specify market scenarios to utilize. The user may search through market factors associated with the market scenarios to utilize by filtering displayed market factors using factor group filter widgets (e.g., 1525A-D). For example, utilizing All factor group widget 1525A may show unfiltered market factors associated with the market scenarios to utilize. In another example, utilizing Macro factor group widget 1525D may filter market factors to show market factors associated with the Macro factor group (e.g., change in oil price). The user may search through market factors associated with the market scenarios to utilize by filtering displayed market factors by market factor name using search by factor name widget 1527.

The user may view and/or modify ranges of allowable values for each market factor using market factor widgets (e.g., 1530A-C). For example, screen 1501 shows that ranges of allowable values for the market factors have not been modified (e.g., there are no customized market factors).

FIG. 16 shows a screenshot illustrating user interface(s) of the MLPO. In FIG. 16, an exemplary user interface (e.g., for a mobile device, for a website) for constructing a predefined scenario is illustrated. Screen 1601 shows that the user may modify ranges of allowable values for market factors of a predefined scenario (e.g., an existing predefined scenario selected using the load predefined scenario widget 1605, a new predefined scenario created using the add new predefined scenario widget 1610) using allowable range widgets (e.g., 1635A-C). Screen 1601 shows that when the user modifies the range of allowable values for a market factor, an updated visualization showing how ranges of allowable values for the market factors have been affected may be generated. For example, if the user modifies (e.g., using widget 1635B) the range of allowable values for the 6 month interest rate market factor (e.g., shown in widget 1630B (e.g., rearranged in order and/or highlighted to indicate a customized market factor)), an updated visualization showing how the range of allowable values (e.g., shown in widget 1635A) for the 3 month interest rate market factor (e.g., shown in widget 1630A) and how the range of allowable values (e.g., shown in widget 1635C) for the 1 year interest rate market factor (e.g., shown in widget 1630C) have changed based on the user-specified scenario customization input may be generated.

FIG. 17 shows a screenshot illustrating user interface(s) of the MLPO. In FIG. 17, an exemplary user interface (e.g., for a mobile device, for a website) for constructing a predefined scenario is illustrated. Screen 1701 shows that the user may utilize the Macro factor group widget 1725D to view how the ranges of allowable values (e.g., shown in widgets 1735D-F) for market factors associated with the Macro factor group (e.g., shown in widget 1730D-F) have changed based on the user-specified scenario customization input.

FIG. 18 shows a screenshot illustrating user interface(s) of the MLPO. In FIG. 18, an exemplary user interface (e.g., for a mobile device, for a website) for constructing a predefined scenario is illustrated. Screen 1801 shows that when the user modifies the range of allowable values for another market factor (e.g., associated with the Macro factor group), an updated visualization showing how ranges of allowable values for the market factors have been affected (e.g., based on both modifications) may be generated. For example, if the user modifies (e.g., using widget 1835D) the range of allowable values for the oil price market factor (e.g., shown in widget 1830D (e.g., rearranged in order and/or highlighted to indicate a customized market factor)), an updated visualization showing how the range of allowable values (e.g., shown in widget 1835E) for the VIX market factor (e.g., shown in widget 1830E) and how the range of allowable values (e.g., shown in widget 1835F) for the Commodities market factor (e.g., shown in widget 1830F) have changed based on the two user-specified scenario customization inputs may be generated.

FIG. 19 shows a screenshot illustrating user interface(s) of the MLPO. In FIG. 19, an exemplary user interface (e.g., for a mobile device, for a website) for constructing a predefined scenario is illustrated. Screen 1901 shows that the user may utilize the All factor group widget 1925A to view how the ranges of allowable values for the market factors have changed based on the user-specified scenario customization inputs. For example, market factor widget 1930A shows how the range of allowable values (e.g., shown in widget 1935A) for the 3 month interest rate market factor has changed based on the user-specified changes to the range of allowable values (e.g., shown in widget 1935B) for the 6 month interest rate market factor (e.g., shown in widget 1930B) and to the range of allowable values (e.g., shown in widget 1935D) for the oil price market factor (e.g., shown in widget 1930D). The user may save the predefined scenario using a save widget 1940.

FIG. 20 shows a datagraph illustrating data flow(s) for the MLPO. In FIG. 20, dashed lines indicate data flow elements that may be more likely to be optional. In FIG. 20, a user client 2004 (e.g., of a user) may send a portfolio returns visualization request 2021 to a MLPO server 2006 to facilitate generating a portfolio returns visualization based on customized market factors. For example, the user client may be a desktop, a laptop, a tablet, a smartphone, a smartwatch, and/or the like that is executing a client application. In one implementation, the portfolio returns visualization request may include data such as a request identifier, a user identifier, a predefined scenario identifier, a simulation model, a pricing date, a portfolio identifier, and/or the like. In one embodiment, the user client may provide the following example portfolio returns visualization request, substantially in the form of a HTTP(S) POST message including XML-formatted data, as provided below:

```
POST /portfolio_returns_visualization_request.php HTTP/1.1
Host: www.server.com
Content-Type: Application/XML
Content-Length: 667
<?XML version = "1.0" encoding = "UTF-8"?>
<portfolio_returns_visualization_request>
  <request_identifier>ID_request_31</request_identifier>
  <user_identifier>ID_user_1</user_identifier>
  <predefined_scenario_identifier>
    ID_predefined_scenario_1
  </predefined_scenario_identifier>
  <simulation_model>ID_neural_network_simulation_model_
```

-continued

```
 1Y</simulation_model>
  <pricing_date>2020-04-17</pricing_date>
  <portfolio_identifier>ID_portfolio_1</portfolio_identifier>
</portfolio_returns_visualization_request>
```

The MLPO server 2006 may send an expected returns retrieve request 2023 to a repository 2010 to facilitate retrieving expected returns for securities in the portfolio for simulated scenarios corresponding to the specified simulation (e.g., with a simulation identifier determined based on the specified pricing date and/or simulation model). In one implementation, the expected returns retrieve request may include data such as a request identifier, expected returns to retrieve specification, and/or the like. In one embodiment, the MLPO server may provide the following example expected returns retrieve request, substantially in the form of a HTTP(S) POST message including XML-formatted data, as provided below:

```
POST /expected_returns_retrieve_request.php HTTP/1.1
Host: www.server.com
Content-Type: Application/XML
Content-Length: 667
<?XML version = "1.0" encoding = "UTF-8"?>
<expected_returns_retrieve_request>
  <request_identifier>ID_request_32</request_identifier>
  <expected_returns_specification>
    <simulation_identifier>ID_sim_1</simulation_identifier>
    <scenario>
      <scenario_identifier>ID_scenario_1</scenario_identifier>
      <securities>MSFT, AAPL, ...</securities>
    </scenario>
    <scenario>
      <scenario_identifier>ID_scenario_2</scenario_identifier>
      <securities>MSFT, AAPL, ...</securities>
    </scenario>
    ...
  </expected_returns_specification>
</expected_returns_retrieve_request>
```

The repository 2010 may send an expected returns retrieve response 2025 to the MLPO server 2006 with the requested expected returns data. In one implementation, the expected returns retrieve response may include data such as a response identifier, the requested expected returns data, and/or the like. In one embodiment, the repository may provide the following example expected returns retrieve response, substantially in the form of a HTTP(S) POST message including XML-formatted data, as provided below:

```
POST /expected_returns_retrieve_response.php HTTP/1.1
Host: www.server.com
Content-Type: Application/XML
Content-Length: 667
<?XML version = "1.0" encoding = "UTF-8"?>
<expected_returns_retrieve_response>
  <response_identifier>ID_response_32</response_identifier>
  <expected_returns>
    <scenario>
      <scenario_identifier>ID_scenario_1</scenario_identifier>
      <security>
        <security_identifier>MSFT</security_identifier>
        <expected_return>10%</expected_return>
      </security>
      <security>
        <security_identifier>AAPL</security_identifier>
        <expected_return>12%</expected_return>
      </security>
      ...
```

-continued

```
    </scenario>
    <scenario>
        <scenario_identifier>ID_scenario_2</scenario_identifier>
        <security>
            <security_identifier>MSFT</security_identifier>
            <expected_return>15%</expected_return>
        </security>
        <security>
            <security_identifier>AAPL</security_identifier>
```

-continued

```
            <expected_return>13%</expected_return>
        </security>
        ...
    </scenario>
    ...
  </expected_returns>
</expected_returns_retrieve_response>
```

The MLPO server 2006 may send a predefined scenario retrieve request 2027 to the repository 2010 to facilitate retrieving the specified predefined scenario. In one implementation, the predefined scenario retrieve request may include data such as a request identifier, a user identifier, a predefined scenario identifier, and/or the like. In one embodiment, the MLPO server may provide the following example predefined scenario retrieve request, substantially in the form of a HTTP(S) POST message including XML-formatted data, as provided below:

```
POST /predefined_scenario_retrieve_request.php HTTP/1.1
Host: www.server.com
Content-Type: Application/XML
Content-Length: 667
<?XML version = "1.0" encoding = "UTF-8"?>
<predefined_scenario_retrieve_request>
  <request_identifier>ID_request_33</request_identifier>
  <user_identifier>ID_user_1</user_identifier>
  <predefined_scenario_identifier>
    ID_predefined_scenario_1
  </predefined_scenario_identifier>
</predefined_scenario_retrieve_request>
```

The repository 2010 may send a predefined scenario retrieve response 2029 to the MLPO server 2006 with the requested predefined scenario data. In one implementation, the predefined scenario retrieve response may include data such as a response identifier, the requested predefined scenario data, and/or the like. In one embodiment, the repository may provide the following example predefined scenario retrieve response, substantially in the form of a HTTP(S) POST message including XML-formatted data, as provided below:

```
POST /predefined_scenario_retrieve_response.php HTTP/1.1
Host: www.server.com
Content-Type: Application/XML
Content-Length: 667
<?XML version = "1.0" encoding = "UTF-8"?>
<predefined_scenario_retrieve_response>
  <response_identifier>ID_response_33</response_identifier>
  <customized_market_factors>
    <customized_market_factor>
      <market_factor_identifier>ID_oil_price</market_factor_identifier>
      <minimum_range_value>-49.00</minimum_range_value>
      <maximum_range_value>19992.00</maximum_range_value>
      <average_range_value>2698.92</average_range_value>
    </customized_market_factor>
    <customized_market_factor>
      <market_factor_identifier>ID_interest_rate_6M</market_factor_identifier>
      <minimum_range_value>40.00</minimum_range_value>
      <maximum_range_value>333.00</maximum_range_value>
      <average_range_value>132.76</average_range_value>
    </customized_market_factor>
  </customized_market_factors>
</predefined_scenario_retrieve_response>
```

A scenario based portfolio returns visualizing (SPRY) component 2033 may utilize data provided in the portfolio returns visualization request to generate a portfolio return metrics visualization. See FIG. 21 for additional details regarding the SPRV component.

The MLPO server 2006 may send a portfolio returns visualization response 2037 to the user client 2004 to provide a visualization of portfolio return metrics for the specified portfolio under the specified predefined scenario. In one implementation, the portfolio returns visualization response may include data such as a response identifier, visualization data, and/or the like. In one embodiment, the MLPO server may provide the following example portfolio returns visualization response, substantially in the form of a HTTP(S) POST message including XML-formatted data, as provided below:

```
POST /portfolio_returns_visualization_response.php HTTP/1.1
Host: www.server.com
Content-Type: Application/XML
Content-Length: 667
<?XML version = "1.0" encoding = "UTF-8"?>
<portfolio_returns_visualization_response>
  <response_identifier>ID_response_31</response_identifier>
  <visualization_data>
    portfolio return metrics data (e.g., constituent securities' and/or
    portfolio's returns, worst returns, return volatility, frequency
    vs. returns data)
  </visualization_data>
</portfolio_returns_visualization_response>
```

If the user customizes a market factor, the user client 2004 may send a visualization scenario customization input 2041 to the MLPO server 2006 specifying a range of values for the customized market factor (e.g., to modify the predefined scenario). In one implementation, the visualization scenario customization input may include data such as a request identifier, a market factor identifier, a minimum range value, a maximum range value, and/or the like. In one embodiment, the user client may provide the following example visualization scenario customization input, substantially in the form of a HTTP(S) POST message including XML-formatted data, as provided below:

```
POST /visualization_scenario_customization_input.php HTTP/1.1
Host: www.server.com
Content-Type: Application/XML
Content-Length: 667
<?XML version = "1.0" encoding = "UTF-8"?>
<visualization_scenario_customization_input>
  <request_identifier>ID_request_34</request_identifier>
  <market_factor_identifier>ID_VIX</market_factor_identifier>
  <minimum_range_value>913.00</minimum_range_value>
  <maximum_range_value>5141.00</maximum_range_value>
</visualization_scenario_customization_input>
```

The MLPO server 2006 may send a visualization scenario customization output 2045 to the user client 2004 to provide an updated visualization of portfolio return metrics for the specified portfolio (e.g., under the modified predefined scenario). In one implementation, the visualization scenario customization output may include data such as a response identifier, visualization data, and/or the like. In one embodiment, the MLPO server may provide the following example visualization scenario customization output, substantially in the form of a HTTP(S) POST message including XML-formatted data, as provided below:

```
POST /visualization_scenario_customization_output.php HTTP/1.1
Host: www.server.com
Content-Type: Application/XML
Content-Length: 667
<?XML version = "1.0" encoding = "UTF-8"?>
<visualization_scenario_customization_output>
  <response_identifier>ID_response_34</response_identifier>
  <visualization_data>
    portfolio return metrics data (e.g., constituent securities' and/or
    portfolio's returns, worst returns, return volatility, frequency
    vs. returns data)
  </visualization_data>
</visualization_scenario_customization_output>
```

FIG. 21 shows a logic flow illustrating embodiments of a scenario based portfolio returns visualizing (SPRY) component for the MLPO. In FIG. 21, a portfolio returns visualization request may be obtained at 2101. For example, the portfolio returns visualization request may be obtained as a result of a user requesting generation of a portfolio returns visualization.

Market scenarios to utilize for generating the portfolio returns visualization may be determined at 2105. In one embodiment, the market scenarios to utilize may be determined based on the simulation model (e.g., for a specified pricing date) and/or time period length selected by the user. In another embodiment, the market scenarios to utilize may be determined based on filters applied to simulated market scenarios. In one implementation, the portfolio returns visualization request may be parsed (e.g., using PHP commands) to determine the market scenarios to utilize (e.g., based on the values of the simulation_model and/or pricing_date fields). For example, the selected simulation model and/or pricing date may be used to determine a simulation identifier (e.g., ID_sim_1) of the corresponding simulation (e.g., a set of simulated market scenarios).

Portfolio securities of a portfolio may be determined at 2109 and portfolio securities weights for the portfolio securities may be determined at 2113. In one embodiment, the portfolio securities and/or the corresponding portfolio securities weights may be retrieved from a database (e.g., based on a portfolio identifier). In one implementation, the portfolio returns visualization request may be parsed (e.g., using PHP commands) to determine the portfolio identifier (e.g., based on the value of the portfolio_identifier field). In another embodiment, the portfolio securities and/or the corresponding portfolio securities weights may be specified by the user. In one implementation, the portfolio returns visualization request may be parsed (e.g., using PHP commands) to determine the specified portfolio securities and/or the corresponding portfolio securities weights. In another embodiment, the portfolio securities and/or the corresponding portfolio securities weights may be determined based on an optimization. In one implementation, the portfolio securities and/or the corresponding portfolio securities weights may be determined as discussed with regard to the PC component.

Expected returns of the portfolio securities for the market scenarios to utilize may be retrieved from a database at 2117. For example, the expected returns may be cached to facilitate expected return metrics calculations. In one implementation, the expected returns may be retrieved via an expected returns retrieve request.

A determination may be made at 2121 whether there remain portfolio securities to process. In one implementation, each of the constituent portfolio securities may be processed. If there remain portfolio securities to process, the next security (e.g., with identifier MSFT) may be selected for processing at 2125.

A determination may be made at 2129 whether there remain market scenarios to analyze. In one implementation, each of the market scenarios to utilize may be analyzed. If there remain market scenarios to analyze, the next market scenario (e.g., with identifier ID_scenario_1) may be selected for analysis at 2133.

An expected return for the selected security for the selected market scenario may be determined at 2137. In one implementation, the expected return may be retrieved from cache. In another implementation, the expected return may be retrieved from a database. For example, the expected return for the selected security for the selected market scenario may be determined via a MySQL database command similar to the following:

```
SELECT linkedScenarioSecurityExpectedReturn
FROM ExpectedReturns
WHERE securityID = "MSFT" AND linkedSimulationID = ID_sim_1
  AND linkedScenarioID = ID_scenario_1;
```

Expected security return metrics for the selected security for the market scenarios to utilize may be calculated at 2141. For example, the expected security return metrics for a security may include the security's expected return, worst returns, return volatility, frequency vs. returns data, and/or the like. In one implementation, the expected security return metrics for each security may be determined by iterating through the market scenarios to utilize and calculating the expected security return metrics based on the expected returns (e.g., cached) for the market scenarios to utilize. For example, the expected return for the selected security for the market scenarios to utilize may be determined via a MySQL database command similar to the following:

```
SELECT AVG(linkedScenarioSecurityExpectedReturn)
FROM ExpectedReturns
WHERE securityID = "MSFT" AND linkedSimulationID = ID_sim_1;
```

Expected portfolio return metrics for the portfolio for the market scenarios to utilize may be calculated at 2145. For example, the expected portfolio return metrics for a portfolio may include the portfolio's expected return, worst returns, return volatility, frequency vs. returns data, and/or the like. In various implementations, the expected portfolio return metrics for the portfolio may be calculated using a weighted average (e.g., weighted based on the portfolio securities weights) of the expected security returns and/or of the calculated expected security return metrics for the constituent securities of the portfolio. For example, the following API may be utilized to determine the expected portfolio return metrics for the portfolio for the market scenarios to utilize:

Post API/Runanalysis

This API facilitates generating portfolio return metrics visualization for a specified portfolio (e.g., list of securities). The portfolio return metrics calculation results are included in the Summary object returned by the API.

The API returns HTTP/1.1 status code 201 if the request is successful. It returns 500 Internal Server Error if there is an exception.

Input Parameter Details

| Attribute name | Mandatory | Default | Description/Rule |
|---|---|---|---|
| securityInputs | Y | | Specify the initial investment |
| cash | N | 0 | Integer between 1 and 50 |
| modelId | Y | 1 | Integer, either 1 or 4 based on the model |
| simulationId | Y | 0 | Taxable = 1, Tax-Exempt = 0 |
| simulationInputs | Y | | List of factor min and max range for filtering of scenarios |
| businessCycleInputs | N | | List of business cycle inputs and associated percentages. (e.g., Late Cycle 50% and Recession 50%) |
| pricingDt | Y | | Current Pricing Date for which simulation data is available |

```
REQUEST
POST API/runAnalysis
Content-type: application/json
{
  "securityInputs": [{
      "fmrCusip": "EAFE",
      "description":"EAFE",
      "qty": 200000
    }, {
      "fmrCusip": "DHI270000",
      "description": "USTB 3.375% 11/15/48",
      "qty": 200000
    }
    ... .
  ],
  "cash": 0,
  "modelId": 1,
  "simulationId": 1,
  "pricingDt": "01/01/2020",
  "simulationInputs":[{
```

-continued

```
          "factorName": "VIX",
          "rangeStart": -3544,
          "rangeEnd": 5513
       }, {
          "factorName": "SP500",
          "rangeStart": -4648,
          "rangeEnd": 2947}
  ],
  "businessCycleInputs": [{
          cycleName: "Late",
          percentage: 100
       }, {
          cycleName: "Recession",
          percentage: 0
     }]
  ...
}
RESPONSE
201
Content-Type: application/json
{
  "summary": {
          "risk": 234.42.
          "avg5Percentile": -202.09
     },
  "marketReturns":[        {
          "marketId": 959,
          "bucketId": 4,
          "marketReturn": -434.16
       }, {
          "marketId": 2527,
          "bucketId": 6,
          "marketReturn": -252.16
       },
       ...
    ]
}
```

A visualization of the expected portfolio return metrics for the portfolio and/or of the expected security return metrics for the constituent securities of the portfolio for the market scenarios to utilize may be generated at 2149. In one implementation, user interface widgets showing the expected portfolio return metrics and/or the expected security return metrics may be generated via a portfolio returns visualization response. See FIGS. 22-25 for examples of visualizations that may be generated.

A determination may be made at 2153 whether a predefined scenario selection input was obtained from the user. In one embodiment, the predefined scenario selection input may be a user interface input from the user with a user-specified predefined scenario selection. For example, the user may select a predefined scenario to determine how expected portfolio return metrics for the portfolio and/or for the constituent securities of the portfolio would change with market factor customizations specified in the predefined scenario.

If a predefined scenario selection input was obtained, the set of customized market factors associated with the selected predefined scenario may be determined at 2157. In one implementation, the market factor customizations specified in the predefined scenario may be obtained via a predefined scenario retrieve response, and the predefined scenario retrieve response may be parsed (e.g., using PHP commands) to determine the set of customized market factors (e.g., based on the values of the market_factor_identifier fields).

The market scenarios to utilize may be filtered based on the set of customized market factors at 2161. In one embodiment, the market scenarios to utilize may be filtered to the subset of market scenarios that satisfy the subrange of allowable values for each customized market factor. See FIG. 14B for additional details regarding filtering the market scenarios to utilize based on customized market factors. In another embodiment, the market scenarios to utilize also may be filtered based on specified business cycle settings (e.g., as discussed with regard to FIG. 27).

Expected security return metrics for the portfolio securities for the filtered market scenarios may be calculated at 2165. In one implementation, the expected security return metrics for each constituent security of the portfolio may be determined by iterating through the filtered market scenarios and calculating the expected security return metrics based on the expected returns (e.g., cached) for the filtered market scenarios. For example, the expected return for a constituent security (e.g., MSFT) of the portfolio for the filtered market scenarios may be determined via a MySQL database command similar to the following:

```
SELECT AVG(linkedScenarioSecurityExpectedReturn)
FROM ExpectedReturns
WHERE securityID = "MSFT" AND linkedSimulationID = ID_sim_1
  AND linkedScenarioID IN (ID_scenario_1, ID_scenario_2, ...);
```

Expected portfolio return metrics for the portfolio for the filtered market scenarios may be calculated at 2169. In various implementations, the expected portfolio return metrics for the portfolio may be calculated using a weighted average (e.g., weighted based on the portfolio securities weights) of the expected security returns and/or of the calculated expected security return metrics for the constituent securities of the portfolio (e.g., via the API).

A visualization of the expected portfolio return metrics for the portfolio and/or of the expected security return metrics for the constituent securities of the portfolio for the filtered market scenarios may be generated at 2173. In one implementation, user interface widgets showing the expected portfolio return metrics and/or the expected security return metrics may be generated (e.g., via a portfolio returns visualization response, via a visualization scenario customization output). See FIGS. 22-25 for examples of visualizations that may be generated.

A determination may be made at 2177 whether a market factor customization input was obtained from the user (e.g., via a visualization scenario customization input). In one embodiment, the market factor customization input may be a user interface input from the user with a user-specified range of allowable values for an updated market factor. If a market factor customization input was obtained, the specified range of allowable values for the updated market factor may be determined at 2181. In one implementation, the visualization scenario customization input may be parsed (e.g., using PHP commands) to determine the specified range of allowable values for the updated market factor (e.g., based on the values of the market_factor_identifier, minimum_range_value, and/or maximum_range_value fields). The set of customized market factors may be updated at 2185. In one implementation, a list (e.g., an array of market factor identifiers, a map of market factor identifier values to customized status Boolean values) of customized market factors may be updated. Market scenarios to utilize may be filtered based on the updated set of customized market factors and an updated visualization of the expected portfolio return metrics for the portfolio and/or of the expected security return metrics for the constituent securities of the portfolio may be generated as discussed with regard to 2161-2173.

FIG. 22 shows a screenshot illustrating user interface(s) of the MLPO. In FIG. 22, an exemplary user interface (e.g., for a mobile device, for a website) for generating a portfolio returns visualization for a portfolio is illustrated. Screen 2201 shows that a user may utilize a scenario tab 2205 to specify predefined scenario settings. The user may utilize a load predefined scenario widget 2210 to select a predefined scenario (e.g., from predefined scenarios associated with the user's user identifier) used to filter market scenarios to utilize for generating a portfolio returns visualization.

FIG. 23 shows a screenshot illustrating user interface(s) of the MLPO. In FIG. 23, an exemplary user interface (e.g., for a mobile device, for a website) for generating a portfolio returns visualization for a portfolio is illustrated. Screen 2301 shows that the user may utilize market factor widgets (e.g., 2305A-B) to view and/or modify ranges of allowable values for each market factor associated with the market scenarios to utilize (e.g., based on customizations specified in the selected predefined scenario). For example, market factor widget 2305A shows some exemplary market factors that may be selected by the user for viewing and/or modification.

FIG. 24 shows a screenshot illustrating user interface(s) of the MLPO. In FIG. 24, an exemplary user interface (e.g., for a mobile device, for a website) for generating a portfolio returns visualization for a portfolio is illustrated. For example, screen 2401 shows that the user may utilize a market factor widget 2405A to view ranges of allowable values (e.g., based on customizations specified in the selected predefined scenario) for the VIX market factor using an allowable range widget 2410A, and a market factor widget 2405B to view ranges of allowable values (e.g., based on customizations specified in the selected predefined scenario) for the SP500 market factor using an allowable range widget 2410B.

Screen 2401 shows that the user may utilize a drawdown widget 2425 to view the expected loss (e.g., −9.42%) at the worst CVaR percentile outcomes for the portfolio under the original predefined scenario. The user may utilize a return volatility widget 2430 to view the return volatility (e.g., 4.15%) of the portfolio under the original predefined scenario. The user may utilize a returns distribution widget 2435 to view the returns distribution of the portfolio under the original predefined scenario. The user may utilize a portfolio securities weights widget 2440 to view and/or modify portfolio securities weights of individual portfolio securities of the portfolio under the original predefined scenario. The user may utilize a portfolio securities returns widget 2445 to view expected returns of individual portfolio securities of the portfolio under the original predefined scenario.

FIG. 25 shows a screenshot illustrating user interface(s) of the MLPO. In FIG. 25, an exemplary user interface (e.g., for a mobile device, for a web site) for generating a portfolio returns visualization for a portfolio is illustrated. Screen 2501 shows that when the user modifies the range of allowable values for a market factor, an updated visualization showing how the expected portfolio return metrics for the portfolio and/or the expected security return metrics for the constituent securities of the portfolio have been affected may be generated. For example, the user may utilize an allowable range widget 2510A to modify the range of allowable values (e.g., a customization) for the VIX market factor. The updated visualization shows how the range of allowable values (e.g., shown in an allowable range widget 2510B) for the SP500 market factor has been affected (e.g., based on the updated set of filtered market scenarios). The updated visualization shows that the user may utilize a drawdown widget 2525 to view the expected loss (e.g., −20.25%) at the worst CVaR percentile outcomes for the portfolio under the customized predefined scenario, the expected loss (e.g., −9.42%) at the worst CVaR percentile outcomes for the portfolio under the original predefined scenario, and the difference in the expected loss at the worst CVaR percentile outcomes (e.g., −10.83) between the two scenarios. The updated visualization shows that the user may utilize a return volatility widget 2530 to view the return volatility (e.g., 4.51%) for the portfolio under the customized predefined scenario, the return volatility (e.g., 4.15%) for the portfolio under the original predefined scenario, and the difference in the expected return volatility (e.g., 0.36%) between the two scenarios. The updated visualization shows that the user may utilize a returns distribution widget 2535 to view the returns distribution for the portfolio under the customized predefined scenario, the returns distribution for the portfolio under the original predefined scenario, and the difference in the expected returns distribution between the two scenarios. The user may utilize a portfolio securities weights widget 2540 to view and/or modify portfolio securities weights of individual portfolio securities of the portfolio under the customized predefined scenario. The user may utilize a portfolio securities returns widget 2545 to view expected returns of individual portfolio securities of the portfolio under the customized predefined scenario. The user may utilize an optimize widget 2550 to determine an optimized portfolio under the customized predefined scenario (e.g., determined based on the updated set of filtered market scenarios). The user may utilize an execute widget 2555 to initiate the execution of tradeable buy and/or sell transactions utilized to create the optimized portfolio under the customized predefined scenario.

FIG. 26 shows a datagraph illustrating data flow(s) for the MLPO. In FIG. 26, dashed lines indicate data flow elements that may be more likely to be optional. In FIG. 26, an user client 2604 (e.g., of a user) may send a portfolio returns visualization request 2621 to a MLPO server 2606 to facilitate generating a portfolio returns visualization based on specified business cycle settings. For example, the user client may be a desktop, a laptop, a tablet, a smartphone, a smartwatch, and/or the like that is executing a client application. In one implementation, the portfolio returns visualization request may include data such as a request identifier, a user identifier, business cycle settings, a simulation model, a pricing date, a portfolio identifier, and/or the like. In one embodiment, the user client may provide the following example portfolio returns visualization request, substantially in the form of a HTTP(S) POST message including XML-formatted data, as provided below:

```
POST /portfolio_returns_visualization_request.php HTTP/1.1
Host: www.server.com
Content-Type: Application/XML
Content-Length: 667
<?XML version = "1.0" encoding = "UTF-8"?>
<portfolio_returns_visualization_request>
  <request_identifier>ID_request_41</request_identifier>
  <user_identifier>ID_user_1</user_identifier>
  <business_cycle_settings>
    <business_cycle>
      <business_cycle_identifier>ID_CYCLE_LATE</business_cycle_identifier>
      <business_cycle_weight>100%</business_cycle_weight>
    </business_cycle>
  </business_cycle_settings>
  <simulation_model>ID_neural_network_simulation_model_1Y</simulation_model>
  <pricing_date>2020-04-17</pricing_date>
  <portfolio_identifier>ID_portfolio_1</portfolio_identifier>
</portfolio_returns_visualization_request>
```

The MLPO server 2606 may send an expected returns retrieve request 2623 to a repository 2610 to facilitate retrieving expected returns for securities in the portfolio for simulated scenarios corresponding to the specified simulation (e.g., with a simulation identifier determined based on the specified pricing date and/or simulation model). In one implementation, the expected returns retrieve request may include data such as a request identifier, expected returns to retrieve specification, and/or the like. In one embodiment, the MLPO server may provide the following example expected returns retrieve request, substantially in the form of a HTTP(S) POST message including XML-formatted data, as provided below:

```
POST /expected_returns_retrieve_request.php HTTP/1.1
Host: www.server.com
Content-Type: Application/XML
Content-Length: 667
<?XML version = "1.0" encoding = "UTF-8"?>
<expected_returns_retrieve_request>
  <request_identifier>ID_request_42</request_identifier>
  <expected_returns_specification>
    <simulation_identifier>ID_sim_1</simulation_identifier>
    <scenario>
      <scenario_identifier>ID_scenario_1</scenario_identifier>
      <securities>MSFT, AAPL, ...</securities>
    </scenario>
    <scenario>
      <scenario_identifier>ID_scenario_2</scenario_identifier>
      <securities>MSFT, AAPL, ...</securities>
    </scenario>
    ...
  </expected_returns_specification>
</expected_returns_retrieve_request>
```

The repository 2610 may send an expected returns retrieve response 2629 to the MLPO server 2606 with the requested expected returns data. In one implementation, the expected returns retrieve response may include data such as a response identifier, the requested expected returns data, and/or the like. In one embodiment, the repository may provide the following example expected returns retrieve response, substantially in the form of a HTTP(S) POST message including XML-formatted data, as provided below:

```
POST /expected_returns_retrieve_response.php HTTP/1.1
```

-continued

```
Host: www.server.com
Content-Type: Application/XML
Content-Length: 667
<?XML version = "1.0" encoding = "UTF-8"?>
<expected_returns_retrieve_response>
  <response_identifier>ID_response_42</response_identifier>
  <expected_returns>
    <scenario>
      <scenario_identifier>ID_scenario_1</scenario_identifier>
      <security>
        <security_identifier>MSFT</security_identifier>
        <expected_return>10%</expected_return>
      </security>
      <security>
        <security_identifier>AAPL</security_identifier>
        <expected_return>12%</expected_return>
      </security>
      ...
    </scenario>
    <scenario>
      <scenario_identifier>ID_scenario_2</scenario_identifier>
      <security>
        <security_identifier>MSFT</security_identifier>
        <expected_return>15%</expected_return>
      </security>
      <security>
        <security_identifier>AAPL</security_identifier>
        <expected_return>13%</expected_return>
      </security>
      ...
    </scenario>
    ...
  </expected_returns>
</expected_returns_retrieve_response>
```

A business cycle based portfolio returns visualizing (BPRV) component 2633 may utilize data provided in the portfolio returns visualization request to generate a portfolio return metrics visualization. See FIG. 27 for additional details regarding the BPRV component.

The MLPO server 2606 may send a portfolio returns visualization response 2637 to the user client 2604 to provide a visualization of portfolio return metrics for the specified portfolio under the specified business cycle settings. In one implementation, the portfolio returns visualization response may include data such as a response identifier, visualization data, and/or the like. In one embodiment, the MLPO server may provide the following example portfolio returns visualization response, substantially in the form of a HTTP(S) POST message including XML-formatted data, as provided below:

```
POST /portfolio_returns_visualization_response.php HTTP/1.1
Host: www.server.com
Content-Type: Application/XML
Content-Length: 667
<?XML version = "1.0" encoding = "UTF-8"?>
<portfolio_returns_visualization_response>
  <response_identifier>ID_response_41</response_identifier>
  <visualization_data>
    portfolio return metrics data (e.g., constituent securities' and/or
    portfolio's returns, worst returns, return volatility, frequency
    vs. returns data)
  </visualization_data>
</portfolio_returns_visualization_response>
```

If the user customizes business cycle settings, the user client 2604 may send a visualization business cycle customization input 2641 to the MLPO server 2606 specifying updated business cycle settings. In one implementation, the visualization business cycle customization input may include data such as a request identifier, business cycle settings, and/or the like. In one embodiment, the user client may provide the following example visualization business cycle customization input, substantially in the form of a HTTP(S) POST message including XML-formatted data, as provided below:

```
POST /visualization_business_cycle_customization_input.php HTTP/1.1
Host: www.server.com
Content-Type: Application/XML
Content-Length: 667
<?XML version = "1.0" encoding = "UTF-8"?>
<visualization_business_cycle_customization_input>
  <request_identifier>ID_request_43</request_identifier>
  <business_cycle_settings>
    <business_cycle>
      <business_cycle_identifier>ID_CYCLE_LATE</business_cycle_identifier>
      <business_cycle_weight>85%</business_cycle_weight>
    </business_cycle>
    <business_cycle>
      <business_cycle_identifier>ID_CYCLE_RECESSION</business_cycle_identifier>
      <business_cycle_weight>15%</business_cycle_weight>
    </business_cycle>
  </business_cycle_settings>
</visualization_business_cycle_customization_input>
```

The MLPO server 2606 may send a visualization business cycle customization output 2645 to the user client 2604 to provide an updated visualization of portfolio return metrics for the specified portfolio (e.g., under the modified business cycle settings). In one implementation, the visualization business cycle customization output may include data such as a response identifier, visualization data, and/or the like. In one embodiment, the MLPO server may provide the following example visualization business cycle customization output, substantially in the form of a HTTP(S) POST message including XML-formatted data, as provided below:

```
POST /visualization_business_cycle_customization_output.php HTTP/1.1
Host: www.server.com
Content-Type: Application/XML
Content-Length: 667
```

-continued

```
<?XML version = "1.0" encoding = "UTF-8"?>
<visualization_business_cycle_customization_output>
  <response_identifier>ID_response_43</response_identifier>
  <visualization_data>
    portfolio return metrics data (e.g., constituent securities' and/or
    portfolio's returns, worst returns, return volatlity, frequency vs.
returns
    data)
  </visualization_data>
</visualization_business_cycle_customization_output>
```

FIG. 27 shows a logic flow illustrating embodiments of a business cycle based portfolio returns visualizing (BPRV) component for the MLPO. In FIG. 27, a portfolio returns visualization request may be obtained at 2701. For example, the portfolio returns visualization request may be obtained as a result of a user requesting generation of a portfolio returns visualization.

Market scenarios to utilize for generating the portfolio returns visualization may be determined at 2705. In one embodiment, the market scenarios to utilize may be determined based on the simulation model (e.g., for a specified pricing date) and/or time period length selected by the user. In another embodiment, the market scenarios to utilize may be determined based on filters applied to simulated market scenarios. In one implementation, the portfolio returns visualization request may be parsed (e.g., using PHP commands) to determine the market scenarios to utilize (e.g., based on the values of the simulation_model and/or pricing_date fields). For example, the selected simulation model and/or pricing date may be used to determine a simulation identifier (e.g., ID_sim_1) of the corresponding simulation (e.g., a set of simulated market scenarios).

Portfolio securities of a portfolio may be determined at 2709 and portfolio securities weights for the portfolio securities may be determined at 2713. In one embodiment, the portfolio securities and/or the corresponding portfolio securities weights may be retrieved from a database (e.g., based on a portfolio identifier). In one implementation, the portfolio returns visualization request may be parsed (e.g., using PHP commands) to determine the portfolio identifier (e.g., based on the value of the portfolio_identifier field). In another embodiment, the portfolio securities and/or the corresponding portfolio securities weights may be specified by the user. In one implementation, the portfolio returns visualization request may be parsed (e.g., using PHP commands) to determine the specified portfolio securities and/or the corresponding portfolio securities weights. In another embodiment, the portfolio securities and/or the corresponding portfolio securities weights may be determined based on an optimization. In one implementation, the portfolio securities and/or the corresponding portfolio securities weights may be determined as discussed with regard to the PC component.

Expected returns of the portfolio securities for the market scenarios to utilize may be retrieved from a database at 2717. For example, the expected returns may be cached to facilitate expected return metrics calculations. In one implementation, the expected returns may be retrieved via an expected returns retrieve request.

A determination may be made at 2721 whether there remain portfolio securities to process. In one implementation, each of the constituent portfolio securities may be processed. If there remain portfolio securities to process, the next security (e.g., with identifier MSFT) may be selected for processing at 2725.

A determination may be made at 2729 whether there remain market scenarios to analyze. In one implementation, each of the market scenarios to utilize may be analyzed. If there remain market scenarios to analyze, the next market scenario (e.g., with identifier ID_scenario_1) may be selected for analysis at 2733.

An expected return for the selected security for the selected market scenario may be determined at 2737. In one implementation, the expected return may be retrieved from cache. In another implementation, the expected return may be retrieved from a database. For example, the expected return for the selected security for the selected market scenario may be determined via a MySQL database command similar to the following:

```
SELECT linkedScenarioSecurityExpectedReturn
FROM ExpectedReturns
WHERE securityID = "MSFT" AND linkedSimulationID = ID_sim_1
  AND linkedScenarioID = ID_scenario_1;
```

Expected security return metrics for the selected security for the market scenarios to utilize may be calculated at 2741. For example, the expected security return metrics for a security may include the security's expected return, worst returns, return volatility, frequency vs. returns data, and/or the like. In one implementation, the expected security return metrics for each security may be determined by iterating through the market scenarios to utilize and calculating the expected security return metrics based on the expected returns (e.g., cached) for the market scenarios to utilize. For example, the expected return for the selected security for the market scenarios to utilize may be determined via a MySQL database command similar to the following:

```
SELECT AVG(linkedScenarioSecurityExpectedReturn)
FROM ExpectedReturns
WHERE securityID="MSFT" AND
  linkedSimulationID=ID_sim_1;
```

Expected portfolio return metrics for the portfolio for the market scenarios to utilize may be calculated at 2745. For example, the expected portfolio return metrics for a portfolio may include the portfolio's expected return, worst returns, return volatility, frequency vs. returns data, and/or the like. In various implementations, the expected portfolio return metrics for the portfolio may be calculated using a weighted average (e.g., weighted based on the portfolio securities weights) of the expected security returns and/or of the calculated expected security return metrics for the constituent securities of the portfolio. For example, the following API may be utilized to determine the expected portfolio return metrics for the portfolio for the market scenarios to utilize:

Post API/Runanalysis

This API facilitates generating portfolio return metrics visualization for a specified portfolio (e.g., list of securities). The portfolio return metrics calculation results are included in the Summary object returned by the API.

The API returns HTTP/1.1 status code 201 if the request is successful. It returns 500 Internal Server Error if there is an exception.

Input Parameter Details

| Attribute name | Mandatory | Default | Description/Rule |
|---|---|---|---|
| securityInputs | Y | | Specify the initial |

-continued

| Attribute name | Mandatory | Default | Description/Rule |
|---|---|---|---|
| | | | investment |
| cash | N | 0 | Integer between 1 and 50 |
| modelId | Y | 1 | Integer, either 1 or 4 based on the model |
| simulationId | Y | 0 | Taxable = 1, Tax-Exempt = 0 |
| simulationInputs | Y | | List of factor min and max range for filtering of scenarios |
| businessCycleInputs | N | | List of business cycle inputs and associated percentages. (e.g., Late Cycle 50% and Recession 50%) |
| pricingDt | Y | | Current Pricing Date for which simulation data is available |

```
REQUEST
POST API/runAnalysis
Content-type: application/json
{
    "securityInputs": [{
            "fmrCusip": "EAFE",
            "description":"EAFE",
            "qty": 200000
        }, {
            "fmrCusip": "DHI270000",
            "description": "USTB 3.375% 11/15/48",
            "qty": 200000
        }
        ....
    ],
    "cash": 0,
    "modelId": 1,
    "simulationId": 1,
    "pricingDt": "01/01/2020",
    "simulationInputs":[{
            "factorName": "VIX",
            "rangeStart": -3544,
            "rangeEnd": 5513
        }, {
            "factorName": "SP500",
            "rangeStart": -4648,
            "rangeEnd": 2947}
      ],
    "businessCycleInputs": [{
            cycleName: "Late",
            percentage: 100
        }, {
            cycleName: "Recession",
            percentage: 0
      }]
    ...
}
RESPONSE
201
Content-Type: application/json
{
  "summary": {
        "risk": 234.42.
        "avg5Percentile": -202.09
      },
  "marketReturns": [ {
        "marketId": 959,
        "bucketId": 4,
        "marketReturn": -434.16
      }, {
        "marketId": 2527,
        "bucketId": 6,
        "marketReturn": -252.16
      },
      ...
    ]
}
```

-continued

A visualization of the expected portfolio return metrics for the portfolio and/or of the expected security return metrics for the constituent securities of the portfolio for the market scenarios to utilize may be generated at 2749. In one implementation, user interface widgets showing the expected portfolio return metrics and/or the expected security return metrics may be generated via a portfolio returns visualization response. See FIGS. 28-30 for examples of visualizations that may be generated.

A determination may be made at 2753 whether a business cycle selection input was obtained from the user. In one embodiment, the business cycle selection input may be a user interface input from the user with a user-specified business cycle selection. For example, the user may select a business cycle (e.g., using a user interface widget to select a specific business cycle, using a user interface widget to request that the MLPO determine the appropriate business cycle (e.g., the business cycle under which the portfolio has the best or the worst expected return metrics)) to determine how expected portfolio return metrics for the portfolio and/or for the constituent securities of the portfolio would change given occurrence of the business cycle (e.g., during the investment time period). In another example, the user may select multiple business cycles, and an associated weight (e.g., probability of occurrence) for each business cycle, to determine how expected portfolio return metrics for the portfolio and/or for the constituent securities of the portfolio would change given business cycle expectations (e.g., during the investment time period).

If a business cycle selection input was obtained, the specified set of business cycles and/or associated business cycle weights may be determined at 2755. In one implementation, the set of business cycles and/or the associated business cycle weights may be specified in a visualization business cycle customization input, and the visualization business cycle customization input may be parsed (e.g., using PHP commands) to determine the specified set of business cycles and/or the associated business cycle weights (e.g., based on the values of the business_cycle_identifier and/or business_cycle_weight fields).

A determination may be made at 2757 whether there remain business cycles to process. In one implementation, each of the specified business cycles may be processed. If there remain business cycles to process, the next business cycle may be selected for processing at 2759.

The market scenarios to utilize may be filtered based on the selected business cycle at 2761. In one embodiment, the market scenarios to utilize may be filtered to the subset of market scenarios that are associated with the selected business cycle. In one implementation, each market scenario to utilize may be associated with a business cycle identifier (e.g., indicating a business cycle during which a simulated market scenario would have occurred), and market scenarios to utilize whose business cycle identifiers do not match the business cycle identifier of the selected business cycle may be filtered out. In another embodiment, the market scenarios to utilize also may be filtered based on specified customized market factors (e.g., as discussed with regard to FIG. 21).

Expected security return metrics for the portfolio securities for the filtered market scenarios may be calculated at 2765. In one implementation, the expected security return metrics for each constituent security of the portfolio for the selected business cycle may be determined by iterating through the filtered market scenarios and calculating the expected security return metrics based on the expected returns (e.g., cached) for the filtered market scenarios. For example, the expected return for a constituent security (e.g., MSFT) of the portfolio for the filtered market scenarios may be determined via a MySQL database command similar to the following:

```
SELECT AVG(linkedScenarioSecurityExpectedReturn)
FROM ExpectedReturns
WHERE securityID = "MSFT" AND linkedSimulationID =
ID_sim_1 AND
  linkedScenarioID IN (ID_scenario_1, ID_scenario_2, ...);
```

Expected portfolio return metrics for the portfolio for the filtered market scenarios may be calculated at 2769. In various implementations, the expected portfolio return metrics for the portfolio for the selected business cycle may be calculated using a weighted average (e.g., weighted based on the portfolio securities weights) of the expected security returns and/or of the calculated expected security return metrics for the constituent securities of the portfolio (e.g., via the API) for the selected business cycle.

Once the specified business cycles have been processed, weighted expected security return metrics for the portfolio securities for the specified business cycles may be calculated at 2773. For example, the weighted expected security return metrics for a security may include the security's weighted expected return, worst returns, return volatility, frequency vs. returns data, and/or the like. In various implementations, the weighted expected security return metrics for a constituent security for the specified business cycles may be calculated using a weighted average (e.g., weighted based on the associated business cycle weights) of the expected security returns for the constituent security for each of the specified business cycles and/or of the calculated expected security return metrics for the constituent security for each of the specified business cycles.

Weighted expected portfolio return metrics for the portfolio for the specified business cycles may be calculated at 2777. For example, the weighted expected portfolio return metrics for a portfolio may include the portfolio's weighted expected return, worst returns, return volatility, frequency vs. returns data, and/or the like. In various implementations, the weighted expected portfolio return metrics for the portfolio for the specified business cycles may be calculated using a weighted average (e.g., weighted based on the portfolio securities weights) of the calculated weighted expected security return metrics for the constituent securities of the portfolio and/or using a weighted average (e.g., weighted based on the associated business cycle weights) of the calculated expected portfolio return metrics for the portfolio for each of the specified business cycles (e.g., via the API).

A visualization of the weighted expected portfolio return metrics for the portfolio and/or of the weighted expected security return metrics for the constituent securities of the portfolio for the specified business cycles may be generated at 2781. In one implementation, user interface widgets showing the weighted expected portfolio return metrics and/or the weighted expected security return metrics may be generated (e.g., via a portfolio returns visualization response, via a visualization business cycle customization output). See FIGS. 28-30 for examples of visualizations that may be generated.

A determination may be made at 2785 whether a business cycle weight selection input was obtained from the user (e.g., via a visualization business cycle customization input). In one embodiment, the business cycle weight selection input may be a user interface input from the user with user-specified business cycle weights for the specified business cycles. If a business cycle weight selection input was obtained, the specified business cycle weights for the specified business cycles may be updated at 2789. In one implementation, the visualization business cycle customization input may be parsed (e.g., using PHP commands) to determine the updated business cycle weights (e.g., based on the values of the business_cycle_weight fields). A determination may be made at 2793 whether the expected portfolio return metrics for the portfolio for each of the specified business cycles and/or the expected security return metrics for the constituent securities of the portfolio for each of the specified business cycles are cached (e.g., from a previous calculation that used different business cycle weights for the specified business cycles). If cached, an updated visualization of the weighted expected portfolio return metrics for the portfolio and/or of the weighted expected security return metrics for the constituent securities of the portfolio for the specified business cycles may be generated as discussed with regard to 2773-2781. If not cached, an updated visualization of the weighted expected portfolio return metrics for the portfolio and/or of the weighted expected security return metrics for the constituent securities of the portfolio for the specified business cycles may be generated as discussed with regard to 2757-2781.

FIG. 28 shows a screenshot illustrating user interface(s) of the MLPO. In FIG. 28, an exemplary user interface (e.g., for a mobile device, for a website) for generating a portfolio returns visualization for a portfolio is illustrated. Screen 2801 shows that a user may utilize a business cycle tab 2803 to specify business cycle settings. The user may utilize business cycle selection widgets 2805A-B to specify business cycles to utilize. For example, business cycle selection widget 2805A shows some exemplary business cycles that may be selected by the user. The user may utilize business cycle weight selection widgets 2810A-B to specify business cycle weights to utilize. For example, the user may specify that a portfolio returns visualization should be generated based on an expectation that the Late business cycle (e.g., selected using business cycle selection widget 2805A) is going to occur with 100% probability (e.g., selected using business cycle weight selection widget 2810A). The user may utilize a positioning widget 2815 to request that the MLPO determine the appropriate business cycle. For example, the user may specify that a portfolio returns visualization should be generated for the business cycle under which the portfolio has the best expected returns (e.g., Late business cycle).

Screen 2801 shows that the user may utilize a returns distribution widget 2835 to view the returns distribution of the portfolio under the original business cycle settings. The user may utilize a portfolio securities weights widget 2840 to view and/or modify portfolio securities weights of individual portfolio securities of the portfolio under the original business cycle settings. The user may utilize a portfolio securities returns widget 2845 to view expected returns of individual portfolio securities of the portfolio under the original business cycle settings.

FIG. 29 shows a screenshot illustrating user interface(s) of the MLPO. In FIG. 29, an exemplary user interface (e.g., for a mobile device, for a website) for generating a portfolio returns visualization for a portfolio is illustrated. Screen 2901 shows that when the user modifies the business cycle settings an updated visualization showing how the expected portfolio return metrics for the portfolio and/or the expected security return metrics for the constituent securities of the portfolio have been affected may be generated. For example, the user may specify that the updated portfolio returns visualization should be generated based on an expectation (e.g., a customization) that the Late business cycle (e.g., selected using business cycle selection widget 2905A) is going to occur with 85% probability (e.g., selected using business cycle weight selection widget 2910A) and the Recession business cycle (e.g., selected using business cycle selection widget 2905B) is going to occur with 15% probability (e.g., selected using business cycle weight selection widget 2910B). The updated visualization shows that the user may utilize a drawdown widget 2925 to view the expected loss (e.g., −1.30%) at the worst CVaR percentile outcomes for the portfolio under the customized business cycle settings, the expected loss (e.g., −0.99%) at the worst CVaR percentile outcomes for the portfolio under the original business cycle settings, and the difference in the expected loss at the worst CVaR percentile outcomes (e.g., −0.31) between the two business cycle settings. The updated visualization shows that the user may utilize a return volatility widget 2930 to view the return volatility (e.g., 0.55%) for the portfolio under the customized business cycle settings, the return volatility (e.g., 0.40%) for the portfolio under the original business cycle settings, and the difference in the expected return volatility (e.g., 0.15%) between the two business cycle settings. The updated visualization shows that the user may utilize a returns distribution widget 2935 to view the returns distribution for the portfolio under the customized business cycle settings, the returns distribution for the portfolio under the original business cycle settings, and the difference in the expected returns distribution between the two business cycle settings. The user may utilize a portfolio securities weights widget 2940 to view and/or modify portfolio securities weights of individual portfolio securities of the portfolio under the customized business cycle settings. The user may utilize a portfolio securities returns widget 2945 to view expected returns of individual portfolio securities of the portfolio under the customized business cycle settings. The user may utilize an optimize widget 2950 to determine an optimized portfolio under the customized business cycle settings (e.g., determined based on the updated weighted expected security returns for the constituent securities of the portfolio). The user may utilize an execute widget 2955 to initiate the execution of tradeable buy and/or sell transactions utilized to create the optimized portfolio under the customized business cycle settings.

FIG. 30 shows a screenshot illustrating user interface(s) of the MLPO. In FIG. 30, an exemplary user interface (e.g., for a mobile device, for a website) for generating a portfolio returns visualization for a portfolio is illustrated. Screen 3001 shows that the user may utilize a positioning widget 3015 to request that the MLPO determine the appropriate business cycle. For example, the user may specify that a portfolio returns visualization should be generated for the business cycle (e.g., a customization) under which the portfolio has the worst expected returns (e.g., Early business cycle (e.g., as shown by business cycle selection widgets 3005A-B) with 100% probability (e.g., as shown by business cycle weight selection widgets 3010A-B)). The updated visualization shows that the user may utilize a drawdown widget 3025 to view the expected loss (e.g., −1.19%) at the worst CVaR percentile outcomes for the portfolio under the customized business cycle settings, the expected loss (e.g., −0.99%) at the worst CVaR percentile outcomes for the portfolio under the original business cycle settings, and the difference in the expected loss at the worst CVaR percentile outcomes (e.g., −0.20) between the two business cycle settings. The updated visualization shows that the user may utilize a return volatility widget 3030 to view the return volatility (e.g., 0.45%) for the portfolio under the customized business cycle settings, the return volatility (e.g., 0.40%) for the portfolio under the original business cycle settings, and the difference in the expected return volatility (e.g., 0.05%) between the two business cycle settings. The updated visualization shows that the user may utilize a returns distribution widget 3035 to view the returns distribution for the portfolio under the customized business cycle settings, the returns distribution for the portfolio under the original business cycle settings, and the difference in the expected returns distribution between the two business cycle settings. The user may utilize a portfolio securities weights widget 3040 to view and/or modify portfolio securities weights of individual portfolio securities of the portfolio under the customized business cycle settings. The user may utilize a portfolio securities returns widget 3045 to view expected returns of individual portfolio securities of the portfolio under the customized business cycle settings.

FIG. 34 shows a datagraph illustrating data flow(s) for the MLPO. In FIG. 34, a client 3402 (e.g., of a user) may send a portfolio returns visualization request 3421 to an application server 3406 to facilitate generating a portfolio returns visualization (e.g., based on customized market factors as discussed with regard to FIG. 20, based on specified business cycle settings as discussed with regard to FIG. 26, for constructing an optimized bond ladder portfolio as discussed with regard to FIG. 37). For example, the client may be a desktop, a laptop, a tablet, a smartphone, a smartwatch, and/or the like that is executing a client application. In one implementation, the portfolio returns visualization request may include data such as a request identifier, a user identifier, a predefined scenario identifier, business cycle settings, a simulation model, a pricing date, a portfolio identifier, investment securities settings, and/or the like. In one embodiment, the client may provide the following example portfolio returns visualization request, substantially in the form of a (Secure) Hypertext Transfer Protocol ("HTTP(S)") POST message including eXtensible Markup Language ("XML") formatted data, as provided below:

```
POST /portfolio_returns_visualization_request.php HTTP/1.1
Host: www.server.com
Content-Type: Application/XML
Content-Length: 667
<?XML version = "1.0" encoding = "UTF-8"?>
<portfolio_returns_visualization_request>
  <request_identifier>ID_request_51</request_identifier>
  <user_identifier>ID_user_1</user_identifier>
  <simulation_model>ID_neural_network_simulation_model_1Y</simulation_model>
```

-continued

```
  <pricing_date>2020-04-17</pricing_date>
  <portfolio_identifier>ID_portfolio_1</portfolio_identifier>
  ...
</portfolio_returns_visualization_request>
```

A portfolio returns visualizing (PRV) component 3425 may utilize data provided in the portfolio returns visualization request to generate a portfolio return metrics visualization based on asset return metrics provided by a database calculation engine. In some embodiments, the PRV component may be an optimized version of the SPRV component (e.g., discussed with regard to FIG. 21), BPRV component (e.g., discussed with regard to FIG. 27), and/or the like components (e.g., a component used to implement a bond ladder construction process discussed with regard to FIG. 48) that utilizes the database calculation engine for improved performance. See FIG. 35 for additional details regarding the PRV component.

The application server 3406 may send an asset return metrics calculation request 3429 to a database server 3410 to obtain asset return metrics for securities in the portfolio for simulated scenarios corresponding to the specified simulation (e.g., with a simulation identifier determined based on the specified pricing date and/or simulation model). In one implementation, the asset return metrics calculation request may include data such as a request identifier, asset return metrics to retrieve specification, and/or the like. In one embodiment, the application server may provide the following example asset return metrics calculation request, substantially in the form of a HTTP(S) POST message including XML-formatted data, as provided below:

```
POST /asset_return_metrics_calculation_request.php HTTP/1.1
Host: www.server.com
Content-Type: Application/XML
Content-Length: 667
<?XML version = "1.0" encoding = "UTF-8"?>
<asset_return_metrics_calculation_request>
  <request_identifier>ID_request_52</request_identifier>
  <securities>MSFT, AAPL, ...</securities>
  <simulation_identifier>ID_sim_1</simulation_identifier>
  <pricing_date>2020-04-17</pricing_date>
  <requested_asset_return_metrics>
    ID_METRIC_EXPECTED_RETURN, ID_METRIC_CVAR
  </requested_asset_return_metrics>
</asset_return_metrics_calculation_request>
```

An asset return metrics calculating (ARMC) component 3433 may utilize data provided in the asset return metrics calculation request to calculate asset return metrics for securities in the portfolio. See FIG. 36 for additional details regarding the ARMC component.

The database server 3410 may send an asset return metrics calculation response 3437 to the application server 3406 with the requested asset return metrics data. In one implementation, the asset return metrics calculation response may include data such as a response identifier, the requested asset return metrics data, and/or the like. In one embodiment, the database server may provide the following example asset return metrics calculation response, substantially in the form of a HTTP(S) POST message including XML-formatted data, as provided below:

```
POST /asset_return_metrics_calculation_response.php HTTP/1.1
Host: www.server.com
Content-Type: Application/XML
Content-Length: 667
<?XML version = "1.0" encoding = "UTF-8"?>
<asset_return_metrics_calculation_response>
  <response_identifier>ID_response_52</response_identifier>
  <asset_simulation_wide_table_data>
    <record>
      <asset_id>IBM</asset_id>
      <pricing_date>2020-04-1</pricing_date>
      <simulation_identifier>ID_sim_1</simulation_identifier>
      <returns>354,353,369,...</returns>
    </record>
    <record>
      <asset_id>AAPL</asset_id>
      <pricing_date>2020-04-17</pricing_date>
      <simulation_identifier>ID_sim_1</simulation_identifier>
      <returns>384,430,276,...</returns>
    </record>
    ...
  </asset_simulation_wide_table_data>
  <asset_measure_table_data>
    <record>
      <asset_id>IBM</asset_id>
      <pricing_date>2020-04-17</pricing_date>
      <simulation_identifier>ID_sim_1</simulation_identifier>
      <scenario_identifier>ID_scenario_1</scenario_identifier>
      <metric_identifier>ID_METRIC_EXPECTED_RETURN</metric_identifier>
      <metric_value>354</metric_value>
    </record>
    <record>
      <asset_id>IBM</asset_id>
      <pricing_date>2020-04-17</pricing_date>
      <simulation_identifier>ID_sim_1</simulation_identifier>
      <scenario_identifier>ID_scenario_2</scenario_identifier>
      <metric_identifier>ID_METRIC_EXPECTED_RETURN</metric_identifier>
      <metric_value>353</metric_value>
    </record>
    ...
    <record>
      <asset_id>IBM</asset_id>
      <pricing_date>2020-04-17</pricing_date>
      <simulation_identifier>ID_sim_1</simulation_identifier>
      <scenario_identifier>ID_scenario_1</scenario_identifier>
      <metric_identifier>ID_METRIC_CVAR</metric_identifier>
      <metric_value>-8.05%</metric_value>
    </record>
    <record>
      <asset_id>IBM</asset_id>
      <pricing_date>2020-04-17</pricing_date>
      <simulation_identifier>ID_sim_1</simulation_identifier>
      <scenario_identifier>ID_scenario_2</scenario_identifier>
      <metric_identifier>ID_METRIC_CVAR</metric_identifier>
      <metric_value>-9.15%</metric_value>
    </record>
    ...
    <record>
      <asset_id>AAPL</asset_id>
      <pricing_date>2020-04-17</pricing_date>
      <simulation_identifier>ID_sim_1</simulation_identifier>
      <scenario_identifier>ID_scenario_1</scenario_identifier>
      <metric_identifier>ID_METRIC_EXPECTED_RETURN</metric_identifier>
      <metric_value>384</metric_value>
    </record>
    <record>
      <asset_id>AAPL</asset_id>
      <pricing_date>2020-04-17</pricing_date>
      <simulation_identifier>ID_sim_1</simulation_identifier>
      <scenario_identifier>ID_scenario_2</scenario_identifier>
      <metric_identifier>ID_METRIC_EXPECTED_RETURN</metric_identifier>
      <metric_value>430</metric_value>
    </record>
    ...
    <record>
      <asset_id>AAPL</asset_id>
      <pricing_date>2020-04-17</pricing_date>
      <simulation_identifier>ID_sim_1</simulation_identifier>
      <scenario_identifier>ID_scenario_1</scenario_identifier>
      <metric_identifier>ID_METRIC_CVAR</metric_identifier>
      <metric_value>–10.05%</metric_value>
```

-continued

```
    </record>
    <record>
      <asset_id>AAPL</asset_id>
      <pricing_date>2020-04-17</pricing_date>
      <simulation_identifier>ID_sim_1</simulation_identifier>
      <scenario_identifier>ID_scenario_2</scenario_identifier>
      <metric_identifier>ID_METRIC_CVAR</metric_identifier>
      <metric_value>−7.15%</metric_value>
    </record>
    ...
  </asset_measure_table_data>
</asset_return_metrics_calculation_response>
```

The application server 3406 may send a portfolio returns visualization response 3441 to the client 3402 to provide a visualization of portfolio return metrics for the specified portfolio. In one implementation, the portfolio returns visualization response may include data such as a response identifier, visualization data, and/or the like. In one embodiment, the application server may provide the following example portfolio returns visualization response, substantially in the form of a HTTP(S) POST message including XML-formatted data, as provided below:

```
POST /portfolio_returns_visualization_response.php HTTP/1.1
Host: www.server.com
Content-Type: Application/XML
Content-Length: 667
<?XML version = "1.0" encoding = "UTF-8"?>
<portfolio_returns_visualization_response>
  <response_identifier>ID_response_51</response_identifier>
  <visualization_data>
    portfolio return metrics data (e.g., constituent securities'
    and/or portfolio's
    returns, worst returns, return volatility, frequency vs. returns data)
  </visualization_data>
</portfolio_returns_visualization_response>
```

FIG. 35 shows a logic flow illustrating embodiments of a portfolio returns visualizing (PRV) component for the MLPO. In FIG. 35, a portfolio returns visualization request may be obtained at 3501. For example, the portfolio returns visualization request may be obtained as a result of a user requesting generation of a portfolio returns visualization.

Market scenarios to utilize for generating the portfolio returns visualization may be determined at 3505. In one embodiment, the market scenarios to utilize may be determined based on the simulation model (e.g., for a specified pricing date) and/or time period length selected by the user. In another embodiment, the market scenarios to utilize may be determined based on filters applied to simulated market scenarios. In one implementation, the portfolio returns visualization request may be parsed (e.g., using PHP commands) to determine the market scenarios to utilize (e.g., based on the values of the simulation_model and/or pricing_date fields). For example, the selected simulation model and/or pricing date may be used to determine a simulation identifier (e.g., ID_sim_1) of the corresponding simulation (e.g., a set of simulated market scenarios).

Portfolio securities of a portfolio may be determined at 3509 and portfolio securities weights for the portfolio securities may be determined at 3513. In one embodiment, the portfolio securities and/or the corresponding portfolio securities weights may be retrieved from a database (e.g., based on a portfolio identifier). In one implementation, the portfolio returns visualization request may be parsed (e.g., using PHP commands) to determine the portfolio identifier (e.g., based on the value of the portfolio_identifier field). In another embodiment, the portfolio securities and/or the corresponding portfolio securities weights may be specified by the user (e.g., via a set of securities universe widgets as discussed with regard to FIG. 10, via a set of security selection widgets as discussed with regard to FIG. 41). In one implementation, the portfolio returns visualization request may be parsed (e.g., using PHP commands) to determine the specified portfolio securities and/or the corresponding portfolio securities weights. In another embodiment, the portfolio securities and/or the corresponding portfolio securities weights may be determined based on an optimization. In one implementation, the portfolio securities and/or the corresponding portfolio securities weights may be determined as discussed with regard to the PC component. In another implementation, the portfolio securities and/or the corresponding portfolio securities weights may be determined as discussed with regard to FIG. 48.

Asset return metrics data for the portfolio securities may be obtained via the ARMC component at 3517. In one embodiment, an application (e.g., executed by an application server) may be configured to generate a portfolio returns visualization comprising a set of visualization return metrics, and the asset return metrics data utilized to calculate the set of visualization return metrics may be obtained using the database calculation engine (e.g., via an asset return metrics calculation request). In one implementation, asset simulation wide table data (e.g., utilized for calculating expected portfolio return metrics for the portfolio) and/or asset measure table data (e.g., utilized for calculating expected security return metrics for the constituent securities of the portfolio) may be obtained. See 706 in FIG. 7C for an example of asset simulation wide table data. See 710 in FIG. 7C for an example of asset measure table data.

A determination may be made at 3521 whether there remain visualization return metrics to determine. In one implementation, each of the visualization return metrics in the set of visualization return metrics may be determined. If there remain visualization return metrics to determine, the next visualization return metric may be selected for processing at 3525.

A determination may be made at 3529 regarding the type of the selected visualization return metric. In one embodiment, a visualization return metric may be an expected portfolio return metric calculated for a portfolio. In another embodiment, a visualization return metric may be an expected security return metric calculated for a security.

If the selected visualization return metric type is portfolio, the selected expected portfolio return metric for the portfolio may be determined using the asset simulation wide table data at 3533. For example, expected portfolio return metrics for a portfolio may include the portfolio's expected return, worst returns, return volatility, frequency vs. returns data, and/or the like. In various implementations, the selected expected portfolio return metric for the portfolio may be calculated using a weighted average (e.g., weighted based on the portfolio securities weights) of expected security returns and/or of determined expected security return metrics for the constituent securities of the portfolio using the asset simulation wide table data. For example, the following API may be utilized to determine expected portfolio return metrics, in the set of visualization return metrics, for the portfolio for the market scenarios to utilize:

Post API/Runanalysis

This API facilitates generating portfolio return metrics visualization for a specified portfolio (e.g., list of securities). The portfolio return metrics calculation results are included in the Summary object returned by the API.

The API returns HTTP/1.1 status code 201 if the request is successful. It returns 500 Internal Server Error if there is an exception.

```
REQUEST
POST API/runAnalysis
Content-type: application/json
{"securityInputs":[{"cusip":"806551EB9", "qty":9000,"price":101.11},
        {"cusip":"806640VU9", "qty":14000,"price":100}],
"simulationId":6,
"scenarioInputs":[{
  "id":1,
  "type":1,
  "simulationInputs":[{"factorName":"VIX","rangeStart":-4588,"rangeEnd":6796},
    {"factorName":"SP500","rangeStart": −5161,"rangeEnd":4082}],
  "businessCycleInputs":[ ]
}, {
  "id":2,
  "type":1,
  "simulationInputs":[ ],
  "businessCycleInputs":[{cycleName: "Late", percentage: 100}, {cycleName:
    "Recession", percentage:
0}]
},...],
"pricingDt":"02/26/2020",
"logger":true
}
RESPONSE
201
Content-Type: application/json
{
  "summary": [{
    "id":1,
    "risk": 234.42,
    "mean": 255,
    "cvar": −202.09,
    "5per": −172,
    "25per": −74,
    "50per": −24,
    "75per": 154,
    "95per": 34,
  },{
    "id":2,
    "risk": 258.30,
    "mean": 267,
    "cvar": −256.09,
    "5per": −176,
    "25per": −74,
    "50per": −21,
    "75per": 165,
    "95per": 38,
  },...]
  "marketReturns":[ {
    "marketId": 959,
    "bucketId": 4,
    "marketReturn": −434.16
    }, {
    "marketId": 2527,
    "bucketId": 6,
    "marketReturn": −252.16
    },
```

Input Parameter Details

| Attribute name | Mandatory | Default | Description/Rule |
|---|---|---|---|
| securityInputs | Y | | Specify the initial investment |
| simulationId | Y | 0 | Taxable = 1, Tax-Exempt = 0 |
| simulationInputs | Y | | List of factor min and max range for filtering of scenarios |
| businessCycleInputs | N | | List of business cycle inputs and associated percentages. (e.g., Late Cycle 50% and Recession 50%) |
| pricingDt | Y | | Current Pricing Date for which simulation data is available |

-continued

```
   ...
  ]
}
```

If the selected visualization return metric type is security, the selected expected security return metric for the portfolio securities of the portfolio may be determined using the asset measure table data at 3537. For example, expected security return metrics for a security may include the security's expected return, worst returns, return volatility, frequency vs. returns data, and/or the like. In various implementations, the selected expected security return metric for each security may be determined (e.g., retrieved, calculated) using the asset measure table data. For example, the following API may be utilized to determine expected security return metrics, in the set of visualization return metrics, for the portfolio securities of the portfolio for the market scenarios to utilize:

| Operation on Entities | Operation Type | End Point | Description |
|---|---|---|---|
| Run Bond Ladder Optimizer | POST | api/runBondLadderOptimizer | Gets the bond ladder based on rule-based optimization. The API automatically calls the available bonds API to get available bonds based on filter criteria. It then constructs the bond ladder. |

Post API/Runbondladderoptimizer

This API facilitates generating portfolio returns visualization. This API returns the bond ladder based on filter specified as part of the input. The API automatically calls the available bonds, applies the filter and then returns bond ladder based on rule-based optimization.

The API returns HTTP/1.1 status code 201 if the request is successful. It returns 500 Internal Server Error if there is an exception.

Input Parameter Details

| Attribute name | Mandatory | Default | Description/Rule |
|---|---|---|---|
| startInvestment | Y | 0 | Specify the initial investment |
| startYear | Y | | Integer between 1 and 50 |
| endYear | Y | | Integer between 1 and 50. Should be greater than startYear |
| taxStatus | N | 1 | Taxable = 1, Tax-Exempt = 0 |
| composition | N | | |
| filter | Y | FALSE | Set to TRUE if filter should be applied. |
| creditquality | N | | Mandatory if Filter is set to TRUE |
| federalTax | N | | |
| stateTax | N | | |
| surTax | N | | |
| step | Y | 1 | Integer value to specify the Yield Range: 1 = Full Market (1st to 4th Quartiles) 2 = Standard (2nd and 3rd Quartile) 3 = Conservative (1st and 2nd Quartile) 4 = Aggressive (3rd and 4th Quartile) |
| diversification | Y | 0.03 | Integer value to specify the Diversification (i.e., max allowed allocation based on the percentage of total market value of the portfolio): 0.03 = High (Max Position size = 3%) 0.05 = Medium (Max Position size = 5%) 0.07 = Low (Max Position size = 7%) 1 = No Limit on Position size |
| riskAdjusted | N | FALSE | FALSE = Maximize Yield TRUE = Risk Adjusted Yield |

REQUEST
POST API/runBondLadderOptimizer
Content-type: application/json

```
{
  "startInvestment": 1000000,
  "startYear": 1,
  "endYear": 15,
  "taxStatus": 1,
  "composition": 1,
  "filter": true,
  "creditquality": "BB+",
  "federalTax": 37,
  "stateTax": 5.1,
  "surTax": 3.8,
  "step": 4,
  "diversification": 0.03,
  "riskAdjusted":true
}
```

RESPONSE
201
Content-Type: application/json

```
{
  "yield": 4.515983619734928,
  "proposed":[ {
    "fmrCusip": "AEG778000",
    "description": "ALPHABET INC 3.625% 05/19/21",
    "price": 103.04,
    "yearsToMaturity": 2,
    "staticYield": 1.774,
    "minDenomination": 2000,
    "minIncrement": 1000,
    "rating": "AA",
    "ratingGrp": 0,
    "tradableQty": 40,
    "kdp_1yr": 0.011852,
    "kdp_2yr": 0.076579,
    "kdp_3yr": 0.117952,
    "kdp_4yr": 0.134964,
    "kdp_5yr": 0.177211,
    "kdp_7yr": 0.267062,
    "kdp_10yr": 0.267116,
    "ratingsIndex": 2,
```

-continued

```
    ...
  }...],
  "bondLadderList":[ {
    "marketValue": 67000,
    "priceChange": 45159.83619734928,
    "defaultValue": 0,
    "yearsToMaturity": 11,
    "securities":[ ]}...],
  "ratingsList":[ {
    "rating": "AA",
    "weight": 0.0028821924148899635
  }...],
  "logs":[...]
}
```

A visualization of the expected portfolio return metrics for the portfolio and/or of the expected security return metrics for the constituent securities of the portfolio for the market scenarios to utilize may be generated at 3541. In one implementation, user interface widgets showing the expected portfolio return metrics and/or the expected security return metrics may be generated via a portfolio returns visualization response. See FIGS. 22-25, 28-30, and 41-47 for examples of visualizations that may be generated.

FIG. 36 shows a logic flow illustrating embodiments of an asset return metrics calculating (ARMC) component for the MLPO. In FIG. 36, an asset return metrics calculation request may be obtained at 3601. For example, the asset return metrics calculation request may be obtained as a result of an application requesting calculation of asset return metrics data.

Assets to analyze may be determined at 3605. In one embodiment, asset return metrics data may be calculated for the determined assets. In one implementation, the asset return metrics calculation request may be parsed (e.g., using PHP commands) to determine the assets (e.g., a set of portfolio securities) to analyze (e.g., based on the value of the securities field). In another implementation, the assets (e.g., a universe of securities (e.g., bonds)) to analyze may be determined (e.g., to precalculate and/or cache asset return metrics data) based on a configuration setting.

A simulation identifier to utilize may be determined at 3609. In one embodiment, the simulation identifier may identify a set of simulated market scenarios to utilize to calculate asset return metrics data. See FIGS. 2A-B and FIG. 4 for additional details regarding the MLSSP component, which may be used to generate simulated market scenarios. In one implementation, the asset return metrics calculation request may be parsed (e.g., using PHP commands) to determine the simulation identifier (e.g., based on the value of the simulation_identifier field).

A pricing date to utilize may be determined at 3613. In one embodiment, the pricing date may represent the date for which analytics (e.g., Key Rate Durations (KRD), Option Adjusted Spread, Muni KRDs, etc.) for the assets are available and/or when asset simulations are calculated. In one implementation, the asset return metrics calculation request may be parsed (e.g., using PHP commands) to determine the pricing date (e.g., based on the value of the pricing_date field). In another implementation, the latest available pricing date may be utilized.

Assets may be filtered based on available factor exposures at 3617. In one embodiment, such filtering is a data reduction technique utilized to reduce the number of records used during calculations thus lowering processing time. In one implementation, the factor exposure table (e.g., factor_expo table in FIG. 40) may comprise data calculated for assets that have analytics available, while the assets table (e.g., asset table in FIG. 40) may comprise data for the available assets (e.g., assets in the universe of securities, assets in the set of portfolio securities). This filtering ensures that those assets for which factor exposures are available are processed. In various implementations, assets may be processed using sessions (e.g., as discussed with regard to 3633) with each session targeting specific range of assets to be processed. For example, if the assets are processed in 4 sessions, the first session may target the first 250K assets, the second session may target assets from 250K to 500K, and so on. Each session may be configured to have access to its own set of global temporary tables that is used to store information related to the assets the respective session is processing (e.g., data may not be shared between sessions). Reducing the assets to those assets that are processed by a session and storing in a global temporary table for the session ensures that big table joins are eliminated during the asset return calculation process. In some implementations, the asset return calculation process may be rerunnable, and may be configured to ignores the assets that are already processed in the previous run. For example, the assets may be filtered based on available factor exposures via an Oracle RDS on Cloud database command similar to the following:

In the query below, the factor exposure is reduced to the assets being targeted in the session and further reduced to ignore assets that are already processed if the asset return calculation process is rerun.

```
INSERT INTO <db-schema>.global_asset_list
SELECT DISTINCT fe.asset_id
FROM
  (SELECT DISTINCT asset_id FROM <db-schema>.factor_expo
   WHERE pricing_dt = lc_truncatedPricingDate
   ORDER BY asset_id offset p_offset ROWS
   FETCH NEXT p_rangeVal ROWS ONLY) fe
LEFT OUTER JOIN
  (SELECT DISTINCT asset_id FROM <db-schema>.asset_sim_wide am
   WHERE am.pricing_dt = lc_truncatedPricingDate) asw
ON (fe.asset_id = asw.asset_id)
WHERE asw.asset_id IS NULL;
```

Factor simulations may be filtered based on the filtered assets at 3621. In one embodiment, such filtering is a data reduction technique utilized to reduce the number of records used during calculations thus lowering processing time. In one implementation, the factor simulations table (e.g., factor_sim table in FIG. 40) may comprise simulated returns for market factors (e.g., 40+ factors which is around 300K records). This filtering determines a set of market factors to which the filtered assets have exposure (e.g., this reduces the number of factor simulation records that are loaded by 50%, to around 150K records, and/or reduces the JOIN for further processing). In some implementations, a factor simulation may contain factor simulation data for multiple simulations with multiple simulation dates. Filtering the table to include targeted simulation ids reduces the number of records that are utilized for calculations. Each asset may have exposure to certain factors and using the factors that the targeted assets have exposure to can further reduce the size of the factor simulation table that is processed. For example, for 250K assets, the unique factors that these assets have access to may be 10 instead of 40+ factors for which factor simulations are available. Reducing the factor simulation to include factor simulations for fewer factors reduce the number of records. Also, storing the data in temporary table instead of using the main table reduces the need to filter data during calculations. For example, the factor simulations may be filtered based on the filtered assets via an Oracle RDS on Cloud database command similar to the following:

```
INSERT INTO <db-schema>.mglobal_factor_sim_tmp
SELECT *
FROM <db-schema>.factor_sim fs
WHERE fs.sim_id IN (p_simIdQuarterly, p_simIdBiAnnually, p_simIdYearly)
AND fs.factor_id IN ( SELECT DISTINCT factor_id FROM <db-schema>.factor_expo fe
   INNER JOIN <db-schema>.global_asset_list gal
   ON fe.asset_id = gal.asset_id
   WHERE fe.pricing_dt = lc_truncatedPricingDate )
```

In some implementations, the factor exposure table and the factor simulations table may be augmented to integrate the impact of convexity in asset simulation. The convexity metric (e.g., option adjusted convexity) may be obtained from Sentinel's security_master table. The factor exposure table may be augmented by inserting convexity as (e.g., two) new market factors (e.g., id 80 for non-muni instruments, id 81 for muni instruments). For example, the exposure table may be augmented via an Oracle RDS on Cloud database command similar to the following:

```
SELECT cusip as asset_id, 80 as factor_id, 1/2 *
   security_master.option_adjusted_convexity / 10000 as exposure
FROM security_master
WHERE product_name != 'Municipal'
UNION ALL
SELECT cusip as asset_id, 81 as factor_id, 1/2 *
   security_master.option_adjusted_convexity / 10000 as exposure
FROM security_master
WHERE product_name = 'Municipal'
```

The factor simulations table may be augmented by inserting the square of the change in yield (e.g., using the average return of different key rates as the proxy for the change in yield) as (e.g., two) new market factors (e.g., id 80 for Treasury curves, id 81 for muni curves) for each simulation and each market scenario. For example, the factor simulations table may be augmented via an Oracle RDS on Cloud database command similar to the following:

```
/*
   Treasury curves 3M, 6M, 1Y, 2Y, 3Y, 5Y, 7Y, 10Y, 20Y, 30Y
   Muni curves 2Y, 5Y, 10Y, 20Y
*/
with oac_factor as
(
   select fs.sim_id, fs.market_id, power(avg(fs.return), 2) as return,
   case when f.type = 'Treasury Curves' then 80
      when f.type = 'Muni Curves' then 81
   end as factor_id
   from factor_sim fs, factor f
   where fs.factor_id = f.id
   and fs.factor_id in
      (select f.id from factor f where f.type = 'Treasury Curves'
         or f.type = 'Muni Curves')
   group by fs.sim_id, f.type, fs.market_id
   order by fs.market_id
)
select distinct fs.sim_id, fs.market_id, fs.bucket_id,
oo.factor_id, oo.return
from oac_factor oo, factor_sim fs
where oo.sim_id = fs.sim_id
and oo.market_id = fs.market_id
order by sim_id, market_id
```

Factor exposures may be filtered based on the filtered assets and/or the pricing date at 3625. In one embodiment, such filtering is a data reduction technique utilized to reduce the number of records used during calculations thus lowering processing time. In one implementation, the factor exposure table may store factor exposures for assets for multiple pricing dates (e.g., for the last three runs/dates). This filtering determines a set of factor exposure records for the pricing date (e.g., for the current pricing date and filters out records for older pricing dates) that are associated with the filtered assets (e.g., assets for which factor exposures are available). For example, the factor exposures may be filtered based on the filtered assets and/or the pricing date via an Oracle RDS on Cloud database command similar to the following:

```
INSERT INTO <db-schema>.mglobal_factor_expo_tmp
   SELECT fe.*
   FROM <db-schema>.factor_expo fe
   INNER JOIN <db-schema>.global_asset_list gal
      ON fe.asset_id = gal.asset_id
   WHERE fe.pricing_dt = lc_truncatedPricingDate;
```

Call and/or put schedules may be filtered based on the filtered assets at 3629. In one embodiment, such filtering is a data reduction technique utilized to reduce the number of records used during calculations thus lowering processing time. In one implementation, the call schedule table (e.g., call_schedule table in FIG. 40) and/or the put schedule table (e.g., put_schedule table in FIG. 40) may comprise call and/or put prices for the available assets (e.g., assets in the universe of securities, assets in the set of portfolio securities). This filtering determines a set of call and/or put schedule records that are associated with the filtered assets (e.g., assets for which factor exposures are available). For example, the call and/or put schedules may be filtered based on the filtered assets via an Oracle RDS on Cloud database command similar to the following:

The query below is separated out into two parts. The first part focuses on getting the call and put price based on different horizons and call date. The second part focuses on calculating the call and put returns which will result in defining the lower cap of the simulated returns.

```
INSERT /*+ APPEND PARALLEL(8) */
INTO <db-schema>.mglobal_call_schedule_tmp
  SELECT
    nvl(call_price_1y.cusp_n,put_price_1y.cusp_n) AS cusp_n,
    call_price_1y.red_price_a c_prc_1y,
    put_price_1y.red_price_a p_prc_1y,
    least(nvl(call_price_ly.red_eff_d '31-DEC-
2099'),nvl(put_price_1y.red_eff_d '1-DEC-2099') ) red_eff_d
  FROM
    (
      SELECT cusp_n, red_eff_d, red_price_a
      FROM
        (
            SELECT cusp_n, red_eff_d, red_price_a, ROW_NUMBER( )
OVER(
              PARTITION BY cusp_n
              ORDER BY
                red_eff_d
            ) rownumber
            FROM
              (
                SELECT cusp_n, red_eff_d, red_price_a
                FROM
                  <db-schema>.call_schedule
                WHERE
                  red_eff_d > lc_truncatedPricingDate
                  AND ( ( red_eff_d -
lc_truncatedPricingDate ) / 365 < 1 )
              )
          )
          WHERE
            rownumber = 1
        ) call_price_1y
        FULL OUTER JOIN (
          <query put_schedule table>
        ) put_price_1y ON call_price_1y.cusp_n = put_price_1y.cusp_n;
INSERT /*+ APPEND PARALLEL(8) */
  INTO <db-schema>.global_call_put_prices
  SELECT
    /*+ full(asim) full(sm) full(cs) parallel(asim 8) parallel(sm 8) parallel(cs 8) */
    b.asset_id asset_id,
    b.put_price_factor_1y,
    b.call_price_factor_1y,
    b.yield_to_worst_rate_factor * LEAST(lv_horizonQuarterly, b.maturity_factor)
quarterly_horizon_factor,
    b.yield_to_worst_rate_factor * LEAST(lv_horizonBiAnnually, b.maturity_factor)
biannual_horizon_factor,
    b.yield_to_worst_rate_factor * LEAST(lv_horizonYearly, b.maturity_factor)
yearly_horizon_factor
  FROM
    (SELECT sm.cusp_n asset_id,
      NVL( (cs.p_prc_1y / sm.cls_prc - 1) *
lv_callPricePutPriceMultiplicationFactor,-lv_putCallMaxValue) put_price_factor_1y,
      NVL( (cs.c_prc_1y / sm.cls_prc - 1) *
lv_callPricePutPriceMultiplicationFactor, lv_putCallMaxValue) call_price_factor_1y,
      LEAST( ( (sm.mty_d - lc_truncatedPricingDate ) / 365), NVL( ( (cs.red_eff_d-
lc_truncatedPricingDate)/ 365), lv_putCallMaxValue) ) maturity_factor,
      sm.calc_yld_to_wrst_rte * 100 yield_to_worst_rate_factor
FROM <db-schema>.mglobal_security_master_tmp sm
LEFT JOIN <db-schema>.mglobal_call_schedule_tmp cs
ON sm.cusp_n = cs.cusp_n) b;
```

The number of sessions to utilize for calculating asset return metrics data may be determined at 3633. In one embodiment, asset return metrics data may be calculated using parallel queries with a specified degree of parallelism. Accordingly, each parallel query may be processed using a number of query server processes corresponding to the specified degree of parallelism. In various implementations, the degree of parallelism for a parallel query may be specified at the statement level, at the session level, at the table level, at the index level, and/or the like. For example, a parallel query may specify that 8 query server processes should be used for processing the parallel query. In one implementation, the number of sessions to utilize may be determined based on available server resources to maintain a consistent degree of parallelism by creating a balance between sessions and parallel query server processes (e.g., threads). For example, for a server having 32 processors (e.g., CPUs, physical cores, virtual cores), 4 sessions may be utilized (e.g., determined by dividing the number of available processors by the specified degree of parallelism). Each session may be utilized for calculating asset return metrics data as discussed with regard to 3637-3693.

An assets range for a session may be determined at 3637. In one embodiment, an assets range for a session may refer to the set of assets to be processed by the session. In one implementation, the assets range for the session may be determined by dividing the filtered assets based on the number of sessions. For example, if there are in total 800K filtered assets for which asset return metrics data should be calculated, the filtered assets may be divided into 4 sets of assets each targeting 200K unique assets, and the session may be assigned 1 of the 4 sets of assets as the session's session assets.

A determination may be made at 3641 whether there remain session assets to analyze. In one implementation, each of the session's session assets may be analyzed. If there remain session assets to analyze, a batch size to utilize may be determined at 3645. In one implementation, the batch size may be specified in a configuration setting. For example, the batch size may be configured to be 1000 assets. In another implementation, the batch size may depend on the number of assets that remain to be analyzed. For example, if 300 assets remain to be analyzed, then the batch size may be 300 assets instead of 1000 assets.

A temporary table of session assets of the determined batch size may be created at 3649. In one implementation, a session assets batch of the determined batch size may be selected from the session assets that remain to be analyzed. For example, the temporary table comprising the session assets batch may be created via an Oracle RDS on Cloud database command similar to the following:

```
INSERT INTO <db-schema>.global_asset_id_distinct_tmp
  SELECT asset_id
  FROM <db-schema>.global_asset_list
  ORDER BY asset_id ASC offset lv_startIndex ROWS
  FETCH NEXT lv_loopIncrement ROWS ONLY;
```

A temporary table of factor simulations for the session assets batch may be created at 3653. In one implementation, the temporary table of factor simulations may be created by transposing factor simulations to store factor simulations for simulation ids representing different time horizons (e.g., this may reduce the number of records in the join as data related to different simulations are available in columns, making the expected returns calculation as discussed with regard to 3661 three times faster). For example, the temporary table of factor simulations for the session assets batch may be created via an Oracle RDS on Cloud database command similar to the following:

```
INSERT INTO pfmofrdbo.global_factor_sim_tmp
  SELECT *
  FROM
    (SELECT fs2.market_id,
      fs2.factor_id,
      fs2.sim_id AS sim_id,
      fs2.return AS RETURN
    FROM
      (SELECT fs.* FROM <db-schema>.mglobal_factor_sim_tmp fs
      WHERE fs.factor_id IN
        (SELECT DISTINCT factor_id FROM <db-schema>.global_factor_expo_tmp)
      ) fs2
    WHERE fs2.sim_id IN (p_simIdQuarterly, p_simIdBiAnnually, p_simIdYearly)
    ) PIVOT (SUM(RETURN) FOR (sim_id) IN (20 AS return_quarterly, 21 AS
return_biannual, 22 return_yearly)) ;
```

A temporary table of factor exposures for the session assets batch may be created at 3657. In one implementation, the temporary table of factor exposures may be created by selecting filtered factor exposures for the session assets batch. For example, the temporary table of factor exposures for the session assets batch may be created via an Oracle RDS on Cloud database command similar to the following:

```
INSERT INTO <db-schema>.global_factor_expo_tmp
```

-continued

```
SELECT fe.*
FROM <db-schema>.mglobal_factor_expo_tmp fe
JOIN <db-schema>.global_asset_id_distinct_tmp age
ON fe.asset_id = age.asset_id
WHERE fe.pricing_dt = lc_truncatedPricingDate;
```

Expected returns for the session assets batch may be calculated via parallel execution (e.g., via a parallel query) at 3661. In one implementation, the expected returns for the session assets batch may be calculated as the sum product of the factor exposures for the session assets batch and the simulated returns of filtered factor simulations for the session assets batch. For example, the expected returns for the session assets batch may be calculated via parallel execution via an Oracle RDS on Cloud database command similar to the following:

```
SELECT
  /*+ full(f) full(e) parallel(f 8) parallel(e 8) */
  e.asset_id asset_id,
  f.market_id,
  SUM(e.exposure * f.return_quarterly) return_quarterly,
  SUM(e.exposure * f.return_biannual) return_biannual,
  SUM(e.exposure * f.return_yearly) return_yearly
FROM <db-schema>.global_factor_sim_tmp f
JOIN <db-schema>.global_factor_expo_tmp e
ON (f.factor_id = e.factor_id)
GROUP BY e.asset_id,
  f.market_id
```

The expected returns for the session assets batch may be adjusted based on call and/or put schedules via parallel execution (e.g., via a parallel query) at 3665. In one implementation, if an asset has an embedded call option redeemable within the investment horizon, the return from exercising the call option may be set as the upper bound of the simulated asset return, and/or if an asset has an embedded put option redeemable within the investment horizon, the return from exercising the put option may be set as the lower bound of the simulated asset return. For example, the call/put option schedules (e.g., including redemption dates and prices) may be obtained from Sentinel's call_schedule/put_schedule tables via an Oracle RDS on Cloud database command similar to the following:

```
SELECT as1.pricing_dt, as1.sim_id, as1.asset_id, as1.market_id,
greatest(least(as1.simulated_return, (cs.next_call_price / sm.current_instrument_price
− 1) * 10000), (ps.next_put_price / sm.current_instrument_price − 1) * 10000)
FROM asset_sim as1, security_master sm, call_schedule cs, put_schedule ps
WHERE as1.asset_id = sm.cusip
AND as1.asset_id = cs.cusip
AND as1.asset_id = ps.cusip
AND cs.earliest_next_call_date <= as1.investment_horizon
AND ps.earliest_next_put_date <= as1.investment_horizon
```

For example, the expected returns for the session assets batch may be adjusted based on call and/or put schedules via parallel execution via an Oracle RDS on Cloud database command similar to the following:

```
SELECT
     /*+ full(asim) full(scp) parallel(asim 8) parallel(scp 8) */
     asim.asset_id,
     asim.market_id,
     GREATEST(GREATEST(scp.put_price_factor_3m, LEAST(asim.return_quarterly,
scp.call_price_factor_3m ) ) + scp.quarterly_horizon_factor,   −10000) return_quarterly,
     GREATEST(GREATEST(scp.put_price_factor_6m, LEAST(asim.return_biannual,
scp.call_price_factor_6m ) )   + scp.biannual_horizon_factor, −10000) return_biannual,
     GREATEST(GREATEST(scp.put_price_factor_1y, LEAST(asim.return_yearly,
scp.call_price_factor_1y ) )       + scp.yearly_horizon_factor, −10000) return_yearly
   FROM
     (SELECT
       /*+ full(f) full(e) parallel(f 8) parallel(e 8) */
       e.asset_id asset_id,
       f.market_id,
       . . . <complete query from 0391>
     ) asim
   JOIN <db-schema>.global_call_put_prices scp
   ON scp.asset_id = asim.asset_id ;
```

The expected returns for the session assets batch may be transposed into array format at 3669. In one embodiment, the wide array format may facilitate improved performance when calculating portfolio level return metrics. For example, the expected returns for the session assets batch may be transposed into array format via an Oracle RDS on Cloud database command similar to the following:

Custom data type asset_sim_return_data_type is used to store an array of decimal values. Each decimal value is split into two parts (e.g., X.Y where X represents the CVaR value and Y represents the market id). Storing both CVaR metric and the associated market id allows storing data in one variable instead of two thus saving storage. This also allows parallel execution of collecting returns in the array format and maintaining the market ids for which each of the returns are associated with.

```
SELECT
     /*+ full(asim) parallel(asim 8) */
     asim.asset_id,
     lc_truncatedPricingDate AS pricing_dt,
     CAST ( COLLECT( TO_BINARY_DOUBLE(TRUNC(asim.return_quarterly)+
SIGN(asim.return_quarterly)* ((asim.market_id*10) +1 )/ 1000000 )) AS
ASSET_SIM_RETURN_DATA_TYPE) return_quarterly,
     CAST ( COLLECT( TO_BINARY_DOUBLE(TRUNC(asim.return_biannual) +
SIGN(asim.return_biannual)* ((asim.market_id*10) +1 )/ 1000000 )) AS
ASSET_SIM_RETURN_DATA_TYPE) return_biannual,
     CAST ( COLLECT( TO_BINARY_DOUBLE(TRUNC(asim.return_yearly)   +
SIGN(asim.return_yearly)* ((asim.market_id*10) +1 )/ 1000000 ) )AS
ASSET_SIM_RETURN_DATA_TYPE) return_yearly
   FROM <db-schema>.global_asset_sim_tmp asim
   GROUP BY asim.asset_id
   ) UNPIVOT (RETURN FOR sim_id IN (return_quarterly AS 20, return_biannual AS 21,
return_yearly AS 22)
```

The transposed expected returns for the session assets batch may be written to the asset simulation wide table via parallel execution (e.g., via a parallel query) at 3673. In one implementation, the asset simulation wide table (e.g., asset_sim_wide table in FIG. 40) may be written to in parallel by query server processes from the utilized sessions (e.g., by up to 32 query server processes when utilizing 4 sessions with degree of parallelism of 8). For example, the transposed expected returns for the session assets batch may be written to the asset simulation wide table via parallel execution via an Oracle RDS on Cloud database command similar to the following:

```
INSERT INTO <db-schema>.asset_sim_wide
  /*+ parallel(8) NO_GATHER_OPTIMIZER_STATISTICS */
  SELECT *
  FROM
    (SELECT
      /*+ full(asim) parallel(asim 8) */
      asim.asset_id,
      lc_truncatedPricingDate AS pricing_dt,
      CAST ( COLLECT( TO_BINARY_DOUBLE(TRUNC(asim.return_quarterly)+
. . . <complete query from 3669>
```

A determination may be made at 3677 whether there remain asset return metrics to calculate for the session assets batch. In one implementation, each of the asset return metrics (e.g., requested asset return metrics specified in the asset return metrics calculation request, default asset return metrics specified in a configuration setting) may be calculated. If there remain asset return metrics to calculate, the next asset return metric may be selected at 3681. For example, asset return metrics may include a security's expected return, worst returns (CVaR), return volatility, and/or the like.

The selected asset return metric for the session assets batch may be calculated via parallel execution (e.g., via a parallel query) at 3685. For example, the average of 5% worst returns may be calculated for the CVaR asset return metric. In one implementation, the selected asset return metric for the session assets batch may be calculated in accordance with an applicable formula for the selected asset return metric. For example, the selected asset return metric (e.g., CVaR) for the session assets batch may be calculated via parallel execution via an Oracle RDS on Cloud database command similar to the following:

The query below shows how CVaR measure is calculated in parallel based on available asset returns for a single horizon. Similar queries may be run for bi-annual and annual horizons. lc_truncatedPricingDate holds the pricing date for which the batch is run, lv_marketCount holds the number of markets used for simulations and lv_marketPercentageForCvar holds the percentage value used for calculating the CVaR (e.g., average of the worst 5% returns).

```
SELECT
    /*+ parallel(8) */
    lc_truncatedPricingDate pricing_dt,
    asim.asset_id,
    p_simIdQuarterly,
    'CVAR' measure_name,
    NULL AS factor_id,
    NULL AS market_id,
    AVG(asim.return_quarterly) measure_value
  FROM
    (SELECT *
    FROM
      (SELECT asim.asset_id,
        asim.return_quarterly,
        ROW_NUMBER( ) OVER( PARTITION BY asim.asset_id ORDER BY
asim.return_quarterly ) rk
      FROM <db-schema>.global_asset_sim_tmp asim
      ) asim
    WHERE rk <= lv_marketPercentageForCvar * lv_marketCount
    ) asim
  GROUP BY asim.asset_id;
```

The selected asset return metric for the session assets batch may be written to the asset measure table via parallel execution (e.g., via a parallel query) at 3689. In one implementation, the asset measure table (e.g., asset_measure table in FIG. 40) may be written to in parallel by query server processes from the utilized sessions (e.g., by up to 32 query server processes when utilizing 4 sessions with degree of parallelism of 8). For example, the selected asset return metric (e.g., CVaR) for the session assets batch may be written to the asset measure table via parallel execution via an Oracle RDS on Cloud database command similar to the following:

```
INSERT INTO <db-schema>.asset_measure
  /*+ parallel(8) NO_GATHER_OPTIMIZER_STATISTICS */
  SELECT
    /*+ parallel(8) */
    lc_truncatedPricingDate pricing_dt,
    asim.asset_id,
    p_simIdQuarterly,
    'CVAR' measure_name,
  . . . <complete query from 3685>
```

The temporary tables created for the session assets batch may be cleared at 3693. In one embodiment, the temporary tables created for the session assets batch may be cleared to reduce temporary storage utilization. For example, the temporary tables created for the session assets batch may be cleared via an Oracle RDS on Cloud database command similar to the following:

```
EXECUTE IMMEDIATE 'TRUNCATE TABLE <db-schema>.global_asset_id_distinct_tmp DROP
STORAGE' ;
EXECUTE IMMEDIATE 'TRUNCATE TABLE <db-schema>.global_factor_expo_tmp DROP
STORAGE' ;
EXECUTE IMMEDIATE 'TRUNCATE TABLE <db-schema>.global_factor_sim_tmp DROP STORAGE' ;
EXECUTE IMMEDIATE 'TRUNCATE TABLE <db-schema>.global_asset_sim_tmp DROP STORAGE' ;
```

Asset return metrics data from the asset simulation wide table and/or the asset measure table may be provided to the requesting application at 3697. In one implementation, the asset return metrics data may be provided via an asset return metrics calculation response. In some implementations, global temporary tables may be cleaned up using Data Definition Language (DDL) statements for faster execution.

FIG. 37 shows an architecture for the MLPO. In FIG. 37, an embodiment of how the database calculation engine 3701 may be utilized to facilitate generation of a portfolio returns visualization (e.g., for constructing an optimized bond ladder portfolio) is illustrated.

FIG. 38 shows an architecture for the MLPO. In FIG. 38, an embodiment of how the factor exposure table may be generated using parallel processing (e.g., via a parallel query) is illustrated. For example, the factor exposure table may be generated via parallel execution via an Oracle RDS on Cloud database command similar to the following:

```
INSERT INTO Factor Expo /*+ parallel(8) NO_GATHER_OPTIMIZER_STATISTICS */
SELECT /*+ full(a) parallel(a 8) */
  case b.factor_id
    when 50 then - - exposure for muni 2Y
    when 55 then - - exposure for muni 5Y
    when 280 then - dimension reduction using median OAS
    ...
  end
FROM INST_REF_ANALYTICS_TEMP a
INNER JOIN SECURITYTYPE_FACTOR_TEMP b
on a.product_type = b.product_type
```

FIG. 39 shows an architecture for the MLPO. In FIG. 39, an embodiment of an asset return metric calculation process that may be utilized to facilitate operation of the database calculation engine is illustrated. For example, the asset return metric calculation process may be implemented via pseudocode similar to the following:

```
Asset Return Metric Calculation Process Pseudocode
GET Input of range of assets to run for the sessions
CLEAR all temporary tables
FIND target assets based on filter criteria/input
POPULATE temporary table with factor sims for target assets
POPULATE temporary table with factor exposure for target assets
SET no-of-target-assets to total number of target assets to be processed
WHILE no-of-target-assets > 0
  FETCH next 1000 assets from target assets
  POPULATE temporary factor sim with factors for 1K assets
  POPULATE temporary factor expo for 1K assets
  CALCULATE asset sims i.e. sum product of factor_sim and factor_expo for 1K
    assets (parallel execution)
  TRANSPOSE asset sims in wide format by converting market returns into array format
    for 1K assets
  SAVE asset sims to table (parallel execution)
  CALCULATE CVAR in parallel for 1K assets
  SAVE CVAR to asset measure table (parallel execution)
  CLEAR temporary tables
  ADJUST no-of-target-assets with number of records processed i.e. no-of-target-
    assets = no-of-target-assets - 1000
CONTINUE LOOP
```

FIG. 40 shows an architecture for the MLPO. In FIG. 40, an entity relationship diagram describing embodiments of a database with a set of database tables that may be utilized to facilitate operation of the database calculation engine is illustrated.

FIG. 41 shows a screenshot illustrating user interface(s) of the MLPO. In FIG. 41, an exemplary user interface (e.g., for a mobile device, for a website) for constructing an optimized bond ladder portfolio is illustrated. Screen 4101 shows that a user may utilize a positions tab 4105 to specify a universe of investment securities. The user may utilize a set of strategy setting widgets 4110 to specify an investment amount, a time horizon, a rung interval, a tax rate, a yield maximization method, and/or the like. The user may utilize a set of security selection widgets 4115 to specify a tax status, a set of products (e.g., one or more of municipal, corporate, treasury, etc.), a state, a callable setting, a minimum credit rating, whether to include non-rated bonds, a maximum security exposure, and/or the like. The user may utilize a construct portfolio widget 4120 to initiate the creation of the optimized bond ladder portfolio.

FIG. 42 shows a screenshot illustrating user interface(s) of the MLPO. In FIG. 42, an exemplary user interface (e.g., for a mobile device, for a website) for constructing an optimized bond ladder portfolio is illustrated. Screen 4201 shows that the user may utilize a positions tab 4205 to view proposed positions of the optimized bond ladder portfolio for corporate product type. The user may utilize a set of proposed positions widgets 4210 to view information regarding bond ladder rungs and/or regarding individual investment securities in each rung.

FIG. 43 shows a screenshot illustrating user interface(s) of the MLPO. In FIG. 43, an exemplary user interface (e.g., for a mobile device, for a website) for constructing an optimized bond ladder portfolio is illustrated. Screen 4301 shows that the user may utilize a positions tab 4305 to view proposed positions of the optimized bond ladder portfolio for municipal product type. The user may utilize a set of proposed positions widgets 4310 to view information regarding bond ladder rungs and/or regarding individual investment securities in each rung.

FIG. 44 shows a screenshot illustrating user interface(s) of the MLPO. In FIG. 44, an exemplary user interface (e.g., for a mobile device, for a website) for constructing an optimized bond ladder portfolio is illustrated. Screen 4401 shows that the user may utilize a positions tab 4405 to view proposed positions of the optimized bond ladder portfolio for treasury product type. The user may utilize a set of proposed positions widgets 4410 to view information regarding bond ladder rungs and/or regarding individual investment securities in each rung.

FIG. 45 shows a screenshot illustrating user interface(s) of the MLPO. In FIG. 45, an exemplary user interface (e.g., for a mobile device, for a website) for constructing an optimized bond ladder portfolio is illustrated. Screen 4501 shows that the user may utilize a portfolio analysis tab 4505 to view portfolio characteristics of the optimized bond ladder portfolio with no risk score adjustment. The user may utilize a set of portfolio characteristics widgets 4510 to view information regarding the various portfolio characteristics.

FIG. 46 shows a screenshot illustrating user interface(s) of the MLPO. In FIG. 46, an exemplary user interface (e.g., for a mobile device, for a website) for constructing an optimized bond ladder portfolio is illustrated. Screen 4601 shows that the user may utilize a portfolio analysis tab 4605 to view portfolio characteristics of the optimized bond ladder portfolio with risk score adjustment. The user may utilize a set of portfolio characteristics widgets 4610 to view information regarding the various portfolio characteristics.

FIG. 47 shows a screenshot illustrating user interface(s) of the MLPO. In FIG. 47, an exemplary user interface (e.g., for a mobile device, for a website) for constructing an optimized bond ladder portfolio is illustrated. Screen 4701 shows that the user may view information regarding market sensitivity of the optimized bond ladder portfolio. The user may utilize a set of market sensitivity widgets 4705 to view information regarding market sensitivity of the optimized bond ladder portfolio for overall market scenarios, for specified predefined scenarios, for specified business cycles, and/or the like over various time horizons.

Additional Alternative Embodiment Examples

The following alternative example embodiments provide a number of variations of some of the core principles already discussed for expanded color on the abilities of the MLPO.

FIG. 31 shows an architecture for the MLPO. In FIG. 31, an embodiment of an AWS architecture that may be utilized to facilitate MLPO (also referred to as ATIM in the figure) operation is illustrated.

FIG. 32 shows an architecture for the MLPO. In FIG. 32, an embodiment of an AWS architecture that may be utilized to facilitate MLPO (also referred to as ATIM in the figure) simulation calculation workflow is illustrated.

FIGS. 33A-B show an architecture for the MLPO. In FIGS. 33A-B, entity relationship diagrams describing embodiments of a database with a set of database tables that may be utilized to facilitate MLPO operation are illustrated.

FIG. 48 shows an architecture for the MLPO. In FIG. 48, an embodiment of a bond ladder construction process that may utilize asset return metric data (e.g., CVaR in the asset measure table) provided by the database calculation engine is illustrated.

Enabling Unprecedented Market Stress Scenarios to be Generated Following the Observed Unprecedentedness Pattern from History The unprecedentedness of a historical scenario is described as the number of Δ factors that take unprecedented values compared to historical scenarios prior to that date. The plot in FIG. 65 visualizes the relationship between Δ VIX and historical unprecedentedness. In this example, a degree 2 polynomial is used to represent the relationship because as Δ VIX becomes more extreme in both ends, greater number of Δ factors taking unprecedented values are expected to show up. The fitted degree 2 polynomial curve is the historical unprecedentedness curve.

As shown in FIG. 65, a large VIX change comes with unseen changes in market risk factors.

The unprecedentedness of a transfer-layer VAE simulated scenario is described to be the number of Δ factors that take unprecedented values compared to historical scenarios. The plot in FIG. 66 shows that simulation output from transfer-layer VAE fails to reflect the relation shown above, with almost all scenarios having 0 unprecedentedness. The reason is that VAE restores the historical scenarios very well so it is not surprising we are unable to see more extreme Δ factors values.

As shown in FIG. 66, a Deep Learning Model captures each factor's history closely but neglects other factors' related new extremes.

Following what has been done to calculate VAE unprecedentedness, we can apply it to panic simulated market scenarios. The goal is to make the relationship between Δ VIX and stress sim unprecedentedness to look alike to the relationship in historical unprecedentedness section. The approach is to find the mean squared error between the unprecedentedness curves. See FIGS. 68, 69, and 70.

For example, as shown in FIG. 67, by selecting historical scenarios with either $\Delta$ VIX $<-1000$ or $\Delta$ VIX$>3062$ to compute mean and covariance and then fit a multivariate normal distribution and sample the same number of scenarios as in history, the relationship fitted from simulated scenarios will be alike to the historical.

A component of the market scenario simulation is a deep learning model, variational autoencoder. To take advantage of the cloud compute power, in one implementation, a machine learning service, SageMaker, may be used in AWS. SageMaker is a fully managed service that provides an efficient way for developers and data scientists to collaborate together to build, train, tune, and deploy models in a machine learning pipeline. With SageMaker, the model training and tuning process can be conveniently run in a parallel and distributed way on multiple instances and multiple GPUs. In addition, the one-click deployment feature of SageMaker significantly reduces the effort to deploy a machine learning model. For example, with the parallel computing architecture using SageMaker, the training time of multiple models may be reduced to 2 minutes in total, while training multiple models sequentially with single instance and single CPU takes 45 minutes, as shown in FIG. 72.

Simulating Mutual Fund and ETF Asset Returns

The Mutual Fund and ETF returns simulation model employs a set of machine learning techniques to estimate 3-month, 6-month and 1-year returns under simulated market scenarios while allowing for domain experts to incorporate their subjective views. FIG. 49 illustrates the overall model architecture. In one implementation, parallel computing may be used to implement training and deployment of a unique model for each mutual fund or ETF. As FIG. 50 demonstrates, the process of loading data from database tables, performing feature engineering, training model and writing results to database may be distributed to multiple processors and conducted simultaneously. FIG. 51 summarizes the database tables containing model input and output. For each fund or ETF, the returns during specified investment horizons are aggregated geometrically from daily returns. Domain experts have the option of specifying a pool of potential market factors to be considered by the feature selection procedure for a particular fund or ETF. If no factors are specified by experts, available market factors will be considered. To select the set of market factors that contribute the most to overall model performance and mitigate the problem of multicollinearity, a proprietary feature selection procedure is designed to utilize XGBoost to rank the feature importance levels of available market factors, and feed the factors with positive importance scores to a customized forward selection process, which selects a set of factors that maximizes the model's adjusted R-squared as well as restrains model coefficients from changing signs (see FIG. 52). Subsequently, a Ridge Regression model is trained to learn the relationship between a fund's or ETF's historical returns and those of the selected set of market factors using 75% of historical data points, is validated using the remaining 25% of historical data points based on a number of metrics, including out-of-sample adjusted R-squared, effect size of residual distribution, residual correlation, etc., and is utilized to estimates its returns under stimulated market environments. FIG. 53 illustrates the market risk factor exposures based on the regression models as presented in the UI. To account for a fund or ETF's active risk not captured by common market factors, regression residuals from the model validation stage are randomly sampled and added to the simulated fund or ETF returns. Lastly, the estimated returns may be calibrated to reflect capital market assumptions provided by economists. FIGS. 54 and 55 present the distributions of simulated returns under user-defined market scenarios and different business cycles, respectively.

Simulating Equity Asset Returns

Individual Equity returns for different time horizons are aggregated geometrically with daily return, which is adjusted for corporate actions such as stock split and dividend. Daily return may be used instead of price because price can have huge jump caused by corporate actions. Feature selection may be utilized before model training. It uses an XGBoost model to select a subset of features that contribute to positive gain in feature importance ranking and then feeds these selected features to a forward selection process, which further extracts features that improve adjusted R square (see FIG. 56). Both Ridge regression (e.g., used in forward selection with adjusted R square) and XGBoost regression at the last step deal with multi-collinearity problem. Based on the CAPM model, an asset's risk has 2 components: one is market risk driven, one is idiosyncratic risk driven. Building the 2 parts separately allows models to better capture the behavior of different risk components. Intuition for conditional beta modeling is that based on historical observation, equities' correlation to market index can vary under different market scenarios, and correlation from different equities can also vary. Conditional beta model captures individual equity's sensitivity to market index across the simulated market scenarios and formulates the market risk driven part. Intuition for idiosyncratic risk modeling is that based on historical observation, beta risk from broad market index partially explains an equity's total return, and the other key part is company specific risk, which in this case is revealed from company financials data and default probability. Combining conditional beta model and idiosyncratic risk model, a more comprehensive total risk simulation is generated matching the CAPM's explanation. During training phase, realized beta is calculated using linear regression of individual equity's return series against market index's return series for a selected time horizon. Modeling for 3M, 6M, and 12M are separated since market scenario simulation and financials factors capture their own dependencies under different time horizons. To account for residual analysis, a few validations were done. 1. Effective size (Cohen's D measure) was close to zero. 2. Residual correlation to target variable was close to zero. 3. Residual was unbiased. Residuals are stored during training phase, randomly sampled during scoring phase, and added to simulated conditional beta to better capture market driven risk. Conditional beta modeling uses broad common market risk factors as features, including macro factors, equity indices, and smart beta factors. To simulate individual equity's conditional beta against market index, simulated market scenarios are used. Conditional beta modeling may be implemented with parallel computing on EMR notebook, which uses AWS cloud environment and utilizes clusters to do the training Generated models for each individual equity may be directly written into a Postgres database in binary format through a driver (see FIG. 62). Company specific returns are modeled with feature importance weighted historical sampling. During model training phase, feature importance is stored. During scoring phase, if a simulated market scenario can be mapped to individual equity's existing historical scenario, then the excess return over market index for this specific historical scenario is used. Otherwise, a Euclidian distance is calculated weighted by feature importance from selected risk features, and excess return over market index for the closest historical scenario is used. Total return is calculated combining beta return and idiosyncratic return. Simulated returns for each equity are stored in an array format in Postgres table.

EMR Notebook is used in simulating asset returns concurrently on Cloud Technology platform for mutual funds, ETFs, equities and fixed income instruments. In Financial Services Industry, as data sets grow rapidly and complexly, the data transformation, data storage, and the users' real-time operations end up with a huge burden. Big data frameworks may be employed to support the data process and storage, and they allow the data to be generated and stored in a parallel and distributed way. Spark and Hadoop are examples of compute engines for big data that may be utilized. The principle of the compute engine in Spark is to analyze computation tasks and optimize the workflow of the data processing before actually executing the code. Spark may utilize Directed Acyclic Graph (DAG) optimizations and in memory processing.

Spark has been integrated into many cloud services, such as Elastic Map Reduce (EMR) provided by Amazon Web Service (AWS). In one implementation, EMR may be utilized to make full usage of compute power offered by the cloud provider and save compute costs, since the EMR runtime for Spark can be over 3 times faster than standard Spark. Using cloud provided service may help to improve the performance of workloads without making extra changes to the applications.

In one implementation, in order to improve the development efficiency, EMR Notebooks may be used along with EMR clusters to submit Spark jobs for parallel computing. EMR Notebook is a managed notebook environment which is based on the open-source Jupyter notebook. It supports submitting Spark code to EMR clusters through Apache Livy.

In one implementation, the Optimizer is developed based on parallel computation capability and advanced numerical optimization methodologies, such as Tail Risk Optimizer and Mean-Variance Optimizer, in order to provide optimal portfolio within 3M, 6M and 1Y horizon and user specified conditions. It evaluates the portfolio expected return, portfolio volatility and portfolio drawdown, equipped with flexible scenarios choices and business Cycle overview.

For Tail Risk Optimizer, mixed integer programming, binary integer programming and linear programming with rounding techniques are available. CVaR-Mean frontier can be shaped with the optimizer parallel computation ability and then illustrate the relationship between CVaR and expected return. Different CVaR-Mean frontier can be visualized according to diversification preferences (see FIG. 71) and market scenarios. The mixed integer programming can offer more accurate results according to asset price and asset tradable amount while the linear programming with rounding techniques guarantees faster performance on large scale computation (See FIG. 72).

For the Mean-Variance Optimizer, the portfolio risk is measured by covariance matrix that can be estimated through two different methods in the tool. "Shifted Diagonal" method adjusts original sample covariance matrix diagonal to decrease asset correlation influence in optimization, and "Ledoit-Wolf" method gives a robust estimation by minimizing the quadratic loss function.

In one implementation, the optimizer attempts to maximize the portfolio return with a risk penalty whose value is decided by risk tolerance parameter. The 0 risk tolerance will lead the optimizer to minimize the risk at all costs and the infinity risk tolerance will maximize the return at all costs. In the tool, the risk tolerance has been mapped from 0 to 10 to be user friendly.

Similarly, the efficient frontier of Mean Variance Optimizer can be presented according to investors' preferences as well as various market scenarios. Optimal portfolio weights may be generated varying risk aversion in the convex optimization with user specified weights constrains and market scenario. This set of optimal solutions the optimizer generated would form a frontier line and the optimal solution of current risk tolerance level would be a big red dot on the previous frontier and should move along on the efficient frontier when risk tolerance parameter changes (see FIG. 73). Thus, the change of risk tolerance level may not change the efficient frontier shape, but the changes of diversification and market scenarios may lead to a reshaped efficient frontier (see FIG. 74 and FIG. 75).

Multi-Risk Factor Risk Engine and Portfolio Aggregation Using Oracle RDS on Cloud Using Oracle RDS on Cloud, a SQL-based solution effectively utilizes different parallel execution techniques for calculating simulation data. Conditional risk simulation can now be calculated for over a million assets using a faster, simple, cost effective and scalable solution using Oracle RDS on Cloud in substantially less amount of time. Computations happens on the database server, eliminating having to transfer a huge set of data to external systems for processing and therefore maximizes processing of data using cloud computing.

The first step of the process is to calculate Factor Exposures for available assets as shown in FIG. 76. Based on available reference data and analytics, the spread ratio is calculated for the available assets in parallel. The second step is to calculate simulated returns for the available assets as shows in FIG. 77. The process of generating simulated asset returns may involve, getting unique list of assets for which exposure data is available and loading the factor exposures for assets with exposure to the factors and loading factor simulations for those factors (see FIG. 78). The process then splits the workload into smaller chunks with each chunk processing a subset of the assets. The simulated returns for the assets are then calculated, adjusted using available call and put schedule, and written to the database using several parallel computing techniques as listed below (see FIG. 79).

Convexity Adjustment—To integrate the impact of convexity in asset simulation, it may be included as an additional term in the dot product following these steps. The convexity metric (option adjusted convexity) is obtained from Sentinel's security_master table.

Step 1: Insert convexity as two new "factors" (id 80 for non-muni instruments, 81 for muni instruments) in the factor_expo table (see FIG. 80).

Step 2: For each simulation id and each market scenario (market id), insert the square of the change in yield as two new "factors" (id 80 for Treasury curves, 81 for muni curves) in the factor_sim table. In one implementation, the average return of different key rates may be used as the proxy for the change in yield (see FIG. 81).

Treasury curves 3M, 6M, 1Y, 2Y, 3Y, 5Y, 7Y, 10Y, 20Y, 30Y

Muni curves 2Y, 5Y, 10Y, 20Y

Optionality Adjustment—If an instrument has an embedded call (or put) option redeemable within the investment horizon, the return from exercising the call (or put) option may be set as the upper (or lower) bound of the simulated asset return. The call (or put) option schedules, including redemption dates and prices, are obtained from Sentinel's call_schedule (or put_schedule) tables (see FIG. 82).

In one implementation, several data reduction, scaling and parallel computing techniques may be utilized. For example, innovative ways to use global temporary tables and sessions, data reduction techniques to drastically limit amount of data utilized for processing thus lowering processing time, and several other data parallelization techniques for generating simulation data may be utilized.

1. Use of Multiple Batches to achieve higher degree of parallelism (DOP)
2. Use of Global Temporary Tables (GTT) to be able to run batch in multiple sessions and reduce temporary storage requirements
3. Use of Data Reduction techniques to reduce full table scans for joins between Factor Exposure and Factor Simulation table
4. Use of Parallel Query to parallelize generation of Asset Simulation and Contribution to Value at Risk data
5. Use of Parallel DML to parallelize inserting data related to Asset Simulation and Contribution to Value at Risk 6. Use of DDL for faster execution of delete statements to speed up cleanup of global temporary tables (see FIG. 79)

Tail-Risk Adjusted Bond Ladder Construction

Tail-risk adjusted bond ladder construction is the capability to construct a bond ladder incorporating real-time market offerings, user-defined search criteria, and pre-trade scenario risk analysis (see FIG. 93). In some implementations, the tail-risk adjusted bond ladder construction process is a rule based approach that avoids the use of a solver, which allows a large number of bond market offerings to be evaluated in real-time, guarantees portfolio construction solutions based on market offerings, and provides consistent and scalable calculation performance. The bond-ladder construction logic (see FIG. 88) uses the real-time bond offering from electronic bond trading venues. Real-time data fusion technologies provide the list of bonds and prices from multiple sources of liquidity. The logic also ensures the market values across the rungs of the bond ladder are approximately equal (see FIG. 94). The proposed bond ladder is built with approximately equal market values across the different rungs of the bond ladder (see FIG. 95). Market value is calculated using allocated par amount and prices from real-time bond offerings.

In one implementation, the bond ladder construction may use two separate modes—Yield Maximization and Risk Score Adjusted to construct the ladder (see FIG. 93). Under Yield Maximization mode (see FIG. 96), the offerings are first organized into classifications according to product type, credit rating, and final maturity. The classifications can then be further screened by user-defined search criteria resulting with the (e.g., one hundred) highest yielding securities presented per rung as ladder portfolio options. Ladder options may be allocated within the portfolio up to a user-defined diversification constraint ("Maximum Security Exposure"). By doing this, the user can specify that the market value of any individual position should not exceed a percentage threshold of the total market value of the portfolio. Under Risk Score Adjusted mode (see FIG. 97), the offerings are first organized into classifications according to product type, credit rating, and final maturity. The classifications can then be further screened by user-defined search criteria. The resulting set of securities are then run through the model which takes the offering yield to worst and performs a calculation on each to arrive at a down-side risk score. Down-side risk is quantified using a statistical measure calculated as a zscore, sourced from either the security's default probability or its 5% worst mark-to-market estimated total returns, also known as the 5% conditional value-at-risk (CVaR).

For bonds which are covered by Kamakura Corporation's default risk model, default probabilities may be used as the down-side risk score. Default probabilities are published daily by Kamakura for public, private and sovereign issuers across multiple time horizons. Default probabilities may be updated for these issuers using the following tenors: 1 Month, 3 Months, 6 Months, 1 Yr, 2 Yr, 4 Yr, 5 Yr, 7 Yr, 10 Yr. These time horizons are matched with the time to maturities of the bonds in the bond offerings. For bonds not covered by Kamakura's default risk model, down-side risk may be quantified as CVaR calculated based on a proprietary risk model. A normalized risk score is calculated for available bond offerings for each rung. The bonds' yield to worst may be adjusted by the risk score. Bond offerings with lower down-side risk rank higher; bond offerings with higher risk rank lower.

Steps for Tail-Risk Adjusted Bond Ladder Construction

1. Get Available Bonds from Offers API based on inputs provided in the Strategy Settings and Security Selected screen of Bond Beacon (see FIG. 89)
2. Check if Risk Score Adjustment option is selected as the Yield Maximization Method. If Yes, continue with Step #3 below otherwise, continue to Step #5.
3. Calculate and store MEAN and STDDEV based on data available for Conditional Value at Risk (CVAR) and Default Probability. These values will be used later to calculate z-score and adjustment to yield.
4. Check each security available for allocation and adjust their yield
   a. If the security has default probability, calculate z-score using the following formula $$z\text{-score} = (DEFAULTinstrument - DEFAULTmean)/DEFAULTstddev$$

$$\text{Adjusted Yield} = \text{yield} * (1 - z\text{-score}/10)$$

b. If no default probability data is available for the security, calculate z-score based on the following formula $$z\text{-score} = (CVARinstrument - CVARmean)/CVARstddev$$

$$\text{Adjusted Yield} = \text{yield} * (1 + z\text{-score}/10)$$

5. Run the bond allocation logic based on Adjusted Yield. If No Risk Score Adjustment option is selected, Adjusted Yield equals to the Yield of the security (see FIG. 90 for output generated from the bond ladder construction logic).
   a. Sort available bonds based on Adjusted Yield, Rating and Available Quantity to Trade
   b. Calculate Quantity to Allocated in PAR for security based on Minimum Denomination, Minimum Increment and Diversification Limit (in MV)
   c. Check for Minimum Balance Remaining based on Calculated Quantity to Allocate. If Minimum Balance Remaining Condition is not satisfied, skip the bond and continue.
   d. Check if the rung has enough cash for allocation based on allocated MV for security.
      i. If rung has enough cash, allocate and adjust rung MV
      ii. If run does not have enough cash, repeat step 5.a using available rung's cash as the limit Continue with steps 5.a, 5.b and 5.c.
6. Check if Residual Cash is remaining after Bond Allocation
   a. Find Rung with highest yield.
      i. Using bonds currently allocated within a rung, find the yield based on weighted average calculations.
      ii. Find the rung with the highest average yield.
   b. For all bonds currently available in the rung, run the bond allocation logic as listed in Step #5

Scenario-Based Risk Reporting for Multiple User-Specified Scenarios

Scenario-based Risk Reporting may be implemented as part of an application programming interface (API) which uses parallel processing for calculating risk-based analytics for user specified scenarios.

The first step of the process is to load simulated returns for available securities in parallel (see FIG. 83). If simulated returns are not available for the specified securities (see FIG. 91), a real-time asset simulation process is executed. This real-time process generates the simulated returns for the securities in real-time by applying data reduction methods for loading factor exposures and simulated factor returns from the database (see FIG. 87) for the factors the securities has exposures to. The data reduction method reduces the data loaded for calculating the simulated returns by reducing the data to the factors the securities have exposures to. This eliminates redundant data being loaded and supports the factor executing of dot product calculations utilized for generating the simulated returns (see FIG. 86).

The second step is to filter out markets based on the input scenarios (occurrence of a situation or changes to key factor such as, change in interest rates) or business cycles (a business cycle is the natural rise and fall of economic growth that occurs over time) specified by the user. For example, if user has created a scenario with a criteria in which the U.S. 2 Year Treasury Rate is between 0.3 and 1.8%, the process creates a map of markets for which the simulated returns for securities falls within this range. The process is executed in parallel for available user-defined scenarios and specified securities. If a particular user-defined scenario has multiple such criteria, additional filter logic is applied on top of previously filtered markets. Once the target list of markets is available for each user-defined scenario, the process filters the simulated returns for securities and reduces the data to the targeted markets available.

The final step is to calculate the weighted average simulated returns for the filtered markets based on the weight specified as part of the input for each security. The process then calculates risk-level analytics such as, CVAR based on filtered simulated returns. The results are then presented to the user (see FIG. 92). FIG. 98 shows the Market Sensitivity Chart that shows how a particular portfolio performs under different user-defined scenarios and business cycles.

Additional embodiments may include:

(Generate Simulated Market Scenarios Using a Set of Deep Learning Neural Networks and Multivariate Mixture with Cloud Computing)

1. A machine learning portfolio generating apparatus, comprising:
   - a memory;
   - a component collection in the memory;
   - a processor disposed in communication with the memory and configured to issue a plurality of processor-executable instructions from the component collection, the processor-executable instructions structured as:
     - generate, via at least one processor, a set of simulated market scenarios using a variational autoencoder with cloud computing technology, the variational autoencoder structured as:
       - use neural networks as encoder to generate a set of latent variables, simulate latent variables with neural networks as decoder such that the decoded simulated market scenarios follow dynamic dependencies and volatilities of historical market risk factors;
       - use a transfer layer between the encoder and the decoder to allow latent space variables to take on any distributions and any dependency joint distribution structures;
       - in which the number of latent space variables, the number of neurons in the encoder and the decoder and the number of layers of the encoder and the decoder are tuned to ensure an overall goodness of fit between the set of simulated market scenarios and a set of historical market scenarios.

2. The apparatus of embodiment 1, further, comprising:
   - the instructions from cloud computing technologies to determine the set of historical market scenarios are structured to comprise instructions to:
     - determine, via at least one processor, a historical data set, a rolling window period length, and a set of market factors;
     - determine, via at least one processor, a set of rolling window periods using the historical data set and the rolling window period length; and
     - calculate, via at least one processor, for each market factor from the set of market factors, for each rolling window period from the set of rolling window periods, a change to the respective market factor during the respective rolling window period,
       - each historical market scenario from the set of historical market scenarios structured to comprise calculated changes to the set of market factors during a rolling window period.

3. The apparatus of embodiment 2, further, comprising:
   - the instructions with cloud computing technologies to calculate a change to a market factor during a rolling window period are structured to comprise instructions to:
     - determine, via at least one processor, the delta between values of the market factor at a beginning time point and an ending time point of the rolling window period.

4. The apparatus of embodiment 3, further, comprising:
   - the processor-executable instructions on cloud computing clusters structured as:
     - determine, via at least one processor, that historical data for the market factor during the rolling window period is unavailable for a time point; and
     - impute, via at least one processor, the unavailable historical data for the time point using a machine learning method, the imputed delta of historical market factors structured to minimize the Mean Absolute Difference between correlation matrices of original and imputed data, in which the mean z-scores of market factor deltas with imputation are minimized compared to the mean z-scores of the original market factor deltas without imputation, and in which the ratios of the standard deviation of each factor with and without imputation approach 1.

5. The apparatus of embodiment 1, further, comprising:
   - the processor-executable instructions on cloud computing clusters structured as:
     - utilize a deep learning neural network for a time period bucket, the trained deep learning neural network is trained to generate a set of Gaussian mixture latent variables.

6. The apparatus of embodiment 5, further, comprising:
   - the processor-executable instructions on cloud computing clusters structured to generate simulated market scenarios for the time period bucket, using the trained deep learning neural network associated with the time period bucket.

7. The apparatus of embodiment 6, further, comprising:
   - the instructions to generate simulated market scenarios for the time period bucket are structured to comprise instructions to:
     - generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

8. The apparatus of embodiment 1, further, comprising: the processor-executable instructions structured as:

filter, via at least one processor, the set of simulated market scenarios associated with a time period length based on specified ranges of allowable values for specified customized market factors.

9. The apparatus of embodiment 1, further, comprising: the processor-executable instructions structured as:

filter, via at least one processor, the set of simulated market scenarios associated with a time period length based on specified business cycle settings.

10. The apparatus of embodiment 1, further, comprising: the instructions to train a machine learning process to generate unprecedented stress market scenarios structured as:

quantify unprecedentedness as a fitted polynomial degree 2 curve, via at least one processor on cloud computing infrastructure, which captures the relationship between movements in VIX and the number of risk factors that experienced unprecedented magnitude of changes; and train, via at least one processor on cloud computing platform, the conditional dependency structure of large movements in VIX, in which the VIX up and VIX down levels are solved by the objective function of minimizing the mean squared error between a simulated polynomial degree 2 curve and a historical polynomial degree 2 curve, in which the fitted polynomial degree 2 curve is fitted from simulated market scenarios generated using at least one of: a variational autoencoder deep learning model, a gaussian copula conditional on large VIX movements.

11. The apparatus of embodiment 1, further, comprising: the processor-executable instructions structured as:

apply cloud service, Amazon Web Services (AWS) SageMaker, to train, tune, and deploy deep learning models in a parallel and distributed way on multiple instances and multiple GPUs.

12. The apparatus of embodiment 1, further, comprising: the processor-executable instructions structured as:

use a machine learning service, SageMaker, in AWS to manage machine learning pipeline.

13. The apparatus of embodiment 1, further, comprising: the processor-executable instructions structured as:

utilize SageMaker to support collaboration between developers and data scientists.

14. The apparatus of embodiment 1, further, comprising: the processor-executable instructions of using SageMaker for parallel market scenario simulation structured as:

create a SageMaker notebook instance with specific lifecycle configuration, permissions and encryption, and network settings;

upload input data to S3 by providing a S3 path;

configure a training job as an estimator by providing arguments including at least one of: training script entry point, SageMaker execution role, number and type of training instance, security key, and a set of hyperparameters;

trigger the training job by launching a docker container on EC2 instances with prebuilt SageMaker docker images and downloading the input data from the specified S3 path to start the training process;

repeat the training job on market scenarios with different delta length to configure multiple training jobs such that they can be triggered together and trained on multiple instances in a parallel way;

deploy models as multiple SageMaker endpoints by specifying instance type and number of instances used to host the endpoints; and simulate market scenarios with different delta length using the SageMaker endpoints.

(Simulating Mutual Fund and ETF Returns with Machine Learning and Cloud Computing Techniques)

1. A machine learning mutual fund and ETF returns simulating apparatus, comprising:

a memory;

a component collection in the memory;

a processor disposed in communication with the memory and configured to issue a plurality of processor-executable instructions from the component collection, the processor-executable instructions structured as:

obtain, via at least one processor, mutual funds' or ETFs' historical daily returns data sets, a set of rolling window period lengths, and data sets for a set of market factors' historical returns during the specified set of rolling window periods;

compute, via at least one processor, for each mutual fund or ETF, returns during each rolling window period from the set of rolling window periods, by aggregating the historical returns;

learn, via at least one processor, for each mutual fund or ETF, for each rolling window period from the set of rolling window periods, the respective mutual fund's or ETF's relationships with a set of most relevant market factors from their historical returns;

simulate, via at least one processor, for each mutual fund or ETF, for each rolling window period from the set of rolling window periods, the respective mutual fund's or ETF's returns under simulated market scenarios;

visualize real-time, via at least one processor, for each mutual fund, ETF, or portfolio of mutual funds and ETFs, for each rolling window period from the set of rolling window periods, the respective mutual fund's, ETF's, or portfolio's simulated returns distributions under user-specified market scenarios or business cycles; and illustrate, via at least one processor, for each mutual fund or ETF, for each rolling window period from the set of rolling window periods, the respective mutual fund's or ETF's exposure to each market factor.

2. The apparatus of embodiment 1, further, comprising: the processor-executable instructions structured as:

construct, via at least one processor, from a set of market factor pairs, a set of spread factors, by computing the difference in returns between each pair of market factors under simulated market scenarios, the set of spread factors comprising orthogonal features that mitigate multicollinearity;

update, via at least one processor, the set of market factors to include the set of spread factors; and select, via at least one processor, for each mutual fund or ETF, the set of most relevant market factors to utilize during simulation model training.

3. The apparatus of embodiment 2, further, comprising: the processor-executable instructions structured as:

obtain, via at least one processor, from database tables, for each mutual fund or ETF, domain experts' input that specifies a set of utilization market factors to be considered for utilization in the return-simulating model, based on the fund or ETF's asset category;

evaluate, via at least one processor, for each mutual fund or ETF, for each market factor in the set of utilization market factors, the importance level of the market factor's impact on the mutual fund's or ETF's returns, using XGBoost's feature importance measurement; and select, via at least one processor, for each mutual fund or ETF, from the domain-expert-specified or entire set of market factors, the top contributing market factors to be later utilized in the return-simulation model, using a customized forward selection algorithm that maximizes regression models' adjusted $R^2$ and restrains model coefficients from flipping signs, the top contributing market factors selected to alleviate multicollinearity.

4. The apparatus of embodiment 3, further, comprising: the processor-executable instructions structured as:

train, via at least one processor, for each mutual fund or ETF, for each rolling window period from the set of rolling window periods, using the selected set of market factors, a ridge regression model which regularizes regression coefficients and mitigates multicollinearity;

evaluate, via at least one processor, for each mutual fund or ETF, for each rolling window period from the set of rolling window periods, model performance by measuring adjusted $R^2$ and conducting residual distribution analysis; and store, via at least one processor, for each mutual fund or ETF, for each rolling window period from the set of rolling window periods, a binary format of the trained ridge regression model and model performance evaluation metrics in one or more database tables.

5. The apparatus of embodiment 4, further, comprising: the processor-executable instructions structured as:

simulate, via at least one processor, for each mutual fund or ETF, for each rolling window period from the set of rolling window periods, the returns under the simulated market scenarios, using the trained ridge regression model;

adjust, via at least one processor, for each mutual fund or ETF, for each rolling window period from the set of rolling window periods, the respective mutual fund's or ETF's market-factor-based simulated returns for idiosyncratic risk, by adding sampled regression residuals; and calibrate, via at least one processor, for each mutual fund or ETF, for each rolling window period from the set of rolling window periods, the respective mutual fund's or ETF's returns to forward-looking capital market assumptions.

6. The apparatus of embodiment 5, further, comprising: the processor-executable instructions structured as:

calculate, via at least one processor, for each mutual fund or ETF, for each rolling window period from the set of rolling window periods, the correlation between the sampled regression residuals and a target variable;

evaluate, via at least one processor, for each mutual fund or ETF, for each rolling window period from the set of rolling window periods, a distribution of the sampled regression residuals by conducting the Mann-Whitney U Test;

assess, via at least one processor, for each mutual fund or ETF, for each rolling window period from the set of rolling window periods, the distance of the residual mean from 0 by calculating Cohen's d.

7. The apparatus of embodiment 1, further, comprising: the processor-executable instructions structured as:

utilize big data framework, Spark, with Elastic Map Reduce (EMR) and EMR Notebook, to support processing and storage in a parallel and distributed way.

8. The apparatus of embodiment 7, further, comprising: the processor-executable instructions structured as:

utilize Spark to analyze computation tasks and optimize processing workflow prior to code execution.

9. The apparatus of embodiment 8, further, comprising: the processor-executable instructions structured as:

use EMR Notebooks along with EMR clusters to submit Spark jobs for parallel computing.

10. The apparatus of embodiment 9, further, comprising: the processor-executable instructions structured as:

execute EMR using a cloud computing infrastructure.

11. The apparatus of embodiment 10, further, comprising:

EMR Notebook is structured to provide at least one of the following features: support for multiple programming languages, test and debug code interactively, monitor Spark activity from within a notebook, visualize large datasets and resume at broken steps, and detach and attach a notebook to different EMR clusters.

12. The apparatus of embodiment 7, further, comprising: the processor-executable instructions structured as:

create an EMR cluster with a predefined bootstrap script including the dependencies utilized by a service;

execute the predefined bootstrap script on each worker node in a cluster script to have dependent libraries installed;

create an EMR Notebook with a pre-defined service Identity and Access Management (IAM) role and connect the EMR Notebook to the EMR cluster;

load input data into the EMR cluster and store among core nodes in a distributed way once the EMR cluster is in ready status;

group assets by the asset id and apply Spark mapper and reducer functions on each asset to conduct a series of transformations and reductions; and save a trained model in binary format or predicted scores by the trained model into Postgres database after the series of transformations and reductions are conducted.

13. The apparatus of embodiment 1, further, comprising: the processor-executable instructions structured as:

provision an event-driven, self-service, and extensible big data and machine learning self-service computation engine using a collection of components implemented in a Workflow Declaration Language (WDL).

14. The apparatus of embodiment 1, further, comprising: the processor-executable instructions structured as:

declaratively define a desired state of big data and machine learning pipelines;

programmatically transform the desired state into a workflow;

generate workflow code associated with the workflow for resource provision, job submission, job scheduling, job monitoring and job dependency orchestration; and inject the workflow code into a container for scheduling and execution.

15. The apparatus of embodiment 1, further, comprising: the processor-executable instructions structured as:

utilize a plurality of platform-executable jobs derived from big data and machine learning artifacts, structured to execute with desired or elastic capacity on a variety of platforms and services including at least one of: multi-node clusters, virtual servers, containers and lambda functions.

16. The apparatus of embodiment 1, further, comprising: the processor-executable instructions structured as:

utilize an event-driven architecture with loosely coupled event producers and consumers, integrated to:

fulfill the prescription of resource allocation;

generate workflow code to facilitate self-service;

provision vertical and horizontal scalability; and support fault-tolerance.

17. The apparatus of embodiment 1, further, comprising: the processor-executable instructions structured as:

utilize parallel on parallel hierarchy and flexible calculation dependencies, structured to facilitate multiple jobs to be concurrently distributed to multiple nodes with tasks in each job executed in parallel.

18. The apparatus of embodiment 1, further, comprising: heterogenous platforms consists of EMR, EC2, ECS and Lambda functions;

a set of supported languages: Scala, Java and Python.

19. The apparatus of embodiment 1, further, comprising: generic roles and responsibilities defined as interfaces for functional implementation;

open source technologies adopted to ensure cloud provider agnosticism.

20. The apparatus of embodiment 1, further, comprising: the processor-executable instructions structured as:

utilize network-optimized, memory-optimized or compute-optimized cloud instances.

21. The apparatus of embodiment 1, further, comprising: an optimization with cost leveraging:

inexpensive and commodity-grade virtual servers;

price-discount with Spot Instances or Reserved Instances.

22. The apparatus of embodiment 1, further, comprising: the processor-executable instructions structured as:

utilize a unified, distributed, parallel, generic computation engine supporting big data batch and streaming processing for financial data extraction, transformation, and load (ETL) and simulation.

(Simulating Equity Returns Under Different Market Scenarios Using a Set of Machine Learning and Cloud Computing Techniques)

1. A machine learning equity returns simulating apparatus, comprising:

a memory;

a component collection in the memory;

a processor disposed in communication with the memory and configured to issue a plurality of processor-executable instructions from the component collection, the processor-executable instructions structured as:

obtain, via at least one processor, equity's historical daily returns data sets, a set of rolling window period lengths, and data sets for the set of market factors' historical returns during the specified rolling window periods;

compute, via at least one processor, for each equity, the returns during each rolling window period from the set of rolling window periods, by aggregating the historical daily returns;

construct, via at least one processor, from a set of market factor pairs, a set of spread factors, by computing the difference in returns between each pair of market factors under simulated market scenarios, in order to create orthogonal features to mitigate the problem of multicollinearity;

update, via at least one processor, the set of market factors to include the set of spread factors;

evaluate, via at least one processor, for each equity, for each market factor in the updated set of market factors, the importance level of the market factor's impact on the equity, using XGBoost's feature importance measurement;

allow, via at least one processor, for each equity, from the updated set of market factors, domain experts to specify market factors to be later considered for utilization in the return-simulating model, based on its asset category (e.g., fixed income, US equity, international equity, etc.);

select, via at least one processor, for each equity, from the entire or domain-expert-specified set of market factors, the top contributing market factors to be later utilized in the return-simulating model, using a customized forward selection algorithm that maximizes regression models adjusted $R^2$, in order to enhance model performance and alleviate the issue of multicollinearity;

learn, via at least one processor, for each equity, for each rolling window period from the set of rolling window periods, its relationships with the set of selected market factors from their historical returns using ridge regression which regularizes regression coefficients and mitigates the problem of multicollinearity;

simulate, via at least one processor, for each equity, for each rolling window period from the set of rolling window periods, its returns under simulated market scenarios using XGBoost regression with the set of selected market factors and company specific financial factors;

calibrate, via at least one processor, for each equity, for each rolling window period from the set of rolling window periods, the returns to forward-looking capital market assumptions;

visualize real-time, via at least one processor, for each equity, or portfolio of equities, for each rolling window period from the set of rolling window periods, its simulated returns distributions under user-specified market scenarios (e.g., business cycle assumption, rising VIX scenario, etc.); and illustrate, via at least one processor, for each equity, for each rolling window period from the set of rolling window periods, its exposure to selected market factor based on their historical returns.

2. A machine learning equity returns model feature engineering apparatus, comprising:

a memory;

a component collection in the memory;

a processor disposed in communication with the memory and configured to issue a plurality of processor-executable instructions from the component collection, the processor-executable instructions structured as:

obtain, via at least one processor, equity's historical conditional betas data sets, a set of rolling window period lengths, data sets for the set of market factors' historical returns during the specified rolling window periods, and data sets for the set of company specific financials factors' historical values during the specified rolling window periods;

compute, via at least one processor, for each equity, during each rolling window period from the set of rolling window periods, the set of features contributing to a positive gain in feature importance ranking, by running nonparametric Gradient Boosting tree regression model; and further compute, via at least one processor, for each equity, during each rolling window period from the set of rolling window periods, the smaller set of features contributing to a positive gain in adjusted R square, by running parametric regression model, in order to enhance model performance and alleviate the issue of multicollinearity.

3. A residual validation workflow apparatus, comprising:

a memory;

a component collection in the memory;

a processor disposed in communication with the memory and configured to issue a plurality of processor-executable instructions from the component collection, the processor-executable instructions structured as:

obtain, via at least one processor, equity's conditional beta model training and test data sets, a set of rolling window period lengths, and data sets for predicted conditional beta through trained model on the same processor;

compute, via at least one processor, for each equity, the residual correlation between the predicted beta and residuals of prediction, the residual normal p value, the residual effective size, the residual Mann Whitney U value, and the residual standard deviation; and validate, via at least one processor, from a set of residual analysis matrix, that beta residuals from models are unbiased, that beta residuals from models are substantively close to zero.

4. A machine learning equity idiosyncratic risk model apparatus, comprising:

a memory;

a component collection in the memory;

a processor disposed in communication with the memory and configured to issue a plurality of processor-executable instructions from the component collection, the processor-executable instructions structured as:

obtain, via at least one processor, equity's historical idiosyncratic risk data sets, a set of rolling window period lengths, data sets for the set of market factors' historical returns during the specified rolling window periods, and data sets for the set of company specific financials factors' historical values during the specified rolling window periods;

compute, via at least one processor, for each equity, during each rolling window period from the set of rolling window periods, with the set of features contributing to a positive gain in feature importance ranking and contributing to a positive gain in adjusted R square, the weighted sum squared Euclidean distance between each simulated market scenario and each historical scenario; and select, via at least one processor, for each equity, during each rolling window period from the set of rolling window periods, the closest historical scenario to simulated market scenarios, and assign the stored idiosyncratic risk of this historical scenario to this simulated market scenario.

5. The apparatus of embodiment 1, further, comprising:

Spark analyzes computation tasks and optimize the workflow of the data processing before actually executing the code, which makes it outperforms Hadoop in terms of performance with Directed Acyclic Graph (DAG) optimizations and in memory processing.

6. The apparatus of embodiment 5, further, comprising:

use EMR Notebooks along with EMR clusters to submit Spark jobs for parallel computing to improve the development efficiency.

7. The apparatus of embodiment 6, further, comprising:

EMR to make full usage of compute power offered by the cloud provider and save compute costs, since the EMR runtime for Spark can be over 3 times faster than standard Spark.

8. The apparatus of embodiment 7, further, comprising:

EMR Notebook provides following functionalities and characteristics:

support multiple programming languages;

test and debug code interactively;

monitor Spark activity from within the notebook;

visualize large datasets and resuming at broken steps; and detach and attach a notebook to different EMR clusters easily.

9. The apparatus of embodiment 8, further, comprising:

the workflow of parallel computing of a single task of asset simulation with EMR Notebook comprising:

create an EMR cluster with a predefined bootstrap script including all the dependencies required by a service;

execute the bootstrap script on each worker node in the cluster script to have dependent libraries installed;

create an EMR Notebook with a pre-defined service IAM role and connect it to the EMR cluster;

load input data into EMR cluster and store among the core nodes in a distributed way once the EMR cluster is in ready status;

group assets by the asset id and apply Spark mapper and reducer functions on each asset to conduct a series of transformations and reductions; and save the eventual results, such as trained model in the format of binary or predicted scores by the model into Postgres database after the transformations are finished.

10. The apparatus of embodiment 1, further, comprising:

A big data and machine learning self-service computation platform, comprising:

a Workflow Declaration Language (WDL);

an implementation of the WDL;

a collection of components in the WDL structured as:

provision an event-driven, self-service, and extensible computation engine.

11. The apparatus of embodiment 1, further, comprising:

the executable instructions structured as:

declaratively define the desired state of big data and machine learning pipelines;

programmatically transform the desired state into workflow;

automatically generate workflow code for resource provision, job submission, job scheduling, job monitoring and Job dependency orchestration; and automatically inject the workflow into a container for scheduling and execution.

12. The apparatus of embodiment 1, further, comprising:

a plurality of platform-executable jobs derived from big data and machine learning artifacts, structured as:

execute on a variety of platforms and services with desired or elastic capacity: multi-node clusters, virtual servers, containers and lambda functions.

13. The apparatus of embodiment 1, further, comprising:

an event-driven architecture with loosely coupled event producers and consumers, integrated to:

fulfil the prescription of resource allocation;

generate workflow code to facilitate self-service;

provision vertical and horizontal scalability; and support fault-tolerance.

14. The apparatus of embodiment 1, further, comprising:

parallel on parallel hierarchy and flexible calculation dependencies, structured as:

enable multiple jobs to be concurrently distributed to multiple nodes with tasks in each job executed in parallel.

15. The apparatus of embodiment 1, further, comprising:

heterogenous platforms consists of EMR, EC2, ECS and Lambda functions;

a set of supported languages: Scala, Java and Python;

16. The apparatus of embodiment 1, further, comprising:

generic roles and responsibilities defined as interfaces for functional implementation;

open source technologies adopted to ensure cloud provider agnosticism.

17. The apparatus of embodiment 1, further, comprising:

an optimization with performance by using network-optimized, memory-optimized and/or compute-optimized cloud instances based on the nature of the computation.

18. The apparatus of embodiment 1, further, comprising:

an optimization with cost leveraging:

inexpensive and commodity-grade virtual servers;

price-discount with Spot Instances or Reserved Instances.

19. The apparatus of embodiment 1, further, comprising:

a unified, distributed, parallel, generic computation engine supporting:

big data batch and streaming processing for financial data ETL and simulation;

machine learning training and scoring for fixed income, equity and mutual fund and ETF.

20. The apparatus of embodiment 1, further, comprising:

the processor-executable instructions structured as:

apply big data framework, Spark, with EMR and EMR Notebook, to support the data process and storage in a parallel and distributed way.

(Optimized Portfolio Generation Using Simulated or Realized Returns with Loss Tolerance or Return Volatility Controls, Generation of Mean-CVaR and Mean-Variance Frontiers with Parallel Computing)

1. A Tail Risk Optimizer risk tool, comprising:

1. an optimization finding the optimal portfolio weights set that reaches max return along with conditional Value at Risk constraints and self-defined asset max allocation weights. The optimization process is structured as:

2. define, via users' loss tolerance, a CVaR threshold percentage that is allowed within the portfolio and self-defined max allocation for each asset in the portfolio, and;

3. obtain, via at least one processor, assets' simulated returns data sets, a set of return data of each asset with different market scenarios, to:

4. convert, via CVaR linear relaxation, the convex CVaR calculation into a linear system to accelerate the optimizer; with an introduction of some auxiliary variable to discretize the integral in general CVaR computation process;

5. optimize; via mixed integer programming techniques; the portfolio expected return with specified asset max allocation, CVaR threshold and allowed volume of cash holdings; acquire, via parallel computation, a proposed set of portfolio weights and its expected return/volatility/drawdown; taking advantages of compute power provided by cloud platform and applies AWS Elastic Container Service (ECS) which is a fully managed container orchestration service to handle requests in a parallel way. Multiple user requests are loaded into different containers that are hosted on a cluster of EC2 machines. Within a single request, the computation process of CVAR is distributed among different CPU cores in each container using multiprocessing mechanism. By using parallel computing techniques, ECS and multiprocessing, the service performance is significantly improved.

6. visualize, via CVaR-Mean frontier plot consisting of hundreds of optimal portfolio points with current constraints but different CVaR threshold, portfolio return versus portfolio CVaR; the relative position between the current optimal portfolio and initial portfolio. Allowing changes of scenarios, business cycles or optimization types, the CVaR-Mean frontier to change accordingly and the capacity of comparing optimal portfolios under different scenarios and methodologies.

2. A Mean Variance Optimizer risk tool, comprising:

1. an optimization finding the best balance between expected return and portfolio risk according to a user specified risk tolerance level and self-defined asset max allocation weights. The optimization process is structured as:

2. define, via users' preference, a risk tolerance level ranging from 0 to 10 as risk averse situation to risk seeking situation, corresponding to conservative investors to aggressive investors and;

3. obtain, via at least one processor, assets' simulated returns data sets, a set of return data of each asset with different market scenarios, to:

4. estimate, via Ledoit-Wolf covariance matrix estimation method which corrects both bias and variance of sample covariance matrix or; historical-based covariance matrix estimation method with addition of a small number on the diagonal to decorrelate asset behavior to capture accurate and robust portfolio risk;

5. optimize; via objective function of maximizing sum of the portfolio return and a risk penalty with coefficient as risk tolerance parameter; along with the constraints of specified asset max allocation as well as the integrity of portfolio weights summation; acquire, via parallel computation, a proposed set of portfolio weights and its expected return/volatility/ drawdown; taking advantages of compute power provided by cloud platform and applies AWS Elastic Container Service (ECS) which is a fully managed container orchestration service to handle requests in a parallel way. Multiple user requests are loaded into different containers that are hosted on a cluster of EC2 machines. Within a single request, the computation process of CVAR is distributed among different CPU cores in each container using multiprocessing mechanism. By using parallel computing techniques, ECS and multiprocessing, the service performance is significantly improved.

6. visualize, via efficient frontier (Volatility-Mean) plot consisting of around 1700 optimal portfolio points with current constraints but different risk tolerance level, portfolio return versus portfolio risk; the relative position between the current optimal portfolio and initial portfolio. Allowing changes of scenarios, business cycles or optimization types, the efficient frontier to change accordingly and the capacity of comparing optimal portfolios under different scenarios and methodologies.

(Constructing Predefined Scenarios (GUI) Using Simulated Market Scenarios and Scenario-Based Risk Reporting Using Multiple User-Defined Scenarios)

1. A computer program or application comprising a volatile or non-volatile computer usable medium having executable code to execute a process for generating scenario-based risk reporting for multiple user-specified scenarios, the process comprising:

obtain, on all available processors, for all securities, load asset simulation data in temporary storage or memory based on time-horizon selected by the user, input passed to the process as a data structure; input data structure includes user-specified scenarios; generate asset simulation data if not available; load call and put schedule in temporary storage or memory to be used by alternate asset simulation process;

simulate, as alternate asset simulation process, on all available processors, for all securities, calculate the dot product of factor exposure for selected securities and factor simulations; adjust simulated returns for assets based on call and put schedule;

generate, on all available processors, for all available user-defined scenarios, find markets matching user provided criteria; apply multiple criteria as provided in user input; store list of markets in a map data structure in temporary storage or memory;

calculate, on all available processors, for all available user-defined scenarios from the map, get market returns based on markets in the map entry; calculate weighted average market returns using asset simulation returns and security weights; store market returns to the map; compute, as main process, on all available processors, for all available user-defined scenarios from the map, use the market returns stored in the map to calculate tail-risk and other risk-based analytics; and visualize real-time, via at least one processor, for each portfolio, for each rolling window period from the set of rolling window periods, its simulated returns distributions under user-specified market scenarios or business cycles (e.g., rising interest rates, recession, etc.).

(Fixed Income Securities Returns Simulation and Portfolio Risk Aggregation Using Oracle RDS or Map Reduce Cloud Computing Technologies)

1. A database-implemented procedure for multi-risk factor risk engine method executed by one or more processors, the method comprising:

obtain, a list of unique securities for which a main operation needs to be executed based on user provided inputs for data filtering;

filter, factor exposures data based on list of unique securities and store in temporary storage or memory; Use Oracle RDS Global Temporary Tables (GTT) to run batch in multiple sessions; further filter, factor simulation data based on unique factors available from factor exposure data and store in temporary storage or memory; if factor exposure data not available, calculate factor exposure data as alternate operation for current pricing date;

process, the alternate operation, on all available processors, calculate spread ratio for all securities using dimension reduction; store calculated factor exposure in local storage or memory; Use Global Temporary Tables where needed for temporary storage;

process, the main operation, all available unique securities in small chunks or batches, for each batch;

retrieve, from temporary storage or memory, the necessary factor simulation and factor exposure data relevant to the unique securities within the batch;

execute, for all available processors, in parallel, for each security within the batch, the sum product of factor exposure and factor simulations for each security and store result asset simulation data in temporary storage or memory; Use combination of Oracle's Parallel Queries and Global Temporary Tables to parallelize computations;

calibrate, for all available processors, in parallel, the asset simulated returns for each security, based on call and put schedule data available for each security;

transpose, from temporary storage or memory, retrieve the asset simulation data for each security within the batch and transpose data from individual records to a list-based data structure and store results to permanent storage in database; Use of Oracle's DDL commands for faster cleanup of Global Temporary Tables (GTT).

Adding the carry return of fixed income instruments based on estimated maturity date. Such that if the security matures within the simulated investment time horizon, the yield to the estimated maturity date is used to represent the carry return.

Adjusting the call and put schedules by not allowing the simulated price returns to go beyond the call or put prices if the call and put schedules fall in the simulation time horizon.

Adjusting for default probabilities by ensuring the simulated returns represent loss given default given the conditional default flag for the instrument under the different simulated markets.

Adjusting for conditional spread beta in the price return calculations given the conditional spread beta for the instrument under the different simulated markets.

Adjusting for convexity of the fixed income instruments in the simulating of the price returns.

2. The apparatus of embodiment 1, further, comprising:

parallel on parallel hierarchy and flexible calculation dependencies, structured as:

enable multiple jobs to be concurrently scheduled and executed on Oracle RDS with tasks in each job executed in parallel.

3. The apparatus of embodiment 1, further, comprising:

ability to compute simulated returns for all time-horizons simultaneously, structured as:

store calculated simulated return data as separate columns and stored in temporary cache or storage;

transpose calculated simulated returns using PIVOT and UNPIVOT Oracle commands to provide capability to compute simulated returns simultaneously and storing data back to the database in parallel.

4. The apparatus of embodiment 1, further, comprising:

Unique design to store simulated returns and market scenario id as a single number. An array of such numbers is stored in storage medium and transported between storage medium and API/UI layer. The unique design ensured data compression, no need to encode/decode compressed data and parallel portfolio risk aggregation for multiple market scenarios, multiple time horizons and multiple portfolios concurrently.

(e.g. <simulated_return>.<market_id> a single number: "−142.0153" where −142 is the simulated return in bps and 153 is the market id. This single dimensional array is a unique data format to support aggregate portfolio simulated returns in parallel. This data format eliminates the complexity to maintain mapping of the returns to market scenarios. At the API layer, in processing this single dimensional array in parallel, there is no need for compression/decompression logic.)

5. The apparatus of embodiment 1, further, comprising:

heterogeneous platforms comprising: Oracle RDS on Cloud, Job Scheduler and Lambda functions;

a set of supported languages: PL-SQL, Java and Python.

6. The apparatus of embodiment 1, further, comprising:

an optimization with performance by using memory-optimized and/or compute-optimized database instances based on the nature of the computation.

7. The apparatus of embodiment 1, further, comprising:

Apply big data framework, Spark, with EMR and EMR Notebook, to support the data process and storage in a parallel and distributed way.

8. The apparatus of embodiment 7, further, comprising:

Spark analyzes computation tasks and optimize the workflow of the data processing before actually executing the code, which makes it outperforms Hadoop in terms of performance with Directed Acyclic Graph (DAG) optimizations and in memory processing.

9. The apparatus of embodiment 8, further, comprising:

use EMR Notebooks along with EMR clusters to submit Spark jobs for parallel computing to improve the development efficiency.

10. The apparatus of embodiment 9, further, comprising:

EMR to make full usage of compute power offered by the cloud provider and save compute costs, since the EMR runtime for Spark can be over 3 times faster than standard Spark.

11. The apparatus of embodiment 10, further, comprising:

EMR Notebook provides following functionalities and characteristics: support multiple programming languages; test and debug code interactively; monitor Spark activity from within the notebook; visualize large datasets and resuming at broken steps; and detach and attach a notebook to different EMR clusters easily.

12. The apparatus of embodiment 11, further, comprising:

the workflow of parallel computing of a single task of asset simulation with EMR Notebook comprising:

create an EMR cluster with a predefined bootstrap script including all the dependencies required by a service;

execute the bootstrap script on each worker node in the cluster script to have dependent libraries installed;

create an EMR Notebook with a pre-defined service IAM role and connect it to the EMR cluster;

load input data into EMR cluster and store among the core nodes in a distributed way once the EMR cluster is in ready status;

group assets by the asset id and apply Spark mapper and reducer functions on each asset to conduct a series of transformations and reductions;

save the eventual results, such as trained model in the format of binary or predicted scores by the model into Postgres database after the transformations are finished; and calculate, for all available processors, in parallel, for each security within the batch, sort available asset sims returns in increasing order, take average of top five percent data and store result to permanent storage in database; Use Parallel DML to parallelize inserting records into the database.

(Tail-Risk Adjusted Bond Ladder Construction)

1. A computer program or application comprising a volatile or non-volatile computer usable medium having executable code to execute a process for constructing a bond ladder based on risk adjusted yield, the process comprising:

obtain, a list of available bond offerings available for trading from various sources, based on filter criteria provided by the user, the input provided in a data structure available to the program;

retrieve, all analytics data related to available bonds, including default probability, conditional value at risk (CVAR), yield, price, available quantity to trade, etc.;

calculate, on all available processors, mean and standard deviation, for all bonds with default probability; calculate same for all bonds with CVAR data; store computed mean and standard deviation in temporary storage or memory;

calculate, on all available processors, for all available bonds, the z-score based on default probability of the bond, mean and standard deviation of default probabilities of all bonds; For bonds with no default probability, calculate z-score based on CVAR of the bond, mean and standard deviation of CVAR for all bonds; adjusted yield for the bond based on the computed z-score;

sort, all available bonds based on adjusted yield, rating and available quantity; group data in rungs based on maturity dates;

process, as main operation, on all available processors, calculate allocated value for all bonds within the rung; per bond based on minimum increment, minimum denomination, diversification and minimum balance remaining constraints; store residual cash not allocated per rung into memory;

compute, on all available processors, for all rungs, calculate weighted average yield per rung; find rung with highest overall yield;

process, as final operation, on all available processors, calculate allocated value for all bonds within the maximum yielding rung, calculate allocated value per bond based on minimum increment, minimum denomination, diversification and maximum balance remaining constraints;

visualize real-time, via at least one processor, for each portfolio, display constructed bond ladder based on rungs as maturity year; display portfolio level risk analytics;

2. The apparatus of embodiment 1, further, comprising:
the instructions to calculate in parallel, mean and standard deviation based on default probability and CVaR for each rung comprising instructions to:
generate, on all available processors; a map of all available securities available in each rung that has a valid default probability or CVaR; and
generate and store in parallel; on all available processors; using temporary memory, a final computed values of mean and standard deviation by rung number, from all available securities in the map.
3. The apparatus of embodiment 1, further, comprising:
the instructions to calculate in parallel, the default probability of securities based on maturity year for which the default probabilities are not available comprising of instructions to:
determine, on all available processors; for all securities the default probability of securities with missing data; using default probabilities for available years; and
calculate, on all available processors, the default probabilities using average of the prior and next year's default probability.
4. The apparatus of embodiment 1, further, comprising:
the instructions to calculate the highest yielding run based on weighted average calculations; structured as:
determine, on all available processors; for all available rungs, securities that have quantities allocated; create a map for each rung; and
calculate, on all available processors, the weighted average yield for each rung using the yield of each security and weight of the security based on market value for each rung.
5. The apparatus of embodiment 1, further, comprising:
the instructions to return additional securities available for the user; for each rung based on highest available yield for each security:
determine, on all available processors; for all available rungs; sort and list additional bonds for all securities.
6. The apparatus of embodiment 1, further, comprising:
parallel on parallel hierarchy and flexible calculation dependencies, structured as:
facilitate bond ladder construction to be executed in parallel for each rung based on maturity date for the securities. The allocation logic executes in parallel for each rung.
7. The apparatus of embodiment 1, further, comprising:
heterogenous platforms consists of ECS, Parallel Streams and Java Web Caching;
a set of supported languages: Docker scripts, Java.
8. The apparatus of embodiment 1, further, comprising:
an optimization with performance by using network-optimized, memory-optimized and/or compute-optimized cloud instances based on the nature of the computation.

Additional Embodiments

101. A machine learning portfolio generating apparatus, comprising:
a memory;
a component collection in the memory;
a processor disposed in communication with the memory and configured to issue a plurality of processor-executable instructions from the component collection, the processor-executable instructions structured as:
obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;
determine, via at least one processor, a set of simulated market scenarios associated with the time period length, the set of simulated market scenarios generated using a set of deep learning neural networks, each simulated market scenario in the set of simulated market scenarios structured to comprise a set of simulated market factor values;
retrieve, via at least one processor, a set of expected returns for securities in the universe of securities for the set of simulated market scenarios, each expected return in the set of expected returns configured as calculated for a security during a simulated market scenario using:
the respective security's conditional Beta during the respective simulated market scenario, determined using a set of decision tree ensembles, trained to estimate conditional Beta of the respective security, based on a first subset of the set of simulated market factor values, and
the respective security's conditional default probability during the respective simulated market scenario, determined using a set of decision tree ensembles, trained to estimate conditional default probability of the respective security, based on a second subset of the set of simulated market factor values;
optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and
execute, via at least one processor, the set of tradeable transactions to generate the optimized portfolio.
102. The apparatus of embodiment 101, further, comprising:
the instructions to generate the set of simulated market scenarios using the set of deep learning neural networks are structured to comprise instructions to:
determine, via at least one processor, a set of historical market scenarios and a set of time period buckets;
determine, via at least one processor, for each time period bucket from the set of time period buckets, a subset of historical market scenarios, from the set of historical market scenarios, associated with the respective time period bucket;
train, via at least one processor, for each time period bucket from the set of time period buckets, a deep learning neural network, from the set of deep learning neural networks, using the subset of historical market scenarios associated with the respective time period bucket;
determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

103. The apparatus of embodiment 102, further, comprising:

the instructions to determine the set of historical market scenarios are structured to comprise instructions to:

determine, via at least one processor, a historical data set, a rolling window period length, and a set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

104. The apparatus of embodiment 103, further, comprising:

the instructions to calculate a change to a market factor during a rolling window period are structured to comprise instructions to:

determine, via at least one processor, the delta between values of the market factor at a beginning time point and an ending time point of the rolling window period.

105. The apparatus of embodiment 104, further, comprising:

the processor-executable instructions structured as:

determine, via at least one processor, that historical data for the market factor during the rolling window period is unavailable for a time point; and impute, via at least one processor, the unavailable historical data for the time point using a machine learning method.

106. The apparatus of embodiment 103, further, comprising:

the rolling window period length is structured to be equal to the time period length.

107. The apparatus of embodiment 102, further, comprising:

the set of time period buckets is structured to have an equal fixed length for each time period bucket.

108. The apparatus of embodiment 102, further, comprising:

the set of time period buckets is structured to have a variable length for each time period bucket, the variable length for each time period bucket determined by judging the overall goodness of fit between the set of simulated market scenarios and the set of historical market scenarios.

109. The apparatus of embodiment 102, further, comprising:

the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

110. The apparatus of embodiment 109, further, comprising:

the deep learning neural network for the time period bucket is trained to generate a set of Gaussian mixture latent variables.

111. The apparatus of embodiment 110, further, comprising:

the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

112. The apparatus of embodiment 101, further, comprising:

the processor-executable instructions structured as:

filter, via at least one processor, the set of simulated market scenarios associated with the time period length based on specified ranges of allowable values for specified customized market factors.

113. The apparatus of embodiment 101, further, comprising:

the processor-executable instructions structured as:

filter, via at least one processor, the set of simulated market scenarios associated with the time period length based on specified business cycle settings.

114. The apparatus of embodiment 101, further, comprising:

the processor-executable instructions structured as:

initialize, via at least one processor, starting portfolio weights of securities in the universe of securities to benchmark portfolio weights of a benchmark portfolio.

115. The apparatus of embodiment 101, further, comprising:

the portfolio weights of securities in the universe of securities are structured to be optimized by finding a mixed integer linear programming portfolio solution.

116. A machine learning portfolio generating processor-readable, non-transient medium, comprising processor-executable instructions structured as:

obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;

determine, via at least one processor, a set of simulated market scenarios associated with the time period length, the set of simulated market scenarios generated using a set of deep learning neural networks, each simulated market scenario in the set of simulated market scenarios structured to comprise a set of simulated market factor values;

retrieve, via at least one processor, a set of expected returns for securities in the universe of securities for the set of simulated market scenarios, each expected return in the set of expected returns configured as calculated for a security during a simulated market scenario using:

the respective security's conditional Beta during the respective simulated market scenario, determined using a set of decision tree ensembles, trained to estimate conditional Beta of the respective security, based on a first subset of the set of simulated market factor values, and the respective security's conditional default probability during the respective simulated market scenario, determined using a set of decision tree ensembles, trained to estimate conditional default probability of the respective security, based on a second subset of the set of simulated market factor values;

optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and execute, via at least one processor, the set of tradeable transactions to generate the optimized portfolio.

117. The medium of embodiment 116, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

118. The medium of embodiment 117, further, comprising:

the instructions to determine the set of historical market scenarios are structured to comprise instructions to:

determine, via at least one processor, a historical data set, a rolling window period length, and a set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

119. The medium of embodiment 118, further, comprising:

the instructions to calculate a change to a market factor during a rolling window period are structured to comprise instructions to:

determine, via at least one processor, the delta between values of the market factor at a beginning time point and an ending time point of the rolling window period.

120. The medium of embodiment 119, further, comprising:

the processor-executable instructions structured as:

determine, via at least one processor, that historical data for the market factor during the rolling window period is unavailable for a time point; and impute, via at least one processor, the unavailable historical data for the time point using a machine learning method.

121. The medium of embodiment 118, further, comprising:

the rolling window period length is structured to be equal to the time period length.

122. The medium of embodiment 117, further, comprising:

the set of time period buckets is structured to have an equal fixed length for each time period bucket.

123. The medium of embodiment 117, further, comprising:

the set of time period buckets is structured to have a variable length for each time period bucket, the variable length for each time period bucket determined by judging the overall goodness of fit between the set of simulated market scenarios and the set of historical market scenarios.

124. The medium of embodiment 117, further, comprising:

the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

125. The medium of embodiment 124, further, comprising:

the deep learning neural network for the time period bucket is trained to generate a set of Gaussian mixture latent variables.

126. The medium of embodiment 125, further, comprising:

the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

127. The medium of embodiment 116, further, comprising:

the processor-executable instructions structured as:

filter, via at least one processor, the set of simulated market scenarios associated with the time period length based on specified ranges of allowable values for specified customized market factors.

128. The medium of embodiment 116, further, comprising:

the processor-executable instructions structured as:

filter, via at least one processor, the set of simulated market scenarios associated with the time period length based on specified business cycle settings.

129. The medium of embodiment 116, further, comprising:

the processor-executable instructions structured as:

initialize, via at least one processor, starting portfolio weights of securities in the universe of securities to benchmark portfolio weights of a benchmark portfolio.

130. The medium of embodiment 116, further, comprising:

the portfolio weights of securities in the universe of securities are structured to be optimized by finding a mixed integer linear programming portfolio solution.

131. A machine learning portfolio generating processor-implemented system, comprising:

means to process processor-executable instructions;

means to issue processor-issuable instructions from a processor-executable component collection via the means to process processor-executable instructions, the processor-issuable instructions structured as:

obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;

determine, via at least one processor, a set of simulated market scenarios associated with the time period length, the set of simulated market scenarios generated using a set of deep learning neural networks, each simulated market scenario in the set of simulated market scenarios structured to comprise a set of simulated market factor values;

retrieve, via at least one processor, a set of expected returns for securities in the universe of securities for the set of simulated market scenarios, each expected return in the set of expected returns configured as calculated for a security during a simulated market scenario using:

the respective security's conditional Beta during the respective simulated market scenario, determined using a set of decision tree ensembles, trained to estimate conditional Beta of the respective security, based on a first subset of the set of simulated market factor values, and the respective security's conditional default probability during the respective simulated market scenario, determined using a set of decision tree ensembles, trained to estimate conditional default probability of the respective security, based on a second subset of the set of simulated market factor values;

optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and execute, via at least one processor, the set of tradeable transactions to generate the optimized portfolio.

132. The system of embodiment 131, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

133. The system of embodiment 132, further, comprising:

the instructions to determine the set of historical market scenarios are structured to comprise instructions to:

determine, via at least one processor, a historical data set, a rolling window period length, and a set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

134. The system of embodiment 133, further, comprising: the instructions to calculate a change to a market factor during a rolling window period are structured to comprise instructions to:
determine, via at least one processor, the delta between values of the market factor at a beginning time point and an ending time point of the rolling window period.

135. The system of embodiment 134, further, comprising: the processor-executable instructions structured as:
determine, via at least one processor, that historical data for the market factor during the rolling window period is unavailable for a time point; and
impute, via at least one processor, the unavailable historical data for the time point using a machine learning method.

136. The system of embodiment 133, further, comprising: the rolling window period length is structured to be equal to the time period length.

137. The system of embodiment 132, further, comprising: the set of time period buckets is structured to have an equal fixed length for each time period bucket.

138. The system of embodiment 132, further, comprising: the set of time period buckets is structured to have a variable length for each time period bucket, the variable length for each time period bucket determined by judging the overall goodness of fit between the set of simulated market scenarios and the set of historical market scenarios.

139. The system of embodiment 132, further, comprising: the instructions to train a deep learning neural network for a time period bucket using the associated subset of historical market scenarios are structured to comprise instructions to:
select, via at least one processor, a historical market scenario from the associated subset of historical market scenarios; and
train, via at least one processor, the deep learning neural network for the time period bucket on the selected historical market scenario using a variational autoencoder.

140. The system of embodiment 139, further, comprising: the deep learning neural network for the time period bucket is trained to generate a set of Gaussian mixture latent variables.

141. The system of embodiment 140, further, comprising: the instructions to generate simulated market scenarios for the time period bucket, using the trained deep learning neural network associated with the time period bucket, are structured to comprise instructions to:
generate, via at least one processor, a set of random values for the set of Gaussian mixture latent variables; and
generate a simulated market scenario, from the simulated market scenarios for the time period bucket, from the generated set of random values using a neural network decoder of the trained deep learning neural network associated with the time period bucket.

142. The system of embodiment 131, further, comprising: the processor-executable instructions structured as:
filter, via at least one processor, the set of simulated market scenarios associated with the time period length based on specified ranges of allowable values for specified customized market factors.

143. The system of embodiment 131, further, comprising: the processor-executable instructions structured as:
filter, via at least one processor, the set of simulated market scenarios associated with the time period length based on specified business cycle settings.

144. The system of embodiment 131, further, comprising: the processor-executable instructions structured as:
initialize, via at least one processor, starting portfolio weights of securities in the universe of securities to benchmark portfolio weights of a benchmark portfolio.

145. The system of embodiment 131, further, comprising: the portfolio weights of securities in the universe of securities are structured to be optimized by finding a mixed integer linear programming portfolio solution.

146. A machine learning portfolio generating processor-implemented process, comprising executing processor-executable instructions to:
obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;
determine, via at least one processor, a set of simulated market scenarios associated with the time period length, the set of simulated market scenarios generated using a set of deep learning neural networks, each simulated market scenario in the set of simulated market scenarios structured to comprise a set of simulated market factor values;
retrieve, via at least one processor, a set of expected returns for securities in the universe of securities for the set of simulated market scenarios, each expected return in the set of expected returns configured as calculated for a security during a simulated market scenario using:
the respective security's conditional Beta during the respective simulated market scenario, determined using a set of decision tree ensembles, trained to estimate conditional Beta of the respective security, based on a first subset of the set of simulated market factor values, and
the respective security's conditional default probability during the respective simulated market scenario, determined using a set of decision tree ensembles, trained to estimate conditional default probability of the respective security, based on a second subset of the set of simulated market factor values;
optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and
execute, via at least one processor, the set of tradeable transactions to generate the optimized portfolio.

147. The process of embodiment 146, further, comprising: the instructions to generate the set of simulated market scenarios using the set of deep learning neural networks are structured to comprise instructions to:
determine, via at least one processor, a set of historical market scenarios and a set of time period buckets;
determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

148. The process of embodiment 147, further, comprising: the instructions to determine the set of historical market scenarios are structured to comprise instructions to:

determine, via at least one processor, a historical data set, a rolling window period length, and a set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

149. The process of embodiment 148, further, comprising: the instructions to calculate a change to a market factor during a rolling window period are structured to comprise instructions to:

determine, via at least one processor, the delta between values of the market factor at a beginning time point and an ending time point of the rolling window period.

150. The process of embodiment 149, further, comprising: the processor-executable instructions structured as:

determine, via at least one processor, that historical data for the market factor during the rolling window period is unavailable for a time point; and impute, via at least one processor, the unavailable historical data for the time point using a machine learning method.

151. The process of embodiment 148, further, comprising: the rolling window period length is structured to be equal to the time period length.

152. The process of embodiment 147, further, comprising: the set of time period buckets is structured to have an equal fixed length for each time period bucket.

153. The process of embodiment 147, further, comprising: the set of time period buckets is structured to have a variable length for each time period bucket, the variable length for each time period bucket determined by judging the overall goodness of fit between the set of simulated market scenarios and the set of historical market scenarios.

154. The process of embodiment 147, further, comprising: the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

155. The process of embodiment 154, further, comprising: the deep learning neural network for the time period bucket is trained to generate a set of Gaussian mixture latent variables.

156. The process of embodiment 155, further, comprising: the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

157. The process of embodiment 146, further, comprising: the processor-executable instructions structured as:

filter, via at least one processor, the set of simulated market scenarios associated with the time period length based on specified ranges of allowable values for specified customized market factors.

158. The process of embodiment 146, further, comprising: the processor-executable instructions structured as:

filter, via at least one processor, the set of simulated market scenarios associated with the time period length based on specified business cycle settings.

159. The process of embodiment 146, further, comprising: the processor-executable instructions structured as:

initialize, via at least one processor, starting portfolio weights of securities in the universe of securities to benchmark portfolio weights of a benchmark portfolio.

160. The process of embodiment 146, further, comprising: the portfolio weights of securities in the universe of securities are structured to be optimized by finding a mixed integer linear programming portfolio solution.

201. A machine learning portfolio generating apparatus, comprising:

a memory;

a component collection in the memory;

a processor disposed in communication with the memory and configured to issue a plurality of processor-executable instructions from the component collection, the processor-executable instructions structured as:

obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;

determine, via at least one processor, a set of simulated market scenarios associated with the time period length, the set of simulated market scenarios generated using a set of multi-variate mixture datastructures, each simulated market scenario in the set of simulated market scenarios structured to comprise a set of simulated market factor values;

retrieve, via at least one processor, a set of expected returns for securities in the universe of securities for the set of simulated market scenarios, each expected return in the set of expected returns configured as calculated for a security during a simulated market scenario using:

the respective security's conditional Beta during the respective simulated market scenario, determined using a set of decision tree ensembles, trained to estimate conditional Beta of the respective security, based on a first subset of the set of simulated market factor values, and the respective security's conditional default probability during the respective simulated market scenario, determined using a set of decision tree ensembles, trained to estimate conditional default probability of the respective security, based on a second subset of the set of simulated market factor values;

optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and execute, via at least one processor, the set of tradeable transactions to generate the optimized portfolio.

202. The apparatus of embodiment 201, further, comprising:

the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructure associated with the respective time period bucket.

203. The apparatus of embodiment 202, further, comprising:

the instructions to determine the set of historical market scenarios are structured to comprise instructions to:

determine, via at least one processor, a historical data set and a set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

204. The apparatus of embodiment 203, further, comprising:

the instructions to calculate a change to a market factor during a rolling window period are structured to comprise instructions to:

determine, via at least one processor, the delta between values of the market factor at two time point of the rolling window period.

205. The apparatus of embodiment 204, further, comprising:

the processor-executable instructions structured as:

determine, via at least one processor, that historical data for the market factor during the rolling window period is unavailable for a time point; and impute, via at least one processor, the unavailable historical data for the time point using a k-Nearest Neighbors method.

206. The apparatus of embodiment 203, further, comprising:

the length of a rolling window period is structured to be equal to the time period length.

207. The apparatus of embodiment 202, further, comprising:

the set of time period buckets is structured to have a fixed length for each time period bucket.

208. The apparatus of embodiment 202, further, comprising:

the set of time period buckets is structured to have variable lengths, the variable length for each time period bucket reflective of changes in volatilities and correlations of the set of historical market scenarios.

209. The apparatus of embodiment 203, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

210. The apparatus of embodiment 209, further, comprising:

the instructions to fit the distribution to use for a market factor for the time period bucket using the associated subset of historical market scenarios are structured to comprise instructions to calculate the mean of the market factor's values in the associated subset of historical market scenarios.

211. The apparatus of embodiment 202, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

212. The apparatus of embodiment 201, further, comprising:

the processor-executable instructions structured as:

filter, via at least one processor, the set of simulated market scenarios associated with the time period length based on specified ranges of allowable values for specified customized market factors.

213. The apparatus of embodiment 201, further, comprising:

the processor-executable instructions structured as:

filter, via at least one processor, the set of simulated market scenarios associated with the time period length based on specified business cycle settings.

214. The apparatus of embodiment 201, further, comprising:

the processor-executable instructions structured as:

initialize, via at least one processor, starting portfolio weights of securities in the universe of securities to benchmark portfolio weights of a benchmark portfolio.

215. The apparatus of embodiment 201, further, comprising:

the portfolio weights of securities in the universe of securities are structured to be optimized by finding a mixed integer linear programming portfolio solution.

216. A machine learning portfolio generating processor-readable, non-transient medium, comprising processor-executable instructions structured as:

obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;

determine, via at least one processor, a set of simulated market scenarios associated with the time period length, the set of simulated market scenarios generated using a set of multi-variate mixture datastructures, each simulated market scenario in the set of simulated market scenarios structured to comprise a set of simulated market factor values;

retrieve, via at least one processor, a set of expected returns for securities in the universe of securities for the set of simulated market scenarios, each expected return in the set of expected returns configured as calculated for a security during a simulated market scenario using:

the respective security's conditional Beta during the respective simulated market scenario, determined using a set of decision tree ensembles, trained to estimate conditional Beta of the respective security, based on a first subset of the set of simulated market factor values, and the respective security's conditional default probability during the respective simulated market scenario, determined using a set of decision tree ensembles, trained to estimate conditional default probability of the respective security, based on a second subset of the set of simulated market factor values;

optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and execute, via at least one processor, the set of tradeable transactions to generate the optimized portfolio.

217. The medium of embodiment 216, further, comprising:

the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructure associated with the respective time period bucket.

218. The medium of embodiment 217, further, comprising:

the instructions to determine the set of historical market scenarios are structured to comprise instructions to:

determine, via at least one processor, a historical data set and a set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

219. The medium of embodiment 218, further, comprising:

the instructions to calculate a change to a market factor during a rolling window period are structured to comprise instructions to:

determine, via at least one processor, the delta between values of the market factor at two time point of the rolling window period.

220. The medium of embodiment 219, further, comprising:

the processor-executable instructions structured as:

determine, via at least one processor, that historical data for the market factor during the rolling window period is unavailable for a time point; and impute, via at least one processor, the unavailable historical data for the time point using a k-Nearest Neighbors method.

221. The medium of embodiment 218, further, comprising:

the length of a rolling window period is structured to be equal to the time period length.

222. The medium of embodiment 217, further, comprising:

the set of time period buckets is structured to have a fixed length for each time period bucket.

223. The medium of embodiment 217, further, comprising:

the set of time period buckets is structured to have variable lengths, the variable length for each time period bucket reflective of changes in volatilities and correlations of the set of historical market scenarios.

224. The medium of embodiment 218, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

225. The medium of embodiment 224, further, comprising:

the instructions to fit the distribution to use for a market factor for the time period bucket using the associated subset of historical market scenarios are structured to comprise instructions to calculate the mean of the market factor's values in the associated subset of historical market scenarios.

226. The medium of embodiment 217, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

227. The medium of embodiment 216, further, comprising:

the processor-executable instructions structured as:

filter, via at least one processor, the set of simulated market scenarios associated with the time period length based on specified ranges of allowable values for specified customized market factors.

228. The medium of embodiment 216, further, comprising:

the processor-executable instructions structured as:

filter, via at least one processor, the set of simulated market scenarios associated with the time period length based on specified business cycle settings.

229. The medium of embodiment 216, further, comprising:

the processor-executable instructions structured as:

initialize, via at least one processor, starting portfolio weights of securities in the universe of securities to benchmark portfolio weights of a benchmark portfolio.

230. The medium of embodiment 216, further, comprising:

the portfolio weights of securities in the universe of securities are structured to be optimized by finding a mixed integer linear programming portfolio solution.

231. A machine learning portfolio generating processor-implemented system, comprising:

means to process processor-executable instructions;

means to issue processor-issuable instructions from a processor-executable component collection via the means to process processor-executable instructions, the processor-issuable instructions structured as:

obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;

determine, via at least one processor, a set of simulated market scenarios associated with the time period length, the set of simulated market scenarios generated using a set of multi-variate mixture datastructures, each simulated market scenario in the set of simulated market scenarios structured to comprise a set of simulated market factor values;

retrieve, via at least one processor, a set of expected returns for securities in the universe of securities for the set of simulated market scenarios, each expected return in the set of expected returns configured as calculated for a security during a simulated market scenario using:

the respective security's conditional Beta during the respective simulated market scenario, determined using a set of decision tree ensembles, trained to estimate conditional Beta of the respective security, based on a first subset of the set of simulated market factor values, and the respective security's conditional default probability during the respective simulated market scenario, determined using a set of decision tree ensembles, trained to estimate conditional default probability of the respective security, based on a second subset of the set of simulated market factor values;

optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and execute, via at least one processor, the set of tradeable transactions to generate the optimized portfolio.

232. The system of embodiment 231, further, comprising: the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructure associated with the respective time period bucket.

233. The system of embodiment 232, further, comprising: the instructions to determine the set of historical market scenarios are structured to comprise instructions to:

determine, via at least one processor, a historical data set and a set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

234. The system of embodiment 233, further, comprising: the instructions to calculate a change to a market factor during a rolling window period are structured to comprise instructions to:

determine, via at least one processor, the delta between values of the market factor at two time point of the rolling window period.

235. The system of embodiment 234, further, comprising: the processor-executable instructions structured as:

determine, via at least one processor, that historical data for the market factor during the rolling window period is unavailable for a time point; and impute, via at least one processor, the unavailable historical data for the time point using a k-Nearest Neighbors method.

236. The system of embodiment 233, further, comprising: the length of a rolling window period is structured to be equal to the time period length.

237. The system of embodiment 232, further, comprising: the set of time period buckets is structured to have a fixed length for each time period bucket.

238. The system of embodiment 232, further, comprising: the set of time period buckets is structured to have variable lengths, the variable length for each time period bucket reflective of changes in volatilities and correlations of the set of historical market scenarios.

239. The system of embodiment 233, further, comprising: the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

240. The system of embodiment 239, further, comprising: the instructions to fit the distribution to use for a market factor for the time period bucket using the associated subset of historical market scenarios are structured to comprise instructions to calculate the mean of the market factor's values in the associated subset of historical market scenarios.

241. The system of embodiment 232, further, comprising: the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

242. The system of embodiment 231, further, comprising: the processor-executable instructions structured as:

filter, via at least one processor, the set of simulated market scenarios associated with the time period length based on specified ranges of allowable values for specified customized market factors.

243. The system of embodiment 231, further, comprising: the processor-executable instructions structured as:
filter, via at least one processor, the set of simulated market scenarios associated with the time period length based on specified business cycle settings.

244. The system of embodiment 231, further, comprising: the processor-executable instructions structured as:
initialize, via at least one processor, starting portfolio weights of securities in the universe of securities to benchmark portfolio weights of a benchmark portfolio.

245. The system of embodiment 231, further, comprising: the portfolio weights of securities in the universe of securities are structured to be optimized by finding a mixed integer linear programming portfolio solution.

246. A machine learning portfolio generating processor-implemented process, comprising executing processor-executable instructions to:
obtain, via at least one processor, a portfolio construction request datastructure, the portfolio construction request datastructure structured to include a set of optimization parameters including a universe of securities, a time period length, a conditional value at risk portion, a conditional value at risk threshold, a portfolio value amount;
determine, via at least one processor, a set of simulated market scenarios associated with the time period length, the set of simulated market scenarios generated using a set of multi-variate mixture datastructures, each simulated market scenario in the set of simulated market scenarios structured to comprise a set of simulated market factor values;
retrieve, via at least one processor, a set of expected returns for securities in the universe of securities for the set of simulated market scenarios, each expected return in the set of expected returns configured as calculated for a security during a simulated market scenario using:
the respective security's conditional Beta during the respective simulated market scenario, determined using a set of decision tree ensembles, trained to estimate conditional Beta of the respective security, based on a first subset of the set of simulated market factor values, and
the respective security's conditional default probability during the respective simulated market scenario, determined using a set of decision tree ensembles, trained to estimate conditional default probability of the respective security, based on a second subset of the set of simulated market factor values;
optimize, via at least one processor, portfolio weights of securities in the universe of securities in accordance with the conditional value at risk portion, the conditional value at risk threshold, and the portfolio value amount, using the set of expected returns, to generate a set of tradeable transactions that maximize expected portfolio return of an optimized portfolio; and
execute, via at least one processor, the set of tradeable transactions to generate the optimized portfolio.

247. The process of embodiment 246, further, comprising: the instructions to generate the set of simulated market scenarios using the set of multi-variate mixture datastructures are structured to comprise instructions to
determine, via at least one processor, a set of historical market scenarios and a set of time period buckets;
determine, via at least one processor, for each time period bucket from the set of time period buckets, a subset of historical market scenarios, from the set of historical market scenarios, associated with the respective time period bucket;
train, via at least one processor, for each time period bucket from the set of time period buckets, a multi-variate mixture datastructure, from the set of multi-variate mixture datastructures, using the subset of historical market scenarios associated with the respective time period bucket;
determine, via at least one processor, for each time period bucket from the set of time period buckets, a number of simulated market scenarios to generate using the trained multi-variate mixture datastructure associated with the respective time period bucket; and
generate, via at least one processor, for each time period bucket from the set of time period buckets, the determined number of simulated market scenarios for the respective time period bucket, using the trained multi-variate mixture datastructure associated with the respective time period bucket.

248. The process of embodiment 247, further, comprising: the instructions to determine the set of historical market scenarios are structured to comprise instructions to:
determine, via at least one processor, a historical data set and a set of market factors;
determine, via at least one processor, a set of rolling window periods for the historical data set; and
calculate, via at least one processor, for each market factor from the set of market factors, for each rolling window period from the set of rolling window periods, a change to the respective market factor during the respective rolling window period,
each historical market scenario from the set of historical market scenarios structured to comprise calculated changes to the set of market factors during a rolling window period.

249. The process of embodiment 248, further, comprising: the instructions to calculate a change to a market factor during a rolling window period are structured to comprise instructions to:
determine, via at least one processor, the delta between values of the market factor at two time point of the rolling window period.

250. The process of embodiment 249, further, comprising: the processor-executable instructions structured as:
determine, via at least one processor, that historical data for the market factor during the rolling window period is unavailable for a time point; and
impute, via at least one processor, the unavailable historical data for the time point using a k-Nearest Neighbors method.

251. The process of embodiment 248, further, comprising: the length of a rolling window period is structured to be equal to the time period length.

252. The process of embodiment 247, further, comprising: the set of time period buckets is structured to have a fixed length for each time period bucket.

253. The process of embodiment 247, further, comprising: the set of time period buckets is structured to have variable lengths, the variable length for each time period bucket reflective of changes in volatilities and correlations of the set of historical market scenarios.

254. The process of embodiment 248, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

255. The process of embodiment 254, further, comprising:

the instructions to fit the distribution to use for a market factor for the time period bucket using the associated subset of historical market scenarios are structured to comprise instructions to calculate the mean of the market factor's values in the associated subset of historical market scenarios.

256. The process of embodiment 247, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

257. The process of embodiment 246, further, comprising:

the processor-executable instructions structured as:

filter, via at least one processor, the set of simulated market scenarios associated with the time period length based on specified ranges of allowable values for specified customized market factors.

258. The process of embodiment 246, further, comprising:

the processor-executable instructions structured as:

filter, via at least one processor, the set of simulated market scenarios associated with the time period length based on specified business cycle settings.

259. The process of embodiment 246, further, comprising:

the processor-executable instructions structured as:

initialize, via at least one processor, starting portfolio weights of securities in the universe of securities to benchmark portfolio weights of a benchmark portfolio.

260. The process of embodiment 246, further, comprising:

the portfolio weights of securities in the universe of securities are structured to be optimized by finding a mixed integer linear programming portfolio solution.

301. A machine learning predefined scenario constructing apparatus, comprising:

a memory;

a component collection in the memory;

a processor disposed in communication with the memory and configured to issue a plurality of processor-executable instructions from the component collection, the processor-executable instructions structured as:

obtain, via at least one processor, a user selection of a set of simulated market scenarios via a simulation selection interaction-interface mechanism, the set of simulated market scenarios generated using a set of deep learning neural networks, each simulated market scenario in the set of simulated market scenarios structured to comprise a set of simulated market factor values corresponding to a set of market factors;

determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;

generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;

obtain, via at least one processor, a user modification to a range of allowable values of a market factor from the set of market factors via the market factor interaction-interface mechanism associated with the modified market factor;

update, via at least one processor, a set of customized market factors from the set of market factors based on the user modification;

determine, via at least one processor, a range of allowable values for each customized market factor from the set of customized market factors;

filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;

determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

302. The apparatus of embodiment 301, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

303. The apparatus of embodiment 302, further, comprising:

the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

304. The apparatus of embodiment 303, further, comprising:

the instructions to calculate a change to a market factor during a rolling window period are structured to comprise instructions to:

determine, via at least one processor, the delta between values of the market factor at a beginning time point and an ending time point of the rolling window period.

305. The apparatus of embodiment 304, further, comprising:

the processor-executable instructions structured as:

determine, via at least one processor, that historical data for the market factor during the rolling window period is unavailable for a time point; and impute, via at least one processor, the unavailable historical data for the time point using a machine learning method.

306. The apparatus of embodiment 303, further, comprising:

the rolling window period length is structured to be equal to the time period length.

307. The apparatus of embodiment 302, further, comprising:

the set of time period buckets is structured to have an equal fixed length for each time period bucket.

308. The apparatus of embodiment 302, further, comprising:

the set of time period buckets is structured to have a variable length for each time period bucket, the variable length for each time period bucket determined by judging the overall goodness of fit between the set of simulated market scenarios and the set of historical market scenarios.

309. The apparatus of embodiment 302, further, comprising:

the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

310. The apparatus of embodiment 309, further, comprising:

the deep learning neural network for the time period bucket is trained to generate a set of Gaussian mixture latent variables.

311. The apparatus of embodiment 310, further, comprising:

the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

312. The apparatus of embodiment 301, further, comprising:

the simulation selection interaction-interface mechanism is structured to comprise a pricing date selection interaction-interface mechanism and a simulation model selection interaction-interface mechanism.

313. The apparatus of embodiment 301, further, comprising:

the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

314. The apparatus of embodiment 301, further, comprising:

each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

315. The apparatus of embodiment 301, further, comprising:

the instructions to update the set of customized market factors based on the user modification are structured to comprise instructions to add the modified market factor to the set of customized market factors.

316. The apparatus of embodiment 301, further, comprising:

the instructions to update the set of customized market factors based on the user modification are structured to comprise instructions to remove the modified market factor from the set of customized market factors.

317. The apparatus of embodiment 301, further, comprising:

the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

318. The apparatus of embodiment 301, further, comprising:

the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

319. The apparatus of embodiment 301, further, comprising:

the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

320. The apparatus of embodiment 319, further, comprising:

the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

321. A machine learning predefined scenario constructing processor-readable, non-transient medium, comprising processor-executable instructions structured as:

obtain, via at least one processor, a user selection of a set of simulated market scenarios via a simulation selection interaction-interface mechanism, the set of simulated market scenarios generated using a set of deep learning neural networks, each simulated market scenario in the set of simulated market scenarios structured to comprise a set of simulated market factor values corresponding to a set of market factors;

determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;

generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;

obtain, via at least one processor, a user modification to a range of allowable values of a market factor from the set of market factors via the market factor interaction-interface mechanism associated with the modified market factor;

update, via at least one processor, a set of customized market factors from the set of market factors based on the user modification;

determine, via at least one processor, a range of allowable values for each customized market factor from the set of customized market factors;

filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;

determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

322. The medium of embodiment 321, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

323. The medium of embodiment 322, further, comprising:

the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

324. The medium of embodiment 323, further, comprising:

the instructions to calculate a change to a market factor during a rolling window period are structured to comprise instructions to:

determine, via at least one processor, the delta between values of the market factor at a beginning time point and an ending time point of the rolling window period.

325. The medium of embodiment 324, further, comprising:

the processor-executable instructions structured as:

determine, via at least one processor, that historical data for the market factor during the rolling window period is unavailable for a time point; and impute, via at least one processor, the unavailable historical data for the time point using a machine learning method.

326. The medium of embodiment 323, further, comprising:

the rolling window period length is structured to be equal to the time period length.

327. The medium of embodiment 322, further, comprising:

the set of time period buckets is structured to have an equal fixed length for each time period bucket.

328. The medium of embodiment 322, further, comprising:

the set of time period buckets is structured to have a variable length for each time period bucket, the variable length for each time period bucket determined by judging the overall goodness of fit between the set of simulated market scenarios and the set of historical market scenarios.

329. The medium of embodiment 322, further, comprising:

the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

330. The medium of embodiment 329, further, comprising:

the deep learning neural network for the time period bucket is trained to generate a set of Gaussian mixture latent variables.

331. The medium of embodiment 330, further, comprising:

the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

332. The medium of embodiment 321, further, comprising:

the simulation selection interaction-interface mechanism is structured to comprise a pricing date selection interaction-interface mechanism and a simulation model selection interaction-interface mechanism.

333. The medium of embodiment 321, further, comprising:

the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

334. The medium of embodiment 321, further, comprising:

each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

335. The medium of embodiment 321, further, comprising:

the instructions to update the set of customized market factors based on the user modification are structured to comprise instructions to add the modified market factor to the set of customized market factors.

336. The medium of embodiment 321, further, comprising:

the instructions to update the set of customized market factors based on the user modification are structured to comprise instructions to remove the modified market factor from the set of customized market factors.

337. The medium of embodiment 321, further, comprising:

the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

338. The medium of embodiment 321, further, comprising:

the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

339. The medium of embodiment 321, further, comprising:

the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

340. The medium of embodiment 339, further, comprising:

the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

341. A machine learning predefined scenario constructing processor-implemented system, comprising:

means to process processor-executable instructions;

means to issue processor-issuable instructions from a processor-executable component collection via the means to process processor-executable instructions, the processor-issuable instructions structured as:

obtain, via at least one processor, a user selection of a set of simulated market scenarios via a simulation selection interaction-interface mechanism, the set of simulated market scenarios generated using a set of deep learning neural networks, each simulated market scenario in the set of simulated market scenarios structured to comprise a set of simulated market factor values corresponding to a set of market factors;

determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;

generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;

obtain, via at least one processor, a user modification to a range of allowable values of a market factor from the set of market factors via the market factor interaction-interface mechanism associated with the modified market factor;

update, via at least one processor, a set of customized market factors from the set of market factors based on the user modification;

determine, via at least one processor, a range of allowable values for each customized market factor from the set of customized market factors;

filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;

determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

342. The system of embodiment 341, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

343. The system of embodiment 342, further, comprising: the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective historical rolling window period, each historical market scenario from the set of historical market scenarios structured to comprise calculated changes to the set of market factors during a rolling window period.

344. The system of embodiment 343, further, comprising: the instructions to calculate a change to a market factor during a rolling window period are structured to comprise instructions to:

determine, via at least one processor, the delta between values of the market factor at a beginning time point and an ending time point of the rolling window period.

345. The system of embodiment 344, further, comprising: the processor-executable instructions structured as:

determine, via at least one processor, that historical data for the market factor during the rolling window period is unavailable for a time point; and impute, via at least one processor, the unavailable historical data for the time point using a machine learning method.

346. The system of embodiment 343, further, comprising: the rolling window period length is structured to be equal to the time period length.

347. The system of embodiment 342, further, comprising: the set of time period buckets is structured to have an equal fixed length for each time period bucket.

348. The system of embodiment 342, further, comprising: the set of time period buckets is structured to have a variable length for each time period bucket, the variable length for each time period bucket determined by judging the overall goodness of fit between the set of simulated market scenarios and the set of historical market scenarios.

349. The system of embodiment 342, further, comprising: the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

350. The system of embodiment 349, further, comprising: the deep learning neural network for the time period bucket is trained to generate a set of Gaussian mixture latent variables.

351. The system of embodiment 350, further, comprising: the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

352. The system of embodiment 341, further, comprising: the simulation selection interaction-interface mechanism is structured to comprise a pricing date selection interaction-interface mechanism and a simulation model selection interaction-interface mechanism.

353. The system of embodiment 341, further, comprising: the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

354. The system of embodiment 341, further, comprising: each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

355. The system of embodiment 341, further, comprising: the instructions to update the set of customized market factors based on the user modification are structured to comprise instructions to add the modified market factor to the set of customized market factors.

356. The system of embodiment 341, further, comprising: the instructions to update the set of customized market factors based on the user modification are structured to comprise instructions to remove the modified market factor from the set of customized market factors.

357. The system of embodiment 341, further, comprising: the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

358. The system of embodiment 341, further, comprising: the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

359. The system of embodiment 341, further, comprising: the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

360. The system of embodiment 359, further, comprising: the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

361. A machine learning predefined scenario constructing processor-implemented process, comprising executing processor-executable instructions to:

obtain, via at least one processor, a user selection of a set of simulated market scenarios via a simulation selection interaction-interface mechanism, the set of simulated market scenarios generated using a set of deep learning neural networks, each simulated market scenario in the set of simulated market scenarios structured to comprise a set of simulated market factor values corresponding to a set of market factors;

determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;

generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;

obtain, via at least one processor, a user modification to a range of allowable values of a market factor from the set of market factors via the market factor interaction-interface mechanism associated with the modified market factor;

update, via at least one processor, a set of customized market factors from the set of market factors based on the user modification;

determine, via at least one processor, a range of allowable values for each customized market factor from the set of customized market factors;

filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;

determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

362. The process of embodiment 361, further, comprising: the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

363. The process of embodiment 362, further, comprising: the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

364. The process of embodiment 363, further, comprising: the instructions to calculate a change to a market factor during a rolling window period are structured to comprise instructions to:

determine, via at least one processor, the delta between values of the market factor at a beginning time point and an ending time point of the rolling window period.

365. The process of embodiment 364, further, comprising: the processor-executable instructions structured as:

determine, via at least one processor, that historical data for the market factor during the rolling window period is unavailable for a time point; and impute, via at least one processor, the unavailable historical data for the time point using a machine learning method.

366. The process of embodiment 363, further, comprising: the rolling window period length is structured to be equal to the time period length.

367. The process of embodiment 362, further, comprising: the set of time period buckets is structured to have an equal fixed length for each time period bucket.

368. The process of embodiment 362, further, comprising: the set of time period buckets is structured to have a variable length for each time period bucket, the variable length for each time period bucket determined by judging the overall goodness of fit between the set of simulated market scenarios and the set of historical market scenarios.

369. The process of embodiment 362, further, comprising: the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

370. The process of embodiment 369, further, comprising: the deep learning neural network for the time period bucket is trained to generate a set of Gaussian mixture latent variables.

371. The process of embodiment 370, further, comprising: the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

372. The process of embodiment 361, further, comprising: the simulation selection interaction-interface mechanism is structured to comprise a pricing date selection interaction-interface mechanism and a simulation model selection interaction-interface mechanism.

373. The process of embodiment 361, further, comprising: the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

374. The process of embodiment 361, further, comprising: each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

375. The process of embodiment 361, further, comprising: the instructions to update the set of customized market factors based on the user modification are structured to comprise instructions to add the modified market factor to the set of customized market factors.

376. The process of embodiment 361, further, comprising: the instructions to update the set of customized market factors based on the user modification are structured to comprise instructions to remove the modified market factor from the set of customized market factors.

377. The process of embodiment 361, further, comprising: the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

378. The process of embodiment 361, further, comprising: the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

379. The process of embodiment 361, further, comprising: the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

380. The process of embodiment 379, further, comprising: the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

401. A machine learning predefined scenario constructing apparatus, comprising:

a memory;

a component collection in the memory;

a processor disposed in communication with the memory and configured to issue a plurality of processor-executable instructions from the component collection, the processor-executable instructions structured as:

obtain, via at least one processor, a user selection of a set of simulated market scenarios via a simulation selection interaction-interface mechanism, the set of simulated market scenarios generated using a set of multi-variate mixture datastructures, each simulated market scenario in the set of simulated market scenarios structured to comprise a set of simulated market factor values corresponding to a set of market factors;

determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;

generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;

obtain, via at least one processor, a user modification to a range of allowable values of a market factor from the set of market factors via the market factor interaction-interface mechanism associated with the modified market factor;

update, via at least one processor, a set of customized market factors from the set of market factors based on the user modification;

determine, via at least one processor, a range of allowable values for each customized market factor from the set of customized market factors;

filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;

determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

402. The apparatus of embodiment 401, further, comprising:

the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructures associated with the respective time period bucket.

403. The apparatus of embodiment 402, further, comprising:

the instructions to determine the set of historical market scenarios are structured to comprise instructions to:

determine, via at least one processor, a historical data set and the set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

404. The apparatus of embodiment 403, further, comprising:

the instructions to calculate a change to a market factor during a rolling window period are structured to comprise instructions to:

determine, via at least one processor, the delta between values of the market factor at two time point of the rolling window period.

405. The apparatus of embodiment 404, further, comprising:

the processor-executable instructions structured as:

determine, via at least one processor, that historical data for the market factor during the rolling window period is unavailable for a time point; and impute, via at least one processor, the unavailable historical data for the time point using a k-Nearest Neighbors method.

406. The apparatus of embodiment 403, further, comprising:

the length of a rolling window period is structured to be equal to the time period length.

407. The apparatus of embodiment 402, further, comprising:

the set of time period buckets is structured to have a fixed length for each time period bucket.

408. The apparatus of embodiment 402, further, comprising:

the set of time period buckets is structured to have variable lengths, the variable length for each time period bucket reflective of changes in volatilities and correlations of the set of historical market scenarios.

409. The apparatus of embodiment 403, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

410. The apparatus of embodiment 409, further, comprising:

the instructions to fit the distribution to use for a market factor for the time period bucket using the associated subset of historical market scenarios are structured to comprise instructions to calculate the mean of the market factor's values in the associated subset of historical market scenarios.

411. The apparatus of embodiment 402, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

412. The apparatus of embodiment 401, further, comprising:

the simulation selection interaction-interface mechanism is structured to comprise a pricing date selection interaction-interface mechanism and a simulation model selection interaction-interface mechanism.

413. The apparatus of embodiment 401, further, comprising:

the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

414. The apparatus of embodiment 401, further, comprising:

each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

415. The apparatus of embodiment 401, further, comprising:

the instructions to update the set of customized market factors based on the user modification are structured to comprise instructions to add the modified market factor to the set of customized market factors.

416. The apparatus of embodiment 401, further, comprising:

the instructions to update the set of customized market factors based on the user modification are structured to comprise instructions to remove the modified market factor from the set of customized market factors.

417. The apparatus of embodiment 401, further, comprising:

the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

418. The apparatus of embodiment 401, further, comprising:

the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

419. The apparatus of embodiment 401, further, comprising:

the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

420. The apparatus of embodiment 419, further, comprising:

the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

421. A machine learning predefined scenario constructing processor-readable, non-transient medium, comprising processor-executable instructions structured as:
obtain, via at least one processor, a user selection of a set of simulated market scenarios via a simulation selection interaction-interface mechanism, the set of simulated market scenarios generated using a set of multi-variate mixture datastructures, each simulated market scenario in the set of simulated market scenarios structured to comprise a set of simulated market factor values corresponding to a set of market factors;
determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;
generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;
obtain, via at least one processor, a user modification to a range of allowable values of a market factor from the set of market factors via the market factor interaction-interface mechanism associated with the modified market factor;
update, via at least one processor, a set of customized market factors from the set of market factors based on the user modification;
determine, via at least one processor, a range of allowable values for each customized market factor from the set of customized market factors;
filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;
determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and
generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

422. The medium of embodiment 421, further, comprising:
the instructions to generate the set of simulated market scenarios using the set of multi-variate mixture datastructures are structured to comprise instructions to
determine, via at least one processor, a set of historical market scenarios and a set of time period buckets;
determine, via at least one processor, for each time period bucket from the set of time period buckets, a subset of historical market scenarios, from the set of historical market scenarios, associated with the respective time period bucket;
train, via at least one processor, for each time period bucket from the set of time period buckets, a multivariate mixture datastructure, from the set of multivariate mixture datastructures, using the subset of historical market scenarios associated with the respective time period bucket;
determine, via at least one processor, for each time period bucket from the set of time period buckets, a number of simulated market scenarios to generate using the trained multi-variate mixture datastructure associated with the respective time period bucket; and
generate, via at least one processor, for each time period bucket from the set of time period buckets, the determined number of simulated market scenarios for the respective time period bucket, using the trained multi-variate mixture datastructures associated with the respective time period bucket.

423. The medium of embodiment 422, further, comprising:
the instructions to determine the set of historical market scenarios are structured to comprise instructions to:
determine, via at least one processor, a historical data set and the set of market factors;
determine, via at least one processor, a set of rolling window periods for the historical data set; and
calculate, via at least one processor, for each market factor from the set of market factors, for each rolling window period from the set of rolling window periods, a change to the respective market factor during the respective rolling window period,
each historical market scenario from the set of historical market scenarios structured to comprise calculated changes to the set of market factors during a rolling window period.

424. The medium of embodiment 423, further, comprising:
the instructions to calculate a change to a market factor during a rolling window period are structured to comprise instructions to:
determine, via at least one processor, the delta between values of the market factor at two time point of the rolling window period.

425. The medium of embodiment 424, further, comprising:
the processor-executable instructions structured as:
determine, via at least one processor, that historical data for the market factor during the rolling window period is unavailable for a time point; and
impute, via at least one processor, the unavailable historical data for the time point using a k-Nearest Neighbors method.

426. The medium of embodiment 423, further, comprising:

the length of a rolling window period is structured to be equal to the time period length.

427. The medium of embodiment 422, further, comprising:

the set of time period buckets is structured to have a fixed length for each time period bucket.

428. The medium of embodiment 422, further, comprising:

the set of time period buckets is structured to have variable lengths, the variable length for each time period bucket reflective of changes in volatilities and correlations of the set of historical market scenarios.

429. The medium of embodiment 423, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

430. The medium of embodiment 429, further, comprising:

the instructions to fit the distribution to use for a market factor for the time period bucket using the associated subset of historical market scenarios are structured to comprise instructions to calculate the mean of the market factor's values in the associated subset of historical market scenarios.

431. The medium of embodiment 422, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

432. The medium of embodiment 421, further, comprising:

the simulation selection interaction-interface mechanism is structured to comprise a pricing date selection interaction-interface mechanism and a simulation model selection interaction-interface mechanism.

433. The medium of embodiment 421, further, comprising:

the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

434. The medium of embodiment 421, further, comprising:

each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

435. The medium of embodiment 421, further, comprising:

the instructions to update the set of customized market factors based on the user modification are structured to comprise instructions to add the modified market factor to the set of customized market factors.

436. The medium of embodiment 421, further, comprising:

the instructions to update the set of customized market factors based on the user modification are structured to comprise instructions to remove the modified market factor from the set of customized market factors.

437. The medium of embodiment 421, further, comprising:

the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

438. The medium of embodiment 421, further, comprising:

the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

439. The medium of embodiment 421, further, comprising:

the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

440. The medium of embodiment 439, further, comprising:

the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

441. A machine learning predefined scenario constructing processor-implemented system, comprising:

means to process processor-executable instructions;

means to issue processor-issuable instructions from a processor-executable component collection via the means to process processor-executable instructions, the processor-issuable instructions structured as:

obtain, via at least one processor, a user selection of a set of simulated market scenarios via a simulation selection interaction-interface mechanism, the set of simulated market scenarios generated using a set of multi-variate mixture datastructures, each simulated market scenario in the set of simulated market scenarios structured to comprise a set of simulated market factor values corresponding to a set of market factors;

determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;

generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;

obtain, via at least one processor, a user modification to a range of allowable values of a market factor from the set of market factors via the market factor interaction-interface mechanism associated with the modified market factor;

update, via at least one processor, a set of customized market factors from the set of market factors based on the user modification;

determine, via at least one processor, a range of allowable values for each customized market factor from the set of customized market factors;

filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;

determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

442. The system of embodiment 441, further, comprising:

the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructures associated with the respective time period bucket.

443. The system of embodiment 442, further, comprising:

the instructions to determine the set of historical market scenarios are structured to comprise instructions to:

determine, via at least one processor, a historical data set and the set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

444. The system of embodiment 443, further, comprising:

the instructions to calculate a change to a market factor during a rolling window period are structured to comprise instructions to:

determine, via at least one processor, the delta between values of the market factor at two time point of the rolling window period.

445. The system of embodiment 444, further, comprising:

the processor-executable instructions structured as:

determine, via at least one processor, that historical data for the market factor during the rolling window period is unavailable for a time point; and impute, via at least one processor, the unavailable historical data for the time point using a k-Nearest Neighbors method.

446. The system of embodiment 443, further, comprising:

the length of a rolling window period is structured to be equal to the time period length.

447. The system of embodiment 442, further, comprising:

the set of time period buckets is structured to have a fixed length for each time period bucket.

448. The system of embodiment 442, further, comprising:

the set of time period buckets is structured to have variable lengths, the variable length for each time period bucket reflective of changes in volatilities and correlations of the set of historical market scenarios.

449. The system of embodiment 443, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

450. The system of embodiment 449, further, comprising:

the instructions to fit the distribution to use for a market factor for the time period bucket using the associated subset of historical market scenarios are structured to comprise instructions to calculate the mean of the market factor's values in the associated subset of historical market scenarios.

451. The system of embodiment 442, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

452. The system of embodiment 441, further, comprising:

the simulation selection interaction-interface mechanism is structured to comprise a pricing date selection interaction-interface mechanism and a simulation model selection interaction-interface mechanism.

453. The system of embodiment 441, further, comprising:

the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

454. The system of embodiment 441, further, comprising:

each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

455. The system of embodiment 441, further, comprising:

the instructions to update the set of customized market factors based on the user modification are structured to comprise instructions to add the modified market factor to the set of customized market factors.

456. The system of embodiment 441, further, comprising:

the instructions to update the set of customized market factors based on the user modification are structured to comprise instructions to remove the modified market factor from the set of customized market factors.

457. The system of embodiment 441, further, comprising:

the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

458. The system of embodiment 441, further, comprising:

the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

459. The system of embodiment 441, further, comprising:

the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

460. The system of embodiment 459, further, comprising:

the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

461. A machine learning predefined scenario constructing processor-implemented process, comprising executing processor-executable instructions to:

obtain, via at least one processor, a user selection of a set of simulated market scenarios via a simulation selection interaction-interface mechanism, the set of simulated market scenarios generated using a set of multi-variate mixture datastructures, each simulated market scenario in the set of simulated market scenarios structured to comprise a set of simulated market factor values corresponding to a set of market factors;

determine, via at least one processor, a range of unfiltered simulated market factor values for each market factor from the set of market factors, the range of unfiltered simulated market factor values for a market factor structured to include a minimum simulated market factor value and a maximum simulated market factor value in the set of simulated market scenarios for the respective market factor;

generate, via at least one processor, a set of market factor interaction-interface mechanisms, each market factor interaction-interface mechanism in the set of market factor interaction-interface mechanisms structured to be associated with a market factor from the set of market factors and structured to display the range of unfiltered simulated market factor values for the respective market factor;

obtain, via at least one processor, a user modification to a range of allowable values of a market factor from the set of market factors via the market factor interaction-interface mechanism associated with the modified market factor;

update, via at least one processor, a set of customized market factors from the set of market factors based on the user modification;

determine, via at least one processor, a range of allowable values for each customized market factor from the set of customized market factors;

filter, via at least one processor, the set of simulated market scenarios based on the determined ranges of allowable values for the set of customized market factors to determine a set of filtered simulated market scenarios having simulated market factor values that fall within the range of allowable values for each customized market factors from the set of customized market factors;

determine, via at least one processor, a range of filtered simulated market factor values for each market factor from the set of market factors, the range of filtered simulated market factor values for a market factor structured to include a minimum simulated market factor value and a maximum simulated market factor value in the set of filtered simulated market scenarios for the respective market factor; and generate, via at least one processor, an updated set of market factor interaction-interface mechanisms, each updated market factor interaction-interface mechanism in the set of updated market factor interaction-interface mechanisms structured to be associated with a market factor from the set of market factors and structured to display the range of filtered simulated market factor values for the respective market factor.

462. The process of embodiment 461, further, comprising: the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructures associated with the respective time period bucket.

463. The process of embodiment 462, further, comprising: the instructions to determine the set of historical market scenarios are structured to comprise instructions to:

determine, via at least one processor, a historical data set and the set of market factors; determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

464. The process of embodiment 463, further, comprising: the instructions to calculate a change to a market factor during a rolling window period are structured to comprise instructions to:

determine, via at least one processor, the delta between values of the market factor at two time point of the rolling window period.

465. The process of embodiment 464, further, comprising: the processor-executable instructions structured as:

determine, via at least one processor, that historical data for the market factor during the rolling window period is unavailable for a time point; and impute, via at least one processor, the unavailable historical data for the time point using a k-Nearest Neighbors method.

466. The process of embodiment 463, further, comprising: the length of a rolling window period is structured to be equal to the time period length.

467. The process of embodiment 462, further, comprising: the set of time period buckets is structured to have a fixed length for each time period bucket.

468. The process of embodiment 462, further, comprising: the set of time period buckets is structured to have variable lengths, the variable length for each time period bucket reflective of changes in volatilities and correlations of the set of historical market scenarios.

469. The process of embodiment 463, further, comprising: the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

470. The process of embodiment 469, further, comprising: the instructions to fit the distribution to use for a market factor for the time period bucket using the associated subset of historical market scenarios are structured to comprise instructions to calculate the mean of the market factor's values in the associated subset of historical market scenarios.

471. The process of embodiment 462, further, comprising: the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

472. The process of embodiment 461, further, comprising: the simulation selection interaction-interface mechanism is structured to comprise a pricing date selection interaction-interface mechanism and a simulation model selection interaction-interface mechanism.

473. The process of embodiment 461, further, comprising: the range of unfiltered simulated market factor values for a market factor structured to include an average simulated market factor value in the set of simulated market scenarios for the market factor; and the range of filtered simulated market factor values for the market factor structured to include an average value in the set of filtered simulated market scenarios for the market factor.

474. The process of embodiment 461, further, comprising: each market factor interaction-interface mechanism in the set of market factor interaction-interface mechanisms is structured to include a slider interaction-interface mechanism to affect user modification to a range of allowable values of a market factor associated with the respective market factor interaction-interface mechanism.

475. The process of embodiment 461, further, comprising: the instructions to update the set of customized market factors based on the user modification are structured to comprise instructions to add the modified market factor to the set of customized market factors.

476. The process of embodiment 461, further, comprising: the instructions to update the set of customized market factors based on the user modification are structured to comprise instructions to remove the modified market factor from the set of customized market factors.

477. The process of embodiment 461, further, comprising: the processor-executable instructions structured as:

generate, via at least one processor, a predefined scenario datastructure that includes a simulation identifier associated with the set of simulated market scenarios, identifiers of customized market factors from the set of customized market factors, and the ranges of allowable values for the set of customized market factors.

478. The process of embodiment 461, further, comprising: the processor-executable instructions structured as:

generate, via at least one processor, a predefined scenario datastructure that includes a simulation identifier associated with the set of simulated market scenarios, and identifiers of filtered simulated market scenarios from the set of filtered simulated market scenarios.

479. The process of embodiment 461, further, comprising: the processor-executable instructions structured as:

generate, via at least one processor, a set of factor group filter interaction-interface mechanisms, each factor group filter interaction-interface mechanism in the set of factor group filter interaction-interface mechanisms structured to be associated with a subset of market factor interaction-interface mechanisms from the set of market factor interaction-interface mechanisms.

480. The process of embodiment 479, further, comprising: the processor-executable instructions structured as:

obtain, via at least one processor, a user selection of a factor group filter interaction-interface mechanism in the set of factor group filter interaction-interface mechanisms; and generate, via at least one processor, a filtered set of market factor interaction-interface mechanisms, each filtered market factor interaction-interface mechanism in the set of filtered market factor interaction-interface mechanisms structured to be associated with the selected factor group filter interaction-interface mechanism.

501. A machine learning portfolio return computation engine apparatus, comprising:

a memory;

a component collection in the memory;

a processor disposed in communication with the memory and configured to issue a plurality of processor-executable instructions from the component collection, the processor-executable instructions structured as:

obtain, via at least one processor, a portfolio return computation request datastructure, the portfolio return computation request datastructure structured to specify a set of simulated market scenarios and a set of filters, the set of simulated market scenarios generated using a set of deep learning neural networks, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

502. The apparatus of embodiment 501, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

503. The apparatus of embodiment 502, further, comprising:

the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

504. The apparatus of embodiment 503, further, comprising:

the instructions to calculate a change to a market factor during a rolling window period are structured to comprise instructions to:

determine, via at least one processor, the delta between values of the market factor at a beginning time point and an ending time point of the rolling window period.

505. The apparatus of embodiment 504, further, comprising:

the processor-executable instructions structured as:

determine, via at least one processor, that historical data for the market factor during the rolling window period is unavailable for a time point; and impute, via at least one processor, the unavailable historical data for the time point using a machine learning method.

506. The apparatus of embodiment 503, further, comprising:

the rolling window period length is structured to be equal to the time period length.

507. The apparatus of embodiment 502, further, comprising:

the set of time period buckets is structured to have an equal fixed length for each time period bucket.

508. The apparatus of embodiment 502, further, comprising:

the set of time period buckets is structured to have a variable length for each time period bucket, the variable length for each time period bucket determined by judging the overall goodness of fit between the set of simulated market scenarios and the set of historical market scenarios.

509. The apparatus of embodiment 502, further, comprising:

the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

510. The apparatus of embodiment 509, further, comprising:

the deep learning neural network for the time period bucket is trained to generate a set of Gaussian mixture latent variables.

511. The apparatus of embodiment 510, further, comprising:

the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

512. The apparatus of embodiment 501, further, comprising:

a filter in the set of filters is configured as a set of customized market factors from the set of market factors and a range of allowable values for each customized market factor from the set of customized market factors.

513. The apparatus of embodiment 512, further, comprising:

the instructions to filter the set of simulated market scenarios based on the set of filters are structured to comprise instructions to determine a set of filtered simulated market scenarios having simulated market factor values that fall within the range of allowable values for each customized market factors from the set of customized market factors.

514. The apparatus of embodiment 501, further, comprising:

a filter in the set of filters is configured as a business cycle identifier and a business cycle weight associated with the business cycle identifier.

515. The apparatus of embodiment 514, further, comprising:

the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

516. A machine learning portfolio return computation engine processor-readable, non-transient medium, comprising processor-executable instructions structured as:

obtain, via at least one processor, a portfolio return computation request datastructure, the portfolio return computation request datastructure structured to specify a set of simulated market scenarios and a set of filters, the set of simulated market scenarios generated using a set of deep learning neural networks, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

517. The medium of embodiment 516, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

518. The medium of embodiment 517, further, comprising:

the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

519. The medium of embodiment 518, further, comprising:

the instructions to calculate a change to a market factor during a rolling window period are structured to comprise instructions to:

determine, via at least one processor, the delta between values of the market factor at a beginning time point and an ending time point of the rolling window period.

520. The medium of embodiment 519, further, comprising:

the processor-executable instructions structured as:

determine, via at least one processor, that historical data for the market factor during the rolling window period is unavailable for a time point; and impute, via at least one processor, the unavailable historical data for the time point using a machine learning method.

521. The medium of embodiment 518, further, comprising:

the rolling window period length is structured to be equal to the time period length.

522. The medium of embodiment 517, further, comprising:

the set of time period buckets is structured to have an equal fixed length for each time period bucket.

523. The medium of embodiment 517, further, comprising:

the set of time period buckets is structured to have a variable length for each time period bucket, the variable length for each time period bucket determined by judging the overall goodness of fit between the set of simulated market scenarios and the set of historical market scenarios.

524. The medium of embodiment 517, further, comprising:

the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

525. The medium of embodiment 524, further, comprising:

the deep learning neural network for the time period bucket is trained to generate a set of Gaussian mixture latent variables.

526. The medium of embodiment 525, further, comprising:

the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

527. The medium of embodiment 516, further, comprising:

a filter in the set of filters is configured as a set of customized market factors from the set of market factors and a range of allowable values for each customized market factor from the set of customized market factors.

528. The medium of embodiment 527, further, comprising:

the instructions to filter the set of simulated market scenarios based on the set of filters are structured to comprise instructions to determine a set of filtered simulated market scenarios having simulated market factor values that fall within the range of allowable values for each customized market factors from the set of customized market factors.

529. The medium of embodiment 516, further, comprising:

a filter in the set of filters is configured as a business cycle identifier and a business cycle weight associated with the business cycle identifier.

530. The medium of embodiment 529, further, comprising:

the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

531. A machine learning portfolio return computation engine processor-implemented system, comprising:

means to process processor-executable instructions;

means to issue processor-issuable instructions from a processor-executable component collection via the means to process processor-executable instructions, the processor-issuable instructions structured as:

obtain, via at least one processor, a portfolio return computation request datastructure, the portfolio return computation request datastructure structured to specify a set of simulated market scenarios and a set of filters, the set of simulated market scenarios generated using a set of deep learning neural networks, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

532. The system of embodiment 531, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

533. The system of embodiment 532, further, comprising: the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

534. The system of embodiment 533, further, comprising: the instructions to calculate a change to a market factor during a rolling window period are structured to comprise instructions to:

determine, via at least one processor, the delta between values of the market factor at a beginning time point and an ending time point of the rolling window period.

535. The system of embodiment 534, further, comprising: the processor-executable instructions structured as:

determine, via at least one processor, that historical data for the market factor during the rolling window period is unavailable for a time point; and impute, via at least one processor, the unavailable historical data for the time point using a machine learning method.

536. The system of embodiment 533, further, comprising: the rolling window period length is structured to be equal to the time period length.

537. The system of embodiment 532, further, comprising: the set of time period buckets is structured to have an equal fixed length for each time period bucket.

538. The system of embodiment 532, further, comprising: the set of time period buckets is structured to have a variable length for each time period bucket, the variable length for each time period bucket determined by judging the overall goodness of fit between the set of simulated market scenarios and the set of historical market scenarios.

539. The system of embodiment 532, further, comprising: the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

540. The system of embodiment 539, further, comprising: the deep learning neural network for the time period bucket is trained to generate a set of Gaussian mixture latent variables.

541. The system of embodiment 540, further, comprising: the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

542. The system of embodiment 531, further, comprising: a filter in the set of filters is configured as a set of customized market factors from the set of market factors and a range of allowable values for each customized market factor from the set of customized market factors.

543. The system of embodiment 542, further, comprising: the instructions to filter the set of simulated market scenarios based on the set of filters are structured to comprise instructions to determine a set of filtered simulated market scenarios having simulated market factor values that fall within the range of allowable values for each customized market factors from the set of customized market factors.

544. The system of embodiment 531, further, comprising: a filter in the set of filters is configured as a business cycle identifier and a business cycle weight associated with the business cycle identifier.

545. The system of embodiment 544, further, comprising: the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

546. A machine learning portfolio return computation engine processor-implemented process, comprising executing processor-executable instructions to:

obtain, via at least one processor, a portfolio return computation request datastructure, the portfolio return computation request datastructure structured to specify a set of simulated market scenarios and a set of filters, the set of simulated market scenarios generated using a set of deep learning neural networks, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

547. The process of embodiment 546, further, comprising:

the instructions to generate the set of simulated market scenarios using the set of deep learning neural networks are structured to comprise instructions to:

determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a deep learning neural network, from the set of deep learning neural networks, using the subset of historical market scenarios associated with the respective time period bucket;

determine, via at least one processor, for each time period bucket from the set of time period buckets, a number of simulated market scenarios to generate using the trained deep learning neural network associated with the respective time period bucket; and generate, via at least one processor, for each time period bucket from the set of time period buckets, the determined number of simulated market scenarios for the respective time period bucket, using the trained deep learning neural network associated with the respective time period bucket.

548. The process of embodiment 547, further, comprising:

the instructions to determine the set of historical market scenarios are structured to comprise instructions to:

determine, via at least one processor, a historical data set, a rolling window period length, and the set of market factors;

determine, via at least one processor, a set of rolling window periods using the historical data set and the rolling window period length; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

549. The process of embodiment 548, further, comprising:

the instructions to calculate a change to a market factor during a rolling window period are structured to comprise instructions to:

determine, via at least one processor, the delta between values of the market factor at a beginning time point and an ending time point of the rolling window period.

550. The process of embodiment 549, further, comprising:

the processor-executable instructions structured as:

determine, via at least one processor, that historical data for the market factor during the rolling window period is unavailable for a time point; and impute, via at least one processor, the unavailable historical data for the time point using a machine learning method.

551. The process of embodiment 548, further, comprising:

the rolling window period length is structured to be equal to the time period length.

552. The process of embodiment 547, further, comprising:

the set of time period buckets is structured to have an equal fixed length for each time period bucket.

553. The process of embodiment 547, further, comprising:

the set of time period buckets is structured to have a variable length for each time period bucket, the variable length for each time period bucket determined by judging the overall goodness of fit between the set of simulated market scenarios and the set of historical market scenarios.

554. The process of embodiment 547, further, comprising:

the instructions to train a deep learning neural network for a time period bucket using the associated subset of historical market scenarios are structured to comprise instructions to:

select, via at least one processor, a historical market scenario from the associated subset of historical market scenarios; and train, via at least one processor, the deep learning neural network for the time period bucket on the selected historical market scenario using a variational autoencoder.

555. The process of embodiment 554, further, comprising:

the deep learning neural network for the time period bucket is trained to generate a set of Gaussian mixture latent variables.

556. The process of embodiment 555, further, comprising:

the instructions to generate simulated market scenarios for the time period bucket, using the trained deep learning neural network associated with the time period bucket, are structured to comprise instructions to:

generate, via at least one processor, a set of random values for the set of Gaussian mixture latent variables; and generate a simulated market scenario, from the simulated market scenarios for the time period bucket, from the generated set of random values using a neural network decoder of the trained deep learning neural network associated with the time period bucket.

557. The process of embodiment 546, further, comprising:

a filter in the set of filters is configured as a set of customized market factors from the set of market factors and a range of allowable values for each customized market factor from the set of customized market factors.

558. The process of embodiment 557, further, comprising:

the instructions to filter the set of simulated market scenarios based on the set of filters are structured to comprise instructions to determine a set of filtered simulated market scenarios having simulated market factor values that fall within the range of allowable values for each customized market factors from the set of customized market factors.

559. The process of embodiment 546, further, comprising:

a filter in the set of filters is configured as a business cycle identifier and a business cycle weight associated with the business cycle identifier.

560. The process of embodiment 559, further, comprising:

the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

601. A machine learning portfolio return computation engine apparatus, comprising:

a memory;

a component collection in the memory;

a processor disposed in communication with the memory and configured to issue a plurality of processor-executable instructions from the component collection, the processor-executable instructions structured as:

obtain, via at least one processor, a portfolio return computation request datastructure, the portfolio return computation request datastructure structured to specify a set of simulated market scenarios and a set of filters, the set of simulated market scenarios generated using a set of multi-variate mixture datastructures, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

602. The apparatus of embodiment 601, further, comprising:

the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructure associated with the respective time period bucket.

603. The apparatus of embodiment 602, further, comprising:

the instructions to determine the set of historical market scenarios are structured to comprise instructions to:

determine, via at least one processor, a historical data set and the set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

604. The apparatus of embodiment 603, further, comprising:

the instructions to calculate a change to a market factor during a rolling window period are structured to comprise instructions to:

determine, via at least one processor, the delta between values of the market factor at two time point of the rolling window period.

605. The apparatus of embodiment 604, further, comprising:

the processor-executable instructions structured as:

determine, via at least one processor, that historical data for the market factor during the rolling window period is unavailable for a time point; and impute, via at least one processor, the unavailable historical data for the time point using a k-Nearest Neighbors method.

606. The apparatus of embodiment 603, further, comprising:

the length of a rolling window period is structured to be equal to the time period length.

607. The apparatus of embodiment 602, further, comprising:

the set of time period buckets is structured to have a fixed length for each time period bucket.

608. The apparatus of embodiment 602, further, comprising:

the set of time period buckets is structured to have variable lengths, the variable length for each time period bucket reflective of changes in volatilities and correlations of the set of historical market scenarios.

609. The apparatus of embodiment 603, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

610. The apparatus of embodiment 609, further, comprising:

the instructions to fit the distribution to use for a market factor for the time period bucket using the associated subset of historical market scenarios are structured to comprise instructions to calculate the mean of the market factor's values in the associated subset of historical market scenarios.

611. The apparatus of embodiment 602, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

612. The apparatus of embodiment 601, further, comprising:

a filter in the set of filters is configured as a set of customized market factors from the set of market factors and a range of allowable values for each customized market factor from the set of customized market factors.

613. The apparatus of embodiment 612, further, comprising:

the instructions to filter the set of simulated market scenarios based on the set of filters are structured to comprise instructions to determine a set of filtered simulated market scenarios having simulated market factor values that fall within the range of allowable values for each customized market factors from the set of customized market factors.

614. The apparatus of embodiment 601, further, comprising:

a filter in the set of filters is configured as a business cycle identifier and a business cycle weight associated with the business cycle identifier.

615. The apparatus of embodiment 614, further, comprising:

the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

616. A machine learning portfolio return computation engine processor-readable, non-transient medium, comprising processor-executable instructions structured as:

obtain, via at least one processor, a portfolio return computation request datastructure, the portfolio return computation request datastructure structured to specify a set of simulated market scenarios and a set of filters, the set of simulated market scenarios generated using a set of multi-variate mixture datastructures, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

617. The medium of embodiment 616, further, comprising:

the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructure associated with the respective time period bucket.

618. The medium of embodiment 617, further, comprising:

the instructions to determine the set of historical market scenarios are structured to comprise instructions to:

determine, via at least one processor, a historical data set and the set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

619. The medium of embodiment 618, further, comprising:

the instructions to calculate a change to a market factor during a rolling window period are structured to comprise instructions to:

determine, via at least one processor, the delta between values of the market factor at two time point of the rolling window period.

620. The medium of embodiment 619, further, comprising:

the processor-executable instructions structured as:

determine, via at least one processor, that historical data for the market factor during the rolling window period is unavailable for a time point; and impute, via at least one processor, the unavailable historical data for the time point using a k-Nearest Neighbors method.

621. The medium of embodiment 618, further, comprising:

the length of a rolling window period is structured to be equal to the time period length.

622. The medium of embodiment 617, further, comprising:

the set of time period buckets is structured to have a fixed length for each time period bucket.

623. The medium of embodiment 617, further, comprising:

the set of time period buckets is structured to have variable lengths, the variable length for each time period bucket reflective of changes in volatilities and correlations of the set of historical market scenarios.

624. The medium of embodiment 618, further, comprising:

the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

625. The medium of embodiment 624, further, comprising:

the instructions to fit the distribution to use for a market factor for the time period bucket using the associated subset of historical market scenarios are structured to comprise instructions to calculate the mean of the market factor's values in the associated subset of historical market scenarios.

626. The medium of embodiment 617, further, comprising:

the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

627. The medium of embodiment 616, further, comprising:

a filter in the set of filters is configured as a set of customized market factors from the set of market factors and a range of allowable values for each customized market factor from the set of customized market factors.

628. The medium of embodiment 627, further, comprising:

the instructions to filter the set of simulated market scenarios based on the set of filters are structured to comprise instructions to determine a set of filtered simulated market scenarios having simulated market factor values that fall within the range of allowable values for each customized market factors from the set of customized market factors.

629. The medium of embodiment 616, further, comprising:

a filter in the set of filters is configured as a business cycle identifier and a business cycle weight associated with the business cycle identifier.

630. The medium of embodiment 629, further, comprising:

the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

631. A machine learning portfolio return computation engine processor-implemented system, comprising:

means to process processor-executable instructions;

means to issue processor-issuable instructions from a processor-executable component collection via the means to process processor-executable instructions, the processor-issuable instructions structured as:

obtain, via at least one processor, a portfolio return computation request datastructure, the portfolio return computation request datastructure structured to specify a set of simulated market scenarios and a set of filters, the set of simulated market scenarios generated using a set of multi-variate mixture datastructures, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

632. The system of embodiment 631, further, comprising:

the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructure associated with the respective time period bucket.

633. The system of embodiment 632, further, comprising:

the instructions to determine the set of historical market scenarios are structured to comprise instructions to:

determine, via at least one processor, a historical data set and the set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

634. The system of embodiment 633, further, comprising: the instructions to calculate a change to a market factor during a rolling window period are structured to comprise instructions to:

determine, via at least one processor, the delta between values of the market factor at two time point of the rolling window period.

635. The system of embodiment 634, further, comprising: the processor-executable instructions structured as:

determine, via at least one processor, that historical data for the market factor during the rolling window period is unavailable for a time point; and impute, via at least one processor, the unavailable historical data for the time point using a k-Nearest Neighbors method.

636. The system of embodiment 633, further, comprising: the length of a rolling window period is structured to be equal to the time period length.

637. The system of embodiment 632, further, comprising: the set of time period buckets is structured to have a fixed length for each time period bucket.

638. The system of embodiment 632, further, comprising: the set of time period buckets is structured to have variable lengths, the variable length for each time period bucket reflective of changes in volatilities and correlations of the set of historical market scenarios.

639. The system of embodiment 633, further, comprising: the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

640. The system of embodiment 639, further, comprising: the instructions to fit the distribution to use for a market factor for the time period bucket using the associated subset of historical market scenarios are structured to comprise instructions to calculate the mean of the market factor's values in the associated subset of historical market scenarios.

641. The system of embodiment 632, further, comprising: the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

642. The system of embodiment 631, further, comprising: a filter in the set of filters is configured as a set of customized market factors from the set of market factors and a range of allowable values for each customized market factor from the set of customized market factors.

643. The system of embodiment 642, further, comprising: the instructions to filter the set of simulated market scenarios based on the set of filters are structured to comprise instructions to determine a set of filtered simulated market scenarios having simulated market factor values that fall within the range of allowable values for each customized market factors from the set of customized market factors.

644. The system of embodiment 631, further, comprising: a filter in the set of filters is configured as a business cycle identifier and a business cycle weight associated with the business cycle identifier.

645. The system of embodiment 644, further, comprising: the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

646. A machine learning portfolio return computation engine processor-implemented process, comprising executing processor-executable instructions to:

obtain, via at least one processor, a portfolio return computation request datastructure, the portfolio return computation request datastructure structured to specify a set of simulated market scenarios and a set of filters, the set of simulated market scenarios generated using a set of multi-variate mixture datastructures, each simulated market scenario in the set of simulated market scenarios structured to comprise a set of simulated market factor values corresponding to a set of market factors;

determine, via at least one processor, a set of constituent portfolio securities of a portfolio, each constituent portfolio security in the set of constituent portfolio securities associated with a portfolio security weight of the respective constituent portfolio security in the portfolio;

filter, via at least one processor, the set of simulated market scenarios based on the set of filters to determine a set of filtered simulated market scenarios having simulated market factor values that fall within the range of allowable values for each filter in the set of filters;

retrieve, via at least one processor, a set of expected returns for the set of constituent portfolio securities of the portfolio for the set of filtered simulated market scenarios;

calculate, via at least one processor, for each constituent portfolio security in the set of constituent portfolio securities, an expected constituent portfolio security return for the set of filtered simulated market scenarios as an average of expected returns in the set of expected returns of the respective constituent portfolio security; and calculate, via at least one processor, an expected portfolio return for the set of filtered simulated market scenarios as a weighted average of the calculated expected constituent portfolio security returns for the set of filtered simulated market scenarios, an expected constituent portfolio security return weighted in accordance with the portfolio security weight of the associated portfolio security.

647. The process of embodiment 646, further, comprising: the instructions to generate the set of simulated market scenarios using the set of multi-variate mixture datastructures are structured to comprise instructions to determine, via at least one processor, a set of historical market scenarios and a set of time period buckets;

determine, via at least one processor, for each time period bucket from the set of time period buckets, a subset of historical market scenarios, from the set of historical market scenarios, associated with the respective time period bucket;

train, via at least one processor, for each time period bucket from the set of time period buckets, a multi-variate mixture datastructure, from the set of multi-variate mixture datastructures, using the subset of historical market scenarios associated with the respective time period bucket;

determine, via at least one processor, for each time period bucket from the set of time period buckets, a number of simulated market scenarios to generate using the trained multi-variate mixture datastructure associated with the respective time period bucket; and generate, via at least one processor, for each time period bucket from the set of time period buckets, the determined number of simulated market scenarios for the respective time period bucket, using the trained multi-variate mixture datastructure associated with the respective time period bucket.

648. The process of embodiment 647, further, comprising: the instructions to determine the set of historical market scenarios are structured to comprise instructions to:

determine, via at least one processor, a historical data set and the set of market factors;

determine, via at least one processor, a set of rolling window periods for the historical data set; and calculate, via at least one processor, for each market factor from the set of market factors, for each rolling window period from the set of rolling window periods, a change to the respective market factor during the respective rolling window period, each historical market scenario from the set of historical market scenarios structured to comprise calculated changes to the set of market factors during a rolling window period.

649. The process of embodiment 648, further, comprising: the instructions to calculate a change to a market factor during a rolling window period are structured to comprise instructions to:

determine, via at least one processor, the delta between values of the market factor at two time point of the rolling window period.

650. The process of embodiment 649, further, comprising: the processor-executable instructions structured as:

determine, via at least one processor, that historical data for the market factor during the rolling window period is unavailable for a time point; and impute, via at least one processor, the unavailable historical data for the time point using a k-Nearest Neighbors method.

651. The process of embodiment 648, further, comprising: the length of a rolling window period is structured to be equal to the time period length.

652. The process of embodiment 647, further, comprising: the set of time period buckets is structured to have a fixed length for each time period bucket.

653. The process of embodiment 647, further, comprising: the set of time period buckets is structured to have variable lengths, the variable length for each time period bucket reflective of changes in volatilities and correlations of the set of historical market scenarios.

654. The process of embodiment 648, further, comprising: the instructions to train a multi-variate mixture datastructure for a time period bucket using the associated subset of historical market scenarios are structured to comprise instructions to:

determine, via at least one processor, for each market factor from the set of market factors, a distribution to use for the respective market factor for the time period bucket;

fit, via at least one processor, for each market factor from the set of market factors, the distribution to use for the respective market factor for the time period bucket using the associated subset of historical market scenarios;

determine, via at least one processor, a copula for the set of market factors for the time period bucket; and train, via at least one processor, the multi-variate mixture datastructure for the time period bucket using the fitted distributions and the copula for the set of market factors.

655. The process of embodiment 654, further, comprising: the instructions to fit the distribution to use for a market factor for the time period bucket using the associated subset of historical market scenarios are structured to comprise instructions to calculate the mean of the market factor's values in the associated subset of historical market scenarios.

656. The process of embodiment 647, further, comprising: the instructions to generate simulated market scenarios for a time period bucket, using the trained multi-variate mixture datastructure associated with the time period bucket, are structured to comprise instructions to:

generate a simulated market scenario, from the simulated market scenarios for the time period bucket, by sampling the trained multi-variate mixture datastructure associated with the time period bucket.

657. The process of embodiment 646, further, comprising: a filter in the set of filters is configured as a set of customized market factors from the set of market factors and a range of allowable values for each customized market factor from the set of customized market factors.

658. The process of embodiment 657, further, comprising: the instructions to filter the set of simulated market scenarios based on the set of filters are structured to comprise instructions to determine a set of filtered simulated market scenarios having simulated market factor values that fall within the range of allowable values for each customized market factors from the set of customized market factors.

659. The process of embodiment 646, further, comprising: a filter in the set of filters is configured as a business cycle identifier and a business cycle weight associated with the business cycle identifier.

660. The process of embodiment 659, further, comprising: the processor-executable instructions structured as:

calculate, via at least one processor, a weighted expected portfolio return for the portfolio as a weighted average of calculated expected portfolio returns for a set of business cycle identifiers, the set of business cycle identifiers including the business cycle identifier, the calculated expected portfolio return associated with the business cycle identifier weighted in accordance with the business cycle weight.

701. A database calculation engine apparatus, comprising:
a memory;
a component collection in the memory;
a processor disposed in communication with the memory and configured to issue a plurality of processor-executable instructions from the component collection, the processor-executable instructions structured as:
obtain, via at least one processor, an asset return metrics calculation request datastructure, the asset return metrics calculation request datastructure structured to specify a set of assets and a set of simulated market scenarios, each simulated market scenario in the set of simulated market scenarios structured to comprise a set of simulated market factor values corresponding to a set of market factors;
determine, via at least one processor, a number of sessions to utilize for calculating asset return metrics data;
determine, via at least one processor, an assets range for a session based on the determined number of sessions to utilize, the assets range comprising a set of asset database table records for the set of assets to be processed by the session;
create, via at least one processor, an assets batch database table, the assets batch database table structured to comprise a set of asset database table records of a specified batch size from the assets range for the session;
create, via at least one processor, a factor simulations batch database table, the factor simulations batch database table structured to comprise a set of simulated market factor return values for the set of asset database table records in the assets batch database table;
create, via at least one processor, a factor exposures batch database table, the factor exposures batch database table structured to comprise a set of factor exposure database table records matching the set of asset database table records in the assets batch database table; and
calculate, via at least one processor, via a parallel SQL query, expected returns for the set of asset database table records in the assets batch database table, using the factor simulations batch database table and the factor exposures batch database table.

702. The apparatus of embodiment 701, further, comprising:
the set of simulated market factor values for a simulated market scenario is configured as generated using a set of deep learning neural networks.

703. The apparatus of embodiment 701, further, comprising:
the set of simulated market factor values for a simulated market scenario is configured as generated using a set of multi-variate mixture datastructures.

704. The apparatus of embodiment 701, further, comprising:
the processor-executable instructions structured as:
filter, via at least one processor, asset database table records associated with the set of assets, based on available factor exposure database table records, using a SQL statement.

705. The apparatus of embodiment 704, further, comprising:
the processor-executable instructions structured as:
filter, via at least one processor, simulated market scenario database table records associated with the set of simulated market scenarios, based on a subset of market factors from the set of market factors to which the filtered asset database table records have exposure, using a SQL statement.

706. The apparatus of embodiment 701, further, comprising:
the number of sessions to utilize for calculating asset return metrics data is determined based on the number of available server processors and a specified degree of parallelism per session.

707. The apparatus of embodiment 701, further, comprising:
the assets batch database table, the factor simulations batch database table, and the factor exposures batch database table are temporary database tables.

708. The apparatus of embodiment 704, further, comprising:
the processor-executable instructions structured as:
filter, via at least one processor, at least one of call schedule database table records and put schedule database table records based on the filtered asset database table records.

709. The apparatus of embodiment 708, further, comprising:
the processor-executable instructions structured as:
adjust, via at least one processor, via a parallel SQL query, the calculated expected returns for the set of asset database table records in the assets batch database table, based on at least one of the filtered call schedule database table records and the filtered put schedule database table records.

710. The apparatus of embodiment 701, further, comprising:
the processor-executable instructions structured as:
transpose, via at least one processor, the calculated expected returns for the set of asset database table records in the assets batch database table into a wide array format; and
write, via at least one processor, via a parallel SQL query, the transposed expected returns to an asset simulation wide table.

711. The apparatus of embodiment 710, further, comprising:
the asset simulation wide table formatted to facilitate efficient calculation of portfolio return metrics; and
the asset simulation wide table structured to be written to in parallel by query server processes from a plurality of utilized sessions.

712. The apparatus of embodiment 701, further, comprising:
the processor-executable instructions structured as:
calculate, via at least one processor, via a parallel SQL query, an asset return metric based on the calculated expected returns for the set of asset database table records in the assets batch database table;

transpose, via at least one processor, the calculated asset return metric for the set of asset database table records in the assets batch database table into a wide array format; and write, via at least one processor, via a parallel SQL query, the transposed asset return metric to an asset simulation wide table.

713. The apparatus of embodiment 701, further, comprising:

the processor-executable instructions structured as:

write, via at least one processor, via a parallel SQL query, the calculated expected returns to an asset measure table.

714. The apparatus of embodiment 701, further, comprising:

the processor-executable instructions structured as:

calculate, via at least one processor, via a parallel SQL query, an asset return metric based on the calculated expected returns for the set of asset database table records in the assets batch database table; and write, via at least one processor, via a parallel SQL query, the calculated asset return metric to an asset measure table.

715. The apparatus of embodiment 714, further, comprising:

the asset measure table formatted to facilitate efficient calculation of security return metrics; and the asset measure table structured to be written to in parallel by query server processes from a plurality of utilized sessions.

716. A database calculation engine processor-readable, non-transient medium, comprising processor-executable instructions structured as:

obtain, via at least one processor, an asset return metrics calculation request datastructure, the asset return metrics calculation request datastructure structured to specify a set of assets and a set of simulated market scenarios, each simulated market scenario in the set of simulated market scenarios structured to comprise a set of simulated market factor values corresponding to a set of market factors;

determine, via at least one processor, a number of sessions to utilize for calculating asset return metrics data;

determine, via at least one processor, an assets range for a session based on the determined number of sessions to utilize, the assets range comprising a set of asset database table records for the set of assets to be processed by the session;

create, via at least one processor, an assets batch database table, the assets batch database table structured to comprise a set of asset database table records of a specified batch size from the assets range for the session;

create, via at least one processor, a factor simulations batch database table, the factor simulations batch database table structured to comprise a set of simulated market factor return values for the set of asset database table records in the assets batch database table;

create, via at least one processor, a factor exposures batch database table, the factor exposures batch database table structured to comprise a set of factor exposure database table records matching the set of asset database table records in the assets batch database table; and calculate, via at least one processor, via a parallel SQL query, expected returns for the set of asset database table records in the assets batch database table, using the factor simulations batch database table and the factor exposures batch database table.

717. The medium of embodiment 716, further, comprising:

the set of simulated market factor values for a simulated market scenario is configured as generated using a set of deep learning neural networks.

718. The medium of embodiment 716, further, comprising:

the set of simulated market factor values for a simulated market scenario is configured as generated using a set of multi-variate mixture datastructures.

719. The medium of embodiment 716, further, comprising:

the processor-executable instructions structured as:

filter, via at least one processor, asset database table records associated with the set of assets, based on available factor exposure database table records, using a SQL statement.

720. The medium of embodiment 719, further, comprising:

the processor-executable instructions structured as:

filter, via at least one processor, simulated market scenario database table records associated with the set of simulated market scenarios, based on a subset of market factors from the set of market factors to which the filtered asset database table records have exposure, using a SQL statement.

721. The medium of embodiment 716, further, comprising:

the number of sessions to utilize for calculating asset return metrics data is determined based on the number of available server processors and a specified degree of parallelism per session.

722. The medium of embodiment 716, further, comprising:

the assets batch database table, the factor simulations batch database table, and the factor exposures batch database table are temporary database tables.

723. The medium of embodiment 719, further, comprising:

the processor-executable instructions structured as:

filter, via at least one processor, at least one of call schedule database table records and put schedule database table records based on the filtered asset database table records.

724. The medium of embodiment 723, further, comprising:

the processor-executable instructions structured as:

adjust, via at least one processor, via a parallel SQL query, the calculated expected returns for the set of asset database table records in the assets batch database table, based on at least one of the filtered call schedule database table records and the filtered put schedule database table records.

725. The medium of embodiment 716, further, comprising:

the processor-executable instructions structured as:

transpose, via at least one processor, the calculated expected returns for the set of asset database table records in the assets batch database table into a wide array format; and write, via at least one processor, via a parallel SQL query, the transposed expected returns to an asset simulation wide table.

726. The medium of embodiment 725, further, comprising:

the asset simulation wide table formatted to facilitate efficient calculation of portfolio return metrics; and the asset simulation wide table structured to be written to in parallel by query server processes from a plurality of utilized sessions.

727. The medium of embodiment 716, further, comprising:

the processor-executable instructions structured as:

calculate, via at least one processor, via a parallel SQL query, an asset return metric based on the calculated expected returns for the set of asset database table records in the assets batch database table;

transpose, via at least one processor, the calculated asset return metric for the set of asset database table records in the assets batch database table into a wide array format; and write, via at least one processor, via a parallel SQL query, the transposed asset return metric to an asset simulation wide table.

728. The medium of embodiment 716, further, comprising:

the processor-executable instructions structured as:

write, via at least one processor, via a parallel SQL query, the calculated expected returns to an asset measure table.

729. The medium of embodiment 716, further, comprising:

the processor-executable instructions structured as:

calculate, via at least one processor, via a parallel SQL query, an asset return metric based on the calculated expected returns for the set of asset database table records in the assets batch database table; and write, via at least one processor, via a parallel SQL query, the calculated asset return metric to an asset measure table.

730. The medium of embodiment 729, further, comprising:

the asset measure table formatted to facilitate efficient calculation of security return metrics; and the asset measure table structured to be written to in parallel by query server processes from a plurality of utilized sessions.

731. A database calculation engine processor-implemented system, comprising:

means to process processor-executable instructions;

means to issue processor-issuable instructions from a processor-executable component collection via the means to process processor-executable instructions, the processor-issuable instructions structured as:

obtain, via at least one processor, an asset return metrics calculation request datastructure, the asset return metrics calculation request datastructure structured to specify a set of assets and a set of simulated market scenarios, each simulated market scenario in the set of simulated market scenarios structured to comprise a set of simulated market factor values corresponding to a set of market factors;

determine, via at least one processor, a number of sessions to utilize for calculating asset return metrics data;

determine, via at least one processor, an assets range for a session based on the determined number of sessions to utilize, the assets range comprising a set of asset database table records for the set of assets to be processed by the session;

create, via at least one processor, an assets batch database table, the assets batch database table structured to comprise a set of asset database table records of a specified batch size from the assets range for the session;

create, via at least one processor, a factor simulations batch database table, the factor simulations batch database table structured to comprise a set of simulated market factor return values for the set of asset database table records in the assets batch database table;

create, via at least one processor, a factor exposures batch database table, the factor exposures batch database table structured to comprise a set of factor exposure database table records matching the set of asset database table records in the assets batch database table; and calculate, via at least one processor, via a parallel SQL query, expected returns for the set of asset database table records in the assets batch database table, using the factor simulations batch database table and the factor exposures batch database table.

732. The system of embodiment 731, further, comprising:

the set of simulated market factor values for a simulated market scenario is configured as generated using a set of deep learning neural networks.

733. The system of embodiment 731, further, comprising:

the set of simulated market factor values for a simulated market scenario is configured as generated using a set of multi-variate mixture datastructures.

734. The system of embodiment 731, further, comprising:

the processor-executable instructions structured as:

filter, via at least one processor, asset database table records associated with the set of assets, based on available factor exposure database table records, using a SQL statement.

735. The system of embodiment 734, further, comprising:

the processor-executable instructions structured as:

filter, via at least one processor, simulated market scenario database table records associated with the set of simulated market scenarios, based on a subset of market factors from the set of market factors to which the filtered asset database table records have exposure, using a SQL statement.

736. The system of embodiment 731, further, comprising:

the number of sessions to utilize for calculating asset return metrics data is determined based on the number of available server processors and a specified degree of parallelism per session.

737. The system of embodiment 731, further, comprising:

the assets batch database table, the factor simulations batch database table, and the factor exposures batch database table are temporary database tables.

738. The system of embodiment 734, further, comprising:

the processor-executable instructions structured as:

filter, via at least one processor, at least one of call schedule database table records and put schedule database table records based on the filtered asset database table records.

739. The system of embodiment 738, further, comprising:

the processor-executable instructions structured as:

adjust, via at least one processor, via a parallel SQL query, the calculated expected returns for the set of asset database table records in the assets batch database table, based on at least one of the filtered call schedule database table records and the filtered put schedule database table records.

740. The system of embodiment 731, further, comprising: the processor-executable instructions structured as:

transpose, via at least one processor, the calculated expected returns for the set of asset database table records in the assets batch database table into a wide array format; and write, via at least one processor, via a parallel SQL query, the transposed expected returns to an asset simulation wide table.

741. The system of embodiment 740, further, comprising: the asset simulation wide table formatted to facilitate efficient calculation of portfolio return metrics; and the asset simulation wide table structured to be written to in parallel by query server processes from a plurality of utilized sessions.

742. The system of embodiment 731, further, comprising: the processor-executable instructions structured as:

calculate, via at least one processor, via a parallel SQL query, an asset return metric based on the calculated expected returns for the set of asset database table records in the assets batch database table;

transpose, via at least one processor, the calculated asset return metric for the set of asset database table records in the assets batch database table into a wide array format; and write, via at least one processor, via a parallel SQL query, the transposed asset return metric to an asset simulation wide table.

743. The system of embodiment 731, further, comprising: the processor-executable instructions structured as:

write, via at least one processor, via a parallel SQL query, the calculated expected returns to an asset measure table.

744. The system of embodiment 731, further, comprising: the processor-executable instructions structured as:

calculate, via at least one processor, via a parallel SQL query, an asset return metric based on the calculated expected returns for the set of asset database table records in the assets batch database table; and write, via at least one processor, via a parallel SQL query, the calculated asset return metric to an asset measure table.

745. The system of embodiment 744, further, comprising: the asset measure table formatted to facilitate efficient calculation of security return metrics; and the asset measure table structured to be written to in parallel by query server processes from a plurality of utilized sessions.

746. A database calculation engine processor-implemented process, comprising executing processor-executable instructions to:

obtain, via at least one processor, an asset return metrics calculation request datastructure, the asset return metrics calculation request datastructure structured to specify a set of assets and a set of simulated market scenarios, each simulated market scenario in the set of simulated market scenarios structured to comprise a set of simulated market factor values corresponding to a set of market factors;

determine, via at least one processor, a number of sessions to utilize for calculating asset return metrics data;

determine, via at least one processor, an assets range for a session based on the determined number of sessions to utilize, the assets range comprising a set of asset database table records for the set of assets to be processed by the session;

create, via at least one processor, an assets batch database table, the assets batch database table structured to comprise a set of asset database table records of a specified batch size from the assets range for the session;

create, via at least one processor, a factor simulations batch database table, the factor simulations batch database table structured to comprise a set of simulated market factor return values for the set of asset database table records in the assets batch database table;

create, via at least one processor, a factor exposures batch database table, the factor exposures batch database table structured to comprise a set of factor exposure database table records matching the set of asset database table records in the assets batch database table; and calculate, via at least one processor, via a parallel SQL query, expected returns for the set of asset database table records in the assets batch database table, using the factor simulations batch database table and the factor exposures batch database table.

747. The process of embodiment 746, further, comprising: the set of simulated market factor values for a simulated market scenario is configured as generated using a set of deep learning neural networks.

748. The process of embodiment 746, further, comprising: the set of simulated market factor values for a simulated market scenario is configured as generated using a set of multi-variate mixture datastructures.

749. The process of embodiment 746, further, comprising: the processor-executable instructions structured as:

filter, via at least one processor, asset database table records associated with the set of assets, based on available factor exposure database table records, using a SQL statement.

750. The process of embodiment 749, further, comprising: the processor-executable instructions structured as:

filter, via at least one processor, simulated market scenario database table records associated with the set of simulated market scenarios, based on a subset of market factors from the set of market factors to which the filtered asset database table records have exposure, using a SQL statement.

751. The process of embodiment 746, further, comprising: the number of sessions to utilize for calculating asset return metrics data is determined based on the number of available server processors and a specified degree of parallelism per session.

752. The process of embodiment 746, further, comprising: the assets batch database table, the factor simulations batch database table, and the factor exposures batch database table are temporary database tables.

753. The process of embodiment 749, further, comprising: the processor-executable instructions structured as:

filter, via at least one processor, at least one of call schedule database table records and put schedule database table records based on the filtered asset database table records.

754. The process of embodiment 753, further, comprising: the processor-executable instructions structured as:
adjust, via at least one processor, via a parallel SQL query, the calculated expected returns for the set of asset database table records in the assets batch database table, based on at least one of the filtered call schedule database table records and the filtered put schedule database table records.

755. The process of embodiment 746, further, comprising: the processor-executable instructions structured as:
transpose, via at least one processor, the calculated expected returns for the set of asset database table records in the assets batch database table into a wide array format; and
write, via at least one processor, via a parallel SQL query, the transposed expected returns to an asset simulation wide table.

756. The process of embodiment 755, further, comprising: the asset simulation wide table formatted to facilitate efficient calculation of portfolio return metrics; and
the asset simulation wide table structured to be written to in parallel by query server processes from a plurality of utilized sessions.

757. The process of embodiment 746, further, comprising: the processor-executable instructions structured as:
calculate, via at least one processor, via a parallel SQL query, an asset return metric based on the calculated expected returns for the set of asset database table records in the assets batch database table;
transpose, via at least one processor, the calculated asset return metric for the set of asset database table records in the assets batch database table into a wide array format; and
write, via at least one processor, via a parallel SQL query, the transposed asset return metric to an asset simulation wide table.

758. The process of embodiment 746, further, comprising: the processor-executable instructions structured as:
write, via at least one processor, via a parallel SQL query, the calculated expected returns to an asset measure table.

759. The process of embodiment 746, further, comprising: the processor-executable instructions structured as:
calculate, via at least one processor, via a parallel SQL query, an asset return metric based on the calculated expected returns for the set of asset database table records in the assets batch database table; and
write, via at least one processor, via a parallel SQL query, the calculated asset return metric to an asset measure table.

760. The process of embodiment 759, further, comprising: the asset measure table formatted to facilitate efficient calculation of security return metrics; and
the asset measure table structured to be written to in parallel by query server processes from a plurality of utilized sessions.

MLPO Controller

FIG. 99 shows a block diagram illustrating embodiments of a MLPO controller. In this embodiment, the MLPO controller 9901 may serve to aggregate, process, store, search, serve, identify, instruct, generate, match, and/or facilitate interactions with a computer through machine learning and database systems technologies, and/or other related data.

Users, which may be people and/or other systems, may engage information technology systems (e.g., computers) to facilitate information processing. In turn, computers employ processors to process information; such processors 9903 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 9929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MLPO controller 9901 may be connected to and/or communicate with entities such as, but not limited to: one or more users from peripheral devices 9912 (e.g., user input devices 9911); an optional cryptographic processor device 9928; and/or a communications network 9913.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The MLPO controller 9901 may be based on computer systems that may comprise, but are not limited to, components such as: a computer systemization 9902 connected to memory 9929.

Computer Systemization

A computer systemization 9902 may comprise a clock 9930, central processing unit ("CPU(s)" and/or "processor (s)" (these terms are used interchangeable throughout the disclosure unless noted to the contrary)) 9903, a memory 9929 (e.g., a read only memory (ROM) 9906, a random access memory (RAM) 9905, etc.), and/or an interface bus 9907, and most frequently, although not necessarily, are all interconnected and/or communicating through a system bus 9904 on one or more (mother)board(s) 9902 having conductive and/or otherwise transportive circuit pathways through which instructions (e.g., binary encoded signals) may travel to effectuate communications, operations, storage, etc. The computer systemization may be connected to a power source 9986; e.g., optionally the power source may be internal. Optionally, a cryptographic processor 9926 may be connected to the system bus. In another embodiment, the cryptographic processor, transceivers (e.g., ICs) 9974, and/or sensor array (e.g., accelerometer, altimeter, ambient light, barometer, global positioning system (GPS) (thereby allowing MLPO controller to determine its location), gyroscope, magnetometer, pedometer, proximity, ultra-violet sensor, etc.) 9973 may be connected as either internal and/or external peripheral devices 9912 via the interface bus I/O 9908 (not pictured) and/or directly via the interface bus 9907. In turn, the transceivers may be connected to antenna(s) 9975, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 9929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the MLPO controller and beyond through various interfaces. Should processing requirements dictate a greater amount speed and/or capacity, distributed processors (e.g., see Distributed MLPO below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MLPO may be achieved by implementing a microcontroller such as CAST's® R8051XC2 microcontroller; Intel's® MCS 51 (i.e., 8051 microcontroller); and/or the like. Also, to implement certain features of the MLPO, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MLPO component collection (distributed or otherwise) and/or features may be implemented via the microprocessor and/or via embedded components; e.g., via ASIC, coprocessor, DSP, FPGA, and/or the like. Alternately, some implementations of the MLPO may be implemented with embedded components that are configured and used to achieve a variety of features or signal processing.

Depending on the particular implementation, the embedded components may include software solutions, hardware solutions, and/or some combination of both hardware/software solutions. For example, MLPO features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the MLPO features. A hierarchy of programmable interconnects allow logic blocks to be interconnected as needed by the MLPO system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MLPO may be developed on FPGAs and then migrated into a fixed version that more resembles ASIC implementations. Alternate or coordinating implementations may migrate MLPO controller features to a final ASIC instead of or in addition to FPGAs. Depending on the implementation all of the aforementioned embedded components and microprocessors may be considered the "CPU" and/or "processor" for the MLPO.

Power Source

The power source 9986 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 9986 is connected to at least one of the interconnected subsequent components of the MLPO thereby providing an electric current to all subsequent components. In one example, the power source 9986 is connected to the system bus component 9904. In an alternative embodiment, an outside power source 9986 is provided through a connection across the I/O 9908 interface. For example, a USB and/or IEEE 1394 connection carries both data and power across the connection and is therefore a suitable source of power.

Interface Adapters

Interface bus(ses) 9907 may accept, connect, and/or communicate to a number of interface adapters, variously although not necessarily in the form of adapter cards, such as but not limited to: input output interfaces (I/O) 9908, storage interfaces 9909, network interfaces 9910, and/or the like. Optionally, cryptographic processor interfaces 9927 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 9909 may accept, communicate, and/or connect to a number of storage devices such as, but not limited to: storage devices 9914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 9910 may accept, communicate, and/or connect to a communications network 9913. Through a communications network 9913, the MLPO controller is accessible through remote clients **9933*b* (e.g., computers with web browsers) by users 9933*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MLPO below), architectures may similarly be employed to pool, load balance, and/or otherwise decrease/increase the communicative bandwidth required by the MLPO controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 9910 may be used to engage with various communications network types 9913**. For example, multiple network interfaces may be employed to allow for the communication over broadcast, multicast, and/or unicast networks.

Input Output interfaces (I/O) 9908 may accept, communicate, and/or connect to user, peripheral devices 9912 (e.g., input devices 9911), cryptographic processor devices 9928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 9912 may be connected and/or communicate to I/O and/or other facilities of the like such as network interfaces, storage interfaces, directly to the interface bus, system bus, the CPU, and/or the like. Peripheral devices may be external, internal and/or part of the MLPO controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 9911 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MLPO controller may be embodied as an embedded, dedicated, and/or monitor-less (i.e., headless) device, wherein access would be provided over a network interface connection.

Cryptographic units such as, but not limited to, microcontrollers, processors 9926, interfaces 9927, and/or devices 9928 may be attached, and/or communicate with the MLPO controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 9929. However, memory is a fungible technology and resource, thus, any number of memory embodiments may be employed in lieu of or in concert with one another. It is to be understood that the MLPO controller and/or a computer systemization may employ various forms of memory 9929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 9929 will include ROM 9906, RAM 9905, and a storage device 9914. A storage device 9914 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 9929 may contain a collection of program and/or database components and/or data such as, but not limited to: operating system component(s) 9915 (operating system); information server component(s) 9916 (information server); user interface component(s) 9917 (user interface); Web browser component(s) 9918 (Web browser); database(s) 9919; mail server component(s) 9921; mail client component(s) 9922; cryptographic server component (s) 9920 (cryptographic server); the MLPO component(s) 9935; and/or the like (i.e., collectively a component collection). These components may be stored and accessed from the storage devices and/or from storage devices accessible through an interface bus. Although unconventional program components such as those in the component collection may be stored in a local storage device 9914, they may also be loaded and/or stored in memory such as: peripheral devices, RAM, remote storage facilities through a communications network, ROM, various forms of memory, and/or the like.

Operating System

The operating system component 9915 is an executable program component facilitating the operation of the MLPO controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MLPO controller to communicate with other entities through a communications network 9913. Various communication protocols may be used by the MLPO controller as a subcarrier transport mechanism for interaction, such as, but not limited to: multicast, TCP/IP, UDP, unicast, and/or the like.

Information Server

An information server component 9916 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MLPO controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MLPO database 9919, operating systems, other program components, user interfaces, Web browsers, and/or the like.

Access to the MLPO database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MLPO. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the MLPO as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 9917 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 9918 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MLPO enabled nodes. The combined application may be nugatory on systems employing Web browsers.

Mail Server

A mail server component 9921 is a stored program component that is executed by a CPU 9903. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MLPO. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the MLPO mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 9922 is a stored program component that is executed by a CPU 9903. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 9920 is a stored program component that is executed by a CPU 9903, cryptographic processor 9926, cryptographic processor interface 9927, cryptographic processor device 9928, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MLPO may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the MLPO component to engage in secure transactions if so desired. The cryptographic component facilitates the secure accessing of resources on the MLPO and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MLPO Database

The MLPO database component 9919 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MLPO database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MLPO database is implemented as a data-structure, the use of the MLPO database 9919 may be integrated into another component such as the MLPO component 9935. Also, the database may be implemented as a mix of data structures, objects, and relational structures. Databases may be consolidated and/or distributed in countless variations (e.g., see Distributed MLPO below). Portions of databases, e.g., tables, may be exported and/or imported and thus decentralized and/or integrated.

In one embodiment, the database component 9919 includes several tables 9919*a-z:*

An accounts table 9919*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 9919*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MLPO);

An devices table 9919*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 9919*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 9919*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 9919*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 9919*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 9919*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 9919*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A ScenarioResults table 9919*j* includes fields such as, but not limited to: simulationID, scenarioID, scenarioTimeframe, scenarioMarketFactorID, scenarioDistributionConfiguration, scenarioTrainedMachineLearningConfigurationData, scenarioSimulatedMarketFactorChange, scenarioAssociatedBusinessCycle, simulationMarketFactorRangeMin, simulationMarketFactorRangeMax, simulationMarketFactorRangeAverage, and/or the like;

A DTEs table 9919*k* includes fields such as, but not limited to: DTE_ID, DTE_Type, DTE_LinkedSecurityID, DTE_TrainedConfigurationData, DTE_Linked-simulationID, and/or the like;

An ExpectedReturns table 99191 includes fields such as, but not limited to: securityID, linkedSimulationID, linkedScenarioID, linkedScenarioSecurityExpectedReturn, and/or the like;

A PredefinedScenarios table 9919*m* includes fields such as, but not limited to: predefinedScenarioID, customizedMarketFactorID, customizedMarketFactorRangeMin, customizedMarketFactorRangeMax, customizedMarketFactorRangeAverage, predefinedScenarioAssociatedSimulationID, predefinedScenarioAssociatedFilteredMarketScenarios, and/or the like;

An asset_sim_wide table 9919*n* includes fields such as, but not limited to: asset_id, pricing_dt, sim_id, returns, and/or the like;

An asset_measure table 99190 includes fields such as, but not limited to: asset_id, pricing_dt, sim_id, market_id, measure_name, measure_value, and/or the like;

A market_data table 9919*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and Quote Market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the MLPO database may interact with other database systems. For example, employing a distributed database system, queries and data access by search MLPO component may treat the combination of the MLPO database, an integrated data security layer database as a single database entity (e.g., see Distributed MLPO below).

In one embodiment, user programs may contain various user interface primitives, which may serve to update the MLPO. Also, various accounts may require custom database tables depending upon the environments and the types of clients the MLPO may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 9919*a-z*. The MLPO may be configured to keep track of various settings, inputs, and parameters via database controllers.

The MLPO database may communicate to and/or with other components in a component collection, including itself, and/or facilities of the like. Most frequently, the MLPO database communicates with the MLPO component, other program components, and/or the like. The database may contain, retain, and provide information regarding other nodes and data.

The MLPOs

The MLPO component 9935 is a stored program component that is executed by a CPU. In one embodiment, the MLPO component incorporates any and/or all combinations of the aspects of the MLPO that was discussed in the previous figures. As such, the MLPO affects accessing, obtaining and the provision of information, services, transactions, and/or the like across various communications networks. The features and embodiments of the MLPO discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MLPO's features and facilities, and in many cases reduce the costs, energy consumption/requirements, and extend the life of MLPO's underlying infrastructure; this has the added benefit of making the MLPO more reliable. Similarly, many of the features and mechanisms are designed to be easier for users to use and access, thereby broadening the audience that may enjoy/employ and exploit the feature sets of the MLPO; such ease of use also helps to increase the reliability of the MLPO. In addition, the feature sets include heightened security as noted via the Cryptographic components 9920, 9926, 9928 and throughout, making access to the features and data more reliable and secure The MLPO transforms machine learning simulation request, decision tree ensembles training request, expected returns calculation request, portfolio construction request, predefined scenario construction request, portfolio returns visualization request inputs, via MLPO components (e.g., MLSSP, DTET, ERC, PC, PSC, SPRV, BPRV, PRV, ARMC), into machine learning simulation response, decision tree ensembles training response, expected returns calculation response, portfolio construction response, predefined scenario construction response, portfolio returns visualization response outputs.

The MLPO component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the MLPO server employs a cryptographic server to encrypt and decrypt communications. The MLPO component may communicate to and/or with other components in a component collection, including itself, and/or facilities of the like. Most frequently, the MLPO component communicates with the MLPO database, operating systems, other program components, and/or the like. The MLPO may contain, communicate, generate, obtain, and/or provide program component, system, user, and/or data communications, requests, and/or responses.

Distributed MLPOs

The structure and/or operation of any of the MLPO node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the MLPO controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for MLPO controller and/or MLPO component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MLPO controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain') ;
/ / set ip address and port to listen to for incoming data
$address = '192.168.0.100' ;
$port = 255 ;
/ / create a server-side SSL socket, listen for/accept incoming communication
$sock = socket_create(AF_INET, SOCK_STREAM, 0) ;
socket_bind($sock, $address, $port) or die('Could not bind to address') ;
socket_listen($sock) ;
$client = socket_accept($sock) ;
/ / read input data from client device in 1024 byte blocks until end of message
do {
   $input = "";
   $input = socket_read($client, 1024) ;
   $data .= $input;
} while($input != "") ;
/ / parse data to extract variables
$obj = json_decode($data, true) ;
/ / store input data in a database
mysql_connect("201.408.185.132",$DBserver,$password) ; / / access database server
mysql_select("CLIENT_DB.SQL") ; / / select database to append
mysql_query("INSERT INTO UserTable (transmission)
VALUES ($data)") ; / / add data to UserTable table in a CLIENT database
mysql_close("CLIENT_DB.SQL") ; / / close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Machine Learning Portfolio Simulating and Optimizing Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MLPO individual and/or enterprise user, database configuration and/or relational model, data type, data transmission and/or network framework, syntax structure, and/or the like, various embodiments of the MLPO, may be implemented that allow a great deal of flexibility and customization. For example, aspects of the MLPO may be adapted for derivatives. While various embodiments and discussions of the MLPO have included machine learning and database systems, however, it is to be understood that the embodiments described herein may be readily configured and/or customized for a wide variety of other applications and/or implementations.

What is claimed is:

1. A machine learning portfolio generating apparatus, comprising;

at least one memory;

a component collection stored in the at least one memory;

any of at least one processor disposed in communication with the at least one memory, the any of at least one processor executing processor-executable instructions from the component collection, storage of the component collection structured with processor-executable instructions comprising:

generate a set of simulated marker scenarios datastructures with a variational autoencoder via a network accessible server, in which the variational autoencoder datastructure is structured as including set of latent variables generated via a neural network encoder, and in which the set of latent variables are simulated with neural networks as decoder such that decoding of the simulated market scenarios datastructures follow dynamic dependencies and volatilities of historical market risk factors;

distribute distribution and dependency joint distribution structures with a transfer layer between the encoder and the decoder, in which the latent space variables are structured adopting the distribution and dependency joint distribution structures;

tuning a transfer lavers codec, in which the transfer layers codec is the encoder and the decoder and the transfer layer in between, in which the tuning is structured including: a number of the latest space variables, a number of neurons in the transfer layers codec, a number of layers of the transfer layers codec, in which the tuning is structure as optimizing an overall fit as between the set of simulated market scenarios datastructures and a set of historical market scenarios, determine a historical data set, a rolling window period length, and a set of market factors;

determine a set of rolling window periods with the historical data set and the rolling window period length; and calculate for each market factor from the set of market factors, for each rolling window period from the set of rolling window periods, a change to the respective market factor during the respective rolling window period, each historical marker scenario from the ser of historical market scenarios structured comprising calculated changes to the set of market factors during a rolling window period, determine a delta between values of the market factor at a beginning time point and an ending time point of the rolling window period, determine that historical data for the market factor during the rolling window period is unavailable for a time point; and impute the unavailable historical data for the time point with a machine learning method, the imputed delta of historical market factors structured minimizing the Mean Absolute Difference between correlation matrices of original and imputed data, in which the mean z-scores of market factor deltas with imputation are minimized compared to the mean z-scores of the original market factor deltas without imputation, and in which the ratios of the standard deviation of each factor with and without imputation.

2. The apparatus of claim 1, further, comprising:

structure a deep learning neural network for a time period bucket, the trained deep learning neural network is trained generating a set of Gaussian mixture latent variables.

3. The apparatus of claim 2, further, comprising:

in which cloud computing clusters structured generating simulated market scenarios datastructures for the time period bucket, with the trained deep learning neural network associated with the time period bucket.

4. The apparatus of claim 3, further, comprising:

in which the time period bucket are structured including:

generate a set of random values for the set of Gaussian mixture latent variables; and generate a simulated market scenario, from the simulated market scenarios datastructures for the time period bucket, from the generated set of random values with a neural network decoder of the trained deep learning neural network associated with the time period bucket.

5. The apparatus of claim 1, further, comprising:

filter the set of simulated market scenarios datastructures associated with a time period length based on specified ranges of allowable values for specified customized market factors.

6. The apparatus of claim 1, further, comprising:

filter the set of simulated market scenarios datastructures associated with a time period length based on specified business cycle settings.

7. The apparatus of claim 1, further, comprising:

apply cloud service, Amazon Web Services (AWS) SageMaker, training, tune, and deploy deep learning models in a parallel and distributed way on multiple instances and multiple GPUs.

8. The apparatus of claim 7, further, comprising:

manage a machine learning pipeline including any of: a machine learning service, SageMaker, in AWS.

9. The apparatus of claim 8, further, comprising:

structure SageMaker supporting collaboration between developers and data scientists.

10. The apparatus of claim 9, further, comprising:

in which SageMaker for parallel market scenario simulation structured as:

create a SageMaker notebook instance with specific lifecycle structure, permissions and encryption, and network settings;

upload input data to S3 by providing a S3 path;

structure a training job as an estimator by providing arguments including any of: training script entry point, SageMaker execution role, number and type of training instance, security key, and a set of hyperparameters;

trigger the training job by launching a docker container on EC2 instances with prebuilt SageMaker docker images and downloading the input data from the specified S3 path starting the training process;

repeat the training job on market scenarios with different delta length structured as multiple training jobs triggerable together and trained on multiple instances in parallel;

deploy models as multiple SageMaker endpoints by specifying instance type and number of instances used for hosting the endpoints; and simulate market scenarios with different delta length with the SageMaker endpoints.

11. The apparatus of claim 1, further, comprising:

in which the set of simulated market scenarios datastructures are further generated with a set of multi-variate mixture datastructures.

12. A machine learning portfolio generating apparatus, comprising:

at least one memory;

a component collection stored in the at least one memory;

any of at least one processor disposed in communication with the at least one memory the any of at least one processor executing processor-executable instructions from the component collection, storage of the component collection structured with processor-executable instructions comprising:

generate a set of simulated market scenarios datastructures with a variational autoencoder via a network accessible server, in which the variational autoencoder datastructure is structured as including set of latent variables generated via a neural network encoder, and in which the set of latent variables are simulated with neural networks as decoder such that decoding of the simulated market scenarios datastructures follow dynamic dependencies and volatilities of historical market risk factors;

distribute distribution and dependency joint distribution structures with a transfer layer between the encoder and the decoder, in which the latent space variables are structured adopting the distribution and dependency joint distribution structures;

tuning a transfer layers codec, in which the transfer layers codec is the encoder and the decoder and the transfer layer in between, in which the tuning is structured including: a number of the latent space variables, a number of neurons in the transfer layers codec, a number of lovers of the transfer lavers codec, in which the tuning is structure as optimizing an overall fit as between the set of simulated marker scenarios datastructures and a set of historical market scenarios, quantify unprecedentedness as a fitted polynomial degree 2 curve, via at least one processor on cloud computing infrastructure, which captures the relationship between movements in VIX and the number of risk factors that experienced unprecedented magnitude of changes; and train the conditional dependency structure of large movements in VIX, in which the VIX up and VIX down levels are solved by the objective function of minimizing the mean squared error between a simulated polynomial degree 2 curve and a historical polynomial degree 2 curve, in which the fitted polynomial degree 2 curve is fitted from simulated market scenarios datastructures generated with at least one of: a variational autoencoder deep learning model, a guassian copula conditional on large VIX movements.

13. The apparatus of claim 12, further, comprising:

determine a historical data set, a rolling window period length, and a set of market factors;

determine a set of rolling window periods with the historical data set and the rolling window period length; and calculate for each market factor from the set of market factors, for each rolling window period from the set of rolling window periods, a change to the respective market factor during the respective rolling window period, each historical market scenario from the set of historical market scenarios structured comprising calculated changes to the set of market factors during a rolling window period.

14. The apparatus of claim 13, further, comprising:

determine a delta between values of the market factor at a beginning time point and an ending time point of the rolling window period.

15. A machine learning portfolio generating apparatus, comprising;

at least one memory;

a component collection stored in the at least one memory;

any of at least one processor disposed in communication with the at least one memory, the any of at least one processor executing processor-executable instructions from the component collection, storage of the component collection structured with processor-executable instructions comprising:

generate a set of simulated market scenarios datastructures with a variational autoencoder via a network accessible server, in which the variational autoencoder datastructure is structured as including set of latent variables generated via a neural network encoder, and in which the set of latent variables are simulated with neural networks as decoder such that decoding of the simulated market scenarios datastructures follow dynamic dependencies and volatilities of historical market risk factors:

distribute distribution and dependency joint distribution structures with a transfer layer between the encoder and the decoder, in which the latent space variables are structured adopting the distribution and dependency joint distribution structures;

tuning a transfer layers codec, in which the transfer layers codec is the encoder and the decoder and the transfer layer in between, in which the tuning is structured including: a number of the latent space variables, a number of neurons in the transfer layers codec, a number of lavers of the transfer layers codec, in which the tuning is structure as optimizing an overall fit as between the set of simulated market scenarios datastructures and a set of historical marker scenarios, calculate a set of expected returns for a set of securities, each expected return in the set of expected returns structured as calculated for a security during a simulated market scenario in the set of simulated market scenarios datastructures with:

the respective security's conditional Beta during the respective simulated market scenario, determined with a set of decision tree ensembles, trained estimating conditional Beta of the respective security, based on a first subset of simulated market factors, and the respective security's conditional default probability during the respective simulated market scenario, determined with a set of decision tree ensembles, trained estimating conditional default probability of the respective security, based on a second subset of simulated market factor values.

* * * * *